Dec. 4, 1928.

M. M. GOLDBERG 1,694,009

AUDITING MACHINE

Filed Aug. 11, 1919

Inventor
MAXIMILIAN M. GOLDBERG
by Carl Beust
Henry E. Stauffer
Attorneys

Dec. 4, 1928.

M. M. GOLDBERG

AUDITING MACHINE

Filed Aug. 11, 1919

Inventor
MAXIMILIAN M. GOLDBERG
by Pearl Benst
Henry E. Stauffer
Attorneys

Dec. 4, 1928.  M. M. GOLDBERG  1,694,009
AUDITING MACHINE
Filed Aug. 11, 1919  37 Sheets-Sheet 3
FIG.2a
FIG.4
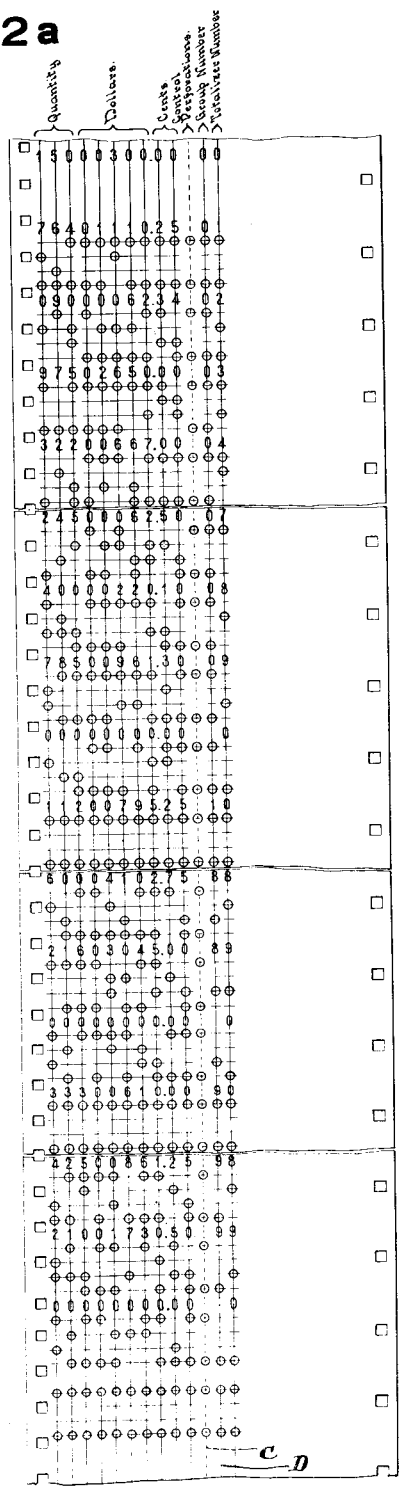
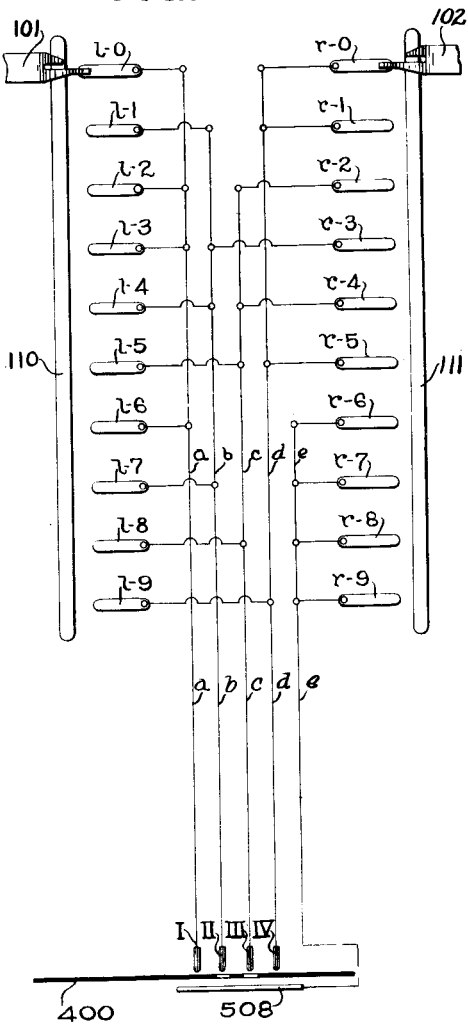
Inventor
MAXIMILIAN M. GOLDBERG
by Pearl Ernst
Henry E. Stauffer
Attorneys

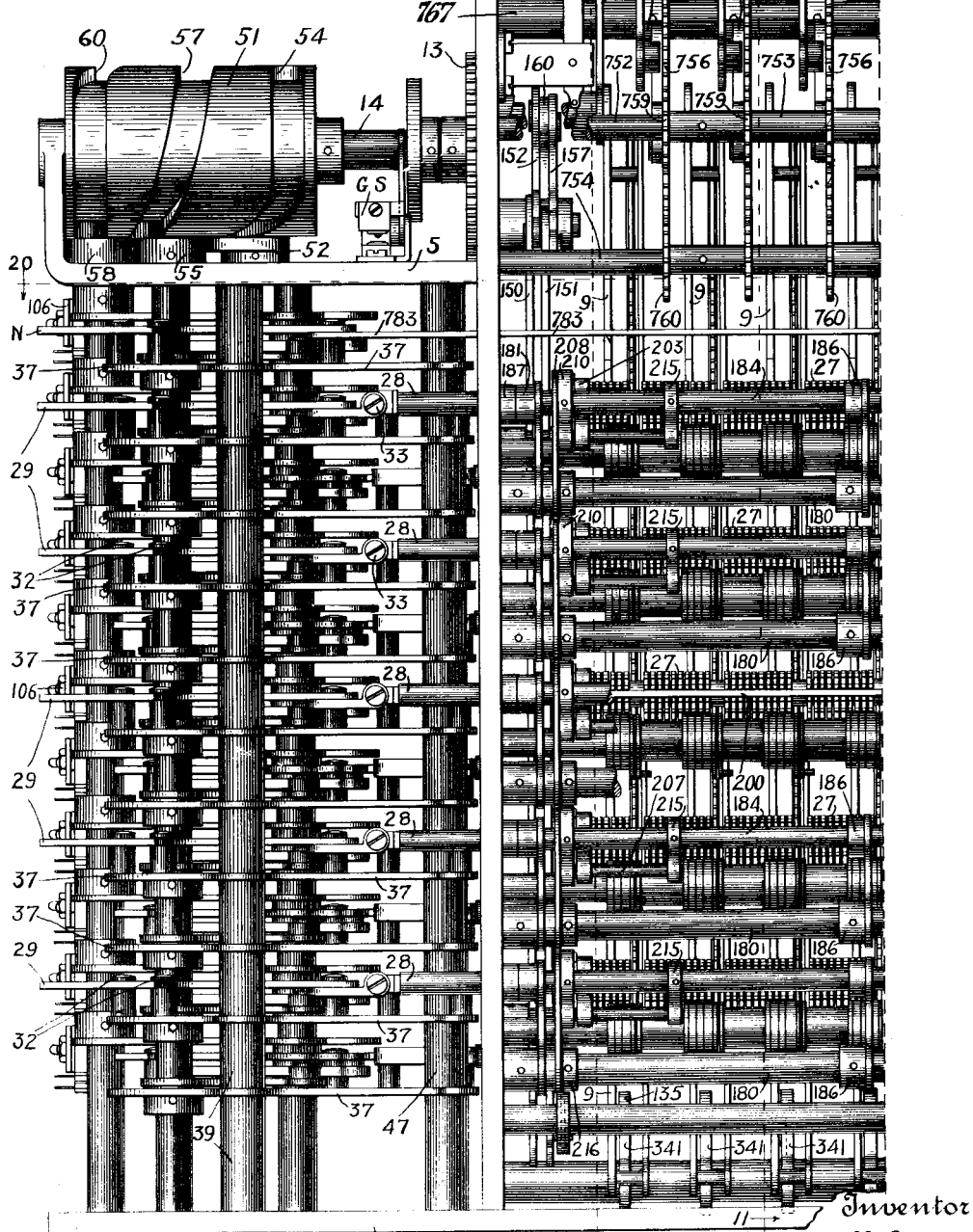

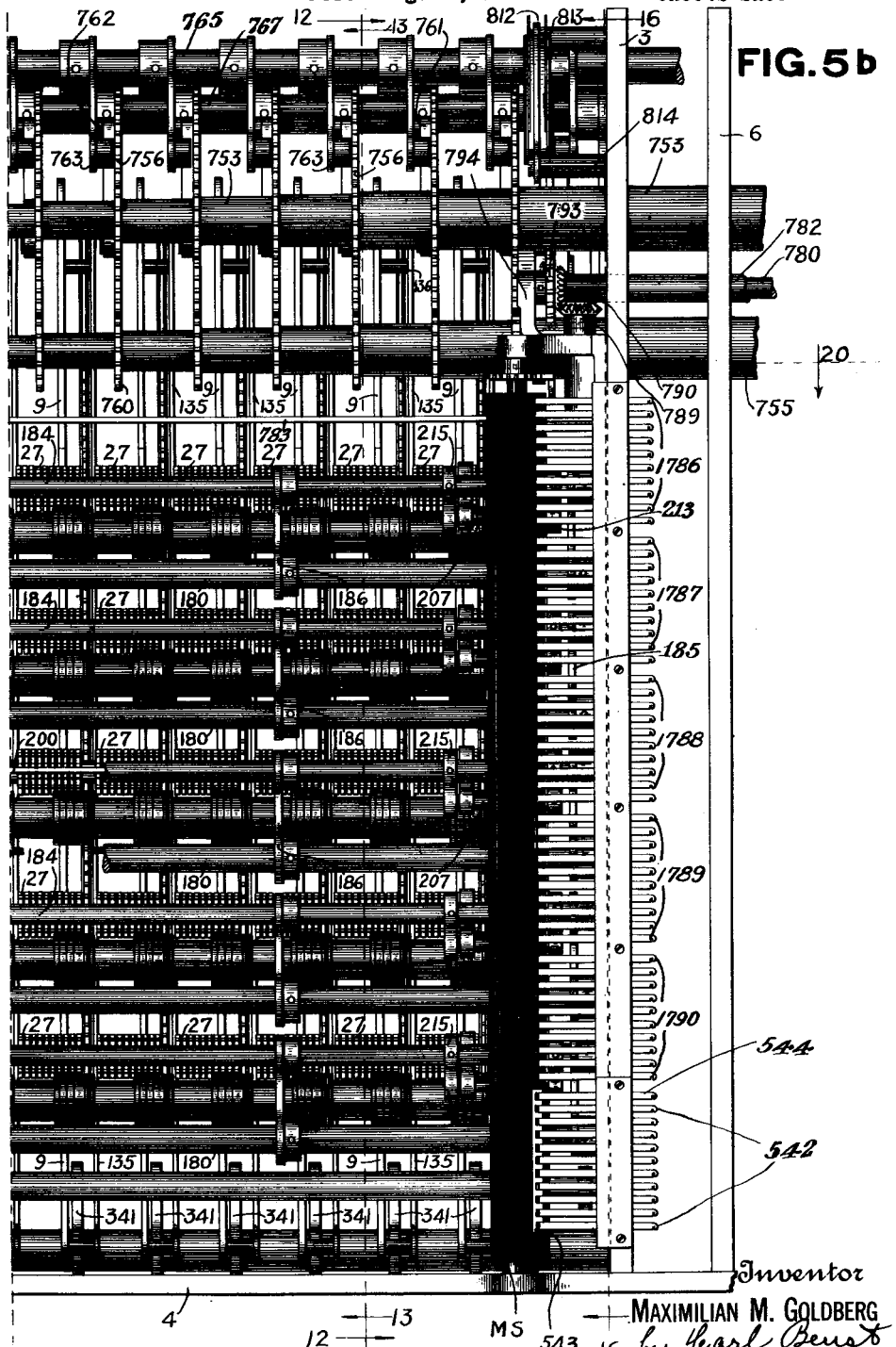

Dec. 4, 1928.
M. M. GOLDBERG
AUDITING MACHINE
Filed Aug. 11, 1919
1,694,009
37 Sheets-Sheet 6
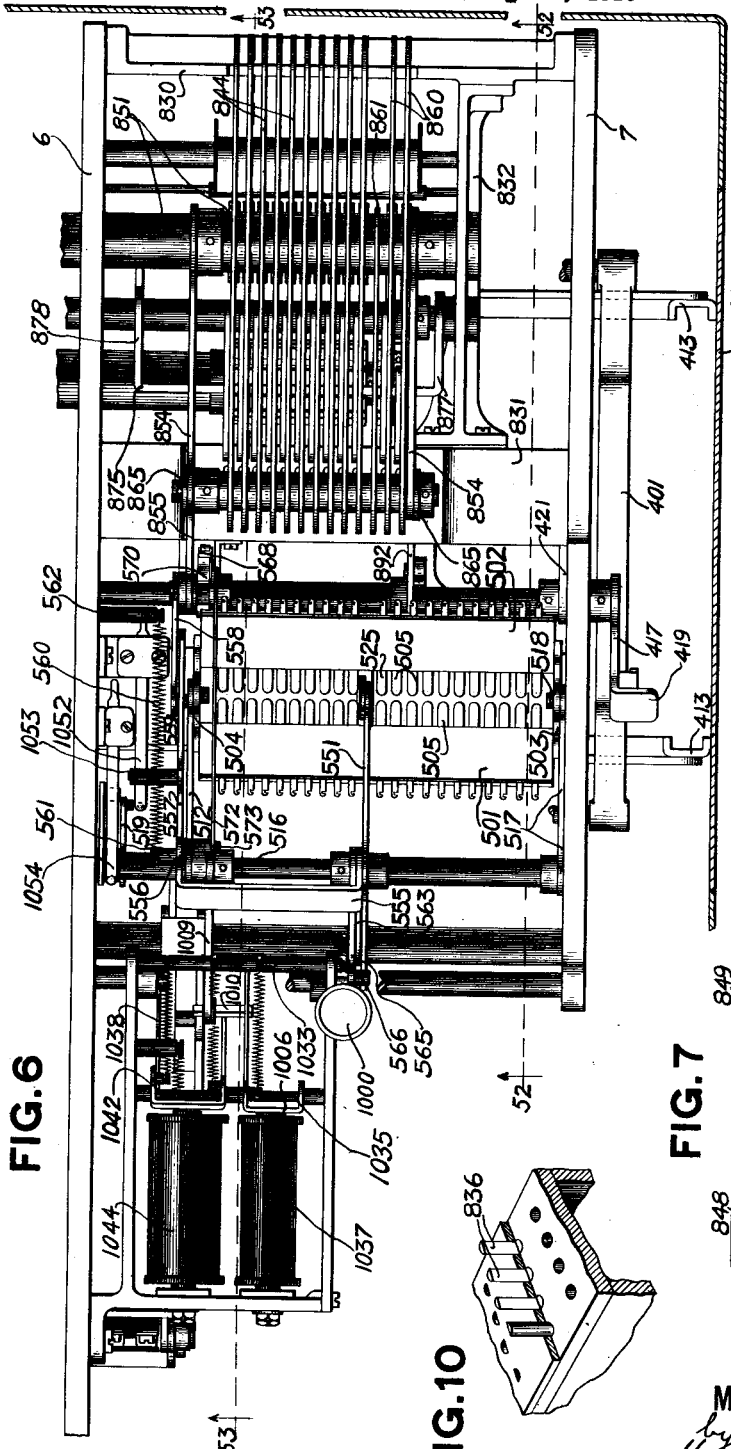
Inventor
MAXIMILIAN M. GOLDBERG

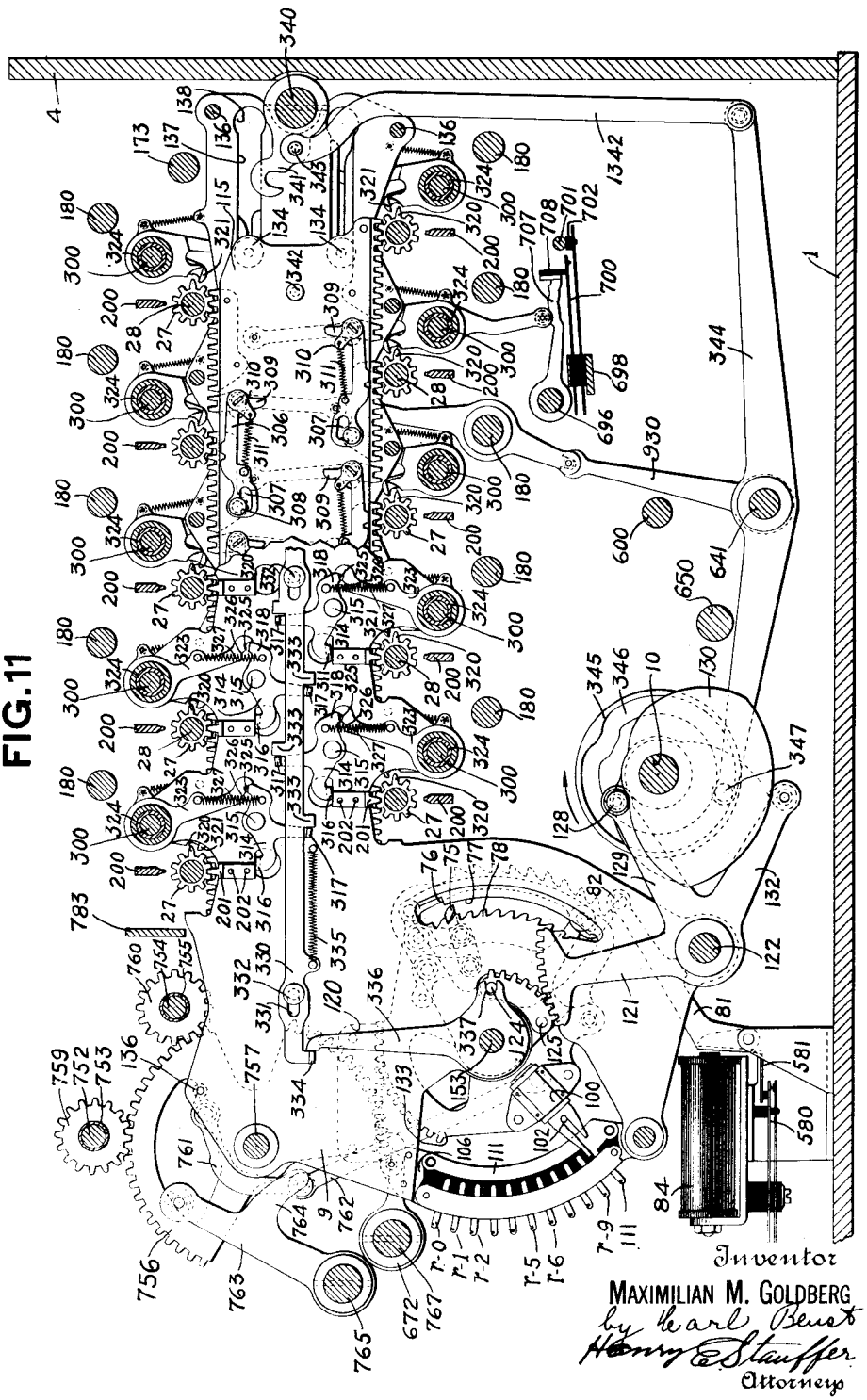

Dec. 4, 1928.
M. M. GOLDBERG
1,694,009
AUDITING MACHINE
Filed Aug. 11, 1919
37 Sheets-Sheet 8
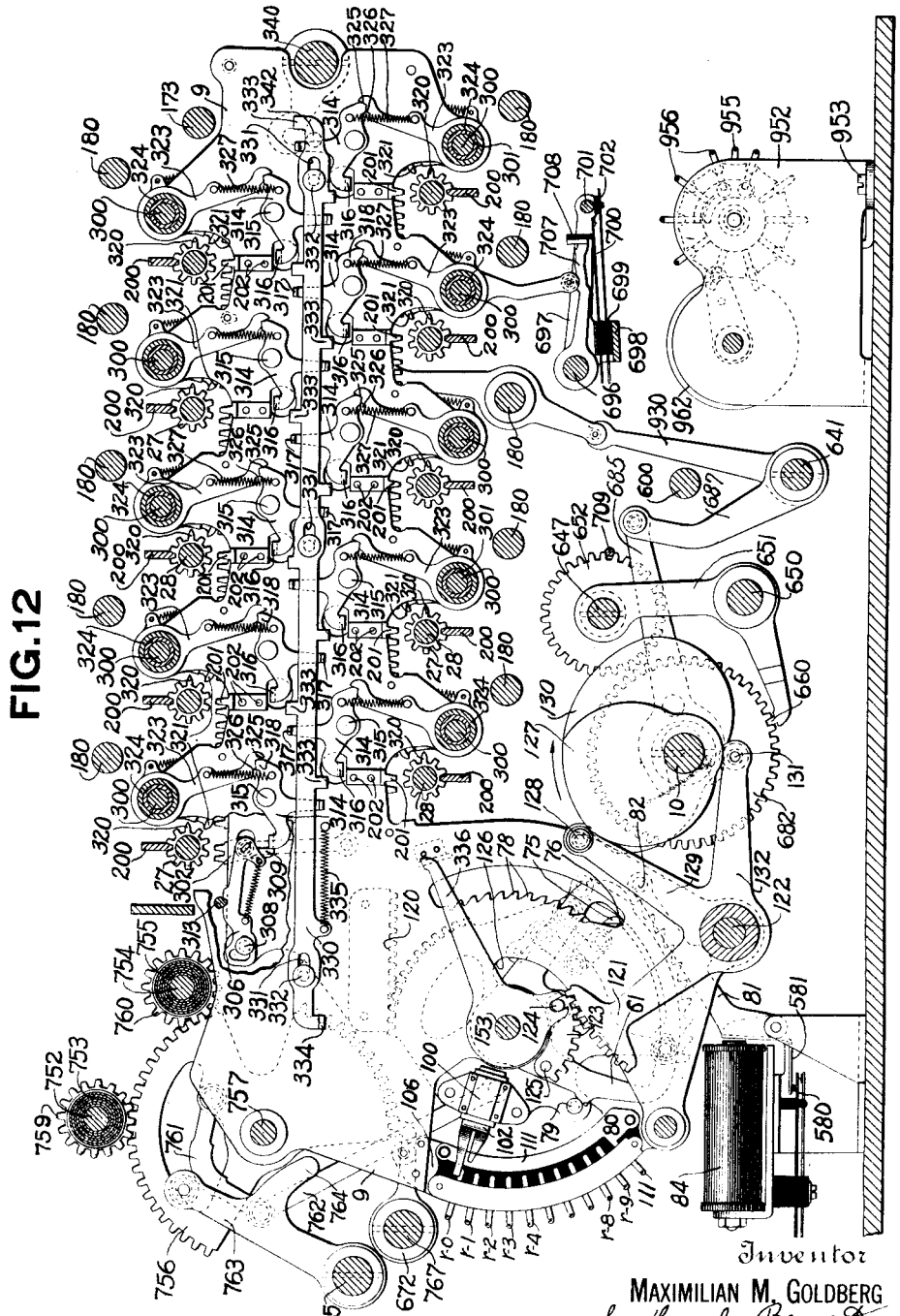
Inventor
MAXIMILIAN M. GOLDBERG

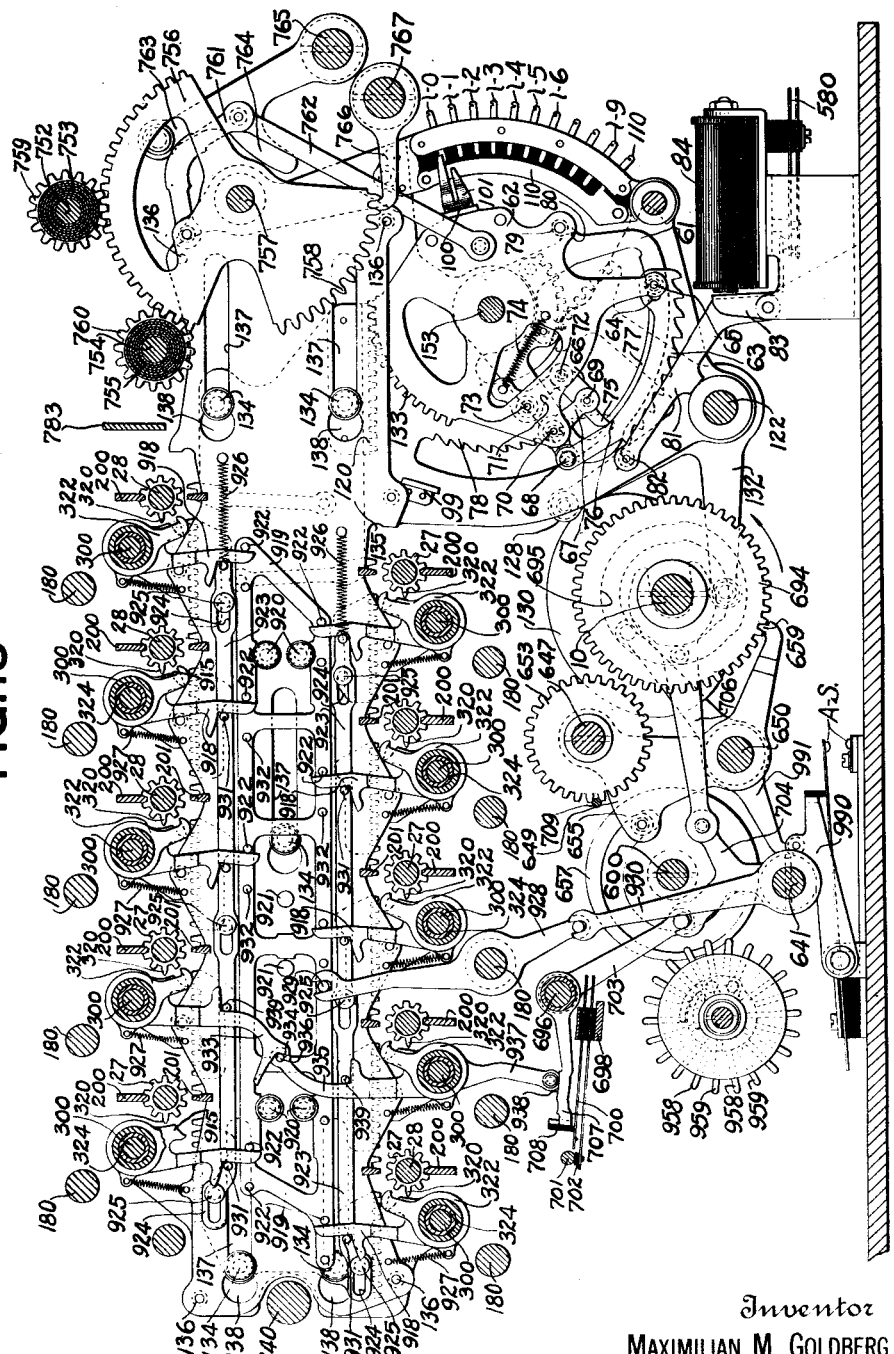

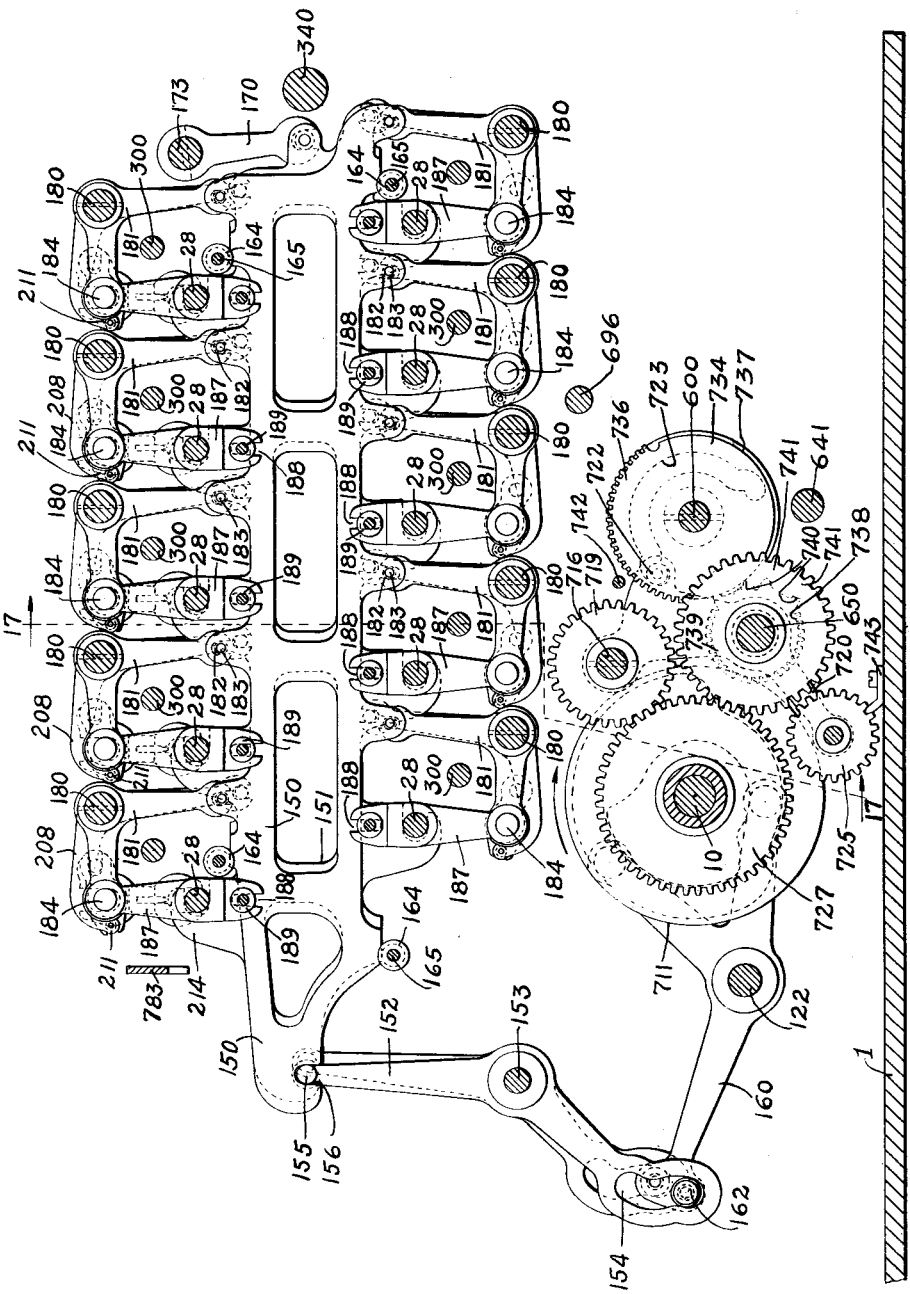

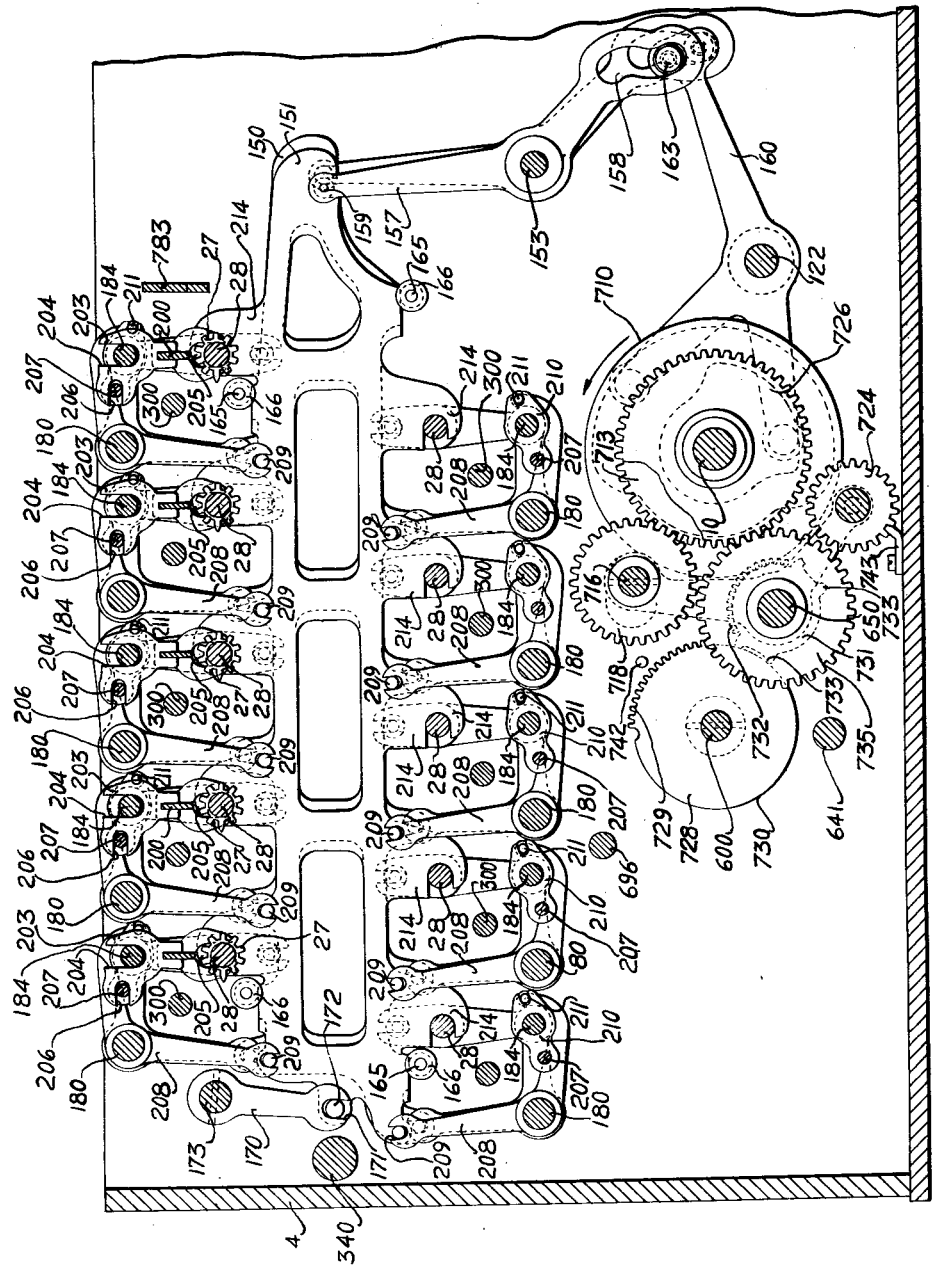

Dec. 4, 1928.
M. M. GOLDBERG
AUDITING MACHINE
Filed Aug. 11, 1919
1,694,009
37 Sheets-Sheet 12
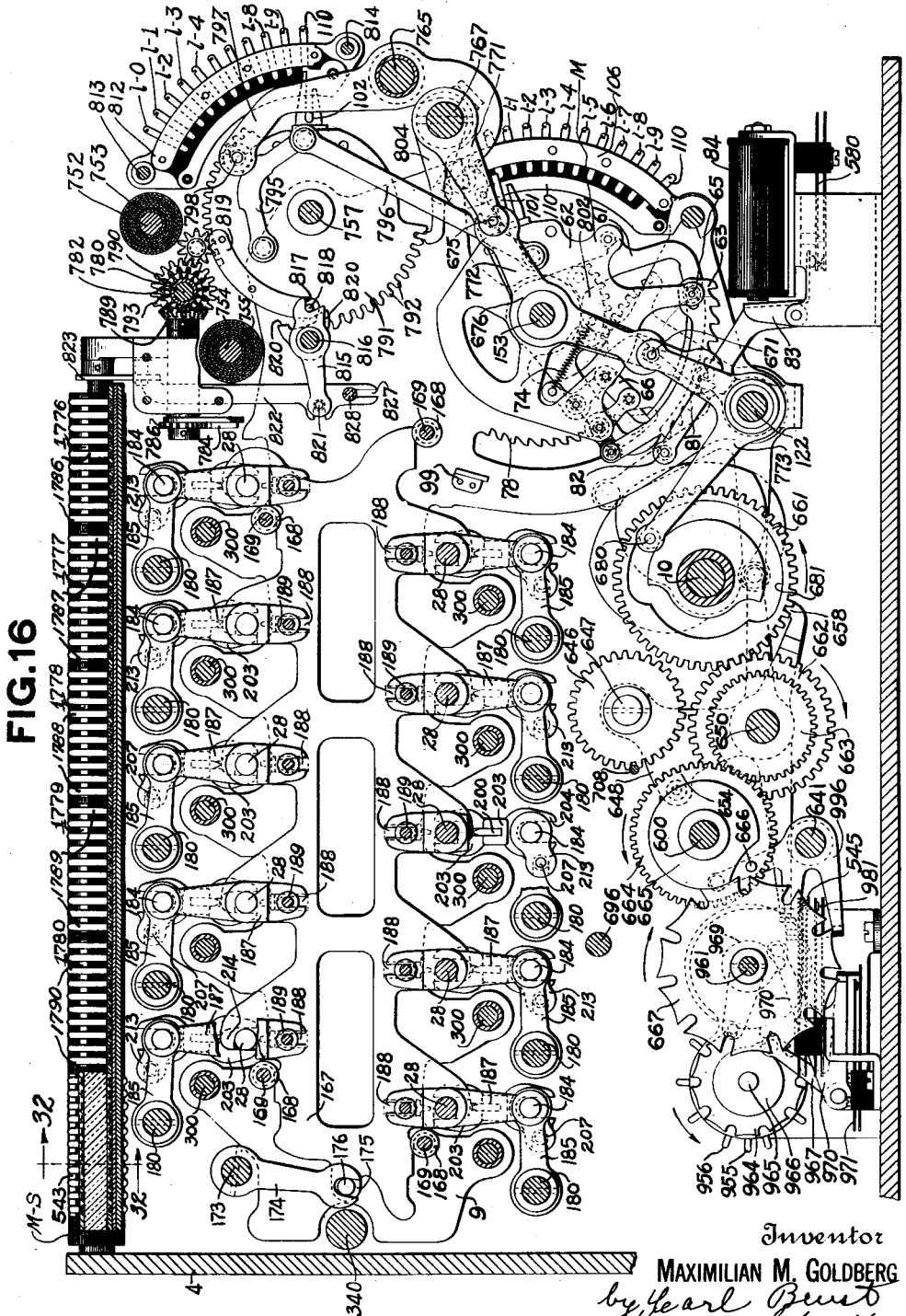
Inventor
MAXIMILIAN M. GOLDBERG

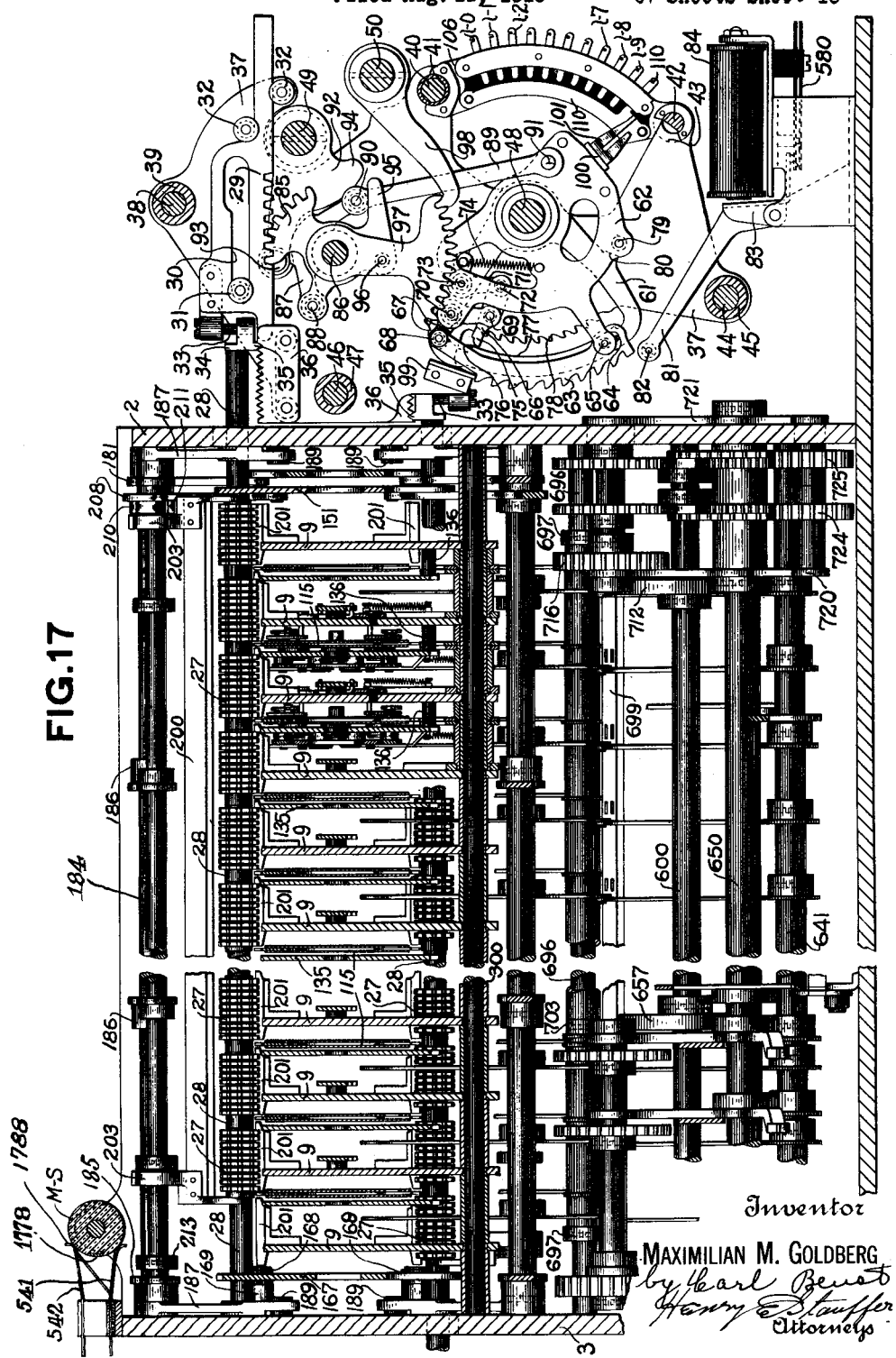

Dec. 4, 1928.

M. M. GOLDBERG 1,694,009

AUDITING MACHINE

Filed Aug. 11, 1919    37 Sheets-Sheet 14

Inventor
MAXIMILIAN M. GOLDBERG
by Carl Benst
Henry E Stauffer
Attorneys

Dec. 4, 1928.　　　　　　　　　　　　　　　　　　　　　1,694,009
M. M. GOLDBERG
AUDITING MACHINE
Filed Aug. 11, 1919　　　　37 Sheets-Sheet 15

Inventor
MAXIMILIAN M. GOLDBERG
by Carl Benst
Henry E. Stauffer
Attorneys

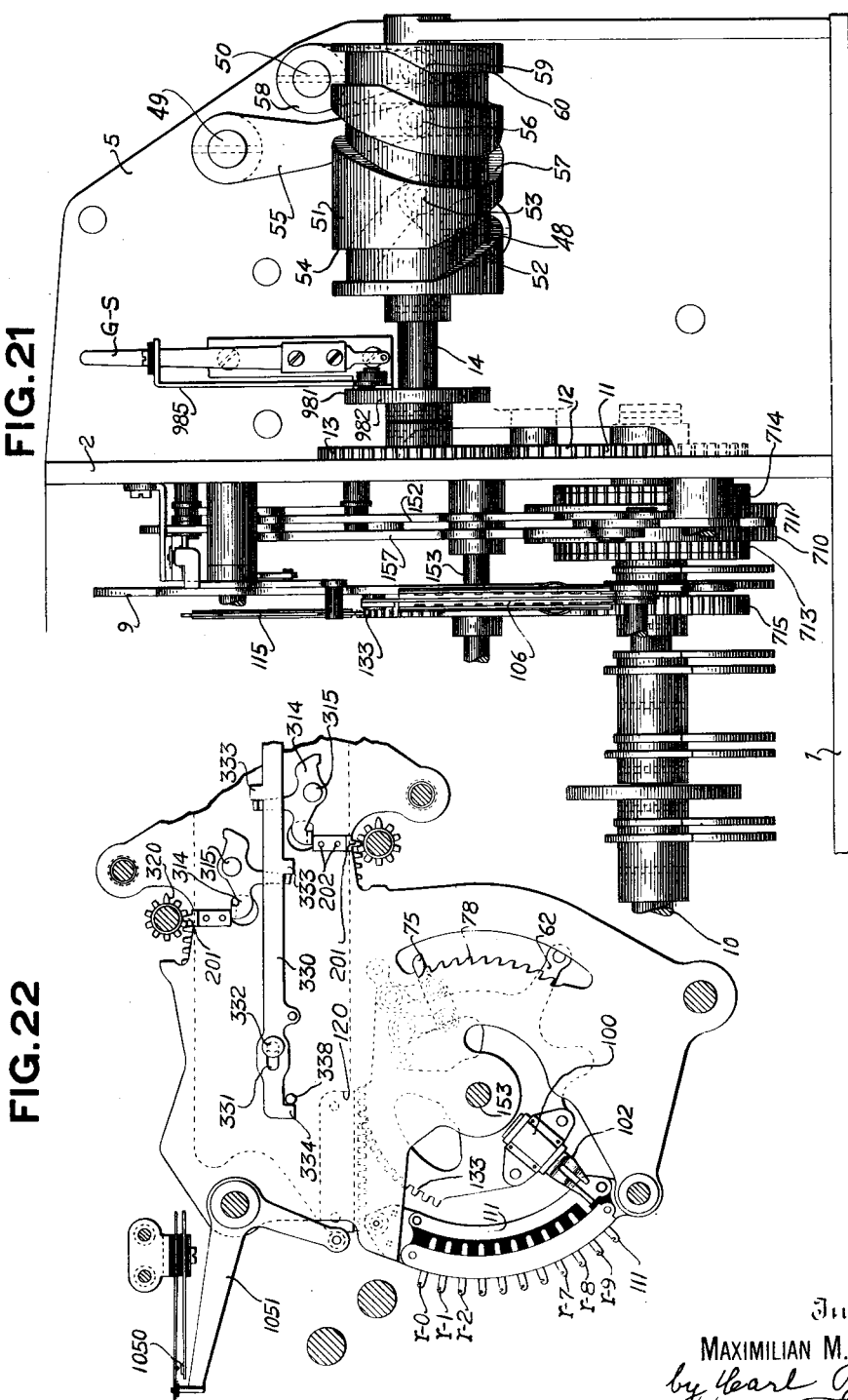

Dec. 4, 1928.
M. M. GOLDBERG
1,694,009
AUDITING MACHINE
Filed Aug. 11, 1919 37 Sheets-Sheet 17
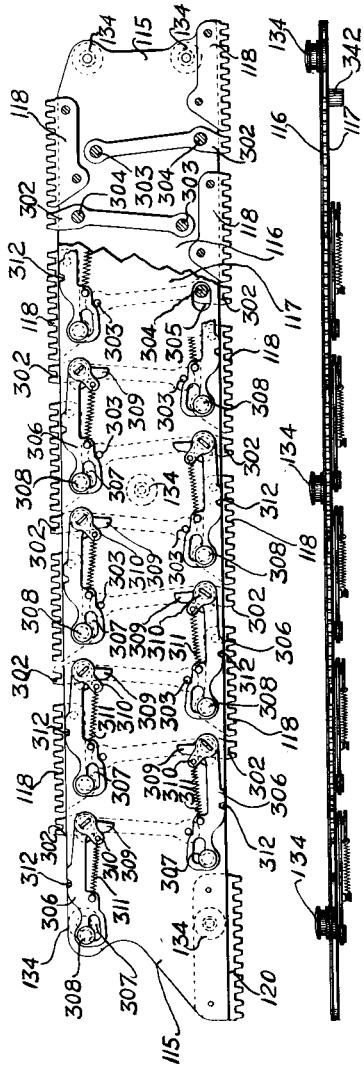
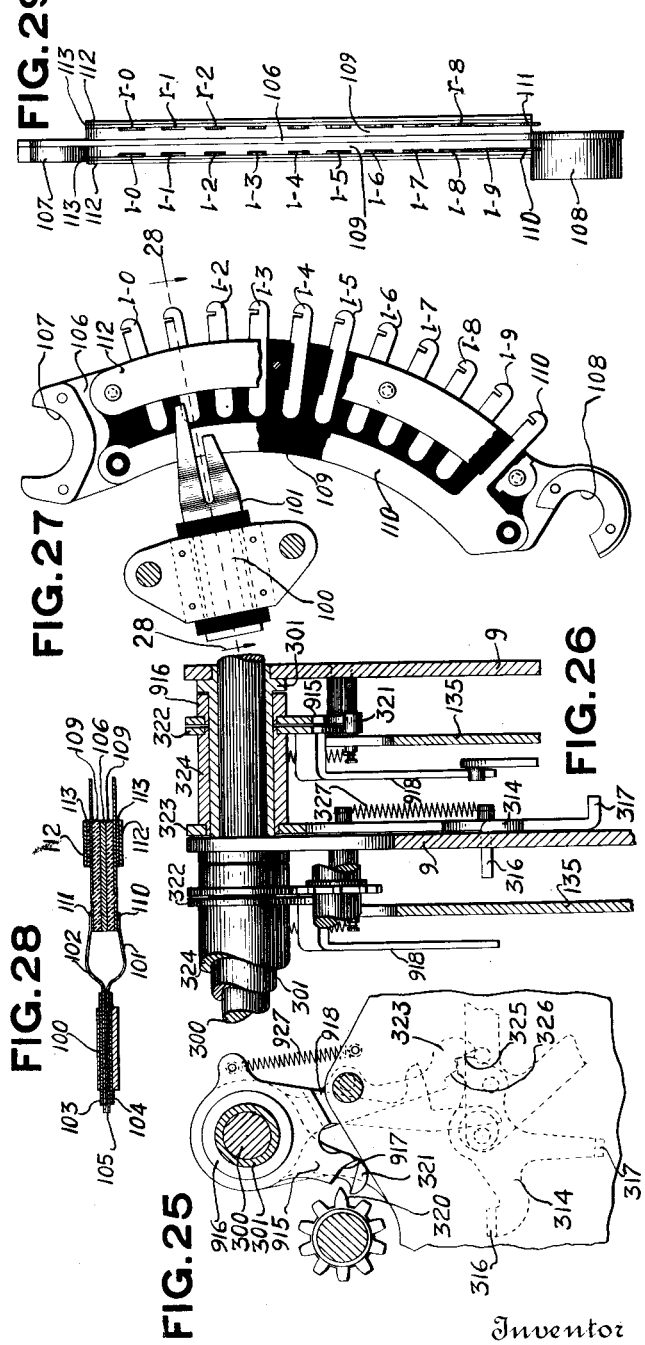
Inventor
MAXIMILIAN M. GOLDBERG
by Hearl Benst
Henry E Stauffer
Attorneys Dec. 4, 1928.
M. M. GOLDBERG
1,694,009
AUDITING MACHINE
Filed Aug. 11, 1919
37 Sheets-Sheet 18
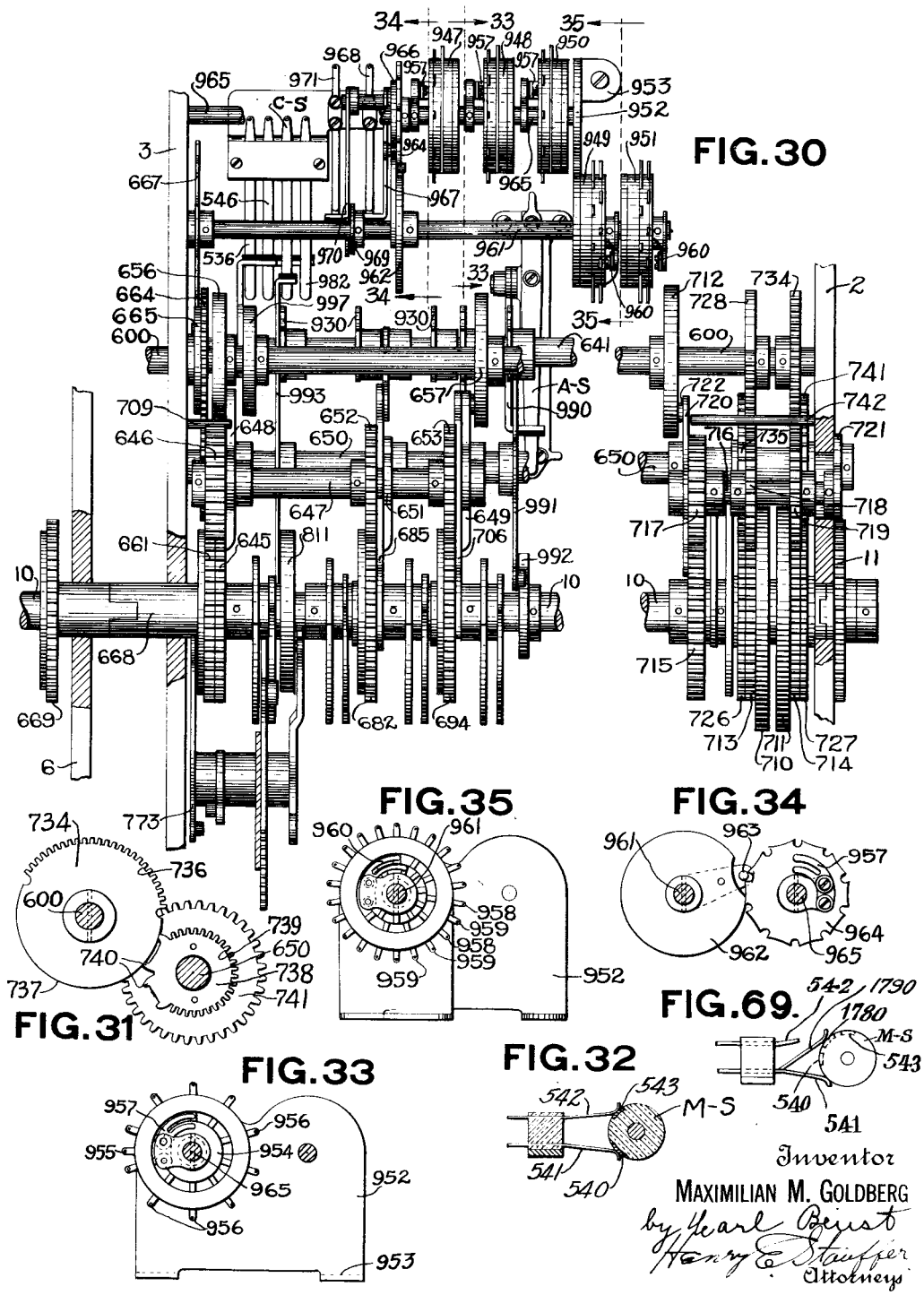

Dec. 4, 1928.
M. M. GOLDBERG
1,694,009
AUDITING MACHINE
Filed Aug. 11, 1919
37 Sheets-Sheet 19
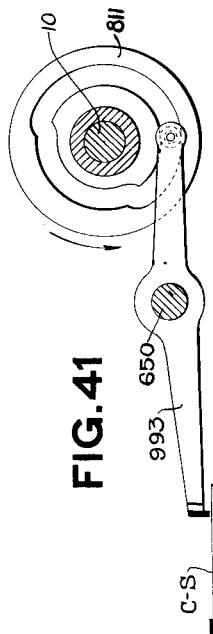
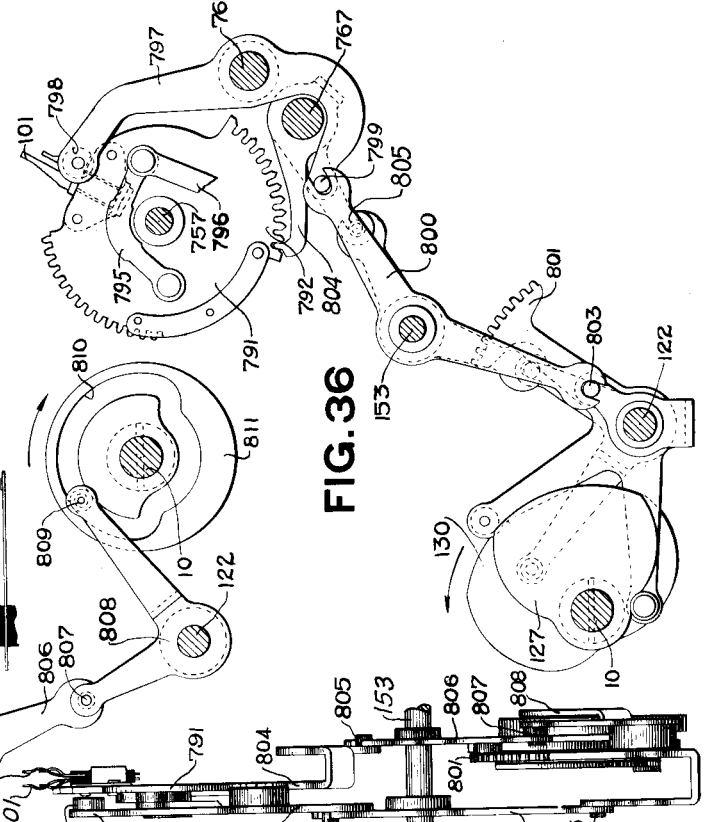
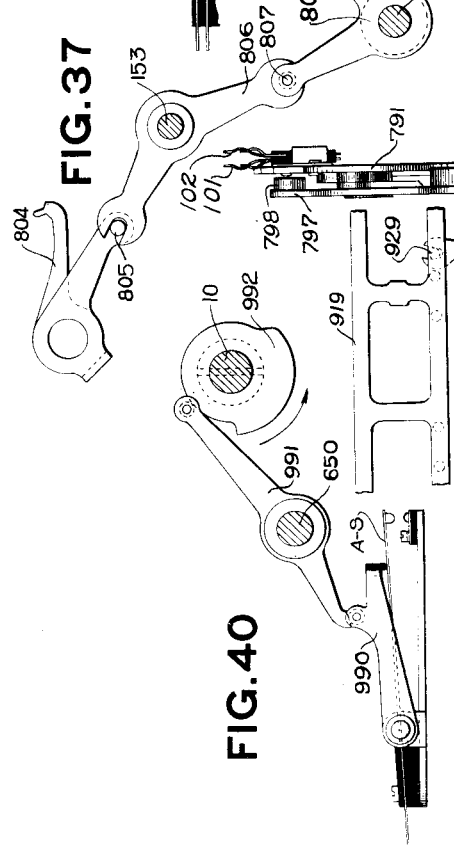
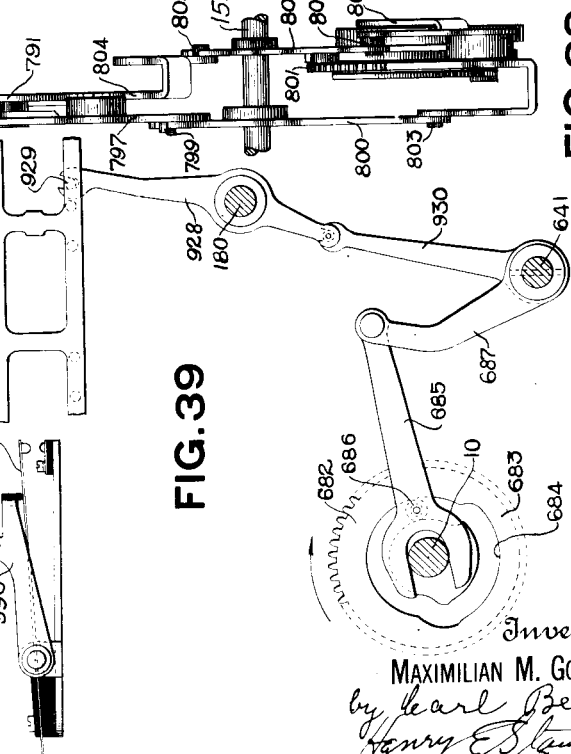
Inventor
MAXIMILIAN M. GOLDBERG

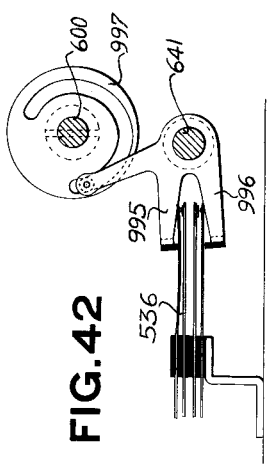
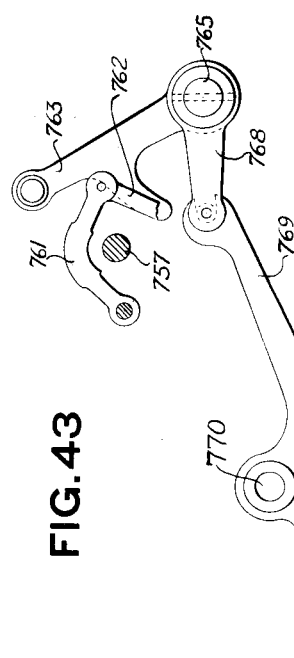
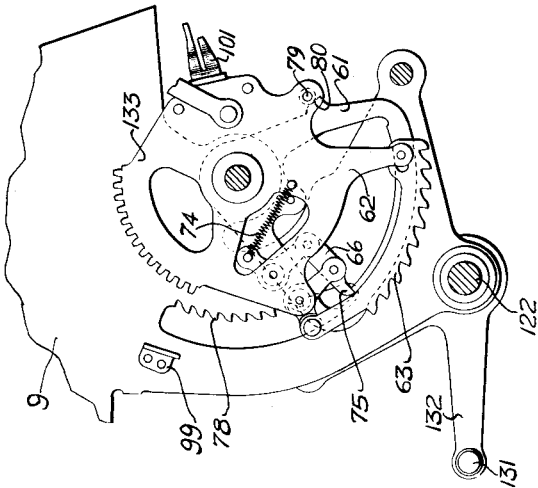
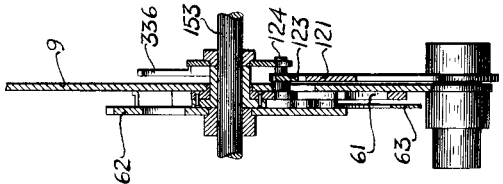
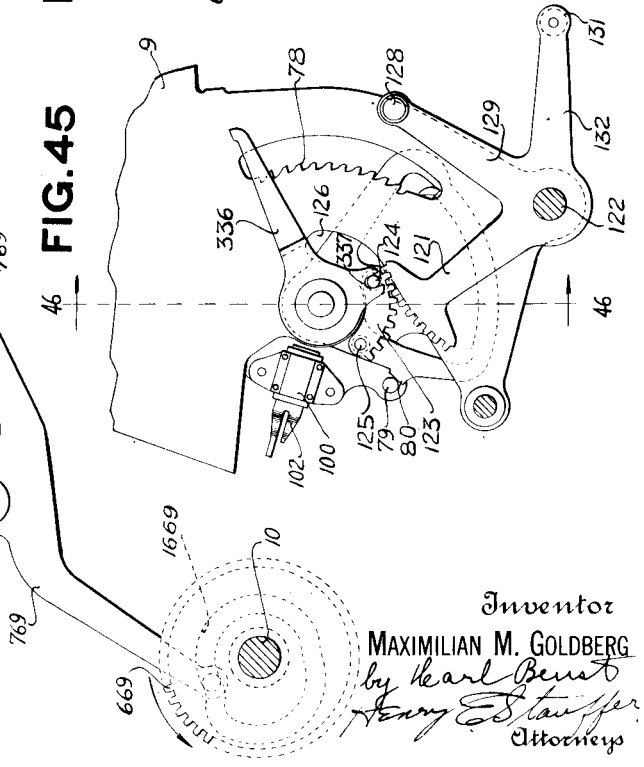

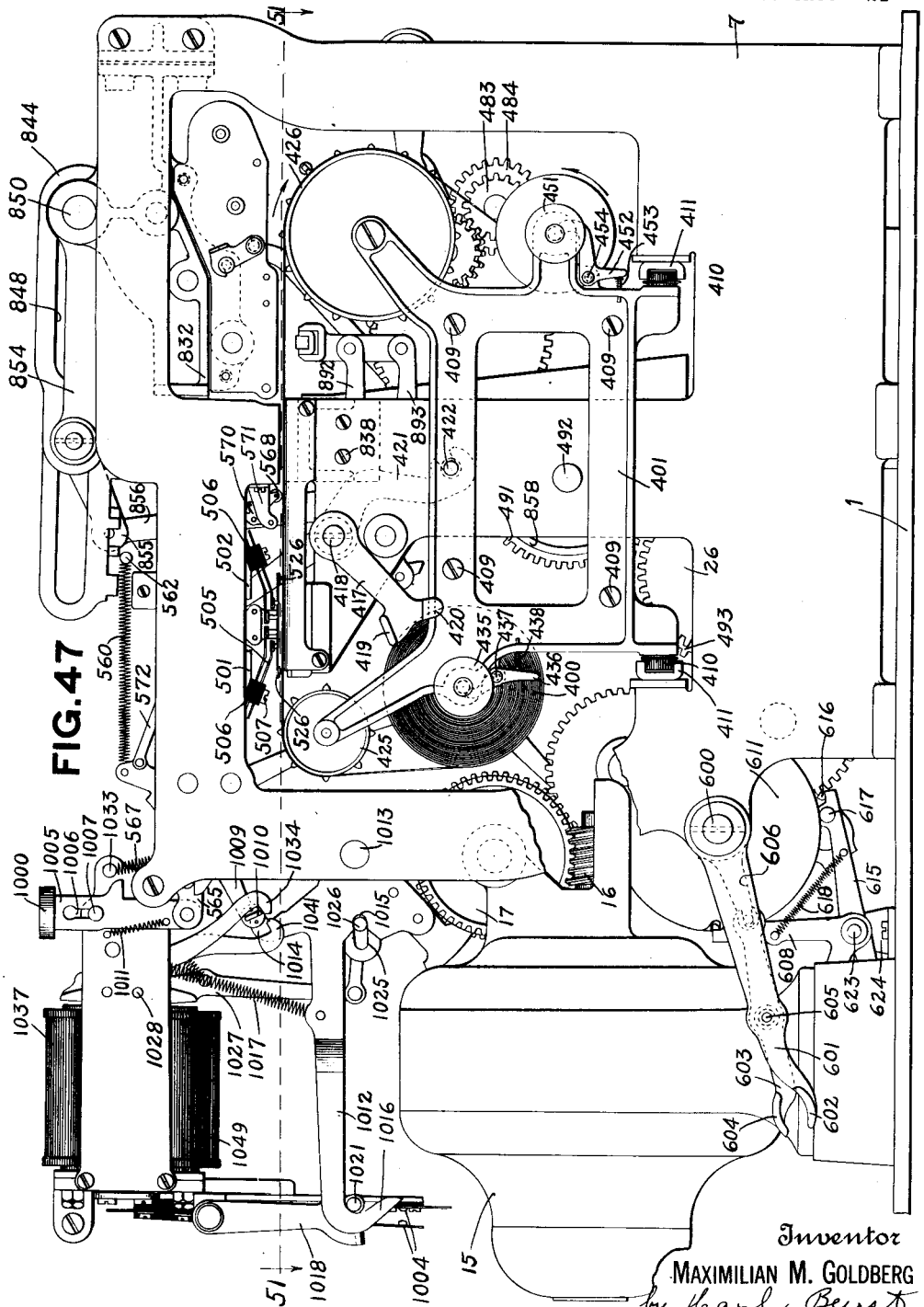

Dec. 4, 1928.　　　　　　M. M. GOLDBERG　　　　　　1,694,009
AUDITING MACHINE
Filed Aug. 11, 1919　　　　　　37 Sheets-Sheet 22

Inventor
MAXIMILIAN M. GOLDBERG
by Pearl Beust
Henry E. Stauffer
Attorneys

Dec. 4, 1928.
M. M. GOLDBERG
1,694,009
AUDITING MACHINE
Filed Aug. 11, 1919      37 Sheets-Sheet 26
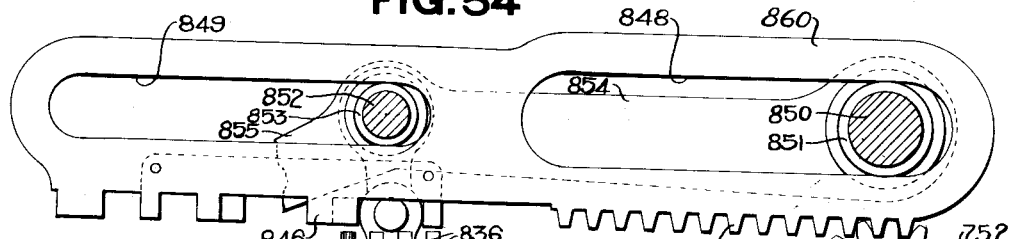
FIG. 54
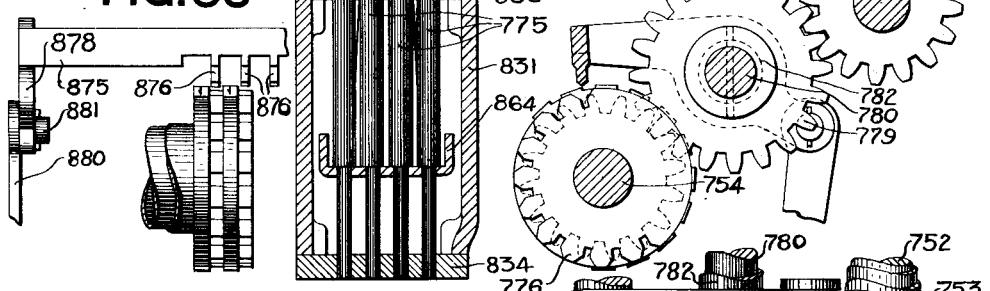
FIG. 56
FIG. 55
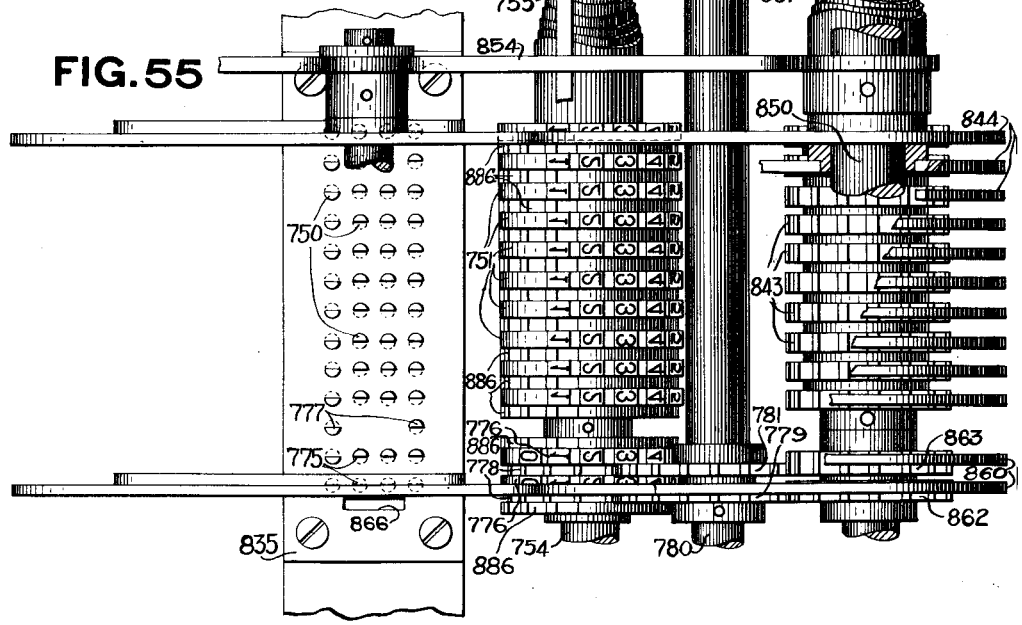
Inventor
MAXIMILIAN M. GOLDBERG
by Carl Bent
Henry E Stauffer
Attorneys Dec. 4, 1928.  
M. M. GOLDBERG  
AUDITING MACHINE  
Filed Aug. 11, 1919  
1,694,009  
37 Sheets-Sheet 27

Inventor  
MAXIMILIAN M. GOLDBERG  
by Carl Berst  
Henry E. Stauffer.  
Attorneys Dec. 4, 1928.
M. M. GOLDBERG
1,694,009
AUDITING MACHINE
Filed Aug. 11, 1919
37 Sheets-Sheet 28
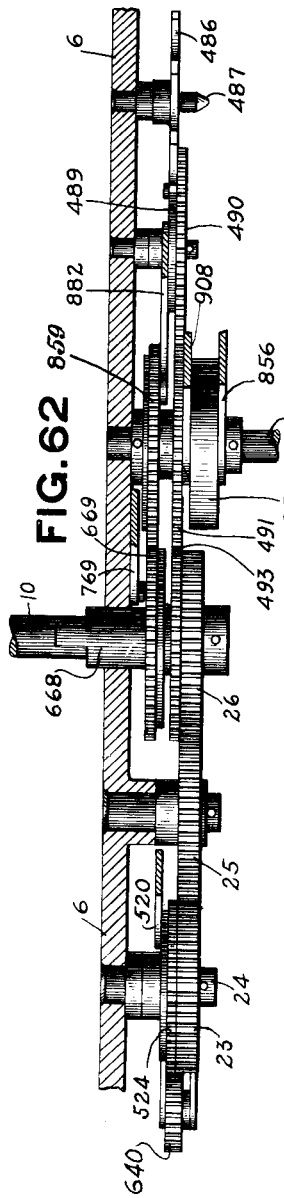
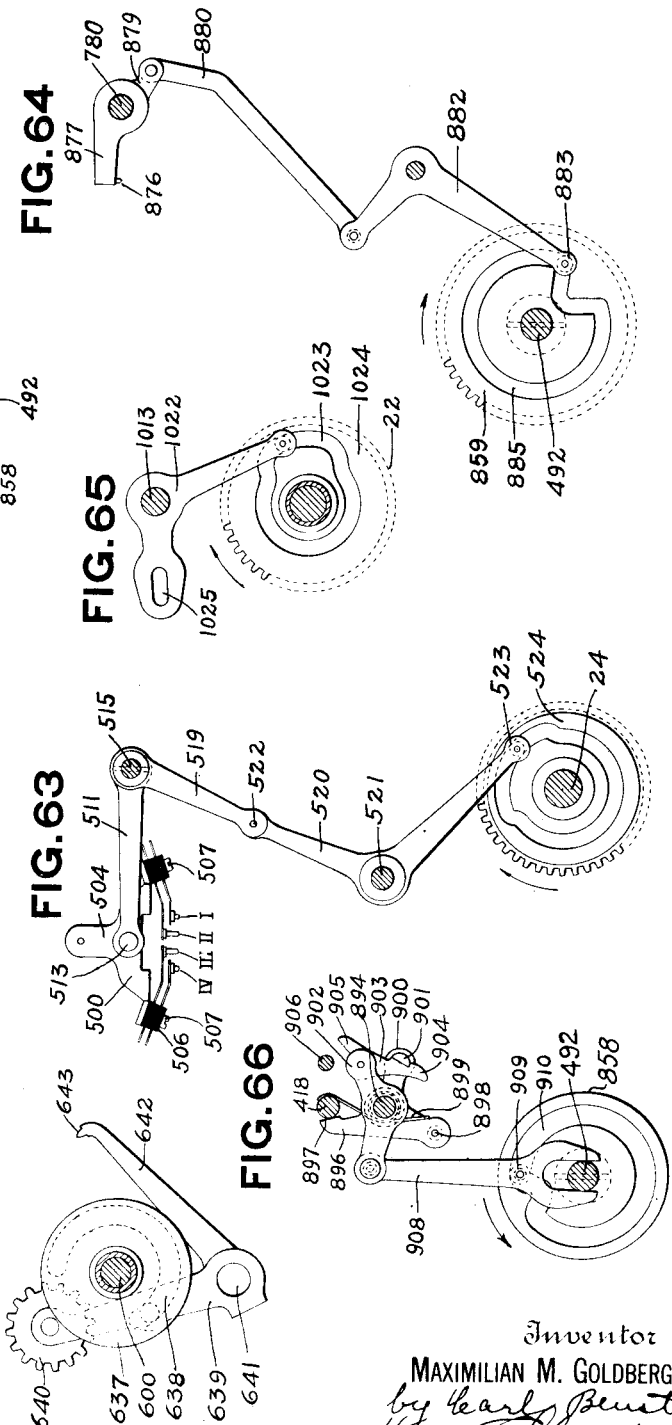
Inventor
MAXIMILIAN M. GOLDBERG
by Carl Benst
Henry E. Stauffer.
Attorneys

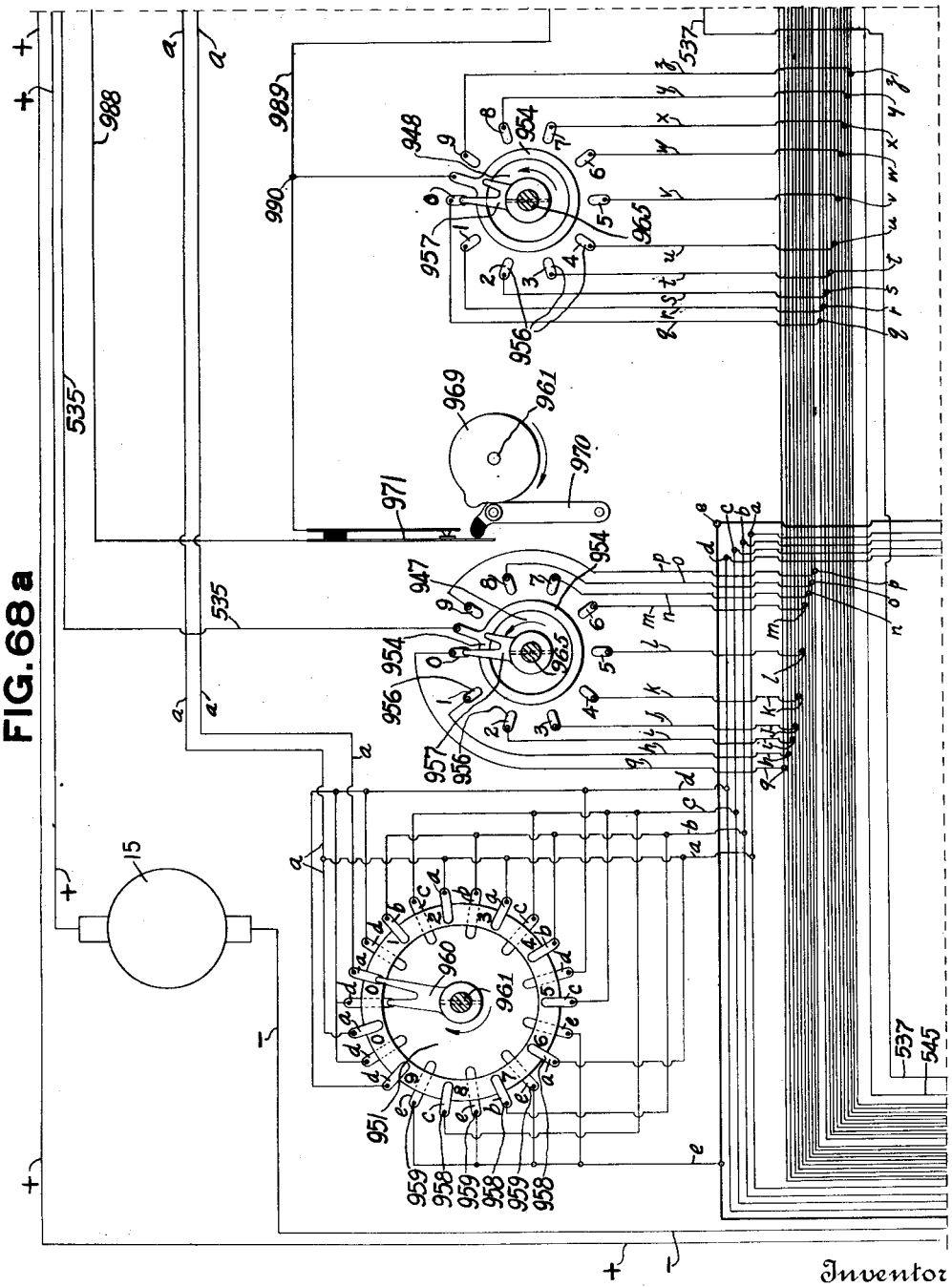

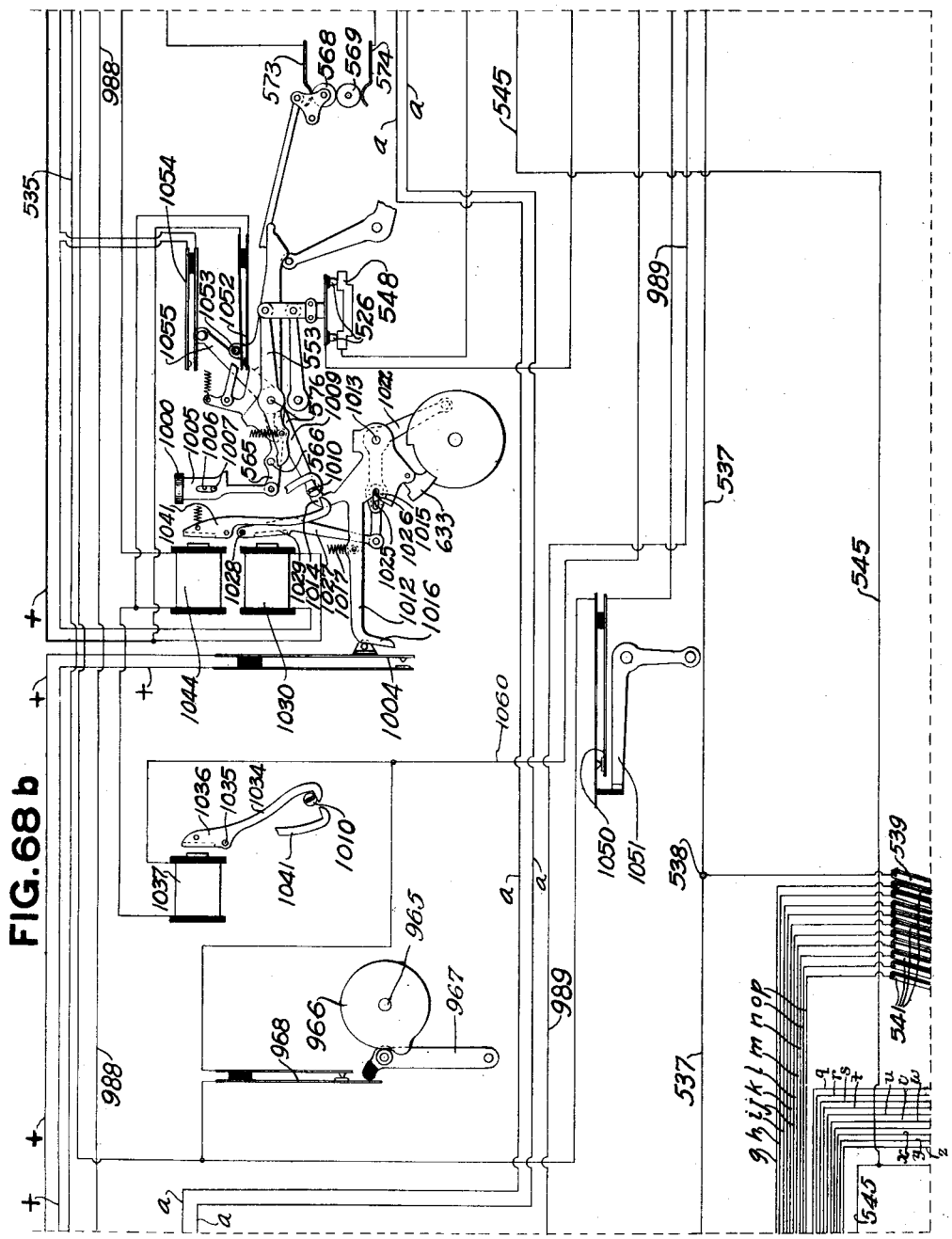

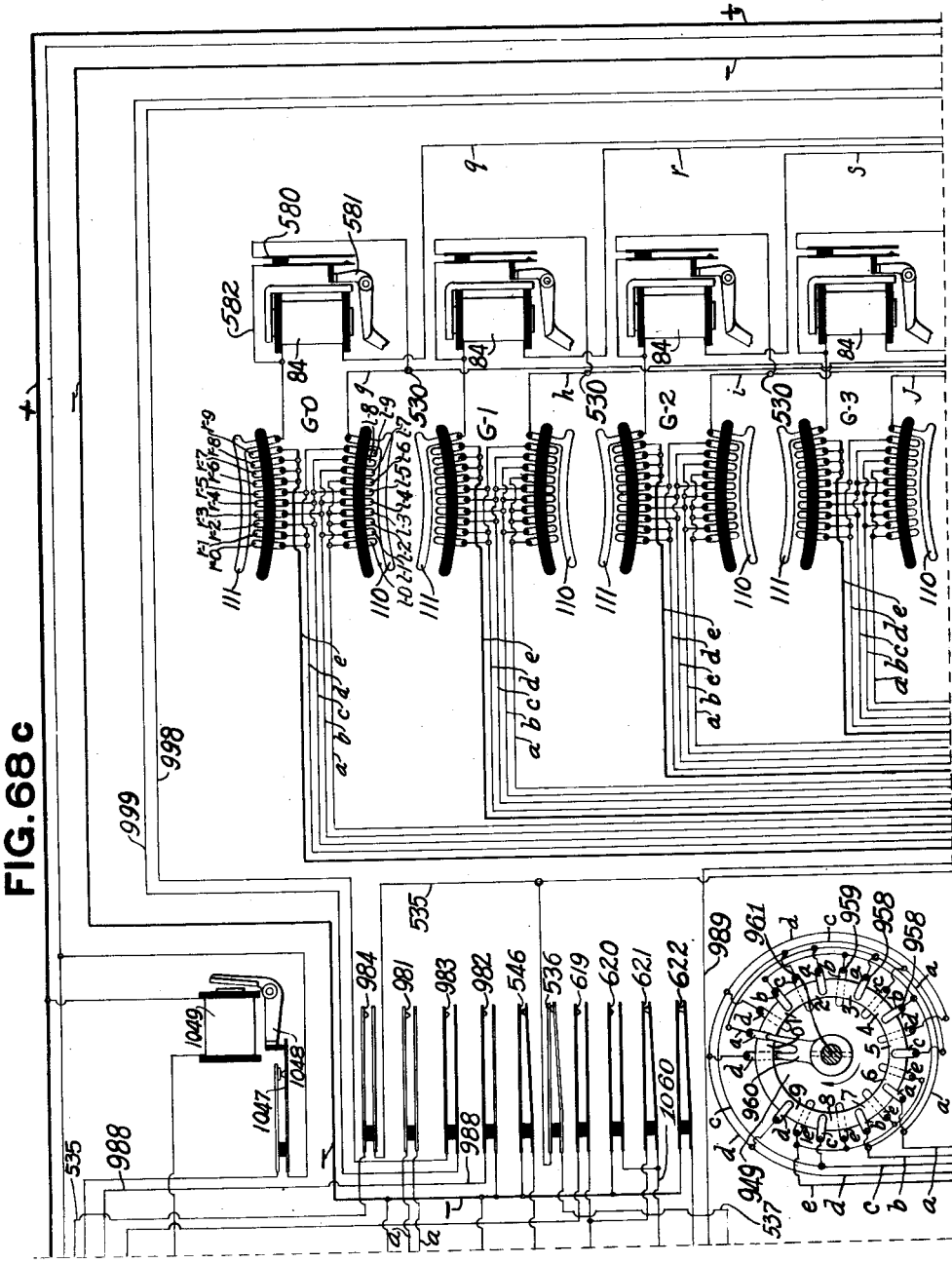

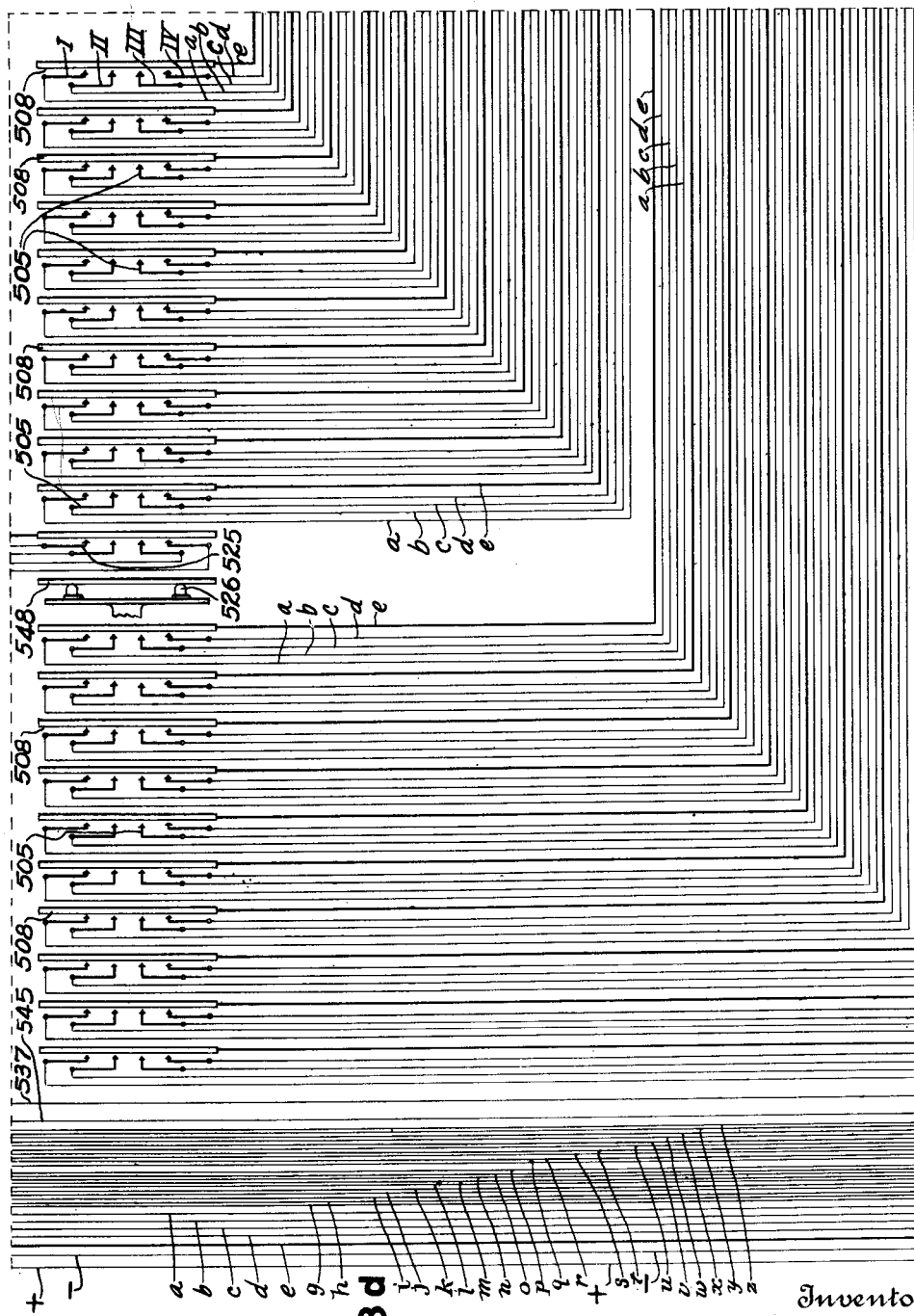

Dec. 4, 1928.
M. M. GOLDBERG
1,694,009
AUDITING MACHINE
Filed Aug. 11, 1919 37 Sheets-Sheet 33
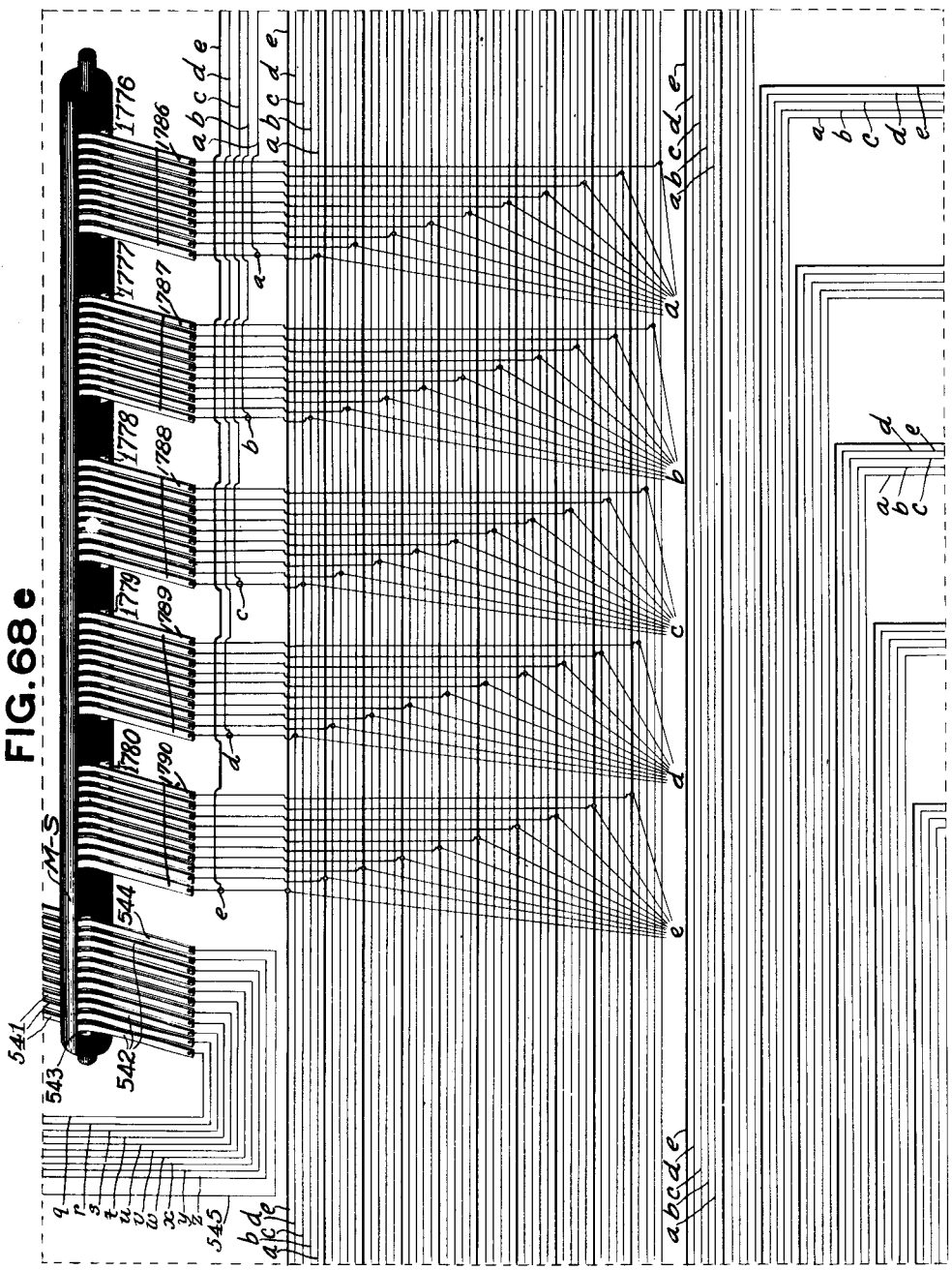
Inventor
MAXIMILIAN M. GOLDBERG
by Carl Beust
Harry E. Stauffer.
Attorneys Dec. 4, 1928.

M. M. GOLDBERG 1,694,009

AUDITING MACHINE

Filed Aug. 11, 1919  37 Sheets-Sheet 34

Inventor
MAXIMILIAN M. GOLDBERG
by Carl Beust
Henry E. Stauffer
Attorneys

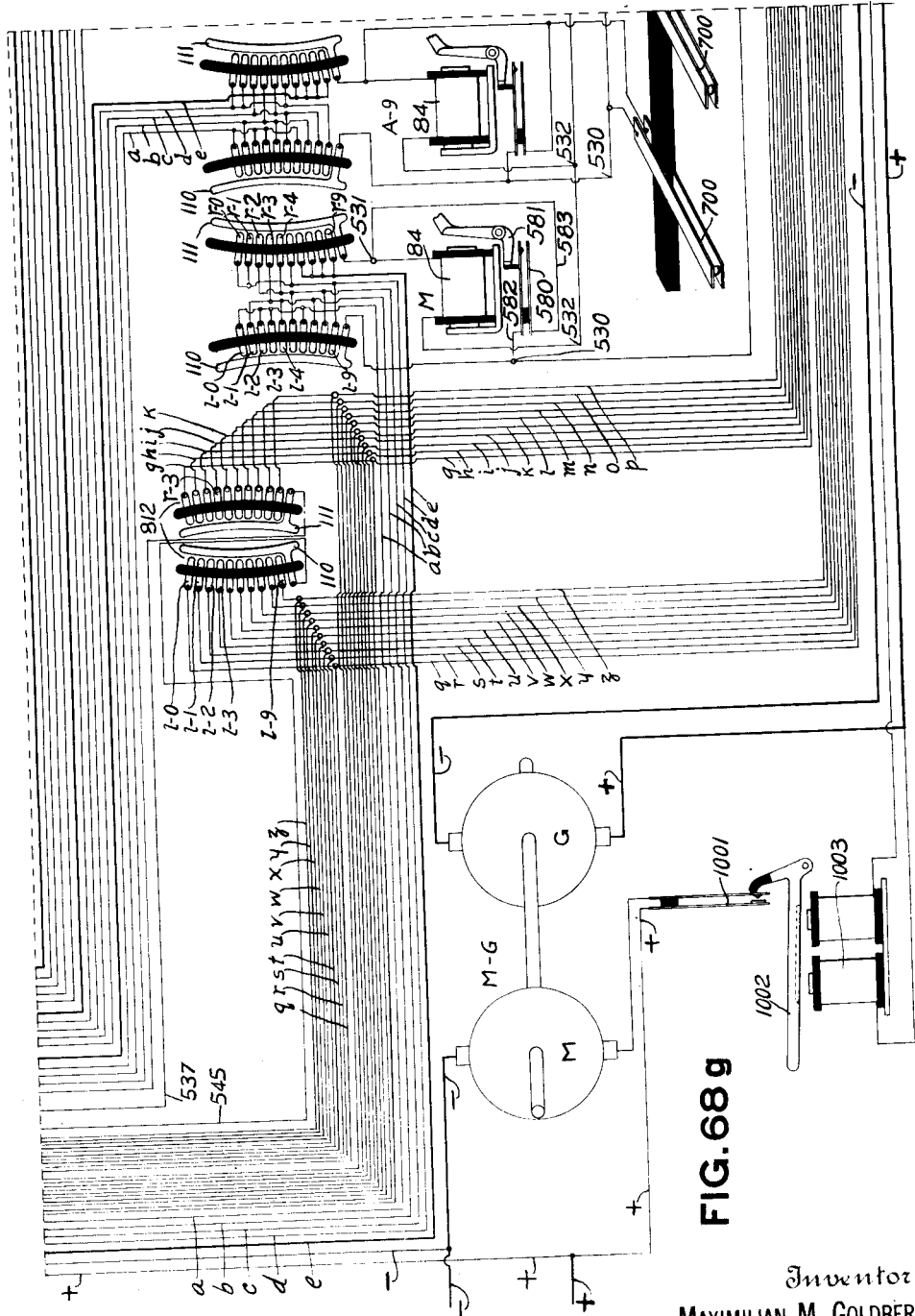

Dec. 4, 1928.  1,694,009
M. M. GOLDBERG
AUDITING MACHINE
Filed Aug. 11, 1919     37 Sheets-Sheet 36

Inventor
MAXIMILIAN M. GOLDBERG

Dec. 4, 1928.

M. M. GOLDBERG 1,694,009

AUDITING MACHINE

Filed Aug. 11, 1919

Inventor
MAXIMILIAN M. GOLDBERG
by Karl Benst
Henry E. Stauffer
Attorneys

Patented Dec. 4, 1928.

1,694,009

UNITED STATES PATENT OFFICE.

MAXIMILIAN M. GOLDBERG, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

AUDITING MACHINE.

Application filed August 11, 1919. Serial No. 316,528.

The invention may best be designated as an auditing machine. It is designed to compile data from previously prepared records, and to produce other records embodying this data.

To secure a comprehensive idea of the invention, it must be considered from four aspects; first, as a machine for compiling data from a previously prepared detail record; second, as a machine for producing a record which is a summary of the data previously compiled; third, as a machine for compiling data from two or more of the summary records; and, fourth, as a machine for producing a grand summary record of the data compiled from the summary records.

The records themselves, both detail and summary, are in the form of cards or sheets having control points, here shown as perforations, arranged in a definite order. It is necessary to consider, then, first, the original or detail record; second, the summary record; and third, the grand summary record. Structurally considered, the detail record is different from the other two, but the summary record and the grand summary record are identical in form.

The machine has adjustments by reason of which it can take care of either kind of record, and by reason of which it can itself produce the summary and grand summary records. The adjustments used to analyze and compile data from detail records are quite different from those used to analyze and compile data from summary records; but the adjustments employed in producing summary and grand summary records are identical. From a structural standpoint, therefore, the machine must be considered from three aspects; first, as a machine for analyzing and compiling data from previously prepared detail record; second, as a machine for producing a summary record; and, third, as a machine for compiling data from summary records which it itself produces.

The machine may be used wherever data is to be accumulated and recorded; for instance, in connection with department stores, to compile and record data from the various departments, indicating the number and amount of the various sales, the character of the goods sold, the names of the clerks making the sales, the character of the transaction, etc.; or, in connection with chain stores, to compile and analyze data from the various stores of the system; or, in railroad freight offices, to compile and analyze data essential to an understanding of the condition of the business of the road; in short, wherever data of the character indicated must be compiled and a record thereof made.

Considering, for instance, a group of chain stores, a daily detail record would be prepared for each store, either in connection with a cash register, modified to prepare such a record, as the various sales are made; such, for instance, as that illustrated in the United States patents granted to Maximilian M. Goldberg, No. 1,506,056, dated August 26, 1924, and No. 1,657,712, dated January 31, 1928; or by any other special machine capable of producing a record having the desired data. At the end of any given period, for instance, at the close of each day, these records would be sent to a central office where one of the auditing machines would be installed. The records from the various stores would then be run through the machine and a summary record for each store prepared. Or the records from all stores might be run through and a single summary record for all the stores representing the day's business prepared. To acquire a complete knowledge of the business done by any store for any desired period, as a week or month, it would only be necessary to run through the machine the several summary records for each store covered by the period selected, and to then prepare a grand summary record therefrom. To secure a knowledge of the whole business for the period, it would only be necessary to run through the machine the necessary records for all of the stores for that period, and to produce a grand summary record therefrom. The summary and grand summary records would constitute a complete history of the business, and from these any desired data might be derived at any time.

The invention is not to be regarded as restricted to the uses suggested; for, obviously various other adaptations of the principle will occur to those using the machine.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Fig. 2 is a fragmentary view of the summary or grand summary record.

Fig. 2a is a view, in reduced size, of the summary or grand summary record, showing both ends of the record, but having certain parts broken away.

Fig. 4 is a diagrammatic view of the analyzing contacts, the grouping or bank contacts, and the connecting circuits.

Fig. 5a is a plan view of one end of the machine.

Fig. 5b is a plan view of the other end of the machine, the same being in fact a continuation of Fig. 5a.

Fig. 6 is a plan view of the analyzing, punching and printing mechanism, and the parts which coact therewith, the punch and printing racks being moved to the extreme position. It is to be regarded as, in fact, a continuation of Figs. 5a and 5b.

Fig. 7 is a side view of one of the punch actuators used in producing the perforated record.

Fig. 8 is a plan view of the punch actuator shown in Fig. 7.

Fig. 9 is a view of an additional or supplemental punch actuator, together with the punches it actuates.

Fig. 10 is a view in perspective of a portion of the punch holder or support, with several of the punches therein.

Fig. 11 is a cross section of the machine on the line 11—11 of Fig. 5a, looking in the direction of the arrow, the differential and rack being moved to the extreme position.

Fig. 12 is a view taken on the line 12—12 of Fig. 5b, looking to the right.

Fig. 13 is a section taken on the line 13—13 of Fig. 5b looking to the left.

Fig. 14 is a section of the machine taken on the line 14—14 of Fig. 5a, looking in the direction of the arrow.

Fig. 15 is a section of the machine taken on the line 15—15 of Fig. 5a looking in the direction of the arrow.

Fig. 16 is a section of the machine taken on the line 16—16 of Fig. 5b looking in the direction of the arrow.

Fig. 17 is a section of the machine taken on the line 17—17 of Fig. 14, looking in the direction of the arrow, and showing, among other things, means for actuating the upper totalizer shafts.

Fig. 21 is a view of the cam which drives the totalizer shaft positioning devices, and certain of the actuators for positioning the actuating racks.

Fig. 22 is a view of one of the differential rack actuating devices, and also of the bar which holds inoperative the tripping pawls of the first bank.

Fig. 23 is a side view of one of the actuating racks, together with certain parts of the carrying mechanism.

Fig. 24 is a plan view of the mechanism shown in Fig. 23.

Fig. 25 is an enlarged view of parts of the transfer or carrying mechanism.

Fig. 26 is a view taken at right angles to Fig. 25.

Fig. 27 is a view of one of the segmental contact plates with the contacts mounted thereon and the movable contact in cooperative relation thereto.

Fig. 28 is a section through Fig. 27 on the line 28—28, looking in the direction of the arrow.

Fig. 29 is a front or edge view of the segmental contact bank shown in Fig. 27.

Fig. 30 is a view of certain of the driving parts of the machine, some of which are active under all conditions, and some only during totaling operations.

Fig. 31 is a detail view of certain parts used in changing the machine from auditing to recording, and vice versa.

Fig. 32 is a section taken on the line 32—32 of Fig. 16 and shows certain of the contact switches with their coacting contact plates.

Fig. 33 is a view of one of the circuit controlling switches, taken on the line 33—33 of Fig. 30, and looking in the direction of the arrow.

Fig. 34 is a view of the driving means for the movable contacts of the circuit controlling switches taken on the line 34—34 of Fig. 30, and looking in the direction of the arrow.

Fig. 35 is a view of another of the circuit controlling switches, taken on the line 35—35 of Fig. 30, and looking in the direction of the arrow.

Fig. 36 is a detail view of the driving mechanism for what will be herein known as the "bank M" contacts, and the coacting elements.

Fig. 37 is a view of the aligning mechanism for the structure shown in Fig. 36.

Fig. 38 is a front view of the parts appearing in Figs. 36 and 37, and shows the relation of these parts to each other.

Fig. 39 is a detail view of the driving mechanism for the transfer restoring slide.

Fig. 40 is a view of one of the control switches with means for actuating the same.

Fig. 41 is a view of the "bank M" control switch and its actuating mechanism.

Fig. 42 is a view showing certain contacts under the control of the manual shifting lever.

Fig. 43 is a view of the beam actuator for adjusting the printing and punching devices.

Fig. 44 is an elevation of the rack differential setting mechanism.

Fig. 45 is a reverse view of the mechanism shown in Fig. 44, with the actuating device therefor.

Fig. 46 is a sectional view of the mechanism shown in Figs. 44 and 45, taken on the line 46—46 of Fig. 45, and looking in the direction of the arrow.

Fig. 47 is an end elevation of the analyzing and record producing portion of the machine.

Fig. 54 is an enlarged view of the number punch selecting and actuating mechanism.

Fig. 55 is a plan view, with certain parts broken away, of the record punching and printing devices.

Fig. 56 is a detached fragmentary view of the printing devices used for numbering the totalizers as they are cleared.

Fig. 62 is a view of the gear train employed to transmit motion to the various parts of the analyzing and recording portions of the machine, the gears being somewhat displaced to show the relations of the parts.

Fig. 63 is a view of the analyzer and the means for actuating the same.

Fig. 64 is a view of the aligner for positioning the printing wheels and the mechanism for actuating the same.

Fig. 65 is a view of the lever used to lock and unlock the machine, with the cam for operating the same.

Fig. 66 is a view of part of the printing elements, and the cam for actuating the same.

Fig. 67 is a detail view showing one of the shifting and locking devices employed when changing the machine from adding to totalizing.

Figs. 68a, 68b, 68c, 68d, 68e, 68f, 68g, 68h and 68i, taken together constitute a diagrammatic view of the various electrical circuits, magnets and other elements employed in the electrical parts of the machine. The views are to be read together.

Fig. 69 shows the position of M—S switch when the machine is analyzing a summary record.

IN GENERAL.

In order that the invention may function as intended, it is essential that a considerable number of accounting devices be provided. The number will depend upon the requirements of the business with which the machine is used, but in that here described, one hundred are employed. The accounting devices may themselves be of any preferred form, those here illustrated being what are commonly known as "totalizers"; that is, accounting devices in which varying amounts may be simultaneously entered upon the several denominational elements; and, while the accounting devices will hereinafter be usually referred to as "totalizers", it is to be understood that, in the broader aspects of the invention, any suitable accounting devices may be employed.

In order that the accounting devices or totalizers may be selected with readiness, and with a minimum amount of mechanism, they have been divided into groups; and in making a selection, the group or groups containing the desired accounting devices or totalizers are determined, and the desired totalizer or totalizers then selected from these groups.

When the machine is compiling data, the selection of the totalizers is controlled by either the detail record or the summary record, depending upon which of these records is being analyzed. If the data represents original transactions, the control sheet is of the form shown in Fig. 1; if the data is a summary of other data, the control sheet is of the form shown in Figs. 2 and 2a. When the machine is operating to record the data upon its totalizers, the totalizers to be cleared are selected one by one by means of a mechanical selector.

Figure 3:
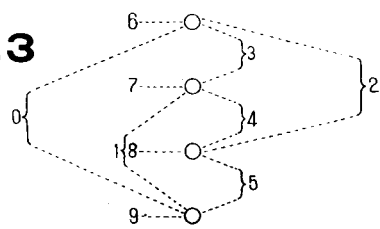
Fig. 3 is a diagrammatic view showing how the perforations are employed either in combination or alone to select the digits.

*Perforations.*—It is necessary that every element to be controlled be set at any one of ten positions. The simplest method of doing this would perhaps be to employ ten positions in the control record for each element to be controlled. This, however, would require a record of undue length. To limit the same as much as possible, recourse has been had to a combination of perforations. It is possible by the use of only four positions to secure the necessary selections. The manner in which this is done is illustrated in Fig. 3. As there shown, the digit 0 is represented by two holes, one in the first and one in the fourth position; the digit 1 is represented by two perforations one in the second and one in the fourth position; 2 is represented by perforations in the first and third positions; 3 by perforations in the first and second positions; 4 by perforations in the second and third positions; and 5 by perforations in the third and fourth positions. The other four digits are represented by a single perforation each; namely, 6 by a perforation in the first position; 7 by a perforation in the second position; 8 by a perforation in the third position; and 9 by a perforation in the fourth position. In this manner, any one of the whole number of digits can be selected by the use of not more than two perforations.

Figure 1:
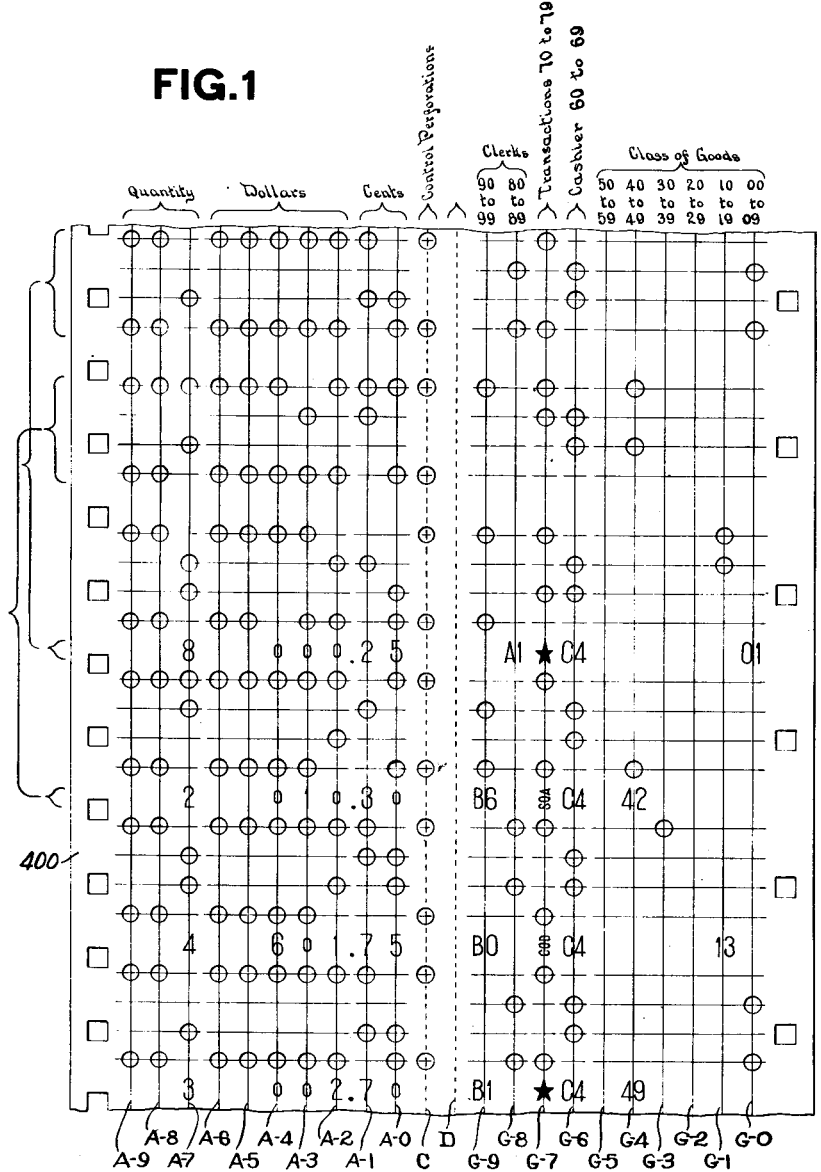
Fig. 1 is a view of the detail record, to be used with the machine.

*Detail record.*—The detail record or control sheet, as it appears in practice, is shown in Fig. 1, except that the lines appearing thereon may be omitted, since they serve no function except to aid in visually locating the control points. It will be noted that the sheet is provided with ten columns of perforations on the right-hand side and ten on the left-hand side. Between these is an additional space equal in width to the width of two columns. An additional column of perforations appears in the left of these two spaces; the other space is blank.

Each of the columns of perforations constituting the right-hand set controls one group of totalizers, and the combinations of perforations appearing in the columns determine the particular totalizers to be selected. The number of these columns must therefore equal the number of groups of totalizers. In the machine here shown there are ten groups of these totalizers, therefore there are ten columns in the control sheet. If a less number of groups of totalizers were used, the number of columns would be made to agree therewith; if a greater number were used, the number of columns would have to be increased to accord therewith. In any case the number of columns in the control sheet must equal the number of groups of totalizers in the machine.

The perforations in the ten columns on the left-hand side of the sheet control the mechanism which actuates the denominational elements of the totalizers; that is, control the amounts to be entered upon the denominational elements of the totalizers which have been selected by the perforations in the right-hand columns. There must, therefore, be upon this side of the sheet as many rows of perforations as there are denominational elements in the totalizers. In the machine here shown each totalizer is provided with ten elements. There are, therefore, ten columns of perforations in the sheet. Should the totalizers be provided with a less number of denominational elements a correspondingly smaller number of rows of perforations would be used. If, on the other hand, the totalizers should have a greater number of denominational elements, a correspondingly greater number of rows of perforations would be employed. It is thus seen that the columns of perforations on the right-hand side of the sheet select the totalizers upon which the entries are to be made, while the perforations in the columns on the left-hand side of the sheet determine the numerical quantities which are to be entered on the totalizers which have been selected.

In entering any given transaction, a totalizer may be selected from any group, or one totalizer may be selected from each of two or more groups, but not more than one totalizer can be selected from any one group. Since ten groups are provided in the machine here described, it is possible in any given case to select as many as ten totalizers for the simultaneous entry of the same data, but not more.

The additional row of perforations lying adjacent the left-hand set of columns is used solely for control purposes, and does not in any way enter into the computations of the machine. The blank space lying between the two sets of columns is likewise used for certain control purposes as will be hereinafter described.

In the drawings (Fig. 1) the various columns are provided with legends, which illustrate how the data to be classified may be divided or considered. But these legends are illustrative only; various other arrangements and classifications may, of course, be used, depending upon the needs of the situation.

The numerical quantities, and the classification thereof, may both vary. As applied to commercial enterprises, such as those referred to above, the numerical amounts will most frequently be dollars and cents, and the classification will be as to goods, clerks, kinds of transactions, etc. But the numerical amounts may be other matter. Some of the columns may in fact be set aside for dollars and cents, and other columns for other information. In the illustration (Fig. 1) the three columns on the left-hand side have been used to indicate the quantity of articles entering into the transactions; columns four to eight, inclusive, have been used to represent dollars, while columns nine and ten indicate cents.

As to the classification, in the illustration shown those totalizers from 00 to 59 inclusive, have been set aside for classes of goods; totalizers 60 to 69 have been set aside for cashiers; those between 70 and 79 for transactions, as cash, charge, collect on delivery, paid on account, etc.; those between 80 and 99 for the clerks who conduct the transactions.

In columns 9 and 10, counting from the right, certain letters will be found. These are clerks' initials. The lettering is arbitrary, and any practical method of designation may be used. In this art, however, it has become customary to designate the clerks by letters; therefore, the printing wheels which print in these two columns are provided with letters in the usual way.

In the eighth column from the right, that which designates transactions, will also be found special legends. The star or asterisk has come to indicate cash sales; the legend, S O A, "sold on approval"; and C O D "collect on delivery".

The numbers appearing at various points on the six right-hand columns indicate the number of the totalizer in which the goods is classified.

The sheet will perhaps be better understood by describing in detail all of the perforations and all of the data pertaining to some particlar transaction. For this purpose, the transaction at the top of the sheet will be taken. Since four perforations are required to completely control the selection of the ten digits, each transaction is to be considered as represented by four horizontal rows of perforations taken together and considered as a unit. The details of the several transactions are printed in Arabic numerals, so that it is possible for one not familiar with the combinations of perforations to at once readily interpret any given transaction. However, for mechanical reasons the printed interpretation of any particular transaction does not lie immediately adjacent the perforations of that transaction, but as here shown is displaced two spaces behind the transaction which it interprets, so that the data printed below the third transaction on the sheet (Fig. 1) is the interpretation of the first transaction, represented by the first four horizontal rows of perforations; and the second line of printed data is the interpretation of the second transaction, as represented by the second group of four horizontal rows of perforations, and so on, down the sheet. In the drawings (Fig. 1) the rows of perforations constituting a transaction are connected by a brace, and the interpretation thereof is connected to this brace by a larger brace. This is the form of sheet produced by the machine shown in Goldberg's Patents No. 1,506,056 and 1,657,712 above referred to.

The separation of the interpretation of any given transaction from the transaction itself is a matter of no special importance, for the operator will readily become acquainted with the method of interpretation. In fact, it requires but little skill to interpret the perforations by reading them directly, the combinations being very simple, moreover the printing may, and in many instances will, be omitted entirely.

In the example shown in the drawings (top of Fig. 1) and beginning at the left-hand side of the sheet, it will be noticed that the perforations in the first column lie one in the first space and one in the fourth; these, according to the diagram (Fig. 3), indicate 0; but the "0" is not printed in the interpretation. In the second column the holes are arranged in the same position as in the first, and they also therefore indicate 0; but here again the "0" is not printed in the interpretation. In the third column a single perforation lies in the third space; this, according to the diagram (Fig. 3), and the notation on the sheet, indicates 8; and "8" is shown printed in this position in the interpretation. In the fourth and fifth columns perforations are again found one in the first space and one in the fourth, which, therefore in both instances indicate 0; but here also the "0" is not printed in the interpretation. The perforations in the sixth, seventh and eighth columns also represent 0, but these are shown printed in the interpretation. In the ninth column, perporations appear in the first and third spaces, which, according to the diagram (Fig. 3), represent 2; and "2" is shown printed in this column in the interpretation. In the tenth column, perforations appear in the third and fourth spaces, which according to the diagram (Fig. 3) represent 5, and "5" is shown printed in this column in the interpretation of this transaction.

The reason for not printing the "0" in columns one, two, four, and five is that provision must be made for supplemental or carry-over elements in the totalizers; and if all positions were used in the detail record, there would be no extra totalizer elements for this purpose. Therefore in the detail record all of the positions set aside for quantities and all set aside for dollars have not been used. The positions are provided with 0 perforations merely to control the elements of the machine, so that nothing should be added to these elements.

Further, following this transaction, and considering now the perforations on the right-hand side of the sheet; that is, the perforations controlling the selection of the totalizers, and beginning with the column at the left, it will be seen that no perforations appear in this column. Since all totalizers controlled by this column are found between 90 and 99, the absence of perforations means that the clerk conducting the transaction had a number not falling within this group. In the second column perforations occur in the second and fourth spaces. These perforations stand for "1", and means that clerk "1" in group 8, that is, clerk number 81, made the sale. But in this art it has come to be the practice to refer to clerks by letters instead of numbers. This custom has been followed here. All clerks between 80 and 89 are known as "A" clerks, while those between 90 and 99 are known as "B" clerks. The "A" clerks and the "B" clerks are differentiated from each other by means of numerals, as "A 0", "A 1", "A 2", etc., to "A 9", and "B 0", "B 1", "B 2", etc., to "B 9". In the third row, still counting from the left, perforations are found in the first and fourth spaces, which, according to the diagram (Fig. 3) means "0". This group of totalizers, 70 to 79, has been set aside for transactions. This means, therefore, that the transaction was of the kind to be entered on the "0" totalizer of group 7, or totalizer 70. In the interpretation of the transaction, the designation is a star. This in this art has come to mean "cash" so that in this instance the transaction was for cash. But the sale might have been made on approval, "S O A", or collect on delivery, "C O D", or some other kind, as indicated by data of other transactions. In column four, holes appear in the second and third positions, which, according to the diagram (Fig. 3) stand for 4. This means that the transaction was supervised by the cashier 4 in the group 60 to 69 set apart for cashiers, or the cashier whose totalizer is No. 64. But cashiers like clerks are sometimes designated by letters instead of numbers, and are here designated by the letter "C" together with a number. In this case the cashier was No. 4, and the designation is therefore "C 4". The fifth column, counting from the left, is blank, as are also columns 6, 7, 8 and 9. This means that the class of goods to which the article sold belonged did not fall within any of the groups controlled by these columns. But perforations appear in the last column in the second and fourth positions, which indicate "1". The goods therefore belonged to class 1. The interpretation of the whole first transaction, is that eight articles were sold for $0.25; and that the sale was made by clerk A 1 (81); that the transaction was for cash; that it was supervised by cashier C 4 (64), and that the goods belonged to class No. 1.

The second transaction, as interpreted by the printed information is that two articles were sold for $10.30; that the sale was made by clerk "B 6" (96); that the sale was made on approval (S O A); that the transaction was supervised by cashier "C 4" (64); and that the goods belonged to class No. 42.

*Summary and grand summary records.*— Since the summary and grand summary records are identical from a structural standpoint, a description of one will suffice for both. The configuration of these records is illustrated by Figs. 2 and 2ª. The ten columns at the left-hand side of the sheet coincide in location, and are identical as to function and method of interpretation, with the ten columns on the left-hand side of the detail record (Fig. 1). No lengthy description of this portion of the record is therefore necessary. Each field, or what in the detail record was described as a transaction, here represents the data taken from one totalizer; that is, the data from each totalizer is transferred to one field of the summary or of the grand summary record. Therefore, the number of fields or transactions found in the summary or the grand summary record coincides with the number of totalizers in the machine. The machine described in this application, which contains one hundred totalizers, will, therefore, produce a record of one hundred fields.

The columns on the right-hand side of the sheet are two only, and these have been so perforated as to indicate the totalizer whose data is embodied in the perforations of the field of that totalizer. In this machine the totalizers begin with 0, and the first group will be hereinafter referred to as the "0 group". In this manner it is possible to designate the whole 100 totalizers by two columns of holes or digits, the first being 00 and the last 99.

With this explanation the data of the field embodied in the brace can be readily interpreted. The interpretation printed in the first line at the top of the sheet belongs to the transaction within the first brace. As here illustrated the interpretation is printed on the sheet, just as in the detail record; but this is not essential. In this record, however, the interpretation is printed one field ahead of the transaction instead of two fields or spaces behind, as in the detail record. The connection of the interpretations with the transactions is shown in two instances by braces (Fig. 2). The distance between the perforations of any given transaction and its interpretation is more or less arbitrary. As stated, in the detail record the interpretation is two spaces or fields behind the perforations representing the respective transactions; while in the summary and grand summary records it is one space in advance thereof. This is arbitrary. But in the machine forming the basis of Goldberg's Patents Nos. 1,506,056 and 1,657,712, which is adapted to produce the detail record (Fig. 1) the printer is arranged to print two fields or spaces behind the perforator, while in this machine when adjusted to produce the summary or grand summary record, it prints one space ahead of the perforator.

It will also be noticed that in the detail record the "0" is smaller than the other numerals, while in the summary and grand summary records they are of the same size as the other numerals. This fact has no significance so far as this case is concerned. But the machine of the Goldberg Patents Nos. 1,506,056 and 1,657,712, is arranged with small "o'." for purposes of emphasis, and the detail record is here shown as produced by that machine. This system has not been adopted in this machine, so that the "0's" in the summary and grand summary records appear as of the same size as the other numerals.

The columns of the summary and grand summary record will not be considered seriatim as was done in the description of the detail record. But considering the interpretation at the top of the sheet (Fig. 2), it will be seen that the first column represents 0, the second represents 1, the third 5, the fourth 0, the fifth 0, the sixth 0, the seventh 5, the eighth 7, the ninth 1, and the tenth 0. The perforations representing the whole of the first field or transaction (Fig. 2) is that fifteen articles were sold for the sum of $57.10.

The perforations on the right-hand side of the sheet show that the totalizer cleared was that designated by 0, and that it was found in the group also understood as 0.

It will now be noticed, by running down the columns on the right-hand side of the sheet, that the numbering of the totalizers is successive from 00 to 99, the numbers occurring in regular sequence. In order to understand this record it is therefore only necessary to know what the various totalizers on the various shafts have been used to sum up. This, of course, is arbitrary, and must be determined for each particular case. According to Fig. 1, it means that totalizers from 00 to 59 indicate classes of goods; from 60 to 69 indicate cashiers; from 70 to 79 indicate the character of the transaction; and 80 to 99 indicate clerks.

Of the two columns of perforations appearing on the right-hand side of the record (Figs. 2 and 2ª), one indicates tens and the other units in the numbering of the totalizers. Thus, considering the first field, which is the data taken from totalizer 00, it will be noticed that the perforations appearing in the tens column stand for 0, and that the perforations appearing in the units column also stand for 0. These together, therefore, indicate the totalizer as the 00 totalizer. The perforations indicating the number of the second field or transaction have the tens so arranged as to indicate 0, but the units so arranged as to indicate 1, indicating that this data is taken from totalizer No. 1; and so on down the series to totalizer No. 99.

It will also be noticed that the column used to designate the tens is in direct line with the blank space near the center of the detail record, and that the units column coincides with one of the other columns, in this case the column 90 to 99. The line of control perforations C on the grand summary sheet is identical as to arrangement of perforations C and as to position with the control perforations of the detail record.

THE DETAIL ANALYZING MACHINE.

The machine will first be described as adapted to audit previously prepared detail records. Its constructions to produce the summary record, to add up or summarize the data of a plurality of summary records, and to produce a grand summary record, will be taken up later. Certain parts of the machine, however, are essential to all operations, and these will be referred to in connection with the description of the detail analyzing machine.

Referring to the drawings, a base plate 1, supports end frames 2 and 3, and a side plate 4. A supplementary frame 5 is attached to the base plate and to the end plate 2, and supports certain of the operating parts. At the other end of the machine other frame plates 6 and 7 rise from the base plate, and support the selecting and printing elements, and certain other of the operating parts. A casing 8 covers the analyzing and printing mechanism. In order to afford support for certain of the operative elements, a group of plates 9, supported by rods 300 (described later) are arranged across the body of the machine parallel with the plates 2 and 3.

A main shaft 10 supported by the plates 2, 3 and 6, runs lengthwise through the machine, and transmits motion directly to many parts of the machine. This shaft communicates motion indirectly to a gear 11 at the left-hand end of the machine, which gear meshes with an idle gear 12 (Fig. 19), which, in turn, meshes with a gear 13 fast on a supplementary shaft 14, and transmits motion thereto. This last-mentioned shaft communicates motion to certain of the operating elements which are arranged across the end of the machine.

Figure 51:
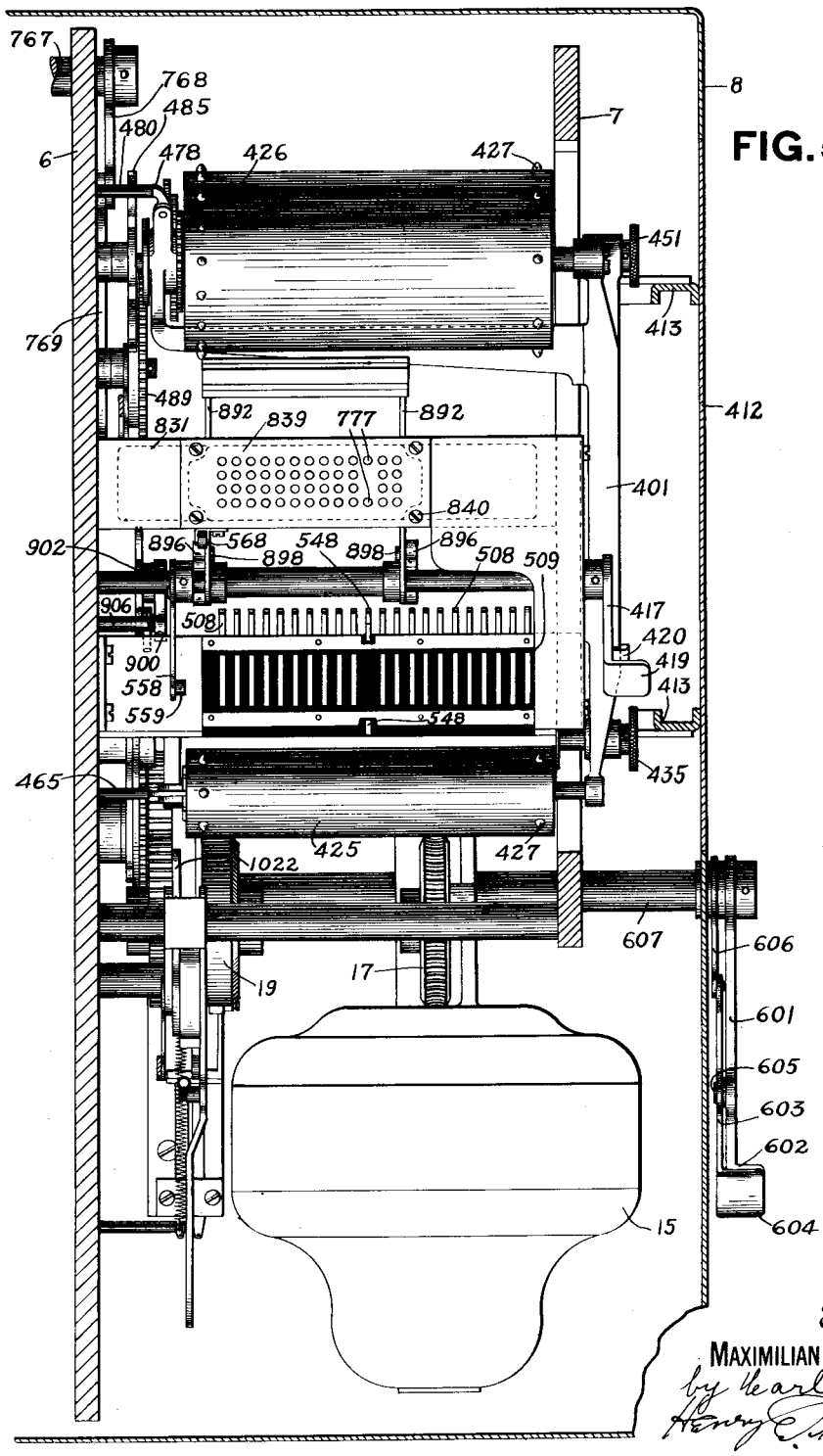
Fig. 51 is a horizontal section through the analyzing and record producing part of the machine, taken on the line 51—51 of Fig. 47, and looking in the direction of the arrow.

Power is supplied to the main shaft by means of a motor 15 of any suitable construction, an electric motor being here shown (Figs. 47 and 51). This carries upon its shaft a worm 16, which engages a worm gear 17, upon a shaft 18. At the other end of the shaft 18 is a clutch having a drum 19, and an inner clutch member 20 (Fig. 53), which cooperates with the drum by means of rollers 21 in a well-known manner. A gear 22 driven by the inner clutch member 20, communicates motion to an idle gear 23, mounted to rotate on the stud 24 (Figs. 53 and 62); and this, in turn, transmits motion to a gear 25 loose upon a shaft 650 (later described) supported in the frame, and from this gear motion is transmitted to the gear 26 fast on the main shaft 10 of the machine. Through this train of gears motion is transmitted from the motor to the main shaft 10 and the supplementary shaft 14, and from these to all of the operative parts of the machine.

*Totalizers.*—To facilitate selection, the accounting devices are divided into groups of any convenient number; and since this machine is provided with one hundred totalizers, the grouping here adopted has been by tens; so that we here have ten groups of totalizers of ten totalizers to the group. While the accounting devices may be of any preferred form, it is desirable to have them as compact as possible. The accounting devices or totalizers here used belong to that class in which all of the denominational elements of the totalizers belonging to any group are mounted together; the units together, the tens together, the hundreds together, and so on to the end of the series. It is, then, only necessary to provide one actuator or operating rack for each set of the several denominational elements; namely, one rack for all the units of the group, another for all of the tens, another for all the hundreds, etc. With this arrangement, by effecting a relative movement between the totalizers and the actuators, all denominational elements of the desired totalizer may be brought into operative relation with the actuators.

The various sets of totalizer units are designated by the character 27. It is to be understood that the character 27 does not indicate a complete totalizer, but designates a set of all the common denominational elements of all of the totalizers in any group. Thus, the first elements of all of the sets of any group are to be taken as constituting one totalizer, the first one in the first set being the units of that totalizer, the first one in the second set being the tens of that totalizer, the first one in the third set being the hundreds of that totalizer, the first in the fourth set the thousands, and so on to the end of the series. The second totalizer is made up of the second element of the first set, which is then the units of that totalizer; the second element of the second set, which is the tens, the second element of the third set, which is the hundreds; and so on to the end. The third totalizer has the third element of the first set for its units, the third element of the second set as its tens, the third element of the third set as its hundreds, etc. And the tenth totalizer has the last element of the first set as its units, the last element of the second set as its tens, the last element of the third set as its hundreds, etc. Each totalizer is made up of ten elements, which may therefore indicate a maximum of 9,999,999,999. The size of the totalizers, namely, the number of denominations included, will of course, vary with the requirements to which the machine is to be put, and for many purposes a much smaller number of denominations than here disclosed would suffice.

Each group of ten totalizers is mounted upon a shaft 28. There are ten of these shafts, arranged in two tiers of five shafts each, and supported in a manner to be described for both longitudinal and vertical movement. The shafts in the respective tiers are not arranged in vertical alignment, but for structural reasons the shafts of one tier are offset with respect to those of the other tier.

A space appears between the elements of the several denominations. This is the so-called neutral or blank position, and any shaft upon which no totalizer has been selected will always assume this position. When in this position none of the denominational elements engage the racks and the latter move idly through the machine, so far as these totalizers are concerned.

Figures 18, 19:
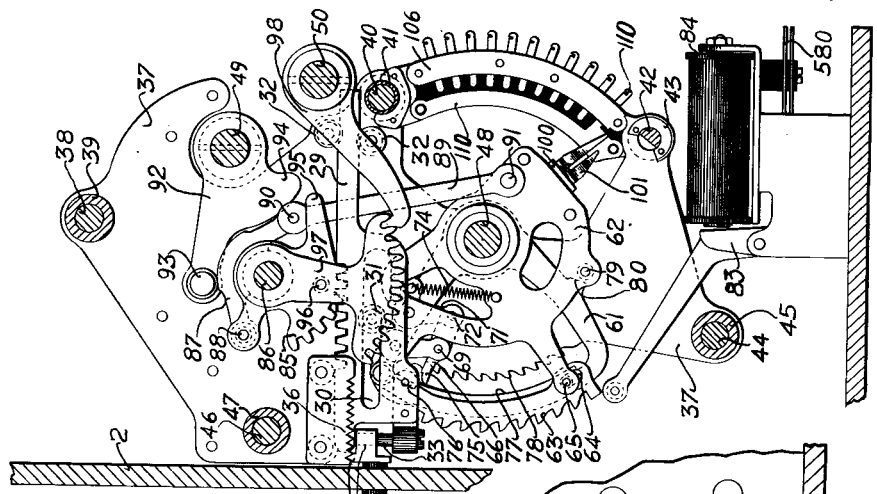
Fig. 18 is a view of the mechanism used to position the lower totalizer shafts.
Fig. 19 is a detail showing one of the main controlling switches, and certain gear connections.
Figure 20:
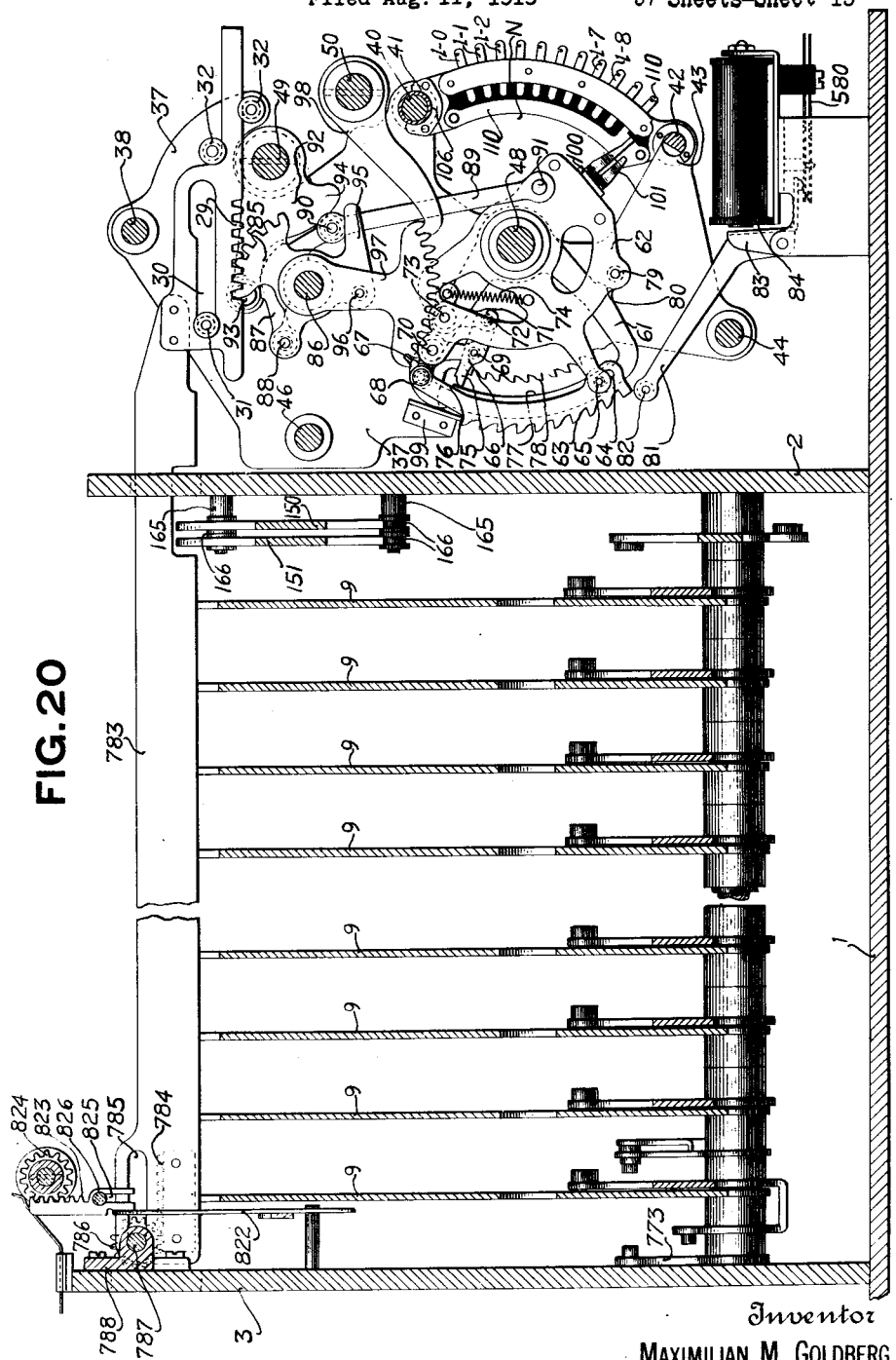
Fig. 20 is a view taken on the line 20—20 of Figs. 5a and 5b, looking in the direction of the arrow, and showing the mechanism for actuating and positioning certain of the printing devices.

*Shaft setting mechanism.*—The shafts which carry the groups of totalizers are positioned by means which will now be described All of the shafts are provided with extensions which protrude through enlarged openings in the frames 2 and 3 (Figs. 17 and 19). To each shaft is attached a rack 29 (Fig. 17) having a slot 30 cut in the body, which co-operates with a roll 31 to guide one end thereof, and passes between rolls 32, 32 to guide the other end. The racks are fastened to the shafts by means of pins 33 which pass loosely through perforated bosses 34 fastened to the shafts. Each of the bosses has on one edge a tooth 35 which engages a fixed notched plate 36, the tooth and the plate together serving as aligning devices for the shafts. The rack is held against vertical movement by the guide rolls 31 and 32; but, as stated before, the shafts are adapted to move somewhat in a vertical plane. To permit the racks to actuate the shafts and yet provide for this vertical movement, a space is left between the bosses on the shafts and the upper supports of the pins 33, so that the bosses may move up and down upon these pins.

All of the actuating devices for both tiers of shafts are substantially identical in construction. The parts, however, which actuate the lower racks (Fig. 18) are in some respects reversed in position with respect to those which actuate the upper racks. This refers particularly to the racks 29, the guiding rolls 31 and 32, the pin 33, the boss 34, the aligning tooth 35 and notched plate 36. But since these parts are identical in construction and identical in function with those which operate the upper tier of shafts, no further specific reference thereto is necessary. While the construction by which the lower tier of totalizer shafts is actuated is substantially identical with that which operates the upper tier, it is to be noted that in setting the tiers, the shafts of the upper tier are shifted from right to left, whereas those in the lower tier are shifted from left to right.

The racks are supported by plates 37 arranged one adjacent each of the racks, to which the guide rolls 31 and 32, are secured. These plates are held in place by rods and spacers. These include rod 38, with spacers 39; rod 40, with spacers 41; rod 42, with spacers 43; rod 44, with spacers 45; and rod 46, with spacers 47. The rods themselves are supported in the frame plates 4 and 5. This gives a rigid construction, and one that is easily assembled and put in place.

*Differential setting mechanism.*—Inasmuch as only one actuating rack is provided for each set of denominational elements; namely, one for all the units, one for all the tens, one for all the hundreds, etc., it is necessary that the shafts which carry the respective groups of totalizers shall be so positioned with respect to the racks that the denominational elements of any of the totalizers may be brought into engagement therewith. For this purpose a so-called differential mechanism is used; that is, a mechanism which will set the shafts in whatever position required, in order that the elements of its selected totalizer shall be in position to engage the actuating racks. There is, therefore, one differential device for each shaft.

While no reference has yet been made to the means for operating the actuating elements or racks, it may be stated that these too require to be differentially set, so that any amount from 1 to 9 may be entered upon any of the denominational units of the selected totalizers. The mechanism by which they are set is substantially identical with that used to adjust the shafts.

Three shafts, 48, 49 and 50 (Figs. 17, 18, 20 and 21), extend across the end of the machine and are suitably supported in the framework. The supplemental shaft 14, hereinbefore referred to, has rigidly fastened thereto a drum cam 51. The shafts 48, 49 and 50 do not rotate but oscillate between fixed limits, the motion being derived from the cam 51. Shaft 48 has fixed to its end an arm 52 bearing a roll 53, which engages the raceway 54 in the cam 51. The shaft 49 has fixed thereto an arm 55 bearing at its end a roll 56, which engages the second raceway 57 in the cam 51. The shaft 50 has affixed upon its end an arm 58, which carries a roll 59 adapted to engage the third raceway 60 in the cam 51.

The shaft 48 has rigidly affixed thereto a set of drivers 61, one for each of the ten shafts. Since these are fastened to the shaft, and the shaft is driven by a cam, the drivers have an invariable extent of movement for each cycle of the machine. But since it is necessary to adjust the shafts differentially, it is necessary to have some mechanism by which the variable elements may be driven from the parts which have invariable movement. Loosely mounted upon the shaft 48, and adjacent to the drivers 61, are the differential elements 62. Each of these has mounted thereon a segmental rack 63. The rack at one end has an elongated slot 64 through which passes a pin 65. The differential carries a latch 66, supported at one end by a lever 67, which is pivoted to the rack at 68, to the latch at 69, and to the differential member at 70. The other end of the latch is supported by a link 71, pivoted to the latch at 72, and to the differential member at 73. A spring 74 fastened to a lateral extension of the link 71, and to a pin on the differential 62, tends to keep the latch in its outward position. The latch carries at its outer end a double-faced latch-head 75, one face of which engages over the top 76 of the locking face 77, when the parts are latched together, and moves along the face 77 when the parts are unlatched; and the other face of which is adapted, when the parts are unlatched and the latch thrown in as best shown in Figs. 17 and 22, to engage the teeth of a segmental rack 78 cut in the fixed plate 37.

The differential element 62 carries a pin 79, which extends into the path of a projection 80 on the driver 61. Upon the return of the driver the face 80 engages the pin and thereby returns the differential member to its home position, whatever position it may have assumed during any particular cycle of operation.

The differential member 62 is stopped at the desired position by means of an arm 81, which carries a stop 82, adapted to engage any one of the several teeth of the rack 63, carried by the differential member. The arm 81 is attached to, and is actuated by, the armature 83 of an electro-magnet 84. Whenever the magnet is energized it attracts the armature, and thereby throws the stop 82 into engagement with the rack. The time in the cycle at which the magnet is energized will be determined by the perforations in the control sheet. The method of energizing the magnet under the control of this sheet will be described later; it is sufficient at this point to say that the differential is arrested in any one of its several possible positions by means of the magnet and the parts controlled thereby.

Rigidly secured to the frame plate 37 is a stop 99 so positioned as to engage the first tooth of the differentially adjustable rack 63, and thus to stop the segment, unlock the latch 66, and thereby stop the differential, if it has not been previously stopped by the magnet and its coacting parts.

The segmental rack 63 has teeth equal in number to the positions which the totalizer shafts may occupy whatever the number may be. In this case, since each shaft carries ten totalizers, and each shaft has therefore ten totalizer positions, the segmental racks have ten teeth or stopping points.

At the beginning of any cycle of operation, the drivers and the differentials are in the position best shown perhaps in Figs. 12 and 13. Here the latch-head 75 is shown as being in engagement with the driver at the point 76. As the driver 61 moves forward it carries with it its differential 62, the segmental rack 63 and the latch 66. Should the magnet be energized, its stop 82 would be thrown into position to engage the rack. The continued movement of the driver effects the withdrawal of the latch 66 from the face 76 and throws it into engagement with the teeth of the rack 78 upon the fixed support. The differential is thereby unlocked from the driver, and the latter continues to the full extent of its movement. Should the magnet of any particular driver not be energized, the segmental rack will come in contact with the stop 99, which will unlock the parts just as the stop 82 effects this result. When the parts are unlocked, either by means of the magnet and its coacting elements, or by the stop 99, the latch is thrown into cooperating relation with the rack 78, and the latch-head engages the surface 77 on the driver, and is thereby prevented from retracting until the driver returns and moves the surface 77 beyond the point of the latch. The latch then moves forward under the action of its spring 74, and falls into position and engages the driver at the point 76.

*Differential positioning devices.*—The means for transmitting the variable motion of the differentially adjustable elements to the several totalizer shafts will now be described. One differential and one actuating mechanism is provided for each totalizer shaft. The racks for actuating the upper tier of shafts have their teeth upon the lower edge, while those for actuating the lower tier have their teeth upon the upper edge. These racks are engaged by toothed segments, which are variably positioned as the selection may require. The mechanisms which position the shafts of the upper tier (Fig. 17) are all identical in construction, and those which position the lower tier (Fig. 18) are likewise identical in construction. And those which control the upper tier differ from those which control the lower tier only in the position of the actuating segments. With this understanding, a description of one mechanism will suffice for all.

Referring to Fig. 17, the segment 85, loosely mounted on shaft 86, is shown in engagement with the rack 29. A lever 87, known in the art as a "beam" and hereinafter so designated, has one end secured by a pivot 88 to a lateral extension of the gear segment 85. A link 89 has one end pivoted to the beam at 90 and the other pivoted to the differential element at 91. As the element 62 is differentially adjusted, it will vary the position of the beam 87. But this alone will not produce movement of the segment 85. Another element, known in this art as a "beam actuator", and hereinafter so designated, is necessary.

The beam actuator 92 is rigidly fastened to the shaft 49, which is oscillated through an invariable arc by means of the arm 55 and the cam race 57 of cam 51, the oscillations occurring once for each cycle of the machine. As the link 89 is shifted by the differential, the beam actuator moves its roll 93 to engage with the upper surface of the beam. As the beam actuator has an invariable extent of movement, it forces that part of the beam with which the roller engages to a definite position; but, since one end of the beam is fastened to link 89 and may therefore have a varying position; and the other end of the link is secured to the segment, the segment, due to the combined action of these parts, will be variably positioned, the variations following exactly the variations of the differential member. The beam actuator 92 is lifted from engagement with the beam at the same time that the driver 61 returns. This permits the link 89 and the beam 87 to adjust themselves to accommodate the movement of the differential. But the gear segment is not shifted by this reverse movement of the parts. The segment remains in the position in which it was set. Should any totalizer on this shaft be selected for the succeeding operation, the cooperation of the elements is such that the shaft will be moved at once to the new position, and will not be brought home before such adjustment can be effected. The adjustment to the new position is thus always effected by the least possible movement. This beam and coacting mechanism are not new with this inventor, but are old in the art, and are generally designated as a "minimum movement" device.

An extension 94, forming a part of the beam actuator, lies behind the upper end of link 89, and an extension 95, forming a part of the gear segment 85, extends in front of the same link. These serve to guide the free ends of the beam 87 and link 89 and so prevent lateral displacement thereof.

In order that the pivot 88 of beam 87 may be held in exact position the actuating segment 85 has rigidly attached thereto as by a pin 96 or other suitable means a toothed segment 97. Coacting with the teeth of this segment is an aligner 98 having the usual engaging tooth. The aligner is rigidly fastened to the shaft 50. This shaft is oscillated once during each cycle of the machine by means of the cam 51, cam race 60 and lever 58. The aligner is timed to disengage from the segment 97 before adjustment of the segment 85 begins, and to be again placed in position immediately after the adjustment is completed. In this manner the actuating segment 85, and consequently the shaft which it controls, is definitely positioned and positively locked except during the period of adjustment.

*Contact banks.*— Each shaft actuating mechanism has associated therewith certain electrical contacts, which will now be described. Each differential 62 has secured thereto a movable contact support 100. The details of this construction are best shown in Figs. 27, 28 and 29. The contact proper 100 is made double as best shown in Fig. 28, that is, it has two blades 101 and 102 insulated from each other. Furthermore, each blade has two fingers, a long one and a short one. The two blades are insulated from the support by insulating sheets 103 and 104; and from each other by an insulating sheet 105 (Fig. 28).

Removably fastened to the framework of the machine is a series of what may best be termed contact segments 106, one being provided for each shaft actuating mechanism. Each of these segments 106 consists of a plate cut on the arc of a circle with the shaft 48 as its center. They are so positioned as to enable the differential mechanism to carry the movable contacts into operative relation with the contacts of the segment. Each segment has a recess 107 at one end, and a similar recess 108 at the other. The upper end is held in position by tie rod 40, while the lower end is held by the rod 42. The recesses are so cut that the upper end can be inserted under its supporting rod and the lower end then slipped into position. The rod 42 is rotatable and is provided with certain flat sections where the segments are to be engaged. The segment is placed in position by turning the rod so that the recess 108 of the segment can pass over the rod when the flat section is in one position, but is retained when the rod is turned. The segment 106 carries a sheet of insulating material 109 on either side thereof.

Each segment carries two long contacts 110, 111, one on either side thereof, over which the short fingers of the movable contacts 101 and 102 are adapted to move; and they each carry twenty other short fixed contacts, ten on each side thereof, all electrically insulated from each other and from the contacts 110 and 111, and so positioned that the long fingers of the movable contacts 101 and 102 sweep over them. By this means the last-mentioned contacts are electrically connected to the long contacts 110, 111 successively, as the movable contacts move over the segments. The fixed contact on the right hand side of the segments (Fig. 29), are designated $r$—0, $r$—1, $r$—2, $r$—3, etc., to $r$—9, while those on the left hand side, as viewed in the same figure, are designated $l$—0, $l$—1, $l$—2, $l$—3, $l$—4, etc., to $l$—9. Plates 112, and insulating plates 113, are used one on each side of the contact segment to hold the fixed contacts in place.

*Totalizer actuating mechanism.*—The totalizers are operated by actuating devices shown here as racks (Figs. 11, 23 and 24). There is one of these racks 115 for each denomination of the totalizers, and since the totalizers here shown have ten denominations, there are ten racks. These racks may be of any preferred construction, but as here shown are built up of two thin plates 116, 117 (Fig. 24), with the rack sections 118, secured between them. The sections 118, secured in the top of the rack structure, engage the same denominational elements in all of the groups of totalizers on the upper tier of shafts; and the sections secured in the bottom thereof engage the same denominational elements of all the groups of totalizers on the lower tier of shafts; and since, in the construction here shown, there are five shafts in each tier, there are five rack sections on the top of each rack structure, and five rack sections on the bottom thereof. These sections will be varied with the number of groups of totalizers. If the number be less than that here disclosed, the rack sections will be less; if the number be greater, the rack sections will be greater. These rack structures 115 also carry other elements which are used in transferring from a lower to a higher denomination. The construction and operation of these parts will be given when the transfer mechanism is described. Each rack structure also carries upon its under side an additional rack section 120. This engages the driving segment of its differential and is used to shift the rack structure back and forth as circumstances require.

*Rack adjusting devices.*—The racks are adjusted and controlled by differential devices identical in many respects with those used to adjust the totalizer shafts. One of these actuators is provided for each rack structure, and since ten racks are here illustrated, ten actuators have been provided. These are best shown in Figs. 11, 12, 13 and 22. There is, however, this difference to be observed between these actuators and those used to shift the shafts. In the latter case the final adjustment of the shafts is by means of the so-called "minimum movement" mechanism, or by the combined action of the differential devices with these minimum movement elements; but with the rack actuators, the racks are adjusted and operated directly by the differentials.

Since the rack actuators are all alike, the description of one will suffice for all; and in order to avoid the use of an unnecessary number of reference characters, the parts of these actuators which are identical with the shaft actuators will be designated by the same characters as have been used in describing the other structures. Therefore, following this designation, a driver 61, identical with the drivers used in connection with the shaft differentials, communicates motion to the differentials 62. These drivers, however, are not rigidly attached to their supporting shaft as are the drivers for the shaft differentials, but are loosely mounted thereon (shaft 153), and are provided with independent driving means. This is because these differentials cannot act at all times in unison, but upon the return must come back successively. Each differential carries a segmental rack 63, having an elongated slot 64, in which moves a pin 65. A latch 66 is supported at one end by a lever 67, which is pivoted to the segment at 68, and to the latch at 69. A link 71 is pivoted to the latch at 72 and to the differential at 73. A spring 74 forces the latch forward. The latch-head 75 of the latch engages the driver at 76 until disengaged therefrom at the point selected, whereupon it is thrown in and the rear edge of the latch-head 75 engages one of the ratchet teeth 78, while the surface 77 of the driver rides over the point of the latch and prevents it from being retracted. An arm 81 having a stop 82, is supported by the armature 83 of an electro-magnet 84, and serves under conditions to be hereinafter described as a means for stopping the differential element at the point determined by the controlling record. The driver returns the differential by a projection 80 engaging the pin 79, as in the construction formerly described. Each differential mechanism carries a movable contact 100 cooperating with a contact segment 106, which elements have all of the contacts heretofore described for the shaft actuating devices. These segments and contacts function in the identical way as those described for the shaft actuators.

The rack actuators are, as stated, individually driven. This is accomplished by means of segments 121 (Figs. 11, 12, 45 and 46) loosely mounted upon the shaft 122 which engages other segments 123 fastened to the drivers 61 proper by means of pins 124, 125. The segment 123 is arranged on the other side of the supporting plate 9 from that occupied by the driver, and is therefore spaced therefrom sufficiently by the pins 124, 125, to permit the engagement of the actuating segment 121 therewith. In order to permit the free movement of the parts, the plate 9 has a recess 126 so that the pins will have sufficient space for movement. The driving segment 121 is actuated by a double plate cam, one plate 127 (Fig. 36) of which operates upon roll 128 mounted upon the arm 129 to move the segment in one direction, and another plate 130 (Fig. 13) operates upon the roll 131 on another arm 132 to move the segment in the reverse direction, this movement taking place once for each cycle of the machine.

Each differential carries a segmental gear 133 upon its upper surface which engages the rack section 120 upon the rack structure, and thereby transmits motion to the rack 115. Any varying movement which is communicated to the differential is therefore by this means transmitted to the rack, and the latter is likewise adjusted differentially.

The rack structure (Figs. 23 and 24) is provided on one side with a group of guiding rolls 134, five being shown in this instance, by means of which the racks are supported by plates 135, arranged parallel to and supported by means of pins 136 (Figs. 13 and 17) on the main frame plates 9. Each of these plates is provided with a group of guiding slots 137, equal in number to the guiding rolls of the rack, and each slot is provided with an enlargement 138 sufficient in size for the rolls to pass through. These enlargements are for the purpose of assembling only, and perform no function in the operation of the machine.

*Totalizer adjusting mechanism.*—In order that the selected totalizers may be placed in position for actuation, all of the totalizer shafts with the totalizers mounted thereon are shifted at one time from their normal positions to their rack engaging positions. The totalizers which have been selected for actuation are thus placed in engagement with the racks, while those that have not been selected are so placed with relation thereto that the racks move idly through the blank positions with which each group of totalizers is provided. The means for moving the totalizer shafts toward or from the racks and the means for operating the totalizers will now be described.

In order to prevent displacement of the totalizer elements it is necessary that they be locked against movement at all times, except when in engagement with their respective racks. This is effected by aligning devices which will be hereinafter considered.

In describing the totalizer adjusting devices, reference is made to Figs. 14 and 15, in particular, and also to Figs. 5a, 16 and 17. The initial movement is derived from a slide 150 located at the left hand end of the machine, (as viewed in Figs. 5a and 5b). A similar slide 151 is used to communicate motion to the aligning devices. The slide 150 is shifted by means of a lever 152 pivoted at 153, and having at its lower end a slot 154, and at its upper end a stud 155. The last-mentioned stud engages a slot 156 in the underside of the slide 150. Another lever 157 also pivoted at 153, and having a slot 158 at its lower end, and a stud 159 at its upper end, engages beneath and actuates the slide 151. Both levers are in turn actuated by another lever 160, which is pivoted on shaft 122 running across the machine, and in turn derives its motion from cams on the main shaft 10 of the machine. The lever 160 carries at one end a roll 162, which engages the slot 154 in the lever 152; and another roll 163, which engages the slot 158 in the lever 157. The cams which drive the main lever 160 are specially designed so that the timing thereof may be changed during total taking operations. This construction will be described when the last-mentioned operation of the machine is considered. The slide 150 is guided by grooved rolls 164 mounted on studs 165 secured in the main frame 2 of the machine. The slide 151 is similarly guided by rolls 166 also mounted on the studs 165.

At the other end of the machine is another slide 167, (Fig. 16) guided upon rolls 168, mounted on studs 169 secured to the main frame plate 3. This slide is mounted to move in synchronism with the slide 151. Motion is communicated thereto from slide 151 by means of a lever 170 having a bifurcation 171 at its lower end engaging a pin 172 on the slide, the lever being in turn fastened to a shaft 173, which has at its other end another lever 174 also having a slot 175 which engages a pin 176 on slide 167. By this connection any movement of slide 151 is imparted to the companion slide 167.

The shifting of the totalizers is effected directly by slide 150, while slide 151 actuates the aligners; slides 151 and 167 together hold the totalizers while in their engaged position.

Running lengthwise through the machine above and below the actuating racks are a series of shafts 180, there being one shaft for each group of totalizers. These are journaled in the main frames 2 and 3 of the machine. To each shaft there is rigidly affixed a bell crank 181 (Fig. 14), there being one of these cranks for each totalizer shaft. One arm of each bell crank is slotted as at 182 to engage a pin 183 on the slide 150. The other end of each bell crank embraces and carries one end of another shaft 184 likewise running across the machine. These shafts are journalled for oscillation in the bell cranks, and do not extend to the frames. The shafts 180 have arms 185 (Figs. 5b, 16 and 17) secured to them at the other end of the machine which arms embrace the opposite ends of the several shafts 184. Other arms 186 (Figs. 5a and 5b) are fastened to the shafts 180 intermediate their ends, and likewise embrace the shafts 184 thereby helping to support the same between their ends. Adjacent the bell cranks 181 and the arms 185 are hung on the shafts 184 arms 187 having at their lower ends slots 188 engaging guiding rolls 189 secured to the end frames of the machine (Fig. 17). In these arms 187 are hung the totalizer shafts 28, each shaft being supported by two of these arms 187, one at either end of the machine. By this means, as the slide 150 is shifted to the right (as viewed in Fig. 14) it actuates the several bell cranks 181 thereby moving the arms 187 and putting the totalizers into engaging position with the actuating racks. As the slide moves in the reverse direction, the shafts 28 and totalizers are withdrawn. This shifting of the totalizers occurs once during each cycle of the machine, and is so timed that the totalizers are brought into engaging position after the actuating racks have been differentially positioned, so that the selected totalizers are in engagement with the racks during the return of the latter to their home positions, and thus the movements represented by the variously positioned racks is communicated to the totalizers. The totalizers are then disengaged from the racks.

*Aligning devices.*—As stated above, the aligning devices are actuated by the slide 151, which secures its movement from the shaft 10 by means of the levers 157 and 160. It is necessary that all totalizer elements be positively held at all times except when in actual engagement with the actuating racks. Two aligning devices are therefore provided, one for holding all of the totalizer elements when the totalizers are out of the rack engaging position, and another to hold all totalizer elements that are not in engagement with the racks when the totalizers have been moved to their engaging positions.

To hold the totalizers aligned when in their disengaged positions, aligning bars 200 (Figs. 15 and 17) are provided. There is one of these bars for each group of totalizers, and the bars are so mounted as to move both longitudinally and vertically with the groups with which they are respectively associated. The stationary aligning devices are shown at 201. These are short rigid sections equal in length to the space occupied by ten totalizer elements, and are secured to the frame plates 9 between the actuating racks by means of rivets 202 (Fig. 12). When the totalizers are moved into engaging positions all elements not in engagement with the racks are brought into engagement with these aligning devices.

The aligning bars 200 are mounted in supporting slides 203, one at either end of the machine (Figs. 15 and 16). Each slide 203 is provided at its upper end with a slot 204 by which it is guided by the shaft 184; and at its lower end by a slot 205 by which it is guided by the shaft 28. Each slide has a third slot 206 in a lateral extension which engages a short pin or rod 207, by means of which it is raised and lowered.

The movement of the aligning devices must be such that they will move with the totalizers, and keep the elements thereof aligned, until the totalizers are in their rack engaging positions, at which time the elements of the totalizers are held by the stationary aligning devices or by the racks themselves. Immediately after the totalizers are in rack engaging positions the movable aligning devices must be withdrawn, so that the racks may actuate the selected elements. As soon as the selected elements have been actuated by the racks the movable aligning devices must again engage all of the totalizer elements, and this engagement must be maintained while the totalizers are being moved from their rack engaging positions. It is therefore seen that the aligning devices must first be moved with the totalizers, then they must be disengaged therefrom, then they must be reengaged therewith, and then again move away with the totalizers.

Loosely mounted upon the shafts 180 are other bell cranks 208, each of which has a slotted lower end engaging a pin 209 on the slide 151 (Fig. 15). The other arms of these bell cranks extend laterally over the shafts 184, and each carries at this end a pin 211 (Figs. 14 and 15). Rigidly secured to shafts 184 are certain other small levers 210, there being one lever for each shaft. One end of each of these levers is provided with a slot with which the pin 211 of the bell crank 208 engages. The opposite ends of these levers carry one end of the short pins or rods 207. At the other end of the machine rigidly attached to shafts 184 are mounted similar levers 213 (Figs. 5b, 16 and 17); but these levers merely carry one end of pins or rods 207 located at that end of the machine, and do not have slots at the other end as do the levers shown in Fig. 15, since there are no bell cranks at this end of the machine for directly actuating these levers. The other ends of the pins or rods 207 are supported by levers 215 also rigidly secured to shafts 184.

Collars 216 pinned to the shafts 180 hold the bell cranks 208 in position and yet permit their free oscillation.

This construction is somewhat involved, but its operation is clear, and is as follows: At the beginning of the movement of the totalizers toward the rack engaging position, slides 150 and 151 move together. Slide 150 acts upon bell cranks 181, and effects the positioning of the totalizers. Slide 151 also moves bell-cranks 208. The elements are so arranged that there is no substantial relative movement between the totalizers and the aligning devices, the latter simply moving with the totalizers. When the totalizers reach the rack engaging position, and have been engaged by the racks and the stationary aligning devices, slide 150 comes to rest, but slide 151 continues its movement. This causes bell cranks 208 to further rotate, and since shafts 184 are now stationary, there is a relative movement between the pins 211 and the levers 210, which causes the latter to rotate, and since the levers 210 are fast to shafts 184, these shafts likewise turn, and with them the levers 213 at the other end of the machine (Fig. 16) and the supplemental levers 215. This causes the other ends of the levers 210, 213 and 215 to move in a direction opposite to the movement of the pins 211. Since the other ends of these levers actuate the pins or rods 207, and since these pins or rods engage the slots 206 in the slides 203 whatever the longitudinal position of the groups of totalizers with which they are associated, the slides will be withdrawn, and the aligning plates 200 removed from engagement with the totalizers. As soon as this happens the slide 151 comes to rest, and all further relative movement between the aligning devices and the totalizers ceases.

The parts are held in this position until the racks have reached their home positions, whereupon slide 151 begins to move in the reverse direction, thereby shifting the several pins 211, and thus shifting in a reverse direction the pins or rods 207, which in turn also shift the slides 203 at both ends of the machine, and cause the aligning devices 200 to reengage with the totalizers. Slide 150 then begins to move, and the two slides continue their movement in substantial unison, so that as slide 151 continues to shift its bell cranks 208, slide 150 shifts the bell cranks 181, and the totalizers and the aligning devices recede together to their normal positions, where they remain until the next succeeding cycle of the machine.

Slides 151 (Fig. 15) and 167 (Fig. 16) are provided with hooks 214, there being as many of these hooks on each slide as there are totalizer shafts. When the totalizers are in their rack engaging positions these hooks engage the totalizer shafts 28 and hold the same against displacement. As illustrated (Figs. 14, 15 and 16), the totalizers are in the rack engaging positions, and are shown as locked in place by the slides 151 and 167. As the slides recede, the hooks 214 also recede. At the same time the aligning devices are being brought into engagement with the registers. By the time that the aligning devices have been placed, the hooks 214 have been removed, and the shafts 28 together with the totalizers may be withdrawn to their normal positions.

The use of the pins or rods 207 are necessary because of the longitudinal travel on the totalizer shafts. The possible lengthwise movement of each of these shafts is equal to the space occupied by the number of elements in each register, in this case ten, together with the space occupied by the blank position. Since it is necessary for the aligning devices to engage the elements of the totalizers whatever the positions of the shafts are, it is necessary that these aligning devices travel with the totalizer shafts. As a shaft is adjusted longitudinally, the aligning device for all the totalizers of that shaft together with its carrying slides 203 moves with it. Since the aligner may have to be adjusted at any position of the shaft the pins or rods 207 are made of such length that the slides 203 may be adjusted whatever the position of the totalizer shaft. This is best shown in Figs. 5a and 5b where the length of these pins or rods are particularly illustrated.

*Transfer mechanism.*—The carrying mechanism will now be described. Inasmuch as the totalizers are arranged with all of the units of each group together, all of the tens together, all of the hundreds together, etc.; whenever any totalizer of the group is selected, all of the denominational elements of such totalizer must be in position to engage with the several racks. The units element of that totalizer must engage the units rack; the tens element, the tens rack; the hundreds element, the hundreds rack; and so on to the end of the series. This requires that the carrying mechanism shall carry from the element which is in engagement with the units rack to the element which is in engagement with the ' ns rack, and that the latter shall be able to carry to the element that is in engagement with the hundreds rack, and so on through the series.

The means for giving the additional step of movement to the denominational element into which the carry is to be made is in the rack structure itself. Each of the racks proper consists of a main rack and a supplemental rack, the main rack being of a length and having a movement sufficient to give the totalizer element nine steps of movement, and the supplemental rack being of a length and having movement sufficient to give the totalizer element one additional step of movement. When carrying is to take place the supplemental rack is permitted to act upon the totalizer element into which the carrying is to be made, but at all other times the supplemental rack is rendered ineffective. Means is therefore provided for controlling the movement of the supplemental racks by mechanism under the control of the next lower denominational element; so that the supplemental rack is effective or not effective, depending upon the condition or position of the next lower denominational element of the totalizer engaged.

Running across the machine is a series of rods 300, one for each totalizer shaft, the rods being fixed in the end frames 2 and 3 and spacing plates 9 of the machine. Spacing collars 301 (Fig. 26) are employed to maintain the proper distances between the end frames and division plates 9, and between the plates themselves. Upon the collars are placed the devices which, acting under the control of the denominational elements, determine whether the next higher denominational element of any given totalizer shall or shall not have its element moved the additional step necessary to effect a carry.

Adjacent each rack section 118 is the supplemental two-toothed racks 302 (Fig. 23), pivotally mounted at 303 between the plates 116 and 117 of the rack structure. A sufficient space is allowed between the sections 118 to permit the supplemental racks 302 to move out of the way when no carrying is to be effected. Each of the supplemental racks 302 carries a pin 304, which passes through an enlarged orifice 305 in one of the side plates of the rack structure. Loosely mounted upon this pin is a bell crank 306, having at one end an L-shaped slot 307 through which passes another pin 308 rigid with the rack structure. The short arm 309 of the bell crank extends in a direction at approximately right angles to the other portion thereof, and is adapted to come in contact with a certain controlling device, the position of which determines whether the supplementary rack shall or shall not be effective. To the pin 304 of each supplemental rack is rigidly secured a short arm 310, and between this arm and a pin on the bell crank 306 is stretched a spring 311. The spring holds the lever 306 with the short end of the L-shaped slot 307 engaging the pin 308 (Fig. 23), unless the lever is forcibly shifted to place the long end of the L-shaped slot in line with the pin 308. Each bell crank is further provided with a notch 312 adapted to coact with a fixed rod or stop 313 (Fig. 12) whenever the supplemental rack is held against effective movement.

Mounted upon the transverse frame plates 9 are pivoted tripping levers 314, loosely mounted upon pivots 315 secured in the frame plates (Fig. 12). There are as many of these trip levers as there are rack sections 118. They are all identical in construction, and a description of one will therefore suffice for all. Each trip lever is provided with a laterally bent arm 316 which passes through an enlarged orifice in the frame plates 9 (Figs. 11, 12 and 26), and extends into the path of movement of the short arm 309 of the bell crank 306, mounted upon the rack structure, which moves upon the other side of the frame plate. There is thus provided a stop supported by the frame work of the machine, which may extend into position to coact with the arm 309 of the bell crank 306, or not coact therewith, depending upon the position of this stop. Each trip lever is also provided with another bent arm 317 which is engaged by a restoring bar, to be described, which restores to normal position at the end of each cycle of the machine all trip levers which have been actuated during that cycle. Each trip lever is also provided with another extension 318, which coacts directly with the element controlled by the denominational wheels of the next lower denomination, and which determines whether its lateral arm 316 shall or shall not engage the arm 309 of the bell crank.

Each denominational element is provided with a tooth 320 slightly longer than the other teeth. Arranged in position to be engaged by this long tooth is a pin or plate 321 mounted upon a lever 322 (Figs. 25 and 26). This lever communicates motion to a longer lever 323 in position to engage the trip lever of the next higher denomination, the levers 322 and 323 being connected together by a sleeve 324 (Fig. 26) so as to move in unison. The lever 323 is provided with two notches or steps 325 and 326. A spring 327 yieldingly connects the trip lever 314 and arm 323.

Whenever any denominational wheel of any totalizer except the wheel representing the highest denomination, moves from 9 to 0, its long tooth 320 passes the pin or plate 321 mounted on the lever 322 and slightly displaces the same. This movement is communicated to the lever 323 by means of the connecting sleeve 324, thereby shifting the lower end of the lever 323 so as to permit an extension 318 of the trip lever 314 to move from the step 325 to the step 326 in the arm 323, the two parts being held in this adjusted position by means of the spring 327. This so changes the position of the laterally bent arm 316 (Fig. 26) as to remove it from the path of the short arm 309 of the bell crank 306; so that when the rack structure is shifted, the bent arm 316 and the arm 309 will not come in contact with each other, but the latter will pass freely by the bent arm or stop 316. But if the totalizer wheel is not shifted, or if moved and its movement is not sufficient to engage its long tooth 320 with the pin or plate 321, then the lever 322 will not be moved, the lever 323 will remain with its step or recess 325 in engagement with the extension 318 of the lever 314, and its bent extension 316 will remain in the path of the arm 309 of the bell crank lever 306. As the rack structure moves the arm 309 will strike the stop arm 316. This will cause the lever 306 to move around its pivot 304 causing the long end thereof to be shifted until the short end of the L-shaped slot 307 passes over the pin 308 and the long part thereof comes into line with the pin 308. The supplemental rack 302 is then held against movement, but the rack structure with the rack sections 118 continue to move, the pins 308 moving through the long portion of the L-shaped slot.

As the bell crank levers 306 are stopped and rotated to disengage the vertical limb of the L-shaped slots 307 and pins 308, they engage with the stationary stops 313, which lock with the notches 312 with which these levers are provided. These levers 306 are thus held stationary (Fig. 12) while the racks complete the short additional movement required. At the time the supplemental racks 302 are stopped they are in engagement with the denominational elements of the totalizer or totalizers being actuated. When they are stopped, the totalizer elements also stop, but the main racks 118 continue and make the full movement determined by the differentials. Immediately after the rack actuating mechanism comes to a stop, the totalizer adjusting and aligning devices come into place, the aligners 200 come into position and the totalizers withdraw from the racks.

*Restoring mechanism.*—Inasmuch as it is impossible to determine which of the trip levers 314 will be actuated during any one cycle of movement, devices are provided for restoring any and all of said levers which may have been moved during such cycle. For this purpose restoring bars 330 are provided, one for each rack structure (Fig. 12). These bars are mounted upon the frame plates 9 on the same side thereof as are the trip levers 314. Each bar is provided with a plurality of elongated slots 331 through which pass headed pins or studs 332 secured in the plates 9. Each bar is also provided with lateral extensions 333, equal in number to the number of trip levers which it controls. These extensions are so arranged with respect to the arms 317 of the trip levers that a reciprocation of the bar will engage the arms 317 of all levers that have been tripped during any operation, and move them to such positions that the springs 327 will cause the arms 323 to again latch the trip levers in the step 325, thus holding them in normal positions. Each bar is provided with a lug 334 by which it is shifted in one direction, and a spring 335, stretched between a lug on the bar and a pin on the plate 9, by which it is drawn in the other direction. The bars are actuated by arms 336 (Figs. 12 and 45) mounted to oscillate on the shaft 153 and are driven by the segments 121, which actuate the drivers 61 of the rack differentials. Each arm 336 is provided with a laterally bifurcated extension into which a pin 124, heretofore referred to, engages and by which motion is conveyed thereto. The timing is such that the restoring bar is actuated, and the levers 314 reset, near the end of the advance or positioning movement of the driver 61, so that the trip levers 314 are in position to act as soon as the totalizer elements begin to rotate on the return movement of the actuators. As soon as the drive 61, and its actuating segment 121, begin to return, the arm 336 moves away from the lug 334, which, under the influence of the spring 335, moves in the reverse direction. This removes the extensions 333 out of the path of the arms 317 so that they will be free to move when carrying may take place.

Figure 22 shows a bar 330 similar to the restoring bars 330 heretofore described. This figure, however, shows how the bar is used with the units bank of the machine. Since this is the lowest denomination, and there is therefore no carrying to take place into these denominational elements, these trip levers do not have all the functions of those on the other banks, but they must be able to separate the supplemental from the main rack sections. And since there are no lower denominational elements from which carrying can take place, it is necessary that the supplemental racks be separated from the main racks at every operation. The arm 316 of the trip levers must therefore always function; but since there is no necessity for moving back the restoring bar at each cycle of the machine, this bar is simply secured in its extreme left position, as shown in Figure 22, by a pin 338.

As heretofore stated, the actuating racks are first set differentially, and the selected totalizers then engaged therewith. The racks then return, the units rack starting first, and the others following in close succession one after the other, and the amounts represented by the positions of the several racks are run upon the selected totalizers. As the racks return, and it becomes necessary for a carry to be made, the long tooth of the lower denominational element engages the pin or plate 321 on the lever 322 thereby operating the lever 323, shifting the trip lever 314 of the next higher denominational element to such a position that when the rack returns the arms 309 and 316 will not be engaged, thus permitting the supplemental rack 302 of that particular rack to move that denominational element one additional step. But for all denominational elements in which no carry is to be effected, the trip levers 314 are retained in such position that the arms 309 and 316 do engage, and the bell crank levers 306 are shifted, so that the pin 308 runs into the longitudinal part of its L-shaped slot, and the lever assumes a position into which the locking pin 313 engages in the notch 312 with which each lever is provided. The locking of the lever 306 is completed just as the rack structure reaches its home position at the end of the cycle. It will therefore be found that all of the supplemental racks 302 will not at this time be in the same position. Those which have effected a carry will be held in close juxtaposition to the main racks with which they cooperate, while those which have not effected a carry will remain separated therefrom, and their actuating levers 306 will remain locked by the pin 313, as shown in Fig. 12. These parts will remain in this position until the next cycle of operation. As soon as the actuating racks begin their movement in the succeeding cycle, the first effect will be for the rack structures to move up to a position assumed by the supplemental racks in the previous cycle, thereby shifting the pin 308 in the bayonet slot 307 until the pin reaches the vertical portion of the slot, whereupon the spring 311 will cause the lever 306 to oscillate with the pin 308 in the vertical portion of the slot. This unlocks the lever from the pin 313 and the supplemental rack 302 then moves with the main rack structure. The resetting of the supplemental racks which have not carried takes place therefore at the beginning of the succeeding cycle. For this reason it is necessary that all racks during every cycle of operation have a movement sufficient to bring the supplemental racks into contact with the main racks; for, otherwise, carrying in the succeeding cycle would not be provided for. In order to accomplish this all racks, including those which are not to make entries upon the totalizers, move a distance sufficient to effect the resetting of the supplemental racks. As a matter of fact the constructions of the differentials and record control is such that all rack structures will have at least one step of movement for every cycle of operation. Those racks which are to make entries upon the selected totalizers are set differentially as determined by the amount of the data, but those which are to make no entries have only the one step of movement necessary to restore to actuating position the supplemental rack sections.

*Rack aligner.*—In order to definitely align and place the adding racks, a special aligner is provided which comes into action once during each cycle of operation and immediately after all of the racks have returned to their home positions. A shaft 340 runs across the machine on the side opposite the rack adjusting devices. To this shaft are fastened a series of hooks 341 (Fig. 11), one for each rack, which are adapted to engage pins 342 (Figs. 11 and 24) secured to the racks. When the racks are in their home positions the hooks are oscillated to engage the pins and positively adjust and align the racks. The shaft and attached hooks are actuated by means of a link 1342 pivoted to one of the hooks at 343. The link is shifted by a lever 344 pivoted on one of the shafts of the machine, and having its other end controlled by a cam 345 having a cam-way 346 in which operates a cam roll 347. The cam is so cut as to effect a latching movement of the hooks immediately after the racks have all reached their home positions, and to release the hooks just before the racks are reset for the next cycle of the machine.

*Analyzing mechanism in general.*—The analyzer, which interprets the record, and selects and determines the extent of movement of the several elements, will now be described. This, as viewed in Figs. 5a, 5b and 6 appears at the right hand end of the machine. Adjacent the analyzer is the perforated record and the means for feeding the same through the machine. Certain recording devices, shown both in the form of a perforating machine and of a printing machine, are also arranged here. These recording devices do not function while the machine is analyzing a previously prepared record, but operate to make a record of the data contained in the machine when the same is being cleared. Since these devices operate only when the machine is producing a record of its own data, they will not be now described but will be considered when the machine is described from its second aspect.

Figure 57:
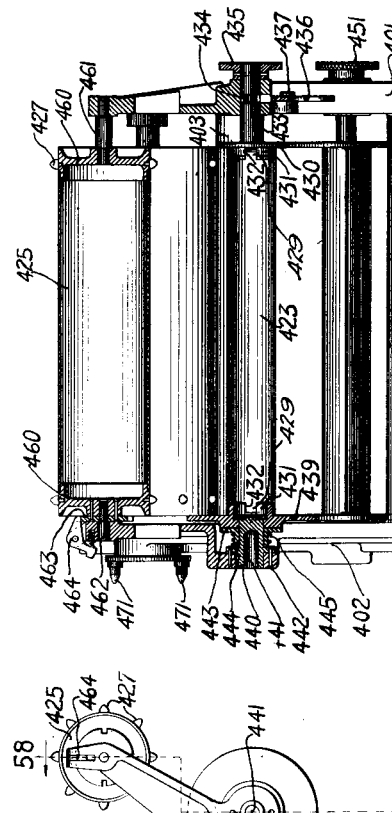
Fig. 57 is a side elevation of the paper carriage detached from the machine.
Figure 60:
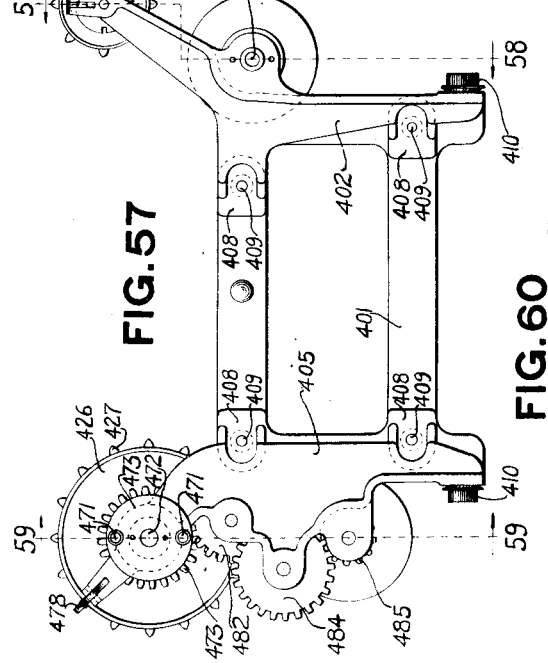
Fig. 60 is a view of the gear train carried by the carriage and used to feed the record.

*The paper carriage.*—The detail record is designated by the character 400. The carriage which supports the reels, feed rolls, etc., is made to be easily removable from the machine. It consists, generally, of three castings; a front piece 401 (Figs. 57 to 60); an end section 402, which has cast with it cross bars 403 and 404; and another end section 405, likewise having crossbars 406 and 407 formed therewith.. All of the bars 403, 404, 406 and 407 are provided with enlarged ends 408 (Fig. 57) by which the sections 402 and 405 are secured to the front piece 401, the parts being fastened together by means of screws 409. These three castings together form a rigid frame-work with an open rear portion, so that it may be inserted into the machine without being obstructed by certain of the operative parts.

The carriage is provided with rollers or castors 410, which run on tracks 411 (Figs. 47 and 52) rigidly secured to the frame-work of the machine. The casing 8 of the machine is provided with a door 412, (Fig. 48) carrying on its inner face two other rails 413. These are hinged by rule-joints to supports 415 secured to the machine in such position that the rails 413 will form continuations of the tracks 411 whenever the door is lowered. The rule joints limit the downward movement of the door, so that the same forms a table upon the rails of which the carriage may be withdrawn.

To lock the carriage in place a latch 417 is secured to a shaft 418 mounted in the frame. This has a thumb piece 419 by which it may be adjusted, and a latching finger 420 which passes down over the edge of the frame. As an additional securing means, the shaft 418 has attached thereto another arm 421 (Figs. 6 and 47), which engages with a pin 422 on the inside of the frame plate 401. When the carriage has been inserted the latch is lowered so as to engage the carriage at both places. To remove the carriage it is only necessary to raise this latch 417, thereby disengaging the latching finger 420 and arm 421; whereupon the carriage may be at once withdrawn.

Two mandrels are provided (Figs. 58 and 59); one 423 comes to the machine with the record already wound thereon; the other 424 receives the material as it passes through the machine. A guide drum 425, and a feed drum 426, guide and feed the record step by step as the same is analyzed. Both drums are provided with driving pins 427 which are so disposed as to engage perforations in the edges of the record. One end of the driving roll has twice as many pins as the other, and the record has on one edge twice as many perforations as on the other. This is to enforce the proper placing of the record in the machine since it must be so arranged as to make the perforations coincide with the pins on the drums. The guide drum 425 also is provided with guiding pins. These also are spaced twice as far apart on one end as on the other, so as to properly engage the record, which has the holes on the two sides differently spaced.

The mandrels are identical in construction, and consist of a metal tube having a longitudinal slit 428, through which the end of the record strip is placed when starting the same on the mandrel, and two tongues 429 (Fig. 52) which engage other portions of the mechanism, so that the mandrel may be positively driven.

The mandrel 423 is supported at one end by a flanged member 430 having a short extension 431 of a size to pass within the end of the tube, and slots 432 to engage the tongues 429 of the mandrel proper. Integral with the flange is a short shaft 433 having an annular recess 434. A milled head 435 is rigidly secured to the shaft, and may be used to manually turn the mandrel when occasion requires. A latch 436 pivoted at 437, and normally held in place by a spring 438 (Fig. 47), engages the recess 434 to prevent accidental withdrawal of the shaft and flange.

The other end of the mandrel is supported by a flange structure 439, having attached thereto an extension 431 having notches 432, identical with the extension 431 and notches 432 of the flange at the other end of the mandrel. This flange is mounted for frictional engagement with the frame of the machine. A stud 440, provided with a central recess 441, is secured to the frame by means of pins 442. This stud passes through the flange 439, and has permanently secured to the inner end thereof a washer, so as to retain the flange 439 thereon, but to permit its rotation. Surrounding the stud 440 is a friction disk 443 having a pin connection 444 with the stud proper so that there may be slight longitudinal movement of the friction disk. Surrounding this friction flange is a spring 445 so arranged as to produce an end thrust of the disk 443 against the flange 439.

By this arrangement the flange 439 is permanently secured to the carriage, and yet may be rotated upon the stud 440, while at the same time its rotation is restricted by the friction disk 443 acting under the force of the spring 445. The other flange 430 may be slightly withdrawn by releasing the latch 436, and pulling upon the milled head 435; this slides the flange 430 to the right (as viewed in Fig. 58), thereby drawing the inner extension 431 out of the mandrel, which latter may then be removed.

The other mandrel 424 is mounted in a manner quite similar to 423 but is provided with a gear so that it may be positively driven. Referring first to the left hand end of the mandrel (Fig. 59), the flange 446 is provided with a reduced extension 447, in a manner substantially identical with the construction of the support for the other mandrel. Rigid with the flange is a short shaft 449, having an annular recess 450, and the milled head 451, which is rigidly secured thereto. A latch 452, actuated by a spring 453 (Fig. 47), is used to engage the groove 450 and hold the shaft and flange against displacement.

At the other end is another flange 446, provided with an inner extension 447, and notches 448, identical with those at the left hand end of this member. A pin or stud 454 is rigidly secured to the frame by means of a riveted head 455. This serves as a pivot upon which the flange 446 rotates. This stud has attached thereto at its inner end a disk or washer 456, which prevents the flange from being removed from the pin 454. The pin and the flange thus form a permanent mounting for the flange 446. The flange 446 has an extension 457 which forms the bearing by which it is supported on the stud or pin 454. Surrounding this extension 457 is a sleeve 458, against which presses a spring 459, forcing the sleeve into frictional engagement with the flange 446. This flange 446 and the mandrel are driven through this frictional connection by a gear train to be described.

Figure 58:
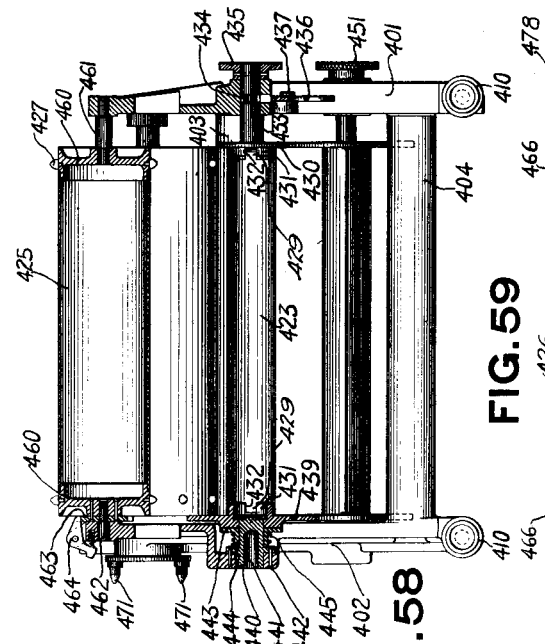
Fig. 58 is a section of the paper carriage, taken on the line 58—58 of Fig. 57, and looking in the direction of the arrow.

The guide drum 425 is mounted in the frame above the supply roll, and in such position that its upper periphery is in horizontal alignment with the table of the analyzer. The drum 425 proper is supported by heads 460 (Fig. 58). The right hand head has secured therein a short shaft 461, which is rotatively mounted in the frame of the carriage. The other end of the roll is similarly supported by a short shaft 462, likewise mounted in the frame of the carriage. Secured to this head by pins or other suitable means is a notched plate 463. Coacting with this plate is a spring pressed latch 464. Whenever the carriage is withdrawn this latch under the action of its spring, engages the locking plate and holds the roll from accidental displacement; but when the carriage is in the machine, the other end of the latch strikes a fixed post 465 on the frame (Fig. 51), and retracts the latch from the plate, so that it may rotate freely.

The feed drum 426 is mounted to be positively driven. The drum proper is secured to heads 466, similar to the heads of the guide drum. The left hand end of the drum (as viewed in Fig. 59) is mounted for rotation upon a stud 467, which is provided with a screw threaded portion 468, by which it is rigidly screwed into the frame. The inner end of the stud has a reduced portion upon which the head freely rotates.

Figure 59:
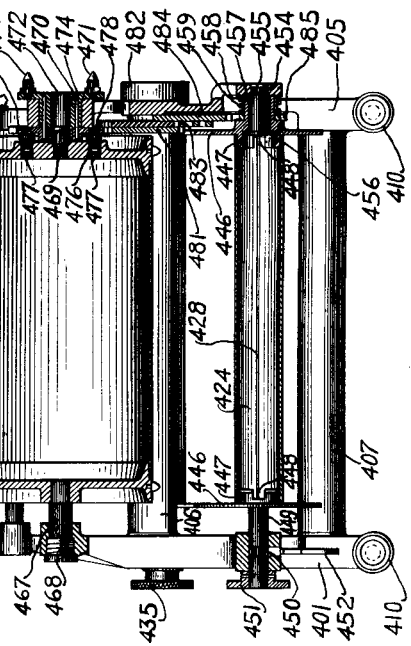
Fig. 59 is a section through the paper carriage, taken on the line 59—59 of Fig. 57, and looking in the direction of the arrow.
Figure 61:
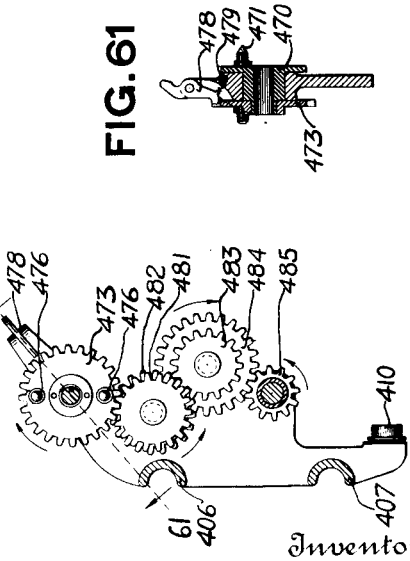
Fig. 61 is a view taken on the line 61—61 of Fig. 60, looking in the direction of the arrow.
Figure 68F:
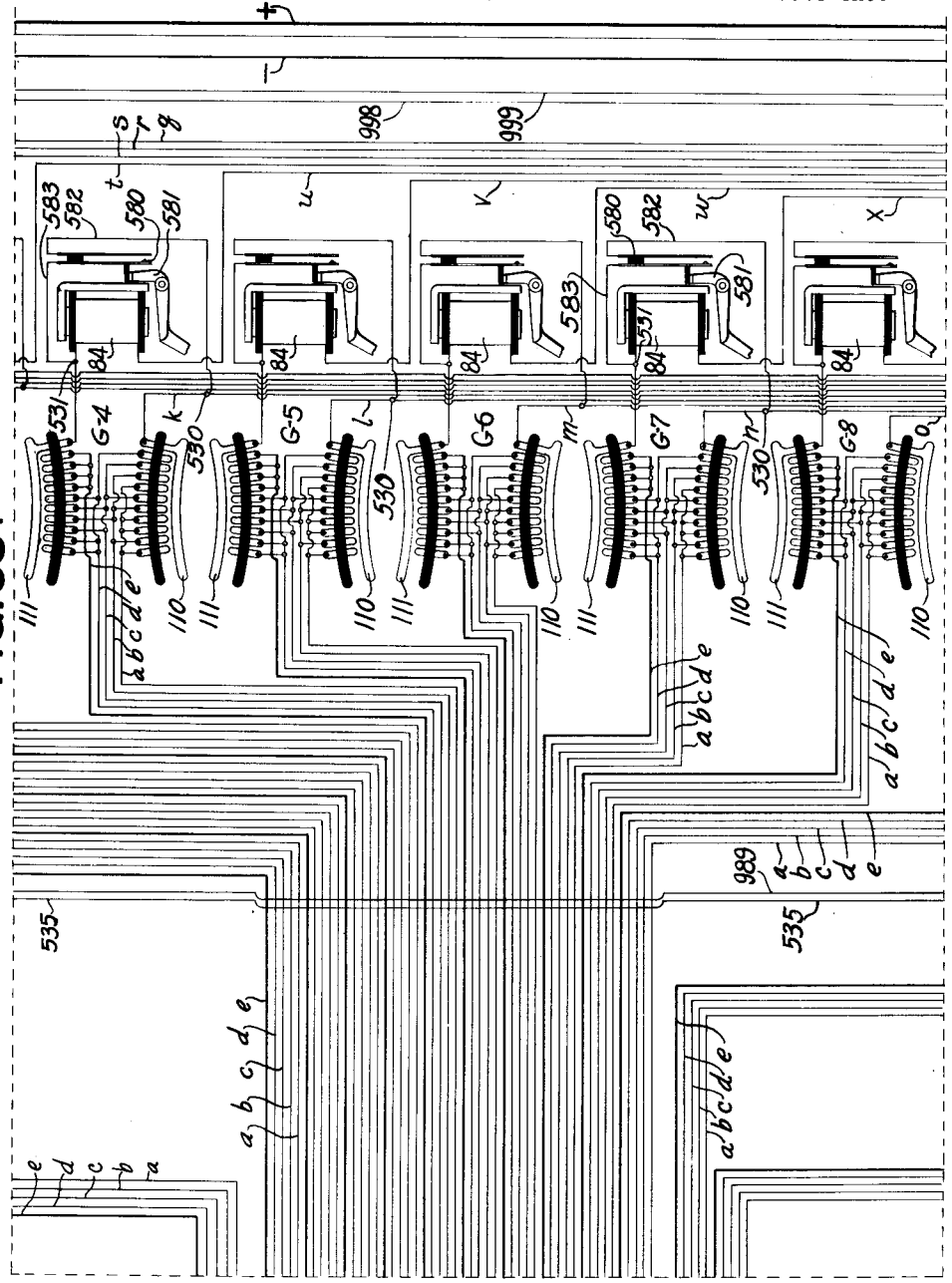
Figure 68H:
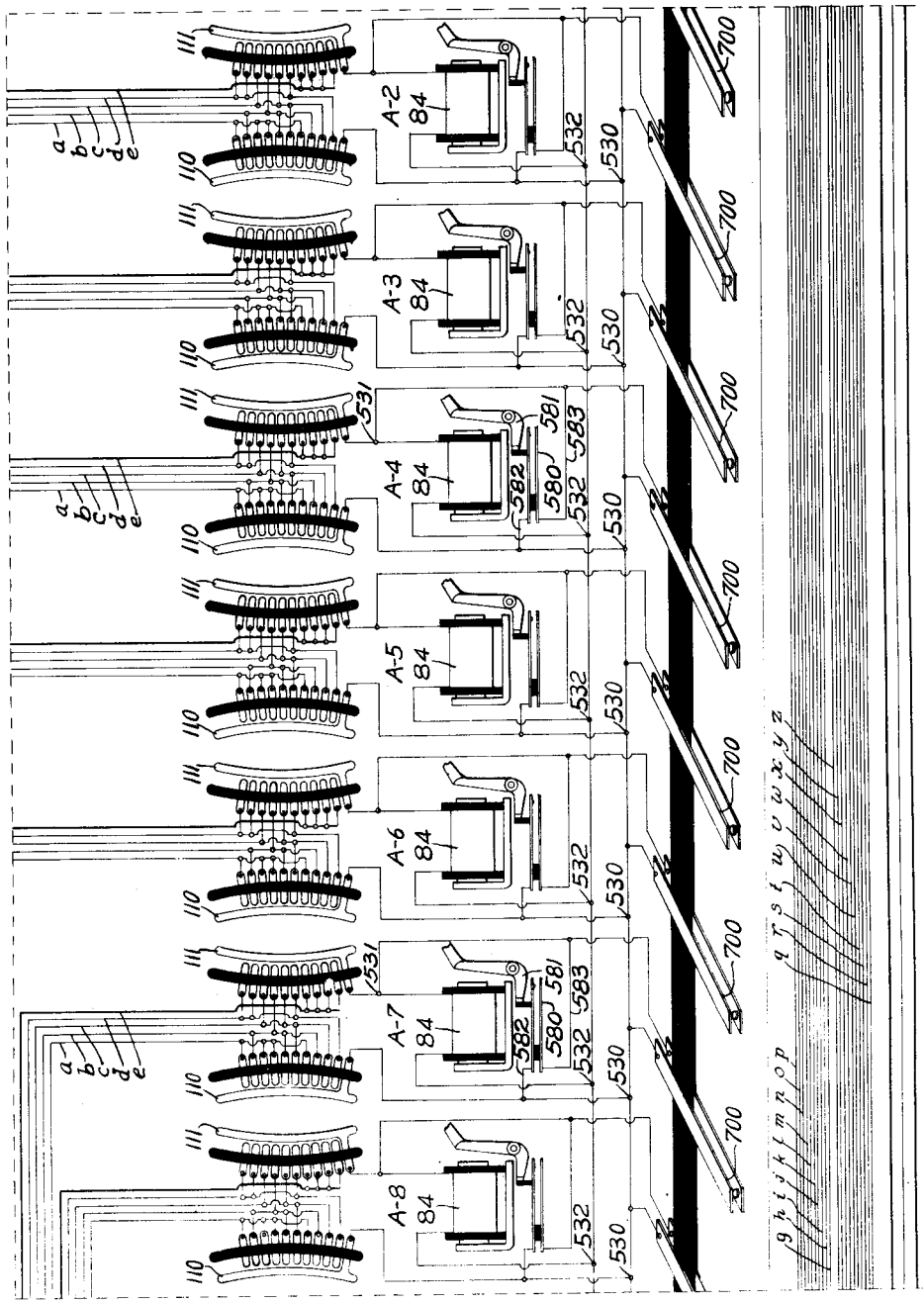
Figure 68I:
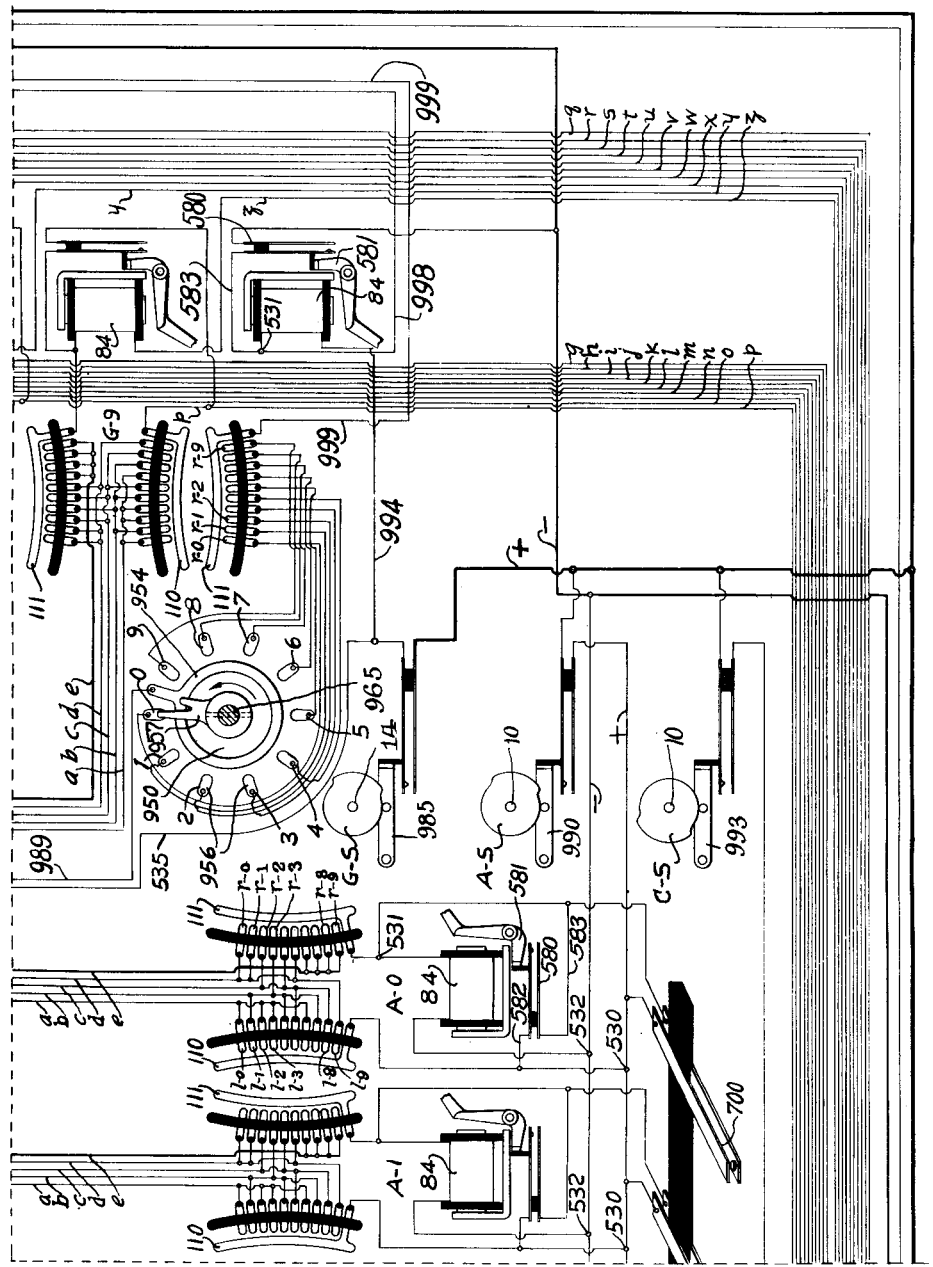

This drum is driven through connections made at the right hand end thereof (as viewed in Fig. 59). A central stud 469, rigidly secured in the head 466 is centered in the driving part or head 470. This consists of a cylindrical sleeve mounted for rotation in the frame of the carriage, carrying two pins 471, which engage with the driving mechanism at all times when the carriage is in place. This head is provided with an opening 472 with which the stud 469 engages. A gear 473 is secured to the driving head 470 by pins 474 or other suitable means. Secured to the gear are two other pins 476, which pass into orifices 477 in the head 466, and serve as a driving connection between the gear and the drum. This drum also is provided with a latch 478, mounted on the frame, and actuated by a spring 479. The latch engages the teeth of the gear 473 (Fig. 61) and holds the drum in position when the carriage is removed, in the same manner that the guide drum 425 is held. This latch also is provided with an extension which engages a stud 480 (Fig. 51) in the frame of the machine, so that when the carriage is inserted the latch is disengaged from the gear by coming into contact with the stud.

Meshing with the gear 473 is another gear 481 mounted on a stud. Connected to move with the gear 481 is another gear 482, which, in turn, meshes with a gear 483. Connected to the gear 483, and adapted to move therewith, is another gear 484, which meshes with a gear 485, on the sleeve 458 which yieldingly engages the flange 446 of the mandrel 424. By this train of gearing, yielding driving motion is communicated to the head of the mandrel 424, so that the same may be driven to wind the record strip thereon as it passes through the machine. The frictioned connections between the sleeve 458 and the flange 446 permits a variable rotation of the mandrel, so that the same will satisfactorily wind the paper whatever the size of the roll on the mandrel.

Power is communicated to the mechanism from the main shaft 10 by means of a train of gears. Mounted upon the end frame 6 of the machine is a stud upon which is loosely fixed a Geneva stop wheel 486, (Fig. 53) having a center 487, and a series of equally spaced holes 488 in the face thereof. As the carriage with its record is forced into the machine the center 487 enters the recess 472 (Fig. 59), and the pins 471 enter the holes 488. This centers the driving drum and also positively engages the same with the Geneva wheel. At the same time the end of the shaft hereinafter to be described and designated by the character 521 (Fig. 53) enters the recess 441 (Figs. 57 and 58) and helps to position the carriage. The wheel 486 is actuated by a Geneva lock and pin 489, so that the wheel 486 is moved one step for each rotation of the lock and pin. The driving means is in turn fastened to a gear 490, which, in turn, meshes with and is driven by another gear 491, loosely mounted on shaft 492. This in turn meshes with a gear 493 mounted rigidly upon the main driving shaft 10. It is necessary that this driving mechanism operate during all phases of operation of the machine; for whether the machine be analyzing a previously prepared record, or is being cleared and therefore preparing a record of its own data, record material, in the one case already perforated, in the other to be perforated, must be fed through the machine.

When the carriage is in position, and the machine is in operation, the paper will be fed a definite distance, the distance necessary to represent one transaction, for each cycle of the machine. The movement will be step by step so as to present just so much of the record as represents one transaction for each operation of the analyzer. The gearing is so proportioned that the Geneva stop wheel, which drives the feed drum, is given a definite and positive motion once for each cycle, the motion being just that required to move so much of the strip as represents one transaction.

*Analyzer.*—The means for analyzing the data upon the records will now be described. As before stated, the machine is designed to audit data from two types of records; the detail record which comes from the cash register or other perforating machine, and which is illustrated in Fig. 1; and a summary record or a grand summary record (Figs. 2 and 2a), produced by the machine itself during total taking operations. These records differ in some respects, and the analyzer must be constructed to care for both.

Figure 52:
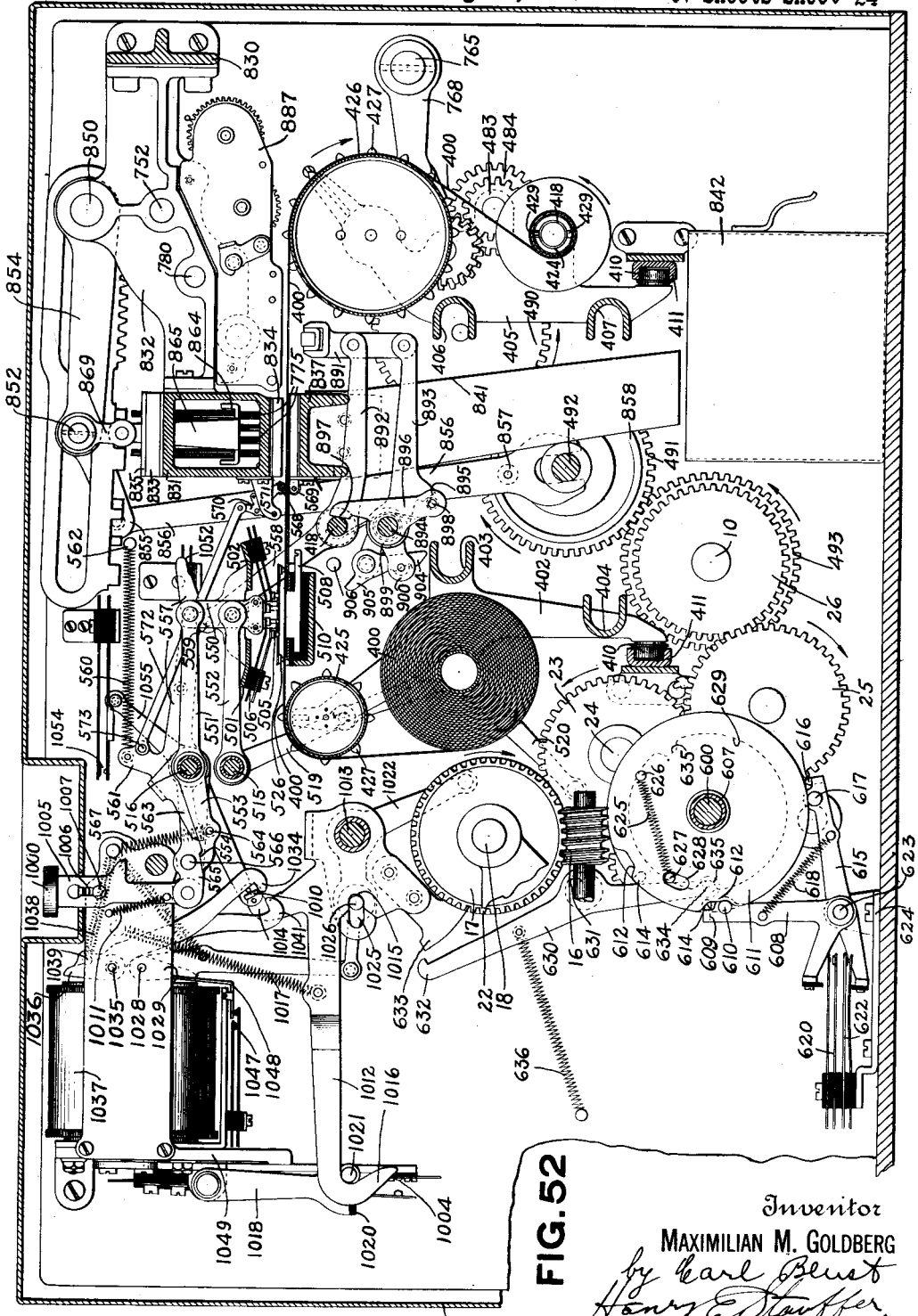
Fig. 52 is a section through the analyzing and record producing part of the machine, taken on the line 52—52 of Fig. 6, and looking in the direction of the arrow.
Figure 53:
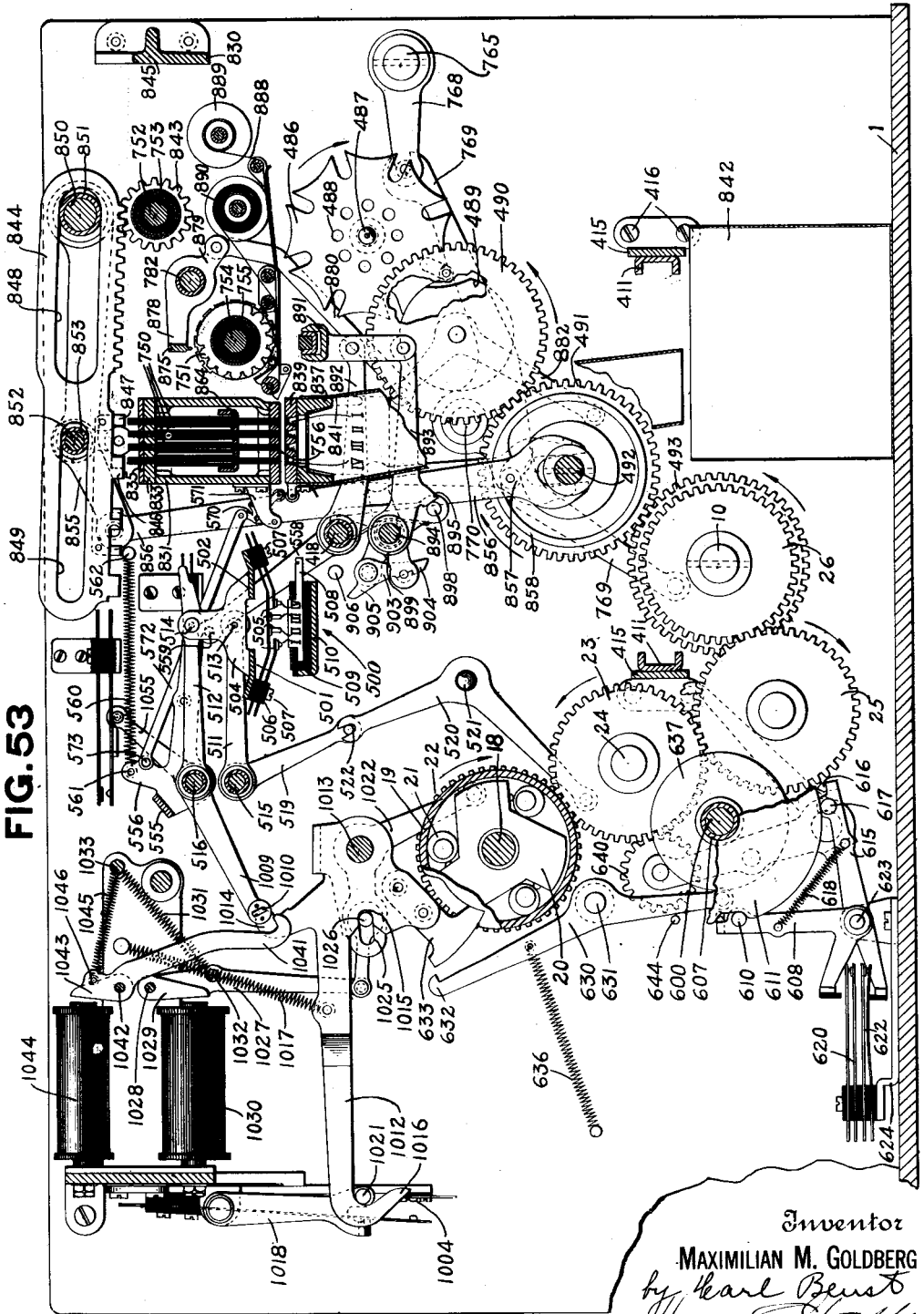
Fig. 53 is a section through the analyzing and record producing part of the machine, taken on the line 53—53 of Fig. 6, and looking in the direction of the arrow.

The analyzer proper is designated generally by the character 500 (Figs. 52, 53, and others). It consists of two horizontally arranged plates 501 and 502 of a sufficient length to extend across the widest record that the machine is intended to use. These plates are connected at their ends by angular extensions 503 and 504, to which the actuating parts are secured. The contacts 505 are carried directly by the plates 501 and 502. In order that they may be properly insulated, bars 506 of insulating material are interposed between the plates and the contacts, and also between the upper and lower groups of contacts. The insulating strips bearing the contacts are fastened in place by screws 507. These contacts are arranged in groups of four running lengthwise of the record, and there are twenty-one of these groups mounted upon the analyzer frame. There are therefore altogether 84 of these contacts.

Each group of four contacts is arranged to make electrical connection with stationary contacts 508, arranged in the path of movement of the movable contacts and immediately below the record to be analyzed. These contacts are in the form of elongated plates of a length sufficient to cover the space occupied by each group of four movable contacts. They are rigidly secured in insulating material 509, supported by a frame 510, and each contact has a lateral extension by means of which electrical connections with other parts of the machine are secured.

The movable analyzer is raised and lowered once for each cycle of the machine. It is mounted upon four parallel arms. Two of these 511 and 512 are shown in Fig. 53; the former is pivoted to the analyzer frame at 513, and the latter at 514. The arm 511 is rigidly secured to shaft 515, while 512 is loosely mounted upon shaft 516. Similar parallel arms are secured to the analyzer frame at the other end, but only one of these arms 517 (Fig. 6) is shown; the other being immediately beneath this one. Arm 517 is loosely mounted upon the shaft 516, and at its other end bears a pin 518, which engages with the end of the analyzer frame. The fourth arm is mounted on shaft 515 and may be suitably fastened thereto. By means of these parallel arms, the analyzer is forced to maintain a horizontal position, and the movable contacts will all coact with the stationary contacts immediately below them. The analyzer is operated by a lever 519, also rigidly secured to the shaft 515; this is actuated by another lever 520, having a pin and slot connection 522 therewith; and this last mentioned lever is pivoted at 521 and carries at its lower end a cam roll 523 (Fig. 63) engaging a slot in one face of the gear cam 524, mounted for free rotation upon the stud 24.

The gear 524 is driven indirectly from the main shaft 10. Since the analyzer does not function when the machine is being cleared— producing a record of its own data—means must be provided for throwing this driving mechanism out of action during clearing operations. This mechanism is shown in Fig. 67, and will be described when the other parts of the changing mechanism are described.

One group of contacts 525 (Fig. 48) does not come into play when a detail strip is being analyzed, but does function when a summary strip is being analyzed. In a certain sense, therefore, this group of contacts is to be regarded as a special group. The function and operation of these contacts will be described when the machine is considered from the aspect of summary record analyzing machine.

Another set of special contacts 526 (Figs. 48 and 52) is shown in the machine near the middle of the analyzer frame. There are two only of these contacts. These are control contacts and are not attached to the analyzer frame, but are specially supported and connected and have independent operating mechanism. They will be described in detail when the various controls are considered.

*Electrical features.*—The principal parts of the mechanism which function during auditing operations have now been described. It remains to consider the electrical elements and features by means of which the various parts are controlled. These are best shown in Figs. 68a–i, where the circuits and other electrical elements for the machine as a whole are all delineated.

The parts with which we are now particularly concerned are the contact banks and control magnets for the totalizer group differentials; the contact banks and control magnets of the rack actuator differentials; and the analyzing contacts and circuits by which the selection of the totalizers is effected, and the movement of the actuator racks is governed. The parts here shown (Figs. 68a–i) which have already been described, bear the same reference characters as in the other drawings, but it will be convenient to refer to groups of devices in a manner not before necessary, and certain special characters have therefore been added. Thus the totalizer group contact banks and control magnets, with their connections, considered as a whole, have been designated by the characters G—0 to G—9, inclusive; and the rack actuator contact banks and control magnets, with their connections, considered as a whole, have been designated by the characters A—0 to A—9, inclusive. And in order to distinguish the analyzer contacts 505 from each other they have been designated individually by the Roman characters I, II, III, IV.

Particular attention is also directed to three switches; one, M—S (Figs. 5b, 16, and 68e), which is a master switch for the totalizer selecting circuits; another, G—S (Figs. 19, 21 and 68i), which is a master switch for the totalizer group magnets; and a third, A—S (Figs. 30, 40, and 68i), which is a master switch for the rack actuator magnets. Each of these switches is closed for a certain period during each cycle of operation, and all of them are operated in timed relation to the other parts of the machine.

*Selecting circuits.*—As before stated, and as shown in Fig. 3, it is possible to select any of the ten digits by the use of only four perforations. The manner in which the contacts and circuits are combined to make this selection is shown in Figs. 4 and 68a–i. The system requires a group of five conductors for each set of contacts, one for each of the four movable contacts, and one for the stationary contact. These have been designated by the characters $a, b, c, d, e$.

Fig. 4 is a diagrammatic view of the circuits, the control contacts, and the bank contacts; and shows how the record controls the selection of the circuits. The contact I of any selected group of four contacts is connected to four contacts of its co-operating bank; namely, to $l$—0, $l$—2, $l$—3, and $l$—6; the contact II is connected to bank contacts $l$—1, $r$—3, $l$—4, $l$—7; contact III is connected to $r$—2, $r$—4, $l$—5, $l$—8; contact IV is connected to $r$—0, $r$—1, $r$—5, $l$—9; and the contact plate 508 is connected to $r$—6, $r$—7, $r$—8, $r$—9. These parts, in the relations they bear to other parts of the machine, are more fully illustrated in Figs. 68a–i.

*Totalizer group circuits.*—In order to explain the electrical features of the invention, the transaction at the top of the detail record will be again referred to. As before explained, the interpretation is that eight articles were sold for $0.25; that the sale was made by clerk A—1 (81); that the transaction was for cash; that it was made under the supervision of cashier C—4 (64); and that the goods belonged to class No. 1.

It will be assumed that the analyzer has been depressed; that the movable contacts 505 (Figs. 52 and 53) have passed through the perforations and are resting on contacts 508; and that the movable contacts 101 and 102 are starting over the contact banks of both the totalizer group contact banks (Figs. 17 and 18) and the rack contact banks (Figs. 11, 12 and 13).

The circuits controlled by the classification perforations will be first considered, for the totalizers upon which the entry is to be made must be selected before the data can be entered. As before stated, the totalizer shafts are to be regarded as being numbered from 0 to 9, and the totalizers on the respective shafts also as though numbered from 0 to 9; so that totalizers from 0 to 9 would be found upon shaft 0; totalizers 10 to 19 on shaft 1; totalizers 20 to 29 on shaft 2, etc., and totalizers 90 to 99 on shaft 9.

The control columns have been marked with characters G—0 to G—9 (Fig. 1), identical with the characters used on the totalizer group control sets with which they coact. Each group of totalizers is therefore controlled by the column which bears the reference character corresponding to that of the group; and the perforations in any given transaction determine the totalizers of the groups which are to be selected.

Considering now the transaction at the top of Fig. 1, the circuits occurring during the analysis of this transaction will be traced. Beginning at the right-hand side of the sheet, and considering the column marked G—0, it will be noticed that perforations appear in the second and fourth spaces. Perforations thus placed mean 1. Since this column controls the magnet 84 of the totalizer selecting group G—0, a circuit will be completed through the magnet of that group when the movable contacts reach the position controlled by the perforations, and the totalizer selected will be that known as 1 in the group 0. The circuit will be from the positive side of the line, through the master switch G—S, (Fig. 68i) through conductor 535, (Fig. 68f) to switch 536, (Fig. 68c) which is closed during this operation, through conductor 537 to point 538, (Fig. 68b) to contact 539, which at this time engages the contact plate 540 on the drum of the master switch M—S, (Figs. 32 and 68e) to the contact 541 for the line g, Fig. 68b) through the line g (Figs. 68a, 68d, 68g, 68h, 68i, 68f, 68c) to the point 530 for group G—0, to stationary contact 110, for this group, through movable contact 101 (Fig. 4) to fixed contact l—1 (Fig. 68c) of this bank, through conductor b (Figs. 68f, 68e, 68d) for this group, to analyzing contact II, to contact plate 508, to contact IV, through conductor d (Figs. 68e, 68f, 68c) of this group, to fixed contact r—1 of this bank, to movable contact 102, (Fig. 4) to fixed contact 111, (Fig. 68c) through magnet 84 for this group, through conductor q, (Figs. 68c, 68f, 68i, 68h, 68g, 68d, 68a, 68b, 68e) to contact 542 for this conductor, to fixed contact 543 on the drum of the master switch M—S, to contact 544, through conductor 545, (Figs. 68e, 68b, 68c) to switch 546, to the negative side of the line.

Columns G—1, G—2, G—3, G—4 and G—5 are without perforations; accordingly, no circuits will be completed for the control magnets of these groups, and these differentials will go to their extreme positions, and the totalizers on all of these groups will move to their several blank positions.

Column G—6 shows perforations in the second and third spaces. Two perforations thus placed indicate 4. This means that totalizer 4 in group 6 (totalizer 64) will be selected. The circuit will be as follows: from the positive side of the line, through the switch G—S, (Fig. 68i) conductor 535, (Fig. 68f) switch 536, (Fig. 68c) through conductor 537 to point 538, (Fig. 68b) to switch contact 539, to the contact plate 540 on the drum of the master switch M—S, (Figs. 32 and 68e) to the contact 541, for conductor m, (Fig. 68b) through line m, (Figs. 68a, 68d, 68g, 68h, 68i, 68f) to the point 530 for the group G—6, through stationary contact 111, movable contact 101, (Fig. 4) fixed contact l—4, (Fig. 68f) through conductor b (Figs. 68f, 68e, 68d) for this set, to analyzer contact II, to contact plate 508, to analyzing contact 110, through conductor c (Figs. 68e, 68f) to fixed contact r—4 of the bank, to movable contact 102 (Fig. 4) to fixed contact, 111, through magnet 84 for this group, through conductor w, (Figs. 68f, 68i, 68h, 68g, 68d, 68a, 68b, 68e) to contact 542 for this line, to contact plate 543 on the drum of the master switch M—S, to contact 544, through conductor 545, (Figs. 68e, 68d, 68c) to switch 546, to the negative side of the line.

The next column, G—7, contains perforations in the first and fourth positions. Two perforations thus placed indicate 0. This means that totalizer 0 in group 7 (totalizer 70) is to be selected. The circuit controlled by these perforations is as follows: From the positive side of the line, through the master switch G—S, (Fig. 68i) through conductor 535, (Fig. 68f) to switch 536, (Fig. 68c) through conductor 537 to the point 538, (Fig. 68b) to contact 539, to contact plate 540 on the drum of the master switch M—S, (Fig. 68e) to contact 541 for conductor n, (Fig. 68b) through conductor n, (Figs. 68a, 68d, 68g, 68h, 68i, 68f) to the point 530 for the group set G—7, through the stationary contact 110, movable contact 101, (Fig. 4) fixed bank contact l—0, through conductor a (Figs. 68e, 68d) for this group, to contact I, to contact plate 508, to analyzer contact IV, through conductor d, (Figs. 68e, 68f) for this set, to fixed contact r—0, movable contact 102, (Fig. 4) fixed contact 111, through magnet 84 for this group to conductor x, (Figs. 68f, 68i, 68h, 68g, 68d, 68a, 68b, 68e) to contact 542 for this line, to contact plate 543 on the drum of the master switch M—S, to contact 544, through conductor 545, (Figs. 68e, 68b, 68c) to switch 546, to the negative side of the line.

The next column G—8, contains perforations in the second and fourth spaces. Two perforations thus placed mean 1. That is, the totalizer 1 in the eight group (totalizer 81) is to be selected. The circuit will be as follows: From the positive side of the line, through master switch G—S, (Fig. 68i) conductor 535, (Fig. 68i) switch 536, (Fig. 68c) conductor 537 to the point 538, (Fig. 68b) to contact 539, contact plate 540 (Fig. 68c) on the drum of the master switch M—S, to contact 541, for conductor o, (Fig. 68b) through conductor o, (Figs. 68a, 68d, 68g, 68h, 68i) to the point 530 of this group, to the fixed contact 110, (Fig. 68f) movable contact 101, (Fig. 4) fixed contact l—1, conductor b (Figs. 68e, 68d) for this group, analyzing contact II, fixed contact plate 508, to analyzing contact IV, through conductor d (Figs. 68e, 68f) for this group, to stationary bank contact r—1, movable contact 102, (Fig. 4) fixed contact 111, through magnet 84 for this group, through conductor y, (Figs. 68i, 68h, 68g, 68d, 68a, 68b, 68e) to contact 542 connected to this line, to plate contact 543 on the drum of the master switch M—S, to contact 544, through conductor 545, (Figs. 68e, 68b, 68c) through switch 546, to the negative side of the line.

No perforations appear in column G—9, no totalizer in the group 90 to 99 is therefore to be selected. The differential of the group controlled by this column will therefore go to its blank position, and all of the totalizers upon this shaft will be in their inactive positions.

This means that four totalizers; namely, No. 1 of group 0, No. 4 of group 6, No. 0 of group 7, and No. 1 of group 8, will all be selected to have entered thereon the data represented by the amount perforations on the amount side of the control sheet, this data will be entered upon all four of these totalizers.

The master-switch M—S, so far as the circuits thus far considered are concerned, serves to connect the group sets G—0 to G—9, inclusive, with the positive and negative sides of the line, respectively. The switch M—S is oscillated by mechanism to be described to connect and disconnect the contacts 541 with contact 539 by means of the plate 540, and to connect and disconnect the contacts 542 and 544 by means of the plate 543. By this means current passes from the positive side through switch G—S, conductor 535, switch 536, and conductor 537 to contact 539, and thence to the conductors $g$, $h$, $i$, $j$, $k$, $l$, $m$, $n$, $o$, and $p$ as the group sets with which these are respectively connected are selected. Likewise current passes from magnets 84 of such group sets as have been selected through conductors $q$, $r$, $s$, $t$, $u$, $v$, $w$, $x$, $y$, and $z$, to contacts 542, plate 543, and contact 544, through conductor 545, and switch 546, to the negative side of the line.

*Amount circuits.*—The perforations in the ten columns on the left-hand side of the sheet (the amount perforations) will now be considered. These columns have been provided with reference characters A—0 to A—9, inclusive, identical with the rack actuator control sets with which they coact.

In the first column beginning at the right A—0, perforations appear in the third and fourth spaces. According to the diagram (Fig. 3) two perforations thus placed mean 5. The circuit will be from the positive side of the line through master switch A—S, (Fig. 68$i$) to the point 530 of the differential set A—0, to fixed contact 110, movable contact 101, (Fig. 4) bank contact $l$—5, conductor $c$ (Figs. 68$f$, 68$e$, 68$d$) for this set, analyzer contact III, contact plate 508, analyzer contact IV, conductor $d$ (Figs. 68$d$, 68$e$, 68$f$, 68$i$) for this set, bank contact $r$—5, movable contact 102, (Fig. 4) fixed contact 111, Fig. 68$i$) magnet 84 for this differential set, back to the point 532 on the negative line. As the movable contacts 101, 102 move over their respective banks and come into contact with the fixed contacts $l$—5, $r$—5, the circuit will be closed, the magnet 84 energized, and the differential carrying the contacts stopped.

In column A—1, perforation appears in the first and third positions. Two perforations thus placed mean 2 (Fig. 3). The circuit is from the positive side of the line, through master switch A—S, (Fig. 68$i$) to the point 530 of the differential set A—1, to fixed contact 110, movable contact 101, (Fig. 4) fixed bank contact $l$—2, conductor $a$ (Figs. 68$i$, 68$f$, 68$e$, 68$d$) for this set, analyzer contact I, contact plate 508, analyzer contact 111 conductor $c$ (Figs. 68$d$, 68$e$, 68$f$, 68$i$) for this set, fixed contact $r$—2 of the contact bank, movable contact 102, (Fig. 4) fixed contact 111, magnet 84 (Fig. 68$i$) for this differential set, to the negative side of the line at the point 532.

In column A—2, perforations appear in the first and fourth positions. Two perforations thus placed stand for 0. The circuit will be from the positive side of the line, through the master switch A—S, (Fig. 68$i$) to the point 530 (Fig. 68$h$) of the differential set A—2, to stationary contact 110, movable contact 101, (Fig. 4) bank contact $l$—0, conductor $a$ (Figs. 68$h$, 68$e$, 68$d$) for this set, analyzer contact I, contact plate 508, analyzer contact IV, conductor $d$ (Figs. 68$d$, 68$e$, 68$h$) for this set, fixed bank contact $r$—0, movable contact 102, (Fig. 4) fixed bank contact 111, (Fig. 68$h$) magnet 84 for this differential set, to the negative line at the point 532.

The perforations appearing in columns A—3 and A—4 are also in the first and fourth positions, and therefore likewise stand for 0. The circuits are the same as those for set A—2, except that the circuits for column A—3 run through the differential set A—3; and those for column A—4 run through the differential set A—4. The perforations appearing in columns A—5 and A—6 are also found in the first and fourth positions. These therefore also mean 0. The circuits are the same as for the other 0 columns, except that the current flows through the analyzer contacts and control magnets for these columns. In the illustration of the detail record as it comes from the perforating machine no data is printed in these columns which simply means that these columns are not being used in that machine. The amount or the actuator racks will simply move to their 0 positions, and will therefore have no effect on the denominational elements of the totalizers selected.

In column A—7, a single perforation appears in the third position. One perforation thus placed stands for 8. The circuit will be from the positive side of the line, through master switch A—S, (Fig. 68$i$) to the point 530 (Fig. 68$h$) of the differential set A—7, to the stationary contact 110, to movable contact 101, (Fig. 4) bank contact $l$—8, (Fig. 68$h$) conductor $c$ (Figs. 68$h$, 68$g$, 68$d$) for this set, analyzer contact III, contact plate 508, conductor $e$ (Figs. 68$d$, 68$g$, 68$h$) for this set, stationary bank contact $r$—8, movable contact 102, (Fig. 4) stationary contact 111, through magnet 84 (Fig. 68$h$) for this differential set, to the point 532 on the negative side of the line.

Perforations in the column A—8 and A—9 are in both instances in the first and fourth positions; they therefore stand for 0. The circuit will therefore be the same as that traced for column A—2, A—3, A—4, A—5, and A—6 except that they will be completed through the contact banks and magnets 84 for the differential sets A—8 (Fig. 68h) and A—9, (Fig. 68g) respectively. Here again as in columns A—5, A—6, the 0 has not been printed, meaning that in the perforating machine these columns in this instance have not been perforated.

*Special record controls.*—As heretofore stated, a space equal to the width of two columns of perforations lies between the ten classification or totalizer control columns, and the ten amount or actuator control columns of the detail record. In one of these a special column of perforations C is placed; while the other space D is left blank.

The special contacts 526, heretofore referred to, cooperate with the perforations in the column C. These contacts are electrically connected together and cooperate with a fixed contact 548 (Figs. 51 and 68d).

The contacts 526 are supported by a post 550 (Fig. 52), arranged in the central part of the analyzer, and mounted to be moved independently of the analyzer and in a substantially vertical path by means of parallel arms 551 and 552. Of these the former is mounted for rotation upon the shaft 516, and the latter is mounted to rotate on the shaft 515. Integral with the arm 551 is an extension 553, arranged to extend on the other side of the supporting shaft, and having a ledge or face 554 to be engaged by a pin under control of the starting key, yet to be described. The contacts are raised by means of a yoke 555 (Fig. 6) pivoted upon the shaft 516 and having extending therefrom an arm 557. Coacting with the last mentioned arm is another arm 558, (Fig. 53) secured to the shaft 418, which is actuated by the manual latch 417 which holds the carriage in position. The arm 558 has a pin 559, which engages the under face of the arm 557. A spring 560 is fastened at one end to a projection 561, integral with the arm 557, and at the other end to a pin 562, secured to the frame of the machine. The yoke 555 has at its other end an integral arm 563, which engages a pin 564 on the arm 553. Another lever 565, adapted to be actuated by the starting key 1000 (hereafter described) is fastened upon the shaft 516 and carries a pin 566, which engages with the face 554 of the arm 553. A spring 567, fixed at one end to a stationary point of the machine and at the other end to the arm 553, keeps the contacts 526 in contact with the record.

The contacts 526 are therefore under the control of two devices; the latch, which secures the carriage in position, and the starting key 1000 of the machine. The purpose of the latch control is to prevent the starting of the machine, unless the carriage with the proper record is in place; and the object of the key control is to raise the contacts and keep them permanently out of operative relation, so long as the control key is in its lower or running position. Manipulation of the latch 417 from the position shown in Fig. 47 to unlock the carriage, oscillates the lever 558, this lever being secured to the shaft operated by the latch. This will raise the lever 557, oscillate the yoke 555, and depress the extension 563, which engages the pin 564, thereby depressing the lever 553, and raising the contacts 526.

This contact arrangement normally controls the circuit through a magnet which prevents the depression of the starting key until after the magnet has been energized. As soon as the carriage with a properly perforated sheet is placed in the machine, a lowering of the latch to position the carriage, also lowers the arm 558, which permits the spring 560 to oscillate the yoke, thus permitting the lever 553 and its pin 564 to rise under the action of the spring 567, thereby lowering the contacts into their working positions. If a properly perforated strip is in place, the magnet circuit, to be hereinafter described, will be then completed, and it will be possible to depress the starting key. However, should an improper sheet be placed in the machine, such as a strip of blank paper; or should the detail sheet not be in proper position, no circuit would be made when the contacts are lowered, the control magnet would not be energized and the machine can not be started. These contacts therefore prevent operation of the machine unless the carriage is supplied with a properly perforated record which is properly positioned.

It will be noticed that these contacts 526 are more widely separated than are the analyzing contacts. In fact, they are sufficiently far apart to engage a perforation on either side of the perforations which constitute any given transaction. When a strip to be analyzed is placed in the machine it must be so adjusted that the left hand contact (as viewed in Fig. 52) comes into register with the first control perforation. Until this position is acquired no circuit can be completed through these contacts, and the machine cannot be started. As soon, however, as such a hole does come into register with a contact, a circuit will be completed; the control magnet will be energized, and it becomes possible to depress the starting key. A depression of the starting key raises the contacts 526, and closes the circuits of the motors. The paper feeding mechanism starts and makes one movement. This brings the first transaction into position under the analyzer.

The contacts 526 therefore function at this time only as a means for exactly locating the perforated record, preparatory to starting the machine, and in this connection only the left-hand contact (as view in Fig. 52) comes into play. Upon pressing the starting key, the frame carrying the contacts is lifted and remains in its elevated position until the record has been completely analyzed. At the end of the operation a control switch (yet to be described) opens the main operating circuits and brings the machine to a stop. When this takes place, the starting key rises automatically, and the frame carrying the contacts 526 will fall. After the last transaction of the record has been analyzed, the feeding mechanism will be given one additional step before the driving mechanism stops. The analyzer then comes down upon the unperforated sheet, but no circuits are closed, and the actuating racks run to their extreme positions and the circuit of the machine is automatically broken. At this time, the last hole in the column of control perforations C will be in such position that when the special contacts 526 fall, due to the lifting of the starting button, the right hand contact (as view in Fig. 52) will register with the last perforation in the control column.

Should the machine now be used to analyze another detail record, the operator would proceed normally just as in the case described; that is, he would insert another record, position it by means of the left hand contact 526 and press the starting button. If however, he should desire to clear the machine and produce a summary record and adjust the machine for this purpose, and inadvertently leave the detail record in position, he would be unable to start the machine because the circuit closed through this contact would prevent the depression of the starting button because of a circuit established through another magnet to be hereafter referred to. In this manner, this element serves to control the machine so as to compel the insertion of the proper record.

The summary record also is provided with a column of control perforations C, identical in location and function with the control perforations in the detail record.

*Rupture controls.*—There is another set of control contacts designed to prevent the starting of the machine without a record, or to effect the stopping of the machine should the record be ruptured. These are shown as insulated roller contacts 568 and 569 (Fig. 52). They are normally separated from each other by the record itself; but should the operator fail to insert a record, or should the record break, the contacts will close a circuit, which will prevent the starting of the machine if the record is not in place, or which will stop the machine in case of rupture of the record. The lower roll 569 is mounted in a bracket on the frame of the machine; the upper roll 568 is mounted in a movable frame 570, pivoted to a fixed support 571. A link 572 connects the roller support 570 with a pin 573 on an arm 561 of arm 557, and is under the control of the tension spring 560, extending between a pin on the arm 561 and another pin 562 on the frame of the machine. As the latch which locks the carriage is raised, thereby raising the arm 557, the link 572 also raises the upper contact 568. As the latch is lowered, the frame 570, and contact 568, are likewise lowered, and are held in contact with the paper by the spring 560. Brushes 573 and 574 (shown only in Fig. 68b) conduct current to the contacts.

Therefore by these connections the contact roll is controlled directly by the carriage latch, being raised when the latch is raised to remove the carriage, and lowered when the latch is lowered to fasten the carriage in place.

*The blank column.*—The blank column D of the detail record has no function except to prevent operation of one set of analyzer contacts. The analyzer, it is to be remembered, will take care of both the detail record and the summary record. While the detail record has ten columns of control perforations, and the summary record two such columns, the analyzer itself has only eleven sets of analyzing contacts (on the control side); nevertheless, the eleven sets of contacts are sufficient to take care of both records; for the tenth row of perforations in the detail record (counting from the right) coincides in position with the units column of control perforations of the summary record. The eleventh row of control contacts (counting from the right) thus coincides in position with the blank column D of the detail record, and these contacts therefore play idly upon the sheet when the detail record is being analyzed; but when a summary record is in the machine they coact with the perforations in the tens column. Moreover, when the summary record is in the machine, the first nine rows of analyzer contacts likewise play idly upon the summary sheet, but when a detail record is in the machine they coact with the perforations therein.

*Locking circuit.*—The magnets 84 which are used to stop the differentials, are all here provided with supplemental or locking circuits. Adjacent each magnet is a switch 580 (Figs. 11 to 13, 16 to 18, 68c, 68f, 68g, 68h, 68i) which is normally open, but the contacts of which are adapted to be closed by an arm 581 on the armature when the latter is drawn to the magnet. This circuit is from the point 530 on the positive line for each magnet, through conductor 582 to switch 580, through conductor 583 to the point 531. From here it passes through the magnet on the negative side of the line as for the original circuit. The negative line for the locking circuits of magnets 84 of the actuators of the group switches G—0 to G—9, is reached through the lines *q, r, s, t, u, v, w, x, y, z*, respectively; and for the actuators for the amount differentials A—0 to A—9 inclusive, directly at points 532. As soon as the magnet is energized and the armature is drawn up, this supplemental circuit is closed and current will then pass also through this path. The magnet will therefore be held in position whatever may take place in the circuit which originally energized it.

These holding or locking circuits for the totalizer shaft magnets are controlled by the master switch G—S, and the switches for the actuator magnets are controlled by master switch A—S.

This holding or locking circuit is not essential to the operation of the machine, for the machine may be designed so that the original circuit holds sufficiently long to avoid the necessity of its use.

*Operation.*—In analyzing either a detail or a summary record, the operating parts are presumed to be in the positions shown in the drawings. The operator having locked the carriage, manually adjusts the record so as to bring the first perforation in the control column C in position beneath the left hand contact 526 (Fig. 52). Having made this adjustment, the starting key is depressed, thereby supplying current to the machine. As the machine starts the analyzer will be depressed and contacts made as permitted by the perforations in the record. After the analyzer has reached its low position, the movable contacts 101, 102 begin to shift over the fixed contacts of the several contact banks; the shafts carrying the groups of totalizers and the beam actuators and aligners co-operating therewith begin to move, and the racks which actuate the totalizers begin their adjustment. As soon as the contacts 101, 102 of any of the differentials reach fixed contacts which are in electrical connection with analyzer contacts which have passed through perforations, the magnets 84 of such differentials are immediately energized and the differentials are brought to a stop. This may happen anywhere throughout the whole extent of movement of the differentials; and the positioning of the totalizer shafts, and of the actuating racks, is determined by the extent of the excursion of the differentials which control these elements. The differentials of those totalizer groups which are not stopped by control perforations continue to the end of their possible movements and bring the totalizers of those groups to the blank positions. The amount actuating racks are always stopped by control perforations. If no amounts are to be added, they are stopped by 0 perforations, except at the end of the analysis, when, there being no perforations, the racks run to their extreme positions and break the circuit thus stopping the machine, as will be described later. After the totalizers are selected and the amount racks are positioned, the totalizers and aligners therefor are moved into engagement with the racks, and the aligners are withdrawn. The racks then return, beginning with the units rack, and the others following at short intervals, so as to allow the carrying operations to take place, and the amounts are entered on the totalizers; the aligning devices are again engaged; and the totalizers are withdrawn. During the last stages of entering the amounts of the first transaction, the record has been again fed forward to present the next transaction, and the analyzer has been depressed, the movement of the various parts of the machine thus overlapping to some extent.

TOTALIZING OR SUMMARY RECORD PRODUCING MACHINE.

The machine will now be described as adapted to produce a record which will be a summary of the data which has been accumulated upon the totalizers, and the totalizers will at the same time be returned to zero. When thus operating, certain parts which function during the adding operation must be disconnected, and other parts which function only during the operation now to be described must be connected. Thus, the analyzer, which interprets the record during the adding operation, has no function to perform when the machine is being cleared and a summary record produced; while, on the other hand, the record producing elements; namely, the punching and printing mechanisms, and the mechanism for setting and aligning the printing devices, and the switch controlling mechanism which determines the order in which the totalizers shall be cleared, must be brought into operation at this time. And, further, certain of the other parts of the machine must be changed as to their time of operation. While adding, the totalizers and actuators are moved so that the racks are set differentially before the totalizers are engaged therewith, after which the racks are brought to their home positions; while in totaling it is necessary to adjust and definitely locate the totalizers before the racks begin to make their movements because the extent to which the individual racks are moved is determined by the positions of the several denominational elements of the totalizers with respect to zero.

*Changing mechanism.*—In order to effect all of these changes, the machine is provided with a manually operated shaft, to which the elements necessary to effect the changes are secured, or from which they derive their movement; so that by the manipulation of this shaft alone all of the necessary changes can be made.

This shaft runs through the machine, and is designated by the character 600. It has an operating handle 601 rigidly secured thereto (Figs. 47 and 51). By means of the handle the shaft is shifted through an arc of a fixed number of degrees, so that by merely moving the handle in one direction or the other to the extent required, the machine, is changed from an auditing to a totalizing machine, and vice versa. This lever bears a thumb piece 602, and has cooperating therewith another lever 603 having a thumb piece 604, pivoted to the handle at 605. The other end of this lever is bifurcated and coacts with another lever 606 fast to a sleeve 607 mounted upon the shaft 600. A lever 608, having a lug 609, (Figs. 48 and 52) and a cam roll 610, working in connection with a cam 611, which is fast on the sleeve 607, serves to definitely lock the shaft in one of its two operative positions. When the thumb pieces 602, 604 are grasped and brought together, the lever 603 oscillates and shifts the sleeve 607, which in turn shifts the cam 611; and the camming notches 612 acting upon the pin 610 by a camming action, withdraw the stop lug 609 from the locking disk 613, which is fast to the shaft 600 and lies immediately behind the disk 611. The disk 613 being fast on shaft 600, the latter cannot be moved until the disk 613 is unlocked.

Coacting with the disk 611 is another lever 615, carrying a stop lug 616 and a cam pin 617, identical with the lug 609 and cam pin 610 of lever 608. A spring 618 connects the levers 608 and 615, so as to cause the pins 610 and 617 to always contact with the surface of the cam disk 611. The pins and locking lugs on the levers 608 and 615 are so positioned with respect to each other that the locking lug 609 coacts with one of the notches 614, and the cam pin 610 coacts with one of the camming notches 612, while the lug 616 of the other lever coacts with the locking notch 614 in the locking plate, and the pin 617 coacts with the other notch 612 of the cam plate 611. Thus, in one condition of the machine the locking lug 609 prevents movement, while in the other condition the locking lug 616 becomes effective for this purpose.

Rigidly secured to the lever 608 and forming an integral part thereof is arm carrying a piece of insulating material which coacts with the switches 619 and 620 (Figs. 48, 52, 53 and 68c) to close the same whenever the lever 608 is forced out of its locking position by movement of the cam disk 611. The other locking lever 615 has a somewhat simliar arm which likewise bears a piece of insulation and cooperates with switches 621 and 622 (Figs. 48, 52, 53 and 68c). The levers 608 and 615 are pivoted at 623 and the switches 619, 620, 621 and 622 are supported by the plate 624 fastened to the base of the machine.

The plate 611 has a limited movement with respect to the locking plate 613, and a spring 625 connected to a pin 626 on the plate 611, and to another pin 627 on the plate 613, is used to restore the relations of the parts after the thumb piece 604 has been released. The pin 627 projects through an elongated slot 628 in the plate 611, which limits the extent to which this plate may travel.

The shaft 600 carries another cam plate 629, which operates lever 630. This lever is pivoted at 631, and has a hook 632 at its upper end, which co-operates with the lever 633, which, in turn, controls the motor clutch. The lever at its lower end carries a pin or roll 634, which co-operates with recesses 635 in the face of the cam, whereby the motion of the lever 630 is controlled in such a manner as to lock the clutch against possible release, except when the machine is in either its adding or its totalizing position. A spring 636 stretched between the lever 630 and a pin on the frame keeps the pin or roll 634 in contact with the cam.

The next cam 637 on the shaft 600 is used to throw the analyzer into and out of operation. It is to be remembered that the analyzer is to operate only during the analysis of either the detail or the summary record, and is to remain idle during the clearing or record producing operation. The cam 637 is fast on the shaft 600, and has formed in one of its faces a cam race 638 (Fig. 67), by which a lever 639, having thereon a properly placed cam roll is actuated. The lever carries at one end a coupling gear 640, and is pivoted upon the end of a shaft 641. The other arm 642 of the lever carries an aligning device 643. Adjacent the shaft 600 is the cam faced gear 524 mounted for free rotation on the stud 24 (Fig. 62) adjacent the gear 23 of the main driving train. The gears 23 and 524 are of the same diametral pitch. When the shaft 600 is in the position which it assumes when the machine is adjusted to perform the analyzing operation, the gear 640 is so adjusted as to couple together the gears 23 and 524; whereas, when the machine is adjusted for totalizing or producing a record of its own data, the gear 640 is out of mesh, and the gear 524 is held against rotation by the aligning device 643; so that in the first instance, the analyzer co-operates with the other elements of the machine, while in the latter it is disconnected and does not function. A pin 644 (Fig. 53) in the frame of the machine acts as an aligning device for the gear 640 when the same is out of coupling relation with the gears 23 and 524 (Fig. 62).

The manually adjustable shaft 600 also effects various other changes in the mechanism when shifting from the analyzing to the totaling position and vice versa. Directly within the frame 3 are located devices for driving the selector switches used during totalizing operations; means for controlling the printing and punching mechanism; means for controlling the zero stop devices;

and means for controlling certain of the switches which affect the several circuits.

To this end, means are provided for connecting all of the various devices mentioned so that they may be driven during the totaling operation, and be disconnected during analyzing operations (Figs. 13, 12, 16 and 30). Power is obtained from a gear 645 fast on the main shaft 10. This meshes with a broad-faced gear 646, mounted to be moved into and out of engagement with the gear 645. To effect this movement, the gear 646 is mounted upon, and rigidly secured to, a short shaft 647, mounted in frames 648 and 649, which in turn are pivoted upon a shaft 650 running through the lower part of the machine. Another frame 651 supports the shaft 647 at an intermediate point, and is likewise mounted upon the shaft 650. Fastened to the shaft 647 are two other gears 652 and 653. The shaft 647 and the frames 648, 649 and 651, thus together form a yoke for supporting and shifting the gears 646, 652 and 653. The frames 648 and 649 have lateral extensions 654 and 655, which carry cam rolls to engage races in cams 656 and 657, fast upon the manually adjustable shaft 600. In addition, the frame 648 has at its other end an aligning tooth 658; the frame 649 has an aligning tooth 659; and the frame 651 has a like tooth 660. These aligning devices hold in position gears which are yet to be described.

As the manual shaft 600 is moved from its analyzing to its totalizing position, the cams 656 and 657 are rotated a definite number of degrees. The races in these cams are so cut that when the machine is changed, the gear 646 is brought into mesh with the gear 645 fast upon the main driving shaft; while when moved in the reverse direction the gear 646 is moved out of mesh with the gear 645.

Adjacent the gear 645 and mounted for free rotation is another gear 661 having attached thereto a cam plate. When the gear 646 is in mesh with the gear 645 it also meshes with the gear 661, and therefore serves to couple the gears 645 and 661 together. Power communicated by the gear 645 is thus transmitted to the gear 661. Meshing with the gear 661 is another gear 662 (Fig. 16) having rigidly attached thereto a smaller gear 663, both loosely mounted upon the shaft 650. The small gear 663 meshes with another gear 664 having attached thereto a locking plate 665 and driving pin 666 for locking and driving the Geneva stop wheel 667, which in turn drives the switches which control the selection of the totalizers, to be hereinafter described in detail. The gear 661 with its cam plate is mounted upon one section of a clutch sleeve 668, adapted to rotate upon the main shaft 10. Secured to the other end of the coupling sleeve is a gear 669 provided with a cam 1669, (Fig. 43) by means of which motion is communicated to certain of the record producing elements, as will be described later.

The cam 681, (Fig. 16) which is secured to or forms a part of the gear 661, is used to communicate motion to aligning devices which hold elements to be described later in detail.

To actuate the so-called "zero stop" mechanism, another gear 682 having a cam face 683 (Fig. 39) is loosely mounted upon the main shaft 10, and is adapted to mesh with the gear 652 when the latter is in the totaling position. A cam race 684 communicates motion to a pitman 685, which carries a roll 686 running in the cam race, and is slotted at its lower end to pass over the main shaft 10 so as to be guided thereby. The other end of the pitman is connected to a lever 687 rigidly secured to the shaft 641 running through the main part of the machine, from which the zero-stop mechanism derives motion.

Loosely mounted upon the shaft 10 is another gear 694, meshing with gear 653 when the latter is in totaling position (Fig. 30). This carries a cam 695, by which motion is communicated to the shaft 696 (Figs. 13 and 17). This shaft is mounted to oscillate in suitable bearings in the end frames of the machine. Secured thereto at either end is an arm 697 (Figs. 12 and 17). Carried by these arms is a bail 698, having thereon sheets of suitable insulation 699, to which certain electrical contacts 700 are secured. There is one pair of these contacts for each zero-stop mechanism, the functions of which will be hereinafter described. When the machine is operated as an adding machine, these contacts do not function, and it is therefore necessary to displace the entire set. To this end, means is provided for oscillating the shaft 696, and bail 698, which carries the contacts 700. In order that the contacts may be maintained in proper alignment, the arms 697 carry at their outer ends a bar 701, which bears upon insulation 702 at the end of each of the lower contacts.

As motion is communicated to the gear 694 by means of the gear 653, the pitman 706 is caused to advance and recede, and by means of the arm 703 and lever 704, loose on shaft 641, oscillates the shaft 696 so as to shift the entire group of contacts once for each cycle of the machine. Loosely mounted on the shaft 696 is a series of arms 707, each provided with an insulated head 708, by means of which the electrical circuits are completed at a certain stage in the cycle of operation.

An aligning pin 709, set in the frame of the machine, holds the gears 646, 652 and 653 in proper positions when out of engagement with their coacting gears. At the same time the aligning teeth 658, 659 and 660 engage and hold the gears 661, 682 and 694 against displacement.

The means for varying the timing relation between the totalizers and the actuating racks is placed at the other end of the machine. These changes also are effected by a partial rotation of the shaft 600. The change in the mechanism for raising and lowering the totalizers and their aligning devices is brought about by changing the position of the cams which actuate these devices. The lever 160 which indirectly effects the engagement of the totalizers with their racks, and the engagement and disengagement of the aligners with respect to the totalizers, is actuated by two cams 710 and 711, (Figs. 14, 15, and 30) one of which operates upon one arm to move the lever in one direction, and the other of which operates on the other arm to move the lever in the opposite direction. When the machine is changed from an adding to a totalizing machine or vice versa, the change in time of operation of this lever 160, and the elements cooperating therewith, is effected by changing the time of operation of the cams 710 and 711. These are loosely mounted upon the main shaft 10, and are rotated through a definite number of degrees, so as to bring the cams in such position as to cause the totalizers and their aligners to be operated at the proper time.

Fast to the shaft 600 is a cam 712. The cam 710 has rigidly attached thereto a gear 713, and the cam 711 has rigidly attached thereto a similar gear 714. When it becomes necessary to change the positions of these cams, motion is communicated thereto from the manual shaft 600. While the cam 710 and its coacting gear 713, and the cam 711 and its coacting gear 714, are loosely mounted upon the main driving shaft, power is communicated thereto from the gear 715 fast on the shaft 10. Rigidly mounted upon a short shaft 716 is another gear 717 which coacts with the gear 715. The shaft 716 also carries two other gears 718 and 719, which are normally in mesh with the gears 713 and 714, respectively. As the shaft 10 rotates, the gear 715 transmits motion to the gear 717, and this, in turn, by means of the shaft 716, communicates motion to the gears 718 and 719. These again drive the gears 713 and 714 respectively, and the cams 710 and 711 connected thereto. This constitutes the normal driving mechanism for transmitting motion to the cams 710 and 711, but in order that they may function in proper time when the machine is being cleared or used to produce a record, it is necessary to change the positions of both of these cams. This is accomplished by the means shown in Figs. 14, 15 and 30. The shaft 716 is rotatably mounted in two levers 720 and 721 (Figs. 14, 15, 19 and 30) rigidly secured to the shaft 650. One of these levers carries a cam roll 722 (Fig. 30) which engages a cam race 723 (Fig. 14) in one face of the cam 712 (Fig. 30). Mounted upon a short shaft connecting the lower ends of the plates 720 and 721 are two other gears 724 and 725, both of which have faces (Fig. 17) somewhat broader than the gears 713 and 714. As the shaft 600 is rotated, the cam 712 shifts levers 720 and 721 so as to first disengage, then hold disengaged for a period and then to again engage the gears 717, 718 and 719 and the gears 715, 713 and 714.

Loosely mounted upon the hub of the gear 713 is another gear 726, and loosely mounted on the hub of the gear 714 is still another gear 727. Rigidly mounted upon the shaft 600 are two mutilated gears 728 and 734. The former has teeth 729 and a locking face 730 (Fig. 15), while the latter has teeth 736 and a locking face 737. Coacting with the mutilated gear 728 is another mutilated gear 731 loosely mounted upon the shaft 650. This has teeth 732, and two locking faces 733. Coacting with the mutilated gear 734 is another mutilated gear 738 loosely mounted upon shaft 650. This has teeth 739 and two locking faces 740. Rigidly secured to the mutilated gear 731 is a gear 735, which at all times meshes with the gear 726. And rigidly secured to the mutilated gear 738 is a gear 741, which at all times meshes with the gear 727.

As the machine is changed from an adding to a totalizing machine, the shaft 600 is oscillated to move cam 712 and the mutilated gears 728 and 734 in a given direction—to the right, as shown in Fig. 15. The cam race 723 of the cam 712 (Fig. 14) is so designed that immediately the shaft 600 begins to turn, it moves the shaft 716, and thereby causes the gears 717, 718 and 719 to disengage from their coacting gears 715, 713 and 714, and at the same time brings the gear 724 into mesh with the gears 713 and 726, and the gears 725 into mesh with gears 714, 727. During this part of the movement of the cam 712, the locking face 730 of mutilated gear 728 engages locking face 733 of the mutilated gear 731; and the locking face 737 of the mutilated gear 734 engages one of the locking faces 740 of the mutilated gear 738. As soon as the gears 717, 718 and 719 have been disengaged from their coacting gears, and the locking gears 724, 725 have been engaged with the gears which they lock and drive, the teeth of the mutilated gears 728 and 734 come into mesh with the teeth of the mutilated gears 731 and 738, respectively, thereby rotating these gears. The motion of the mutilated gears 731 and 738 is communicated to the gears 735, 741, and since these last-mentioned gears are always in mesh with the gears 726 and 727, respectively these last-mentioned gears are also caused to rotate. The movement of the gear 726 is transmitted to the gear 713 by means of the broad faced gear 724; and the motion of the gear 727 is communicated to the gear 714 by means of the broad-toothed gear 725. By this means motion is communicated to the two cams 710 and 711 independently of each other, and both are shifted around the main driving shaft an amount determined by the cam 712 and the extent of the teeth of the mutilated gears 728, 734. As soon as the teeth of the mutilated gears 728 and 734 have passed, the locking faces 730 and 737 become effective and the mutilated gears 731 and 738 are again locked against further movement. Immediately thereafter the cam race 723 of the cam 712 engages the cam roll 722 and shifts the shaft 716 back to the position it occupied before the shaft 600 began its movement; that is, it throws the gears 717, 718 and 719 into mesh with their coacting gears 715, 713, and 714, and throws the broad-faced transmitting or locking gears 724, 725 out of mesh with the gears which they lock and drive. The cams 710 and 711 now stand in their new positions with the driving gears coupled up to again communicate motion thereto.

As shown in the drawings, the movement communicated to the cam 711 is somewhat greater than that communicated to the cam 710. The reason for using two cams to actuate lever 160, which lever effects the engagement and disengagement of the totalizers with the actuating racks, lies in the fact that during the adding cycle the totalizers engage the actuating racks for a longer period than during the total taking or clearing cycle. When clearing, the totalizers engage the racks during the forward movement of the racks, while during adding they engage during the return movement of the racks. The return movement of the racks taken together requires more time than the forward movement, because the racks move forward simultaneously while they return successively to provide time to effect carrying from one denomination to another. By using two cams, in this case cams 710 and 711, one of them, 711, is used to effect engagement of the totalizers and racks, while the other, 710, is used to effect their disengagement. The cam races in the two cams 710 and 711 have certain portions thereof widened so as to permit the free movement of the cam roll of one cam when the other is active, and vice versa. When changing from adding to totaling and the reverse, the two cams are thus rotated through different angles. In this way, not only the time of engaging the totalizers with the racks during each cycle is changed, but the time the totalizers remain engaged during the cycle is also varied.

In addition to changing the time of engaging the totalizers it is also necessary to change the time when the totalizer differentials perform their forward movements. Since the engagement of the racks with the totalizers always takes place immediately after the totalizer differentials finish their forward movements in both adding and totaling operations, it follows that the totalizer engaging cam 711 and the totalizer differential actuating cam 51 retain the same relation to each other in both adding and totaling operations. For this reason cam 711 and gear 11, which drives cam 51, are clutched together and are driven by the same gear 719.

When it becomes necessary to readjust the machine for analyzing purposes, a shifting of the shaft 600 in the reverse direction simply reverses the direction of movement of the mutilated gears and their coacting trains so as to again shift the cams 710 and 711 to their original positions.

In order to preserve the alignment of the parts, an aligning pin 742 is fastened to the main frame of the machine, and stands in position to engage the teeth of the gears 717, 718 and 719 when they are disengaged from their coacting gears; and another aligning device 743, fixed to the base of the machine, co-operates with the gears 724 and 725 to hold them against rotation when they are out of engagement with their coacting gears.

*Amount recording mechanism.*—The record produced when the machine is cleared may be either perforated or printed, or both; as here shown (Fig. 2), it is both perforated and printed. The record itself has already been described in detail, and no further description thereof is necessary.

Both the punches 750 (Fig 55) and the printing devices 751, used to record amounts, are under the control of the differentials which position the actuating racks. A shaft 752, together with a group of sleeves 753, control the punches. The shaft 754, together with another group of sleeves 755, control the printing elements.

The printing wheel of lowest denomination is fixed to the shaft 754; the others are secured one to each of the nine nested sleeves 755. These shafts and sleeves are actuated and positioned by the gear segments 756, (Figs. 11 to 13) mounted for free rotation upon the shaft 757. The segments 756 are equal in number to the number of the rack differentials. Each segment has on its lower edge a toothed locking rack 758, by which it is held in fixed position when the circumstances require. Secured to the shaft 752, and to each of the sleeves arranged thereon is a gear 759, which meshes with the several gear segments 756. And fastened to the shaft 754 and the group of sleeves 755 are gears 760, which likewise mesh with the several gear segments 756.

Motion from the differentials is communicated to the segments 756 by means of a so-called "beam and link" movement. To each segment 756 is pivotally attached one end of a "beam" 761, and to each differential 62 is pivotally attached one end of a link 762; the other end of the beam and the other end of the link are pivoted together. Any movement of the differential is thus communicated to the beam.

*Beam actuators.*—Coacting with the beams 761 are a set of beam actuators 763, one for each beam, rigidly attached to a shaft 765. This shaft is oscillated in timed relation with the other elements, once during each cycle of the machine, thereby depressing the beams, and thus positioning the segments 756, in accordance with the position of the differentials. This means of setting one group of elements differentially by means of another which has previously been set, is well known in this art, and has been previously described herein in connection with the positioning of the totalizers. It is sufficient to say that by this means, both the punches and the printing wheels are positioned to produce a record, such as is required by the differentials, as they are set by the denominational elements of the totalizers.

Extensions 764 on the beam actuators 763 guide the links 762, and prevent lateral displacement.

Attached to the shaft 765 is an arm 768 (Figs. 43 and 53), which serves to oscillate the same. Movement is communicated to this arm by means of a lever 769, pivoted on a post or stud 770 (Fig. 53) in the frame of the machine. The other end of this lever is provided with a cam roll which engages a cam race 1669 formed in the side of the gear 669 (Fig. 62), which is fastened to one section of the clutch sleeve 668, on the shaft 10.

When the coupling gear 646 (Fig. 30) is in the position it occupies, when the machine is being cleared, it meshes, both with the driving gear 645 and the gear 661 on the sleeve clutch 668; and by this means motion is communicated from the main shaft to the cam gear 669, and thence to the shaft 765, by means of the levers 769 and 768. But when the gear 646 is out of mesh with the gears 645 and 661, as in the adding operation, the beam actuating mechanism is idle.

*Segment aligners.*—In order to align and definitely hold the segments 756 in any required position, aligning devices 766 (Fig. 13) are provided. There is one of these devices for each segment, and they are all rigidly mounted on the shaft 767. This shaft oscillates once for each cycle or movement of the machine. Attached to the shaft is a lever 771 (Fig. 16), actuated by another lever 772, pivoted on the shaft 153, and having one end engaging the free end of the lever 771. The lever 772 is in turn actuated by a bell crank lever 773, mounted for free movement upon the shaft 122, one end of which engages the lever 772, and the other end of which carries a cam roll 680 which runs in a race-way 681 in the face of the gear 661. This is the same gear that, as before described, serves to communicate motion to the clutch sleeve 668, and through this to the beam actuator mecha-nism. Therefore, it likewise moves or remains stationary depending upon whether the gear 646 locks this gear to the driving gear 645, as in taking a total, or is disengaged therefrom, as in the adding operation.

*Number recording mechanism.*—In addition to the punches 750, there is another set of punches 775, arranged in two columns of four each, (Figs. 54 and 55). Each column is to be used to punch characters representative of the ten digits; and since there are two of these sets, holes may be perforated to represent any number from 00 to 99, the whole number of totalizers in the machine.

Printing wheels 776 are used to print the numbers represented by the perforations made by the punches 775; so that the number of the register cleared is represented by printed characters, as well as by perforations.

The punches 775 and the printing wheels 776 are controlled by the same mechanism. Each number wheel is provided with a gear 778, and the number wheels, and their associated gears, are mounted for rotation upon the shaft 754. The units printing wheel is driven by a gear 779, fast on a shaft 780; and the tens printing wheel is driven by a gear 781, mounted on a sleeve 782. The shaft 780 and the sleeve 782 are actuated and set by special differential devices. The tens wheel is adjusted to indicate the particular group containing the totalizer being cleared, and the units wheel is set to indicate the particular totalizer of the group which is then being cleared.

*Special perforators.*—There is also a third set of two punches 777 arranged between the group 750 and the group 775. These are used to punch the control perforations in the column C in the summary record. These holes are identical in function with the control holes in the column C of the detail record. The construction of these punches, and the mechanism for operating them, will be hereinafter described.

*Bank "M".*—Structurally considered, the devices which actuate the units and tens punching and numbering devices are substantially identical with the differential devices which set the totalizer shafts and adjust the actuating racks. The special differential which controls the setting of the units punches and units printing wheel is loosely mounted upon the shaft 153, which supports the drivers for the differentials of the actuating racks. It is located at the extreme right-hand end, and is illustrated in detail in Fig. 16. As it is a special differential, it has been arbitrarily designated by the character "M", and in speaking of this structure, it will hereinafter be referred to as the "bank M". The driver 61, the latch 66, and the bank contacts 106, are identical with the corresponding elements of the rack differentials, and have been correspondingly numbered.

*Bank "N".*—The special differential which controls the tens punches and the tens printing wheel is rigidly secured to the shaft 48, which supports the drivers for the totalizer group differentials. It appears in the drawings (Fig. 5a) as the differential at the top of the sheet, and is illustrated in detail in Fig. 20. This device as a whole has been designated by the character "N", and in speaking of this structure as an entirety, it will be referred to as the "bank N". Its driving device 61, beam actuator 92, and aligning device 98, are all identical with the corresponding elements of the totalizer group differentials; and they operate in timed relation with these elements, so that no further description thereof is necessary. But the rack 29, instead of being used to adjust a totalizer shaft, as with the totalizer group differentials, is here used to communicate motion to the tens punches and tens printing wheel. This is its only function. A bar 783 is directly connected to the rack 29 and extends across the machine. This bar has directly secured thereto a short rack 784 and is provided with a guiding slot 785. The rack 784 engages a gear 786, secured to a small counter shaft 787, which passes through the slot 785 in the bar and is supported by a bracket 788, secured to the frame 3. On the other end of the counter shaft 787 is fixed a beveled gear 789 (Figs. 5b and 16), which meshes with a similar gear 790 fast on the sleeve 782; this in turn drives the tens punches and tens printing wheel.

*Beam actuator for bank "M".*—Loosely mounted above the bank M on shaft 757 is a gear segment 791, having on its lower edge a toothed locking section 792. Meshing with this segment is an idler gear and meshing with the idler gear is a gear 793 (Fig. 16) fast on the units printer wheel shaft 780. This shaft is supported at one end by the bar 832 (Fig. 52) and at the other end by a bracket 794 (Fig. 5b). The segment 791 is positioned by means of the differential of the bank M, working in co-operation with a special beam 795, and beam actuator 797. The beam is pivoted at one end to the gear segment 791, the link 796 is pivotally connected to the differential segment 62, and the free ends of the beam and link are connected together. As the differential 62 is positioned during normal operation, the link 796 communicates movement to one end of the beam 795.

To definitely position the segment 791, the beam actuator 797 comes into play. This element is mounted for independent rotation upon the shaft 765. It carries at its upper end a roll 798 (Figs. 36 and 38), which is adapted to engage the top of the beam and depress the same and thereby position the segment. The other end of the beam actuator is curved to pass around the shaft 767 and carries at its lower end a pin 799 (Fig. 36). A lever 800 pivotally mounted upon the shaft 153, has its upper end slotted to engage the pin 799. A special rack segment 801, pivoted on the shaft 122, transmits motion to the driver 61 of the bank M differential in a manner identical with the other drivers of the actuator differentials. The segment 801 has its other end yoked over and likewise pivoted upon the shaft 122, and this yoke carries a pin 803 which engages the slotted end of the lower portion of the lever 800. The segment 801 is actuated by plate cams 127, 130, fast on shaft 10. These cams thus operate both the differential of bank M and also the beam actuator for beam 795. As the segment is shifted by its driving cams, the lever communicates motion to the lever 800, and this in turn to the beam actuator 797, thereby definitely positioning the gear segment 791, and through the coacting gear 793, the units printing wheel. Since the cams are fast on shaft 10, which rotates at all times, the beam actuator is operated at all times whether the machine is analyzing a previously prepared record or is totalizing and producing a record of its own; in this respect it differs from the actuators for beams 761, which operate only during the latter operation. The function of the beam actuator during analyzing operations is to force the segment 791 to its extreme position so as to position the master switch M—S, as will be explained later.

*Aligner for bank M.*—Inasmuch as the time of movement of the bank M is different from that of the actuator rack banks, it is necessary that the aligner for the segment 791 have independent movement. This aligner 804 is yoked over (Figs. 37 and 38), and is pivoted for free movement upon the shaft 767. It carries at its other end a pin 805 which engages a slot in one end of a lever 806, pivoted for free movement on the shaft 153. The other end of this lever is slotted to receive a pin 807 on one arm of a bell crank lever 808, pivoted for free movement upon the shaft 122. The other end of this lever carries a cam roll 809 which engages a cam race 810 in the cam 811, fast on the shaft 10. Any position assumed by the differential 62 of the bank M is, by means of the beam 795, link 796 and beam actuator 797, duplicated by the gear segment 791, and the same is locked in position by means of the aligning device 804. By this means the gear segment 791, and through the connecting train of mechanism the units wheel of the printing device and the units perforator, may be set and held in any one of its ten possible positions.

*Special contact bank.*—Arranged adjacent the gear segment 791, and concentric with its axis, is a special bank of contacts identical or substantially identical with the banks 106. This bank is fastened to the frame of the machine by posts 813 and 814 (Figs. 5b and 16). Fastened to the segment 791 are movable contacts 101 and 102, identical with the contacts 101 and 102 of the other banks. Since the gear segment 791 is under the control of the differential 62, likewise the contacts 101 and 102 are under the control of the same differential, and the movable contacts are forced to stop upon the points determined by the position assumed by the differential 62. The circuits of which these contacts form a part do not function when analyzing a detail record, or during totaling operations, but do function when a summary record is being analyzed. They will be more fully described when that operation of the machine is considered.

*Master switch control.*—The shifting of the master switch M—S, heretofore described, is also effected by devices mounted upon the gear segment 791. Adjacent this segment is a lever 815, mounted for oscillation upon a post 816, set in the end frame of the machine. One end of the lever has a notch 817, which coacts with a pin 818, mounted in a plate 819, fastened to the gear segment. Rigidly secured to, and actually forming a part of, the lever 815, is a locking plate having two engaging surfaces 820. When the parts are in the position shown in Fig. 16, the locking faces 820 are ineffective, and the lever 815 has been so moved that its left-hand end is in its lower position. When, however, the segment 791 is shifted, the pin 818 coacts with the lower surface of the notch 817 and causes the lever to oscillate, and the locking faces 820 engage with the plain face of the plate 819, so as to prevent any oscillation of the lever. This movement causes the slide 822 to lift, and the rack 823 to engage the gear 824 (Fig. 20), and thereby shift the switch. The rack 823 is provided at its lower end with a slot 825, by which its movement is guided over a pin 826 fast in the frame of the machine; and the lower end of the bar 822 is provided with another slot 827, by which it is guided over a pin 828, also fixed in the frame of the machine. There are but two positions for the switch M—S, that shown in Figs. 16, 17, 32, 68*b* and 68*e* where the contact plate 540 is in circuit with the contacts 539 and 541, and plate 543 is in contact with contacts 542 and 544; and the other position, (Fig. 69) in which the drum has been oscillated to close the circuit between the other contacts and plates 1776 to 1780 carried by the drum. As long as bank M is not controlled by perforations, its differential will go to its extreme position and the pin 818 will retain the lever 815 and the switch itself in the position shown in Fig. 16. But when a record is used having perforations which control this differential (a summary record), the differential will be stopped before it reaches its ultimate position and the pin 818 will throw the lever 815 and the switch into the other position shown in Fig. 69.

*Perforators in general.*—The perforating and printing devices are mounted in a supplemental frame in the analyzing portion of the machine. A bar 830 (Figs. 6 and 52) extends between and is secured to the main frame plates 6 and 7. Another frame bar 831, hollow in cross section extends between and is fastened to the same plates. A third bar 832 is rigidly fastened at the one end to the bar 830 and at the other to the bar 831. The shafts for carrying the printing and punching elements and certain of the actuating parts are supported by the frame 6 and the bar 832. The hollow frame bar 831 is used to support the entire set of punches. In order that they be readily inserted and replaced the central portion is cut away at both top and bottom. A guide plate 833 is fastened to the box section at the top, and a similar plate 834 is fastened to the bottom. These plates are provided with aligned perforations of a size to receive the reduced portions of the punches. Directly above the plate 833 and also secured to the box structure is a perforated guide plate 835, the holes in which correspond in number to those in the plate 833. The holes in plate 835 are semi-circular in form; and the upper ends of the punches have one side flattened, as at 836, (Figs. 10 and 54) so that the extreme ends extend through the semi-circular perforations of the guide plate 835. Certain of the semi-circular holes (Fig. 55) face in one direction and the others in the opposite direction. This is for the purpose of selecting the punches. There are four of these punches for each digit, and the combination of perforations desired is obtained by picking out the punch or combination of punches in the manner hereinbefore described.

Extending across the machine directly beneath the box section of the bar 831 is a frame plate 837 fastened to the side frames by screws 838 (Fig. 47). Upon this is mounted the die plate 839 with which the punches coact. This is removably secured to the frame by screws 840 (Fig. 51). A tube 841 (Fig. 52) extends from the frame 837 to a box 842, so as to carry away the small pieces of paper cut by the punches.

*Amount perforating mechanism.*—Gears 843 (Figs. 53 and 54) are mounted, one on the shaft 752 and the others on the several tubes 753; these gears are therefore under the direct control of the rack differentials. Coacting with these gears is a set of ten slides 844 (Fig. 7) each having on its lower edge a rack 845, and hammers 846 which act on the punches. The punches have to be selected so as to punch holes corresponding to the digit required; it is therefore necessary to adjust the racks so that the hammers may select the desired punch or punches. This is accomplished by adjusting the slides or racks 844 so that the hammers are positioned to strike the punches necessary to produce the desired perforations. Certain of the hammers have longer faces than others; moreover, to the side of each slide 844 is attached a supplemental plate 847 also having certain several short faced hammers and one long faced hammer. As these hammers are adjusted over the cutaway ends of the punches, certain hammers engage with the punch heads that face in one direction, and certain others engage with others that face in the other direction.

The racks or slides are each provided with elongated slots 848 and 849, by which they are supported and guided in their movements. Running across the analyzing portion of the machine, and almost directly above the nest of tubes 753, is a shaft 850 having one end mounted for free movement in the frame plate 6 and the other in the supplemental frame bar 832. The racks or slides are mounted upon this shaft by means of the elongated slots. In order to space the slides from each other, and to provide anti-friction bearings therefor, flanged bushings 851 (Fig. 54) are interposed between the sections, the hub portions of which are of a diameter to pass through the slots, while the flanged portions are larger and serve to space the racks from each other. The means for supporting and guiding the other ends of the slides are quite similar to that just described. A shaft 852 is here provided having mounted thereon flanged bushings 853, the hubs of which are of a size to pass into the slots 849 and the flanges of a size to space the slides from each other. The shaft 852, however, is not mounted in the frame of the machine but is supported by arms 854, (Figs. 6 and 54) one on either side of the group of slides, and both rigidly secured to the shaft 850. The shaft 852 and the arms 854 thus in effect constitute a yoke extending from and supported by the shaft 850.

One arm 854 is provided with an extension 855 (Fig. 53) to which a pitman 856 is connected. The pitman is bifurcated at its lower end to embrace the shaft 492, and carries a cam roll 857. A cam 858 provided with a cam race co-operates with the roll 857, to effect a raising and lowering of the yoke which carries the hammers. The cam is rigidly mounted upon the shaft 492, which in turn is driven by the gear 859, which derives its movement from the gear 669 mounted upon the clutch sleeve 668, and driven from gearing upon the other side of the frame. (Figs. 30 and 62).

*Number perforating mechanism.*—Means must also be provided for selecting and actuating the number punches 775, (Figs. 54 and 55) which produce the perforations indicating the numbers of the totalizers cleared. For this purpose racks 860, which also have rack sections 845 and slotted openings 848 and 849, are provided. There are two of these racks, one for the units punches and another for the tens punches. The units rack section 860 is actuated by a gear 862 loose upon the shaft 752, and driven by a gear 779 fast on the shaft 780, which is actuated by the differential of bank M. The rack section 860 which operates the tens punches is driven by a gear 863, also loose upon the shaft 752; and this in turn is driven by a gear 781, fast upon the sleeve 782, which derives its motion from the differential of bank N.

*Special perforator mechanism.*—The punches 777, which produce the control holes in column C (Fig. 2) are operated by arm 861 (Fig. 9). This arm is loosely mounted upon the shaft 850 by means of a flanged bushing 851, and upon the shaft 852 by means of a similar bushing 853, the bushings being identical with those employed to guide and to separate the rack sections. In this instance, no selection of punches is necessary; the two punches are merely actuated at every step of the paper. This movement is effected by the yoke which carries the entire group of rack sections.

*Perforator restoring mechanism.*—In order to support the punches, and to remove those which have been driven through the paper, the entire set is mounted in a carrier or basket 864, (Figs. 52, 53 and 54) which is provided with a series of perforations equal in number to the total number of punches. The punches are supported in the carrier by their enlarged portions. Arms 865, attached to the ends of the carrier, pass through guide openings 866 (Fig. 55) and have the other ends secured to links 869, which in turn are loosely mounted upon the shaft 852. As this shaft is raised and lowered the carrier itself will likewise be raised and lowered. When the shaft starts down the carrier will move down and with it all of the punches. Those which have been selected for operation are driven by the hammers through the paper, while the others rest upon the top of the record sheet. After the perforations have been made, shaft 852 is raised and lifts the carrier with it, thereby again raising the entire set of punches.

*Aligner for the printer.*—In order to position and hold the printing elements, a bar 875 having on its underside teeth 876 (Fig. 56) is provided, there being as many teeth as there are printing elements. The bar is provided with arms 877 (Fig. 6) and 878 mounted for rotation upon the shaft 780 and sleeve 782 respectively (Fig. 53). The last mentioned arm has an extension 879 by means of which motion is communicated thereto. To actuate the aligner a link 880 (Fig. 64) is connected at one end to the extension 879 and at the other end to one arm of a bell crank lever 882, which is mounted for rotation upon the stud which carries the gear 490. The other end of this bell crank lever carries a cam roll 883, which coacts with a cam race 885 in the gear 859. The cam is secured to the shaft 492, which operates only during totaling operations.

*Inking mechanism.*—The inking mechanism 887 is shown generally in Fig. 53. It consists of an inking ribbon 888 which is mounted upon rolls 889 and 890. Any well-known reversing inking ribbon mechanism may be used and that shown is used merely to illustrate how such ribbon is to be applied. There is nothing new in this mechanism, so far as this inventor is concerned, and any well-known form may be employed.

*Impression hammer.*— The impression from the printing rolls is taken by an impression hammer 891, which may be of any ordinary construction. As here illustrated, this hammer is supported by two sets of parallel arms, an upper set 892 and a lower set 893, the free ends of which arms are loosely pivoted to the impression hammer so as to cause the same to move in a vertical plane. The arms 892 are loosely mounted upon the shaft 418 and the lower arms are loosely mounted upon a shaft 894.

In order to give the impression bar the proper striking movement, means are provided for impelling the same by means of a spring tensioned by mechanism which will now be described. Each of the lower arms is provided near its rear end with a flat-faced extension 895. Rigidly secured to the shaft 894 are two levers 896, identical in form. Each lever has at its upper end a flattened face 897 adapted to strike against the shaft 418. Each of these levers also has at its lower end a pin 898, against which the faces 895 of the arms 893 are adapted normally to rest. Wound around the rear end of the shaft 894 is a spring 899, having one of its ends bent over or secured to the shaft 418, and the other end resting against the arm 896. This spring is normally under tension but cannot move the arm 896 or the shaft upon which it is mounted because the flattened faces 897 of these levers are stopped by the shaft 418. The result is that normally the impression device hangs with the flattened faces 895 of the levers 893 resting against the pins 898, as shown in Figs. 52 and 53.

Rigidly attached to the rear end of the shaft 894 is a short lever 900, carrying on its end a flat-faced pin 901. Another lever 902 (Fig. 66) is loosely mounted upon the shaft 894. This has pivotally supported thereon a latch 903. The latch has at its lower end a hook 904, adapted to engage the flat-faced pin 901, and has at its upper end an extension 905, adapted to engage pin 906 fast in the frame of the machine. A pitman 908 carrying a cam roll 909, which engages a cam race 910 in the side of the cam 858 engages the other end of the lever 902. This cam, as before explained, is driven by the gear 859, through mechanism controlled by the manual shifting device. As the pitman lowers, the latch engaging with the pin 901, lifts the lever 900, and puts the spring 899 under additional tension; and since the levers 896 are fast to the shaft 894, the pins 898 recede from the position shown in the drawings, and the parallel arms of the impression device follow the movement of the pins, and are thereby lowered from the position shown in Figs. 52 and 53. This motion continues until the extension 905 of the latch 903 strikes the pin 906. The hook 904 is thereby unlatched from the pin 901, and the mechanism being released, the spring, acting under the energy stored therein, gives a quick movement to the impression device. As soon, however, as the flattened faces 897 of the levers 896 strike the shaft 418, the impelling mechanism is stopped; but the impression device, due to the momentum which it has acquired, moves up and strikes the type through the inking ribbon, after which it merely recedes until its flattened faces 895 rest again in contact with the pins 898. As the pitman rises it lowers the latch 903, and the hook 904 passes under the flattened pin 901 on the lever 900.

*Zero-stop mechanism.*—In order that the actuating racks may be set differentially, and the record-making devices positioned according to the amounts represented by the totalizer elements, means must be provided for stopping the racks when the denominational elements of the totalizer reach zero. In order to clearly understand this mechanism, particular reference is made to Figs. 11, 12, 13, 25 and 26.

The stops proper 915 are provided with hubs 916 (Figs. 25 and 26), by means of which they are supported adjacent the transfer or carrying arms 322; and have concave faces 917, which coact with the totalizers. An arm 918, having an offset, is carried by each stop, and is arranged on the side of plate 135 opposite that occupied by the stop to which it is secured. There are ten of these stops for each actuating rack.

The zero stops are under control of the manual shaft 600. During analyzing operations they are inactive, and occupy the position shown in Figures 11, 12 and 13; but during totaling operations they are under the control of mechanism which shifts them into and out of operative position, once for each cycle of the machine. When in operative position, the stops 915 are so placed as to be in the path of the long teeth 320 of the denominational elements of the totalizer. By this means, as the rack sections are shifted under the influence of their respective differentials, the long teeth 320 of the several denominational elements of the totalizer at that time being cleared will sooner or later strike the stops 915, and cause the same to be shifted. The zero position of the denominational elements is that in which the long teeth are in a horizontal position. As the long tooth of each denominational element approaches zero, it engages the side of its co-operating stop 915 and moves the same a certain definite distance. Advantage is taken of this movement to stop the racks and set the recording devices.

The stopping of the racks and the setting of the recording devices is effected by energizing the magnets 84, and thereby stopping the differentials. Since the totalizer elements may stand in any of ten possible positions, the times vary at which the racks must stop. The racks must be stopped when the totalizer elements are home, but must not be stopped at any other position; the control must therefore be effected between the 1 and the home or 0 positions. Two conditions then exist; one, where the long tooth 320 stands at 1 when the totaling operation begins, and another where the long tooth stands at any other of the nine possible positions.

As before stated, the contacts 700, one for each rack or denomination, are carried by a frame which is raised and lowered at a certain time in each cycle of operation. The closing of these contacts is effected by means of the arms 937, one for each denomination, which are actuated indirectly by the zero stops.

As the totalizers move into rack engaging position the selected totalizer engages the supplemental rack sections 302. The first step of movement of the differentials is to advance the main rack sections 118 until they come up to the supplemental sections. During this step the totalizer elements are not moved. During the next step of the differentials the main rack sections 118 will move one step also, and rotate the totalizer elements one step. If any of the totalizer elements happen to be standing at the 1 position, it will be necessary to stop its rack and its differential at the end of this step of movement, so that the totalizer element will stand at zero. This will cause the corresponding recording devices to stand at 1 to indicate that there had been 1 on that element of the totalizer. Since the differentials are stopped by the magnets 84 and these, in turn, are controlled by contacts 700, it is desirable to energize the magnets as soon as possible, because the time for operation of the parts is necessarily small. This circuit must not be closed before the totalizer has reached the 1 position; but it must be closed at that time or immediately thereafter. The actual completion of the circuit is, as stated, under the control of arms 937. These arms may occupy any one of three positions. What may be described as the normal position is that shown in Figs. 11, 12 and 13; that is, the position they always occupy unless positively moved to some other position. But they may occupy either of two other positions, depending upon the position of the totalizer elements with which they coact. If the totalizer element stands at 1, the stop proper 915 for that element will be arrested when it comes in contact with the side of the long tooth 320. This will cause the arm 937 which it controls to stop before it passes off the dwell 938 of the arm 707, thereby holding the arm in the position shown. If the totalizer stands at one of the other nine possible positions the stop proper 915 will not be arrested by the long tooth but will pass partly over the top of the short tooth then standing at position 1. This will carry the roller on arm 937 off the dwell 938 of arm 707, thereby permitting the latter to rise when the contacts themselves are raised. Thus when the totalizer element stands at 1 at the beginning of the cycle, the arm 937 cannot run off the dwell 938 of arm 707, but holds the latter, so that the circuit will be closed between the contacts immediately the same are raised, which takes place immediately after the stops are positioned; on the other hand, when the totalizer stands with its long tooth at any other than position 1, the arm 937 runs off the dwell 938 of arm 707, thus permitting arm 707 to rise with contacts 700 without closing them. In this case the contacts will be closed by the long tooth 320 forcing over its coacting stop 915, and through intervening connections to the arm 937. This time is variable, depending upon the position of the totalizer element.

Mounted upon each of the several plates 135 on the side opposite that carrying the rack structure 115, is a slide 919 (Fig. 13), moving on guide rolls 920, which are secured on the plate 135. Pins 921, also fastened to the plates 135, limit the movement of the slides 919 in either direction. These slides have upon each edge a series of pins 922 against which the ends of the arms 918 normally rest. Adjacent each slide 919 are two bars 923, one on either side thereof, provided with guide slots 924, by which they ride over pins 925 fixed in the frame plate 135. Springs 926, stretched between the ends of the slides 923 and the frame plate 135, tend to move these slides always to the right (as viewed in Fig. 13). Other springs 927, stretched between the zero stops and the frame plates, tend to throw the arms 918 against the pins 922.

The movement of the slides 919 is effected by levers 928, one for each slide, pivoted upon one of the shafts 180. The upper end of each lever is bifurcated and embraces a pin 929 on the slide. The levers 928 are in turn actuated by other levers 930 fixed on the shaft 641, which, in turn, is actuated (Fig. 39) by the lever 687, pitman 685, cam 683 and gear 682, controlled, as heretofore described, from the manual shaft 600, through the gears 652 and 646 (Figs. 12 and 30).

The slides 923 are provided with pins 931, which engage the arms 918 of the zero stop mechanism; and the slides 919 are provided with other pins 932, which co-operate with the levers 918 to advance the same under certain circumstances. The slides 919 are moved back and forth once for each cycle of operation. As they move to the right (as viewed in Fig. 13), the pins 922 carried thereby move in the same direction, and the arms 918 being no longer restrained, follow under the influence of their springs 927. When the stops reach the totalizer elements they are arrested. Should any totalizer element stand at 1, its stop would be arrested somewhat earlier than those for elements which stand in other positions. The slides continue to move somewhat farther than necessary to position the stops, so that if any stops fail to move under the action of their springs their arms 918 are struck by the pins 932 and started; the slides then come back somewhat and hold all of the stops which have made their full movement against the pins 922. Those stops which may have been arrested by totalizer elements standing with their long teeth in position 1 are not held by the slides but simply rest with the stops against the teeth.

The slides 923 may or may not move to their extreme positions under the influence of the springs 926. If any stops are arrested by totalizer elements in position 1, the bar 923 with which it coacts is also arrested; and the levers 933, 935, are likewise held back, and the lever 937 does not pass off the dwell 938 of arm 707. If none of the stops are arrested by totalizer elements in the 1 position, they will all make their maximum movement, and the levers 933, 935, coact to move the arms 937 entirely off the dwells 938 of arms 707.

If any totalizer element stands at the 1 position, the arm 937 holds the arm 707 in such position that when the frame carrying the contacts 700 rises, the circuit is at once closed, the co-operating magnet 84 is at once energized, and the parts come to rest at the end of the step, thus stopping the rack at the point where its co-operating recording devices will stand to record 1. If the totalizer element does not stand at the 1 position, the rack continues to move. As it approaches the 1 position, it forces the stop back, causes the arm 937 to ride up on the dwell 938 of the contact actuating arm 707, and closes the circuit.

If 0 is to be indicated on the recording elements, the totalizer element makes a complete rotation, and in passing from position 1 to its home or zero position, causes the parts to stop as in other cases. After the totalizer elements are all home, the contacts 700 are again lowered, and the slides 919 again returned to their original positions.

Eight of the arms 918 of each denomination, four in the upper and four in the lower row, are identical in construction; but the other two are of somewhat different construction; one, 933, is provided with a longer arm and has at its lower end a notch 934; the other, 935, also has a longer arm, and carries a pin 936, which rests in the notch 934 of the upper arm. The lower arm for each group has also attached to it the arm or extension 937, which coacts with the lever 707, as heretofore described.

Mounted upon each of the slides 923 adjacent the two long switch actuating arms just described, is an additional pin 939. If one of the upper totalizers is being cleared; for instance, the first one at the right, (Fig. 13), then when the long tooth moves past the stop 915, it will cause the same to shift, thereby moving its corresponding long arm 918; this, coacting with its pin 931 on the slide 923, will cause the latter to move to the left. In doing so, the pin 939 will cause the long arm 933 to also move to the left, and the hooked end 934 thereof engaging the pin 936 on the arm 935, will also cause the latter to move to the left. This will swing the arm 937 to the right and actuate the switch controlling lever 707.

However, should it be the fourth totalizer from the right in the top group that is being cleared (Fig. 13), the long tooth of that totalizer would cause the arm 933 attached thereto to be moved directly, instead of through the intervention of the bar slide 923, and thus communicate motion to the arm 935, and thus to the arm 937. If it is the fourth totalizer in the lower row, the movement is communicated directly to the arm 935 and lever 937.

After the totalizer elements are all home, the actuating mechanism for the slide 919 will force the same again to the left (Fig. 13), thereby restoring to their original positions all of the other zero-stops 915, and also the spring actuated slides 923.

*Selecting switches.*—The selection of the totalizers in the order in which they are to be cleared and the setting of the recording devices to record the numbers thereof, is effected by switches which make the necessary connections. While the construction here shown clears the totalizers in regular sequence from 00 to 99, it is not essential that they be cleared in this order as any special order of clearing may be employed.

The switches are operated only during the totaling or summary record producing operation. They are therefore placed under the control of the manual shaft, so as to be thrown into and out of operation as the machine is changed from adding to totalizing, and vice versa. Since the switches are to operate only during the taking of a total, the driving mechanism therefor is connected with those driving elements which operate only during the taking of the total. This motion is derived through the gears 661, 662, 663 and 664 (Fig. 16), as explained in describing the alterations in the mechanism when the machine is changed from adding to totaling. The locking disk 665 which is fast to the gear 664, and the driving pin 666 also attached to this gear, serve to actuate the Geneva gear 667, which, in turn, communicates motion to the switches proper.

There are five of these switches, divided into two groups, of three and two switches, respectively. The group of three 947, 948 and 949 are used to select the totalizers; two of them, 947 and 948 (Figs. 68a–i), select the group, while 949, selects the totalizers from the groups. One of the group selecting switches, 947, connects the groups one by one to the positive side of the circuit, while the other, 948, connects the same groups to the negative side of the line, both sides of the line are thus positively controlled. In theory one switch would suffice, but because of the difficulty in securing synchronism of the parts, two have been provided in the preferred arrangement. The second group of switches 950 and 951 is used to set up the recording devices; that is, the perforators and the printing wheels, so as to indicate which totalizer has been selected; one, 950, controls the group designating devices, and the other, 951, controls the individual totalizer designating devices.

These switches are all shown mechanically connected in Fig. 30, and in diagram in Figs. 68a–i. The group selecting switches 947 and 948, and the switch 950 for controlling the tens recording devices are mounted to move together; while the units totalizer selecting switch, 949, and the units switch 951 for controlling the units recording devices are mounted to move together.

The construction of the switches 947, 948 and 950 is shown more particularly in Figs. 12, 33 and 34, and in diagram Figs. 68a–i. Each consists of a central plate 954 (Fig. 33) having a radial lug 955 to connect the same in circuit, and a series of radially arranged contact plates 956, all insulated from the plate 954 and from each other. Movable contacts 957, one for each switch, are secured to the shaft 965, and are arranged to be moved with one blade on the plate 954 and the other on the radial contacts 956. As these contacts step around they form electrical connections between the plate 954 and the radial contacts 956.

It will be noticed that the radial contacts 956 are equal to the number of groups of totalizers, which in this machine is ten, but which will vary with the construction of the machine, being fewer or more as there may be a less number or greater number of groups of totalizers.

The switch 949, used to control the selection of the specific totalizer from the group, and the switch 951, used to control the units recording devices, differ somewhat from the other switches and are shown in Figs. 13, 35 and 68a–i. It is necessary for these switches to combine the contacts just as do the contact banks. This requires twenty contacts. In the switch 951 twenty-two contacts are provided (Figs. 68a–i), the extra two being necessary for reasons which will be hereinafter set forth. The shorter contacts are represented by the character 958 and the longer ones by 959. These are all set in a frame and insulated therefrom and from each other. A two-point movable contact 960 one for each switch, is secured to shaft 961, and is moved step by step over the entire set. The circuits will be explained in detail hereafter.

The Geneva gear 667 (Figs. 16 and 30) moves one step for each rotation of the driving pin 666. When it is not being moved it is held against rotation by the locking disk 665. The Geneva gear itself is rigidly secured to a shaft 961 having one end supported by the frame 3 and the other by the frame plate 952. This shaft passes easily through the fixed portions of the switches and carries the movable contacts 960. The Geneva gear has 11 teeth, and therefore moves one eleventh of a rotation for each rotation of its driving member. The movable contacts 960 therefore likewise make one eleventh of a rotation for each rotation of the driving pin 666, and require eleven movements of the driver to make one complete rotation. The reason for the use of eleven steps will be explained later.

Mounted upon the shaft 961 is a locking disk 962, and a driver 963 (Figs. 30 and 34), which coact with another Geneva gear 964, mounted upon the shaft 965, which carries the movable contacts for switches 947, 948 and 950. This gear has ten driving teeth, and therefore makes one tenth of a rotation for every rotation of the Geneva gear 667. It therefore requires ten rotations of the driver 963 to complete one rotation of the Geneva gear 964. During one clearing of the machine, therefore, the switches 949 and 951 make ten rotations, and the switches 947, 948 and 950 one rotation.

A cam 966 mounted on the shaft 965 controls a lever 967, which in turn controls a switch 968 (Figs. 30 and 16), and a cam 969 on the shaft 961 controls a lever 970, which in turn controls another switch 971. The switch 968, being actuated by cam 966 on the shaft of switches 947, 948 and 950, effects the stopping of the machine at the end of the clearing or record producing operation. The cam becomes effective to break the circuit just as the last totalizer is cleared. This indirectly effects the stopping of the machine. But the contacts are again closed before the machine comes to a stop, so that the circuit will be in condition for subsequent operations. The switch 971 is actuated by the cam 969 on the shaft of switches 949 and 951, which makes ten rotations to one rotation of the shaft carrying the cam which actuates switch 968. Switch 971 controls the circuit through switches 948 and 950; this circuit is therefore broken once for each rotation of switches 949 and 951, which is just before the end of the complete rotation of the switches 949 and 951.

CIRCUITS.

The ring contact 954 of switch 947 (Fig. 68a) is connected to the positive side of the circuit through switch G—S, (Fig. 68i) conductor 535, (Figs. 68b, and 68a) and switch 984, (Fig. 68c) (now closed). The terminals 0, 1, 2, 3, 4, 5, 6, 7, 8, and 9 of switch 947 are connected directly to conductors $g, h, i, j, k, l, m, n, o$ and $p$, leading to the contact banks G—0, G—1, G—2, G—3, G—4, G—5, G—6, G—7, G—8, and G—9, with which these several conductors are respectively connected.

Likewise, switch 948 (Fig. 68a) controls the connections to the negative side of the line. The contacts 0, 1, 2, 3, 4, 5, 6, 7, 8 and 9 are connected to the conductors $q, r, s, t, u, v, w, x, y$ and $z$, leading from the contact banks G—0, G—1, G—2, G—3, G—4, G—5, G—6, G—7, G—8, and G—9, respectively; and the ring contact 954 of this switch is connected through the switch 971, conductor 988, and switch 982 (Fig. 68c) (now closed), to the negative side of the circuit.

The switch 949, (Fig. 68c) which selects the totalizer from the group has twenty contacts to which a group of conductors $a, b, c, d$ and $e$ are connected, as in the analyzer and the contact banks, so that by a combination of two contacts ten combinations can be effected. This group of conductors $a, b, c, d$ and $e$ is connected by means of contact plates 1776, 1777, 1778, 1779, 1780 and contacts 1786, 1787, 1788, 1789, 1790, respectively of switch M—S to all the similar conductors of the groups $a, b, c, d$ and $e$, leading to the contact banks of the groups G—0, G—1, G—2, G—3, G—4, G—5, G—6, G—7, G—8 and G—9. By this means one switch 949 will suffice to select the individual totalizers whatever the number of groups. To explain further, it is sufficient now to say that, assuming the movable contact 960 to rest on contacts $d$ and $a$, a circuit will be completed which will select the 0 totalizer of the particular group under control. If it rests on contacts $d$ and $b$ totalizer 1 will be selected; if on $c$ and $a$, totalizer 2; etc.

Switch 950 (Fig. 68i) controls the selection of the tens recording devices. Its rotatable contact 957 moves in unison with the movable contact of switches 947 and 948. It has ten fixed contacts, 0, 1, 2, 3, 4, 5, 6, 7, 8 and 9, identical with the fixed contacts of switches 947 and 948. These are connected by conductors directly with the corresponding fixed contacts $r$—0, $r$—1, $r$—2, $r$—3, $r$—4, $r$—5, $r$—6, $r$—7, $r$—8 and $r$—9 of bank N. Current passes from the positive side of the circuit through switch G—S, conductor 994, magnet 84 of bank N, conductor 998, (Figs. 68f, 68c) switch 983, conductor 999, (Figs. 68f, 68c, 68b, 68a) contact 111 to that contact $r$—0 to $r$—9, then closed, through movable contact 957 of switch 950, to ring contact 954, through conductor 989, (Figs. 68f, 68c, 68b, 68a) to point 990 where it joins the circuit from switch 948, thence through switch 971, conductor 988 (Figs. 68a, 68b, 68c) to switch 982 to the negative side of the line.

Switch 951 (Fig. 68a) controls the selection of the units recording devices. Its rotatable contact 960 moves in unison with the rotatable contact of switch 949. It functions to control bank M just as switch 949 functions to control the particular bank G—0 to G—9 which has been selected for its control. It is connected to the contacts of bank M by a group of five conductors $a, b, c, d$ and $e$ (Figs. 68a, 68d, 68g) like the groups which lead to the group banks and amount banks. In fact, bank M is identical in construction and operation with the other banks, but operates at a different time and is controlled by this special switch. The conductors $a, b, c, d$ and $e$ of the switch are connected to the contacts of the bank, just as in the group banks and amount banks, and control the position of the differential of this bank just as the differentials of the other banks are controlled. The circuit is from the positive side of the line, through switch C—S, (Figs. 68i, 68h, 68g) to contact 110 of the bank through the contact 1—0 to 1—9 at that time in circuit through one of the conductors of the group $a, b, c, d, e$ (Figs. 68g, 68d, 68a) for this bank, to the contact of the pair at switch 951 at that time selected, through movable contact 960, back to proper contact of bank $r$—0, to $r$—1, to contact 111, through magnet 84 for this bank, to the negative side of the line.

The contact $a$ of the initial or starting pair of contacts of switch 951 is not directly connected to conductor $a$ of the group of conductors $a, b, c, d, e$, but is connected thereto through a special switch 981 (Fig. 68c) (now closed), which in turn is controlled from the manual shaft 600. The movable contact 960 when in the home position rests upon these contacts. The purpose of this switch is to prevent energization of magnet 84 of bank M during adding operations. If the circuit were not broken during adding operations the magnet 84 would be energized and the bank M be stopped at the 0 position, whereas when analyzing and adding the data of a detail record it should go to its extreme position and actuate master switch M—S, and when analyzing a summary record must be free to assume any position required by the record.

The circuit connections actually made during the clearing or record making operation will now be described. Since the totalizers are to be cleared in regular sequence, beginning with that known as the 0 totalizer on the shaft known as the 0 shaft; that is, the 00 totalizer, the clearing of this totalizer will be first considered. It is necessary that all control magnets 84, except that used to control the 0 bank, be out of circuit; and it is further necessary that the contact bank be caused to stop on the 0 contacts.

At this time, the grouping switches 947 and 948 will be in such position that the circuit will be closed between the ring contacts 954 and the 0 contacts. The movable element of the units switch 949 will be in such position as to complete the circuit for the 0 totalizer, that is, between the contacts $d$ and $a$. The contact switch for the bank N will stop at the 0 contact, thereby setting the tens punches and the tens printing wheel at its 0 position; the switch 951 which controls the bank M will stop at the 0 contact, thereby setting the units punch and units printing wheel at the 0 position; and the contacts for the amount banks will be stopped wherever the denominational elements of the totalizer being cleared require that they be stopped.

The circuits will be as follows: From the positive side of the line through the group switch G—S (Fig. 68$i$) through conductor 535, (Figs. 68$f$, 68$c$) switch 984, conductor 535 (Figs. 68$c$, 68$b$, 68$a$) to contact ring 954 (Fig. 68$a$) of switch 947, through movable contact 957, to contact 0 of this switch, through conductor $g$ (Figs. 68$a$, 68$d$, 68$g$, 68$h$, 68$i$, 68$f$, 68$c$) to the point 530 for the group bank G—0, thence to the contact plate 110, through contact 101, (Fig. 4) to contact 1—0, through conductor $a$, (Figs. 68$c$, 68$f$, 68$e$) leading to contact 1776 of switch M—S. It does not pass through this contact, but follows conductor $a$ (Figs. 68$e$, 68$f$, 68$c$) directly to the contact $a$ of switch 949 for 0, thence through movable contact 960 of this switch, to contact $d$ for 0 of this switch, through line $d$ (Figs. 68$c$, 68$f$, 68$e$) leading to contact plate 1779 of switch M—S. It does not pass through this contact but follows conductor $d$ (Figs. 68$e$, 68$f$, 68$c$) to the contact $r$—0 of the contact bank G—0, through movable contact 102 (Fig. 4) to the contact plate 111, through the magnet 84 through conductor $q$, (Figs. 68$c$, 68$f$, 68$i$, 68$h$, 68$g$, 68$d$, 68$a$) to the contact 0 of the switch 948 through movable contact 957 of this switch, to the ring contact 954, through switch 971, conductor 988 (Figs. 68$a$, 68$b$, 68$c$) through switch 982 to the negative side of the line.

Since all of the driving members of the shaft differentials are moving in unison, this means that as soon as the contacts for the bank G—0 reach the contacts 1—0, $r$—0, a circuit will be completed through the magnet 84, the magnet will be energized and the differential stopped with the 0 totalizer in rack engaging position. While the contact members for all of the other banks will also be moving down, no circuits will be completed through any of the other control magnets 84 because their connections to both sides of the supply line are all interrupted, and these differentials and contact members will all pass idly to their last position, and their totalizers will all go to their home or blank positions.

As soon as the totalizers have been lowered into position by the devices provided for that purpose, the actuating racks are brought into engagement therewith. Those racks which engage denominational elements representing data are stopped when the long teeth actuate the zero stops for those particular racks; but those actuating racks which engage the denominational elements standing at zero give their totalizer elements a complete rotation, and in passing from 1 to 0 the zero stops are actuated and the racks stopped.

The zero-stop mechanism effects the closing of the contacts 700, one pair of which is provided for the magnet of each amount bank. As soon as these circuits are closed, current passes from the positive side of the generator through the control switch A—S (Fig. 68$i$) to the upper contact of the pair of contacts 700 for that group, through the other contact to the point 531, through the magnet 84 to the point 532, to the negative side of the line. This causes these magnets to be energized and the differentials controlled thereby to be stopped.

The setting of the amount differentials in the manner described causes the gear segments 756 (Figs. 11, 12 and 13) to be positioned differentially, which, in turn, position the amount punch-setting mechanism and the printing wheels, so that the punches when operated shall punch the group of holes required by the data, and the printing wheels shall print numbers corresponding to the positions required.

The circuit for the bank M, which controls the units punching and printing devices, is as follows: From the positive side of the line, to the switch C—S, (Figs. 68$i$, 68$h$) to the point 530, (Fig. 68$g$) to the contact plate 110 through movable contact 101, to the contact 1—0, through conductor $a$ (Figs. 68$g$, 68$d$, 68$a$, 68$b$, 68$c$) for this bank to switch 981 (now closed) back through the other side of the conductor $a$ (Figs. 68$c$, 68$b$, 68$a$) to contact a for 0 of switch 951, through movable contact 960, to contact d, for 0 of this switch, through conductor d (Figs. 68a, 68d, 68g) of the group of conductors for this bank, to contact r–0, through movable contact 102, to contact plate 111 to magnet 84 for this bank, to the negative side of the line.

The actuator for bank N moves in unison with the actuators for the totalizer group shafts. It will stop when its contacts reach the 0 contacts and set the tens recording punching and printing devices accordingly. The circuit is from the positive side of the line, through the switch G—S (Fig. 68i) directly through the magnet 84 for bank N, conductor 988 (Figs. 68i, 68f, 68c) to switch 983 (now closed), back through conductor 999 (Figs. 68c, 68f, 68i) to the contact plate 111, through movable contact 102 to the contact r—0, to the contact 0 of switch 950, through movable contact 957 to contact ring 954 of this switch through conductor 989 (Figs. 68i, 68f, 68c, 68b, 68a) to switch 971, conductor 988 (Figs. 68a, 68b, 68c) to switch 982 (now closed), to the negative side of the line.

These parts of the machine are thus stopped so as to cause the record-making devices, both the punches and the printing elements, to record the data corresponding to the totalizer 00, and to also make a record, both punched and printed, designating this as the totalizer cleared.

It will be noticed that while the group of conductors a, b, c, d, e, leading from the group bank G—0 (Fig. 68c) are connected to the several contacts 1776, 1777, 1778, 1779, and 1780 of master-switch M—S, (Fig. 68e) by the contacts 1786, 1787, 1788, 1789 and 1790 respectively when this group is active current does not actually pass through these contacts, but goes directly to switch 949. With all other groups, the current passes to and through the several contacts 1776, 1777, 1778, 1779, and 1780, and 1786, 1787, 1788, 1789 and 1790 depending upon the conductors in use, and thence to the conductors a, b, c, d, e, leading to switch 949. In other words the contacts 1776, 1777, 1778, 1779, and 1780 connect together all of the group sets of conductors a, b, c, d, e, to the conductors a, b, c, d, e, leading to switch 949.

Therefore, to illustrate further, the circuits for another totalizer, 48 for instance, will be traced. Totalizer No. 48 is the eight totalizer in group four. The movable elements of the switches 947 and 948 (Fig. 68ª) will be this time moved to a position where they will complete the circuit between the contacts 4 and the ring contacts 954, of the respective switches and the movable contact of the switch 949 (Fig. 68c) will be in the position where it will close the circuit between the contacts c and e, that is, at the place marked 8 in the diagram. The circuit will be from the positive side of the line, through switch G—S. (Fig. 68i) conductor 535 (Figs. 68f, 68c), switch 984, conductor 535, (Figs. 68c, 68b, 68a), contact plate 954 of switch 947, movable contact 957 contact 4 of this switch, through conductor k, (Figs. 68a, 68d, 68g, 68h, 68i, 68f), to the point 530 of the group G—4, through the contact plate 110, contact l—8, conductor c, (Figs. 68f, 68e), contact 1788 for this line to the contact plate 1778, of switch M—S, left-hand contact 1788 through conductor c (Figs. 68e, 68f, 68c) leading to switch 949, to contact c where it combines with e through movable contact 960 of this switch at point 8, through conductor e (Figs. 68c, 68f, 68e) to contact 1780 of switch M—S, through conductor e (Figs. 68e, 68f) to contact r—8 for bank of group G—4, through movable contact 102, to plate 111 through the magnet 84 for this bank, through the conductor u (Figs. 68f, 68i, 68h, 68g, 68d, 68a) to the contact 4 of the switch 948, through movable contact 957 of this switch, to the ring contact 954, through the switch 971, conductor 988 (Figs. 68a, 68b, 68c) through the switch 982 (now closed), to the negative side of the line.

The circuit through bank M will be identical with that before described for this bank when setting forth the circuits established when totalizer 0 of group G—0 was cleared. The bank will stop when its contacts reach the fixed contacts l—8, r—8, at which time current will pass and its magnet 84 will be energized and the circuit through the bank N will be identical with that heretofore described for this bank, when setting forth the circuits established when totalizer 0 of group G—0 was cleared, except that current will not pass until the movable contact reaches the fixed contact r—4, the magnet 84 will then be energized.

At the end of the cycle when the last totalizer has been cleared, this totalizer is in its selected position, and likewise the racks are in their moved positions; the totalizers have just been moved to their disengaged positions, and the racks are ready to start on their return movement; in fact, the lowest denominational rack has already moved one step. When changing from totaling to adding the effect of the movement of the cams 710 and 711 (Fig. 30) by the manual shaft is to bring the totalizers into engaging position. The result of this would be that during the first adding cycle the returning racks would add an amount in the totalizer that was last cleared. To avoid this an idle cycle is added at the end of the totaling operations, with the effect that all of the totalizers will be in their home positions, and the returning racks will have no effect whatever thereon. Since there are altogether 100 totalizers, 101 cycles become necessary to complete the clearing operations.

The control system employs two switches, one to select the group of totalizers and the other to select the totalizer from the groups. For a machine having ten groups of ten totalizers each (one hundred totalizers), each switch requires ten positions, and the totalizer selecting switch must go through ten changes of position for each change of the group switch. However, since the machine requires 101 cycles to clear, the switch system must also have at least 101 movements. But the switches cannot be brought to home position by 101 movements, they require at least 110 movements. Thus while parts of the machine could be brought to home position by 101 cycles, it is necessary because of the switches to cause the entire mechanism pass through at least 110 cycles.

Should we add an additional position to the grouping switch 950, giving it eleven positions, and use ten positions with the totalizer selecting switch, the machine would clear, and then make ten extra cycles. The first extra cycle would bring all totalizers to their home or blank positions, and the other nine would simply bring the switch 951 to its home position, the machine rotating idly during the other nine rotations. But the recording devices, both perforators and printers would record zeros in each of the last ten positions.

If, however, we add an additional position to the totalizer selecting switch (switch 951), this also will bring the total number of positions controlled by the switches to 110, there then being ten grouping positions of eleven selecting positions each. But in this case there will be an extra cycle after each ten effective cycles. This is the arrangement that has been here adopted. This has the advantage of causing the recording devices to perforate and print zeros after the clearing of each ten totalizers thus separating the record into ten groups, as appears in Fig. 2a.

Switch 951 (Fig. 68a) in its eleventh position has a special pair of 0 contacts. These are used to control bank M. If this bank were left uncontrolled during the idle operations, it would at once move to its extreme position, shift masterswitch M—S, and disarrange the circuits. The contacts d and a in this eleventh position stop the actuator for this bank at the 0 position and prevent this.

At every eleventh position the amount recording devices both perforate and print zeros. In the columns representing the numbers of the totalizers both columns are perforated and 0 is printed in the units column, but no character is printed in the group column. The 0 is omitted from the group column as a means merely to distinguish this from positions which really represent totalizers.

Attention is now directed to certain other switches. Of these, G—S (Fig. 68i) controls the circuit leading to the group actuator banks and bank N. This switch is mounted on the frame 5 (Figs. 19 and 21) and is actuated by an arm 985 having a cam roll 986, and is shifted by cam 987 fixed on the shaft 14, which transmits motion to the shaft actuators. The switch is thus closed and opened once for each cycle of the machine.

Another switch, A—S, controls the magnets 84 of the amount banks. This is mounted on the base of the machine (Figs. 30 and 40) and is actuated by an arm 990 which in turn is operated by a lever 991, pivoted on the shaft 650, and driven by cam 992 on the main shaft 10. This switch also is thus closed and opened once for each cycle of the machine.

A third switch, C—S (Figs. 30 and 41), controls the magnet 84 of the bank M, and is actuated by a lever 993 pivoted on the shaft 650, which in turn is driven by cam 811. This switch also is opened and closed once for each cycle.

Figure 48:
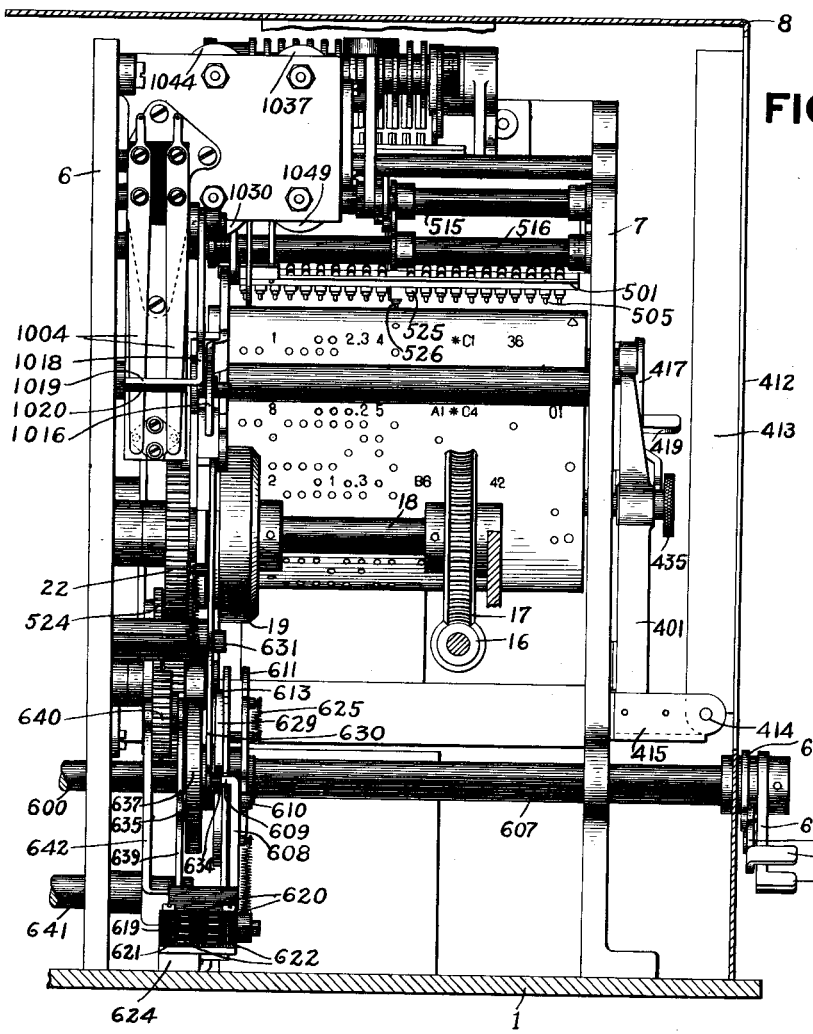
Fig. 48 is a side elevation of the analyzing and record producing mechanism, with the driving motor removed.
Figure 49:
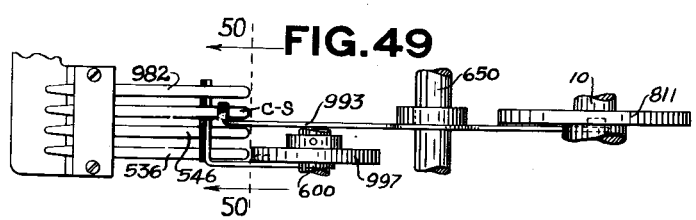
Fig. 49 is a plan view of certain of the contact switches controlled by the manual adjusting devices.
Figure 50:
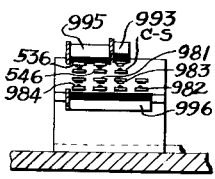
Fig. 50 is an end view of the switches and actuating mechanism shown in Fig. 49.

Other switches 619, 620, 621 and 622, and 536, 546, 981, 982, 983 and 984 (Fig. 68c), are under the control of the manual shaft 600. The first group 619, 620, 621, and 622, inclusive, are shown in Figs. 48 and 52, and the mechanical connections thereof have already been described. The other group, 536, 546, 981, 982, 983 and 984, are all mounted adjacent the mechanical selecting switches (Fig. 30), and are shown more in detail in Figs. 42, 49 and 50. Of these switches, 536 and 546 are arranged together in one plane, and 981, 982, 983 and 984 are arranged in another plane (Figs. 42 and 50). The first two are actuated by an arm 995, and the second group by an arm 996 of the lever pivoted on shaft 641 and actuated by a cam 997 fast on shaft 600. The adjustment is such that contacts 536 and 546 are closed during adding operations and open during totalizing operations, while 981, 982, 983 and 984 are open during adding operations and closed during totaling.

SUMMARY RECORD ANALYZING MACHINE.

The machine as adjusted to perform the third function, namely, that of compiling data from a plurality of summary records, will now be considered. The machine is adjusted with the analyzers operating, and with the record making devices disconnected, just as when analyzing detail records.

When compiling data from such records, the machine is organized somewhat differently from what it is when analyzing detail records. The difference is in the method of selecting the totalizers into which the data is to be entered. In summary records it will be remembered the data has been embodied therein by clearing the totalizers in regular order. In analyzing such records the records will of course be run through in the reverse order. In order to add the data of a plurality of such records, it is only necessary to run them through the machine one after the other. Only two sets of totalizer analyzing contacts are necessary, one for the groups and one for the individuals of the groups. The analyzers for picking out the amounts are identical with those used in analyzing detail records. In practice, a special analyzer 525 (Figs. 6, 48 and 68d) is provided to select the tens or groups, but the units or individual totalizers are selected by one of the analyzing sets 505. Any one may be used for this purpose, but as here shown, the one next to the special contact bank 525 is employed, that is the set normally connected to group set G—9 (Fig. 48).

In order that one of the analyzing contact sets 505 may be used to control all of the totalizer groups from G—0 to G—9, it is necessary to so arrange the circuits that current may pass to any one of the ten groups: To permit this, the master switch M—S is employed just as in the clearing or totalizing operation to connect in multiple all of the control circuits which lead to the group bank contacts G—0 to G—9, inclusive, that is, the lines $a$ (Fig. 68e) which lead to all of these contacts are grouped together by the contact plate 1776 of the master switch; all of the lines $b$ are connected by the plate 1777, all of the lines $c$ by the plate 1778, all of the lines $d$, by the plate 1779, and all of the lines $e$, by the plate 1780.

It will be noticed that the tens row of perforations, the row with which the contacts 525 co-operate, is in the space which is left blank in the detail record. This group of contacts like all of the other groups of the analyzer, are always in operative position, but when compiling from a detail record the contacts have no effect upon the bank M because the record where these contacts operate is unperforated, and the circuit is therefore never closed, but in the summary record, this group of contacts coacts with the perforations arranged in this row.

As heretofore explained, associated with the bank M is a supplemental or auxiliary bank of contacts 812, (Figs. 16 and 68g) identical in number and construction with all of the other banks in the machine. Co-operating therewith are sliding contacts 101 and 102 actuated by the gear segment 791, which is positioned by the beam 795 and link 796 in conjunction with the beam actuator 797. Contacts 101 and 102 mounted on the gear segment 791, are thus set in a position identical with that of contacts 101, 102, on the differential element 62 of the bank M. The conductors $g, h, i, j, k, l, m, n, o$ and $p$, which connect the group sets to the positive side of the line, and the conductors $q, r, s, t, u, v, w, x, y$ and $z$, which connect the group sets to the negative side of the line, are connected to this special bank of contacts 812, and the movable contacts 101 and 102 thereof operate to connect the group sets one at a time in circuit. The ordinary connection is at this time broken at the switch M—S. The result is that only that group magnet 84 can be energized whose circuit is closed through the contact bank 812. This switch therefore performs the same function in adding summary records that the mechanical switches 947 and 948 perform when making a summary record; that is, it picks out the group to be operated.

No further extended description of the operation seems necessary; the amount analyzer contacts control the positions of the amount racks just as they do when compiling data from a detail record. As the summary record is fed through the machine step by step, the analyzers come down, the amount racks are set, and the special contacts 525, and the contacts 505 select the group of totalizers and the particular totalizer of the group.

Assuming some particular totalizer as being selected, for instance No. 37, the action would be as follows: The amount racks would be positioned by control from the perforations, just as in analyzing detail records bank M, under the control of analyzer contacts 525, is positioned as required by the perforations coacting at that particular time with these contacts, and bank M, in turn positions the contacts of the supplemental bank 812, thus selecting or determining the group from which the totalizer is to be selected. The circuits would be from the positive side of the line through switch C—S, (Figs. 68i, 68h) to the point 530, (Fig. 68g) to contact plate 110 through movable contact 101, to contact $l$—3, conductor $a$, (Figs. 68g, 68d, 68a) to contact I of analyzer 525, (Fig. 68d) through stationary contact plate 508, to contact II, through conductor $b$, (Figs. 68a, 68d, 68g,) to bank contact $r$—3, through movable contact 102 to fixed contact 111, through magnet 84 to point 532, to the negative side of the line. Magnet 84 would thus be operated to stop the differential of bank M at the 3 position. This, in turn, will position movable contacts 101 and 102 of the supplemental bank 812 so that it also will stop at position 3. This will complete the circuit for the group differential as follows: From the positive side of the line, through the switch G—S, (Fig. 68i) through conductor 535 (Figs. 68f, 68c) switch 536 conductor 537, (Figs. 68c, 68b, 68a, 68d, 68g) to contact 111 of bank 812, through movable contact 102 of this bank to bank contact $r$—3, through conductor $j$ (Figs. 68g, 68h, 68i, 68f) to the point 530 to contact 110 of group set G—3, (Fig. 68c) through movable contact 101, to contact $l$—7 through conductor $b$ (Figs. 68c, 68f, 68e) for this group contact 1787 for this line, to contact plate 1777 of master switch M—S, contact 1787 for conductor $b$ (Figs. 68e, 68d) leading to analyzer contact II of set 505 next adjacent the special contact set 525, to contact plate 508, through conductor e (Figs. 68d, 68e) to contact 1790 of this line, contact plate 1780 of master switch M—S, contact 1790 for conductor e, (Figs 68e, 68f, 68c) leading to group set G—3, to contact r—7 of this bank, through movable contact 102 to fixed contact 111, through magnet 84 for this set, through conductor t, (Figs. 68f, 68i, 68h, 68g) to contact L—3 of bank 812, through movable contact 101, to fixed contact 110, through conductor 545, (Figs. 68g, 68d, 68a, 68b, 68c) switch 546, to the negative side of the circuit. Magnet 84 for this group will thus be operated, and the movable contacts stopped at the point where they connect the contacts l—7 r—7. This will cause totalizer No. 7 of this particular group to be positioned over the amount actuating racks, and totalizer No. 37 shall have been selected.

What is true with this particular selection is true of every other totalizer. The circuits to the others are obvious, and no further amplification of this matter is therefore deemed necessary.

GRAND SUMMARY RECORD PRODUCING MACHINE.

The fourth function which the machine is adapted to perform is that of producing a grand summary record; that is, a record of all of the totalizers of the machine after a plurality of summary records have been compiled thereby.

When producing such a record the machine is adjusted and functions just as it does when producing the summary record itself. In fact, there is no structural difference between the summary record and the grand summary record, and one cannot be distinguished from the other, except by the amounts which may be represented by the perforations or the printed data thereon. Inasmuch as the operation is the same as in the production of the summary record, and the machine functions in exactly the same way, a description thereof while thus operating would be a mere repetition of the description of the construction and operation when totalizing; no further reference therefore to this phase of the machine is necessary.

GENERAL CONTROLS.

The machine is provided with various switches, magnets and circuits which serve to control its operations. More particularly, they force the operator to proceed in a predetermined manner, in order that the machine may be properly started either during adding or clearing operations; and cause the machine to stop either at the end of some particular operation, or upon some abnormal condition arising, as by the breaking of the paper, etc. These devices will now be described (Figs. 52, 53 and 68a to i).

The machine is driven by an electric motor 15 which receives current from some external source, but the magnets which operate the various parts of the machine derive current from a motor generator M—G, which likewise takes current from some external source, but provides current of the proper potential for this purpose. Both the motor 15 which drives the machine and the motor M of the motor generator set are provided with switches which are under the control of various devices intended to compel the closing or opening of the motor circuits in a particular order or under special circumstances. As in all machines of this class, it is essential that the main driving motor start and stop with the parts in a certain definite order. Provision is therefore made for closing this circuit in a particular manner and for opening it at a particular point in the cycle of the machine. It is also essential that the motor generator be energized and that other adjustments of the machine be normal before the main driving motor is energized.

The machine is started by the push button or key 1000 heretofore described. The circuit to the motor M of the motor generator set is controlled by a switch 1001 which is closed by a hand lever 1002. This lever, when closed, and when the machine is delivering current in the intended manner, is held closed by a holding magnet 1003.

Current to the main driving motor 15 is controlled by a main switch 1004. The starting key 1000 is used to close this switch. The key does not operate the switch directly, but is controlled by devices which require a predetermined condition of the structure and of the circuits before the switch can be closed.

The key 1000 is mounted upon a stem 1005, having a guide slot 1006 running over a pin 1007, and has its lower end pivotally secured to lever 565, heretofore described. This lever is rigidly secured to the shaft 516; and another lever 1009 is likewise rigidly connected to the shaft, so as to be actuated directly by the starting button or key. This last mentioned lever carries a somewhat elongated pin 1010, which, it will be noticed, extends through the lever so that it may be engaged on either side of the lever 1009 (Fig. 6). A spring 1011 having one end secured to the key stem and the other to the frame work of the machine tends to restore the starting key to its normal position.

The closing of the starting switch 1004 is effected by means of the lever 1012, pivoted upon a shaft 1013. This lever has an extension 1014, which normally rests against the short end of the pin 1010; the lever therefore cannot be raised until after the pin 1010 has been moved away. The lever 1012 is further provided with a notch 1015, which coacts with other parts to be described. The end of the lever 1012 is also provided with a cam shaped hook 1016, by means of which the switch 1004 is directly actuated. A spring 1017, having one end attached to the lever and the other to the frame work of the machine, tends to lift the lever. The lever 633, heretofore described, which controls the main motor clutch is also mounted on this lever; so that as the lever rises under the influence of its spring 1017, it carries with it this lever 633, thereby unlocking the clutch and permitting the machine to start.

The switch 1004 consists of two movable contacts and a stationary contact (Fig. 48), the latter serving to electrically connect the movable elements. A lever 1018 (Figs. 47, 48 and 53) having an extension 1019, upon which is mounted an insulating face 1020, serves to depress the movable elements of the switch. This lever carries a pin or roll 1021, (Fig. 52), which is adapted to be engaged by the cam shaped hook 1016 of the lever 1012. As the latter rises, the hook 1016, acting upon the pin or roll 1021, brings the movable contacts of the switch into engagement with the fixed contact.

Mounted upon the shaft 1013, adjacent the lever 1012, is another lever 1022, here shown, as a bell crank lever. One end of this lever is provided with a cam roll which enters a raceway 1023 in the cam 1024 cut in the gear 22, while the other end has a slot 1025, which, under certain circumstances, registers with the notch 1015 in the lever 1012. (Figs. 52 and 65.)

A pin 1026 projects through the notch 1015 and slot 1025 and locks the levers 1012 and 1022 together. But the pin 1026 may be moved radially to disengage these parts. To this end, the pin is movably connected with a lever 1027, pivoted at 1028, and having attached thereto an armature 1029, which is under the control of a magnet 1030. A spring 1031 having one end attached to the lever 1027 by means of a pin 1032, and the other end attached to a rod 1033, tends to draw the armature away from the magnet and cause the locking pin 1026 to engage the notch 1015 and slot 1025, respectively.

The starting button 1000 is normally locked by means of a hook 1034 against displacement. This hook is pivoted at 1035, and has secured thereto an armature 1036 which is actuated by a magnet 1037. A spring 1038, having one end attached to the armature at a point 1039, and its other end attached to the rod 1033, tends to keep the hook 1034 normally in the path of the pin 1010. As long as the parts maintain this position, the key 1000 cannot be depressed, but if the magnet 1037 is energized it will draw up its armature, withdraw the hook, and permit the key to be depressed.

A second hook 1041, likewise adapted to cooperate with the pin 1010, is used to prevent the starting of the machine when adjusted for totalizing operations until all of the parts are in proper working order. This hook is pivoted at a point 1042, (Fig. 53) and likewise has attached thereto an armature 1043, arranged to be acted upon by magnet 1044. A spring 1045, attached to the armature at a point 1046, and with the other end secured to the rod 1033, tends to withdraw the armature from the magnet, and to retain the hook normally out of the path of the pin 1010.

Attention is now directed to another controlling switch 1047, (Fig. 52) which is used to prevent the starting of the machine unless the parts are properly arranged, and to stop the machine under certain abnormal conditions. The switch is actuated by an armature lever 1048, under the influence of a magnet 1049, the circuit of which will be hereafter described.

Another switch 1050 (Fig. 22) is used to stop the machine at the end of an analyzing operation. The switch is placed in the path of one of the actuator racks, and is operated by means of a lever 1051. The circuit for this switch will also be hereinafter described.

Another switch 1052 (Figs. 6 and 52) is used to effect control under certain special conditions. It is arranged adjacent the analyzing mechanism, and is actuated by a post 1053 on the arm or lever 557 loose on the shaft 516. This lever, in turn is actuated by the arm 558 attached to the shaft 418 of the latch 417, so that the switch is closed whenever the latch is locked and open whenever the latch is unlocked.

Stil another switch 1054, operated by an arm 1055 fast on shaft 516 which is actuated by the starting button 1000, is shown arranged in the circuit of magnet 1030.

As the starting key 1000 is depressed it oscillates the shaft 516, and with it the arm 1055, thereby closing the switch 1054. When the key rises, the shaft 516 is rotated reversely and the arm 1055 causes the contacts of switch 1054 to open.

Current from the generator side G of the motor generator is used to energize the various controlling magnets including the magnet 1003, which operates the switch for the motor side of the motor generator set itself. The armature 1002 is to be depressed by hand to close the switch 1001 of the motor of the motor generator set, and the armature is to be held down by magnet 1003 through which current from the generator side of the motor generator set flows. Therefore, unless current passes through the magnet 1003, the circuit for the motor part of the motor generator will not maintain itself. Certain switches are arranged in series with the magnet 1003 all of which must be closed before current can pass therethrough.

Two conditions are to be considered, one where the machine is to be used for analyzing either detail or summary records, and the other where it is used as a totalizing or record producing machine. These conditions will be considered in the order given.

When used as an analyzing machine, the switches in series with the magnet circuit 1003 are those numbered 622, 1047 and 1050. Of these, 622 is controlled by the manual shaft, 600, and the actuator therefor is so arranged that in the analyzing position this switch is closed, while in the totalizing position it is open (Fig. 53). Switch 1047 is under the control of magnet 1049, which, in turn, is controlled by the contacts 568, 569. If an attempt is made to start the machine without having a record in position, the contacts 568, 569 will be in contact and as soon as the generator of the motor generator set begins to deliver current the magnet 1049 will be energized by current which passes from the positive side of the line, through this magnet, through the contacts 568, 569, to the negative side of the line, thereby immediately energizing the magnet and breaking the contacts of the switch 1047. This will immediately release the armature 1002, thereby opening the switch for the motor of the motor generator set. The failure of the circuit to remain energized is therefore an indication that no record has been put in position. In the same manner, should the record be ruptured while running through the machine, these contacts will come together, thereby energizing the magnet 1049 and stopping the motor of the motor generator set. The third switch 1050 (Fig. 22) is under the control of the units actuating rack and is opened by this rack coming into physical contact with the lever 1051 whenever the rack is permitted to go to its maximum position. This happens whenever the analysis of a record is complete and the analyzer comes down upon a blank space; no circuits being then formed, all of the racks will go to their extreme positions. The units rack is selected as a means for actuating this element, because this rack will normally have started upon its return movement before the machine comes to its home position, while the higher denomination racks do not return until the beginning of the succeeding operation.

The starting button 1000 is normally locked against depression by the hook 1034, which is under the control of the magnet 1037, which in turn is energized by current from the motor generator. The magnet 1037 is, however, in circuit with certain other controlling devices, all of which must be closed before current can be passed therethrough. These are the switch 621, the switch 1052, and the special contacts 526, 548. Of these switch 621 is under the control of the manual shaft 600 through lever 615 (Fig. 53) and is closed when the machine is adjusted for analyzing and is open when the machine is adjusted for totalizing or producing a record. Switch 1052 is under the control of the mechanism which locks the record carriage in position; as the carriage is locked the contacts forming this switch are closed so that current passes therethrough; if the carriage is not properly locked in place, these contacts will remain open. The contacts 526, 548 have heretofore been referred to, and are used in conjunction with the special row of perforations with which both the detail and the summary records are provided. The circuit for the starting magnet 1037 is therefore from the positive side of the line through the switch contacts 1052, (Fig. 68b) through magnet 1037, conductor 1060, switch 621, (Fig. 68c) control contacts 526, 548, (Fig. 68b) to the negative side of the line. If any of these switches or contacts are open, no current will pass through the magnet 1037, the hook 1034 will remain in position, and the key cannot be depressed. However, if the machine is properly adjusted and switch 621 therefore closed; and if the carriage is properly locked in position and the switch contacts 1052 therefore closed; and if a record is properly in position so that one of the contacts 526, 548, completes the circuit at this point, current will pass through the magnet 1037, the magnet will be energized, the hook 1034 will be withdrawn and the starting key 1000 may be depressed.

However, even assuming the circuits are properly made as described, the machine will not yet start until magnet 1030 shall have been energized. This magnet controls the locking pin 1026, which locks together the levers 1012 and 1022. The magnet 1030 has in circuit therewith a switch 1054 controlled by arm 1055, which in turn is controlled by the starting button 1000. As the starting button is depressed the arm 1055 causes the contacts 1054 to be closed, and current then passes from the positive side of the line, through the magnet 1030, (Fig. 68b) and through the switch contacts 1054 to where it joins the circuit through the switches 1047, 1050 and 622, to the negative side of the line. This energizes the magnet 1030, which thereupon attracts its armature 1029, withdraws the locking pin 1026, and permits the arm 1012 to rise under the influence of its spring 1017, thereby closing the circuit of the main motor 15. This motor thereupon starts and the machine begins to pass through the several cycles required by the analysis of the record.

Should the machine continue in operation until the analysis is complete, the analyzer as a whole will eventually come down upon an unperforated portion of the record, the actuating racks will be then uncontrolled and will go to their extreme positions, the units rack will actuate the lever 1051 and open the switch 1050, thereby deenergizing the motor generator and the magnet 1030 and bring the machine to a stop, as before.

Should the paper break, contacts 568, 569 will come together and stop the machine by de-energizing the motor generator, as described above, and the magnet 1030, whereupon the locking pin 1026 locks the levers 1012 and 1022 together as soon as the slots in these respective parts come into register and the machine is brought to a stop.

When the machine is adjusted as a totalizing machine, the actuation of the manual shaft 600 opens switch contacts 621, 622, and closes switch contacts 619, 620, (Figs. 48 and 53). When operating to totalize, the machine is stopped by means of the switch 968 actuated by the cam 966, which becomes effective to break the circuit after all of the totalizers have been cleared. The circuit which unlocks the starting button is from the positive side of the line, the switch 1052, (Fig. 68$^b$) magnet 1037, conductor 1060, switch contacts 620 (now closed) to the negative side of the line. At the same time, current flows in parallel from the positive side of the line, through the magnet 1030, (Fig. 68$b$) through the switch contacts 1054, to where it joins the current through contacts 1047, (Fig. 68$c$) switch contacts 968 (Fig. 68$b$), conductor 1060, switch 620 to the negative side of the line. This energizes magnet 1030 and withdraws the locking pin 1026 so as to permit the lever 1012 to rise and close the circuit to the main motor.

Means is also provided for preventing the starting of the machine when totalizing unless the same has been provided with blank record material. This consists of an arm 1041 controlled by magnet 1044. The current for this magnet flows from the positive side of the line through the contact switch 1052 (Fig. 68$b$) through magnet 1044, to switch contact 619 (Fig. 68$c$), through contacts 526, 548 (Fig. 68$b$), to the negative side of the line. The magnet will be thus energized and the hook 1041 thrown in the path of the pin 1010 so that the starting button 1000 can not be depressed. If, however, record material is in position, the contacts 526, 548, are broken, therefore the magnet 1044 can not be energized and the starting key can be depressed.

When operating as to totalize, the machine is normally stopped by the opening of the contact switch 968 at the end of the totaling operation. Cam 966 is so constructed and timed that at the end of the totaling operation it will become effective to break this circuit.

Assuming the operator desires to analyze either a detail or a summary record, the record is inserted into the machine and adjusted until the left hand contact 526 (Fig. 68$b$) makes circuit with the contact 548. The carriage locking devices are then brought to position and in so doing the contacts 1052 are closed. The operator then depresses lever 1002 (Fig. 68$g$), thereby closing switch contacts 1001 and energizing the motor of the motor generator set. If the parts are in the positions intended, current will then flow from the positive side of the generator, through the magnet 1003 (Fig. 68$g$), through (Figs. 68$h$, 68$i$, 68$f$, 68$c$) to switch contacts 1047 (Fig. 68$c$), switch contacts 1050 (Fig. 68$b$), and manual switch contact 622 (Fig. 68$c$), thereby holding the magnet 1003 energized. Current will also flow from the positive side of the line, through the contacts 1052 (Fig. 68$b$), through magnet 1037, conductor 1060 through manual switch contacts 621, (Fig. 68$c$) through contacts 526, 548, (Fig. 68$b$) to the negative side of the line, thereby energizing magnet 1037, and thus unlocking the starting button 1000. As the button 1000 is depressed, it closes contacts 1054, and current flows from the positive side of the line, through magnet 1030, through switch contacts 1054, through contacts 1047, (Fig. 68$c$) 1050 (68$b$) and 622, (Fig. 68$c$) to the negative side of the line, thereby energizing magnet 1030, which thereupon withdraws the locking pin 1026, permitting the arm 1012 to rise, thereby closing the main motor switch contacts 1004, and the motor begins to run. Should no paper be in the machine, contacts 568, 569, come together, the magnet 1049 is energized, switch 1047 is opened and the motor generator circuit is broken.

Should the record be in the machine and be improperly placed, so that contacts 526 and 548 do not come together, no current can pass through the magnet 1037 and the starting key cannot be depressed.

Should an attempt be made to start the machine without locking the carriage in place, the switch contacts 1052 will be separated and no current will pass through magnet 1037, and the starting key cannot be depressed.

As the key 1000 is depressed, it causes the pin 566 (Fig. 52) to engage the lever 553, and thereby raise the contact 526 from off the contact 548 and break the circuit through the magnet 1037. The hook is then retracted but this will not prevent depression of the button, for by this time the pin 1010 is beneath the hook. When the analysis of the record shall have been completed, the next movement of the record strip will bring an unperforated section of the record beneath the analyzer. As the analyzer is depressed none of its contacts will make circuit, all of the actuator racks will then make their maximum movements and one of them, in this case the units rack, will strike the lever 1051 and open the contacts of switch 1050. This will de-energize magnet 1003 and stop the motor generator set; it will also de-energize magnet 1030, and the pin 1026 will be thrown into position to lock together the levers 1012 and 1022 as soon as the slots in these elements register, which they do once during each cycle of the machine, the lever 1012 will thereby be lowered and the contacts of the switch 1004 will open, thereby stopping the main motor.

When the machine is being operated as a totalizer, that is, to produce a summary or a grand summary record, it is started in the same manner as when operated as an analyzer, but when the record has been completed, it is brought to a stop by means of the switch 968 instead of by the switch 1050. The opening of the switch 968 de-energizes magnets 1003 and 1030, thereby stopping both the motor generator and the main motor of the machine.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of groups of totalizers, means for feeding a control record, means controlled by the record for automatically selecting a plurality of totalizers one from each of any two or more groups, and means for actuating the selected totalizers.

2. In a machine of the class described, the combination of groups of totalizers, feeding means for a control record, means for automatically and concurrently selecting totalizers one from each of any two or more groups, and means for automatically actuating the selected totalizers.

3. In a machine of the class described, the combination of groups of totalizers, a control record, feeding means therefor, record controlled means for simultaneously selecting totalizers one from each of any two or more groups, and means for actuating the selected totalizers.

4. In a machine of the class described, the combination of groups of totalizers, means for feeding a control record, means controlled by the record for simultaneously selecting one totalizer from each of two or more groups, and means for actuating the selected totalizers.

5. In a machine of the class described, the combination of groups of totalizers, means for feeding a control record, an analyzer therefor, means controlled by the analyzer for automatically and simultaneously selecting one totalizer from each of two or more groups, and means for actuating the selected totalizers.

6. In a machine of the class described, the combination of groups of totalizers, means for feeding a control record, means controlled by the record for selecting two or more of the groups, means for selecting a totalizer from each of the selected groups, and means for actuating the selected totalizers.

7. In a machine of the class described, the combination of groups of totalizers, means for feeding a control record, means controlled by the record for selecting any two or more of the groups, means for selecting a totalizer from each of the selected groups, and means for actuating the selected totalizers.

8. In a machine of the class described, the combination of groups of totalizers, means for feeding a control record, automatic analyzing means for selecting any two or more of the groups, means for selecting any totalizer from each of the selected groups, and means for actuating the selected totalizers.

9. In a machine of the class described, the combination of groups of totalizers, a control record, means for feeding the same, record controlled means for selecting any two or more of the groups, means for selecting a totalizer from each of the selected groups, and means for actuating the selected totalizers.

10. In a machine of the kind described, the combination of groups of totalizers, means for feeding a control record, means for selecting any two or more of the groups, automatic means for selecting a totalizer from each of the selected groups, and means for actuating the selected totalizers.

11. In a machine of the class described, the combination of groups of totalizers, means for feeding a control record, means for selecting any two or more of the groups, record controlled automatic means for selecting a totalizer from each of the selected groups, and means for actuating the selected totalizers.

12. In a machine of the class described, the combination of groups of totalizers, means for feeding a control record, record controlled means for selecting any two or more of the groups, record controlled means for selecting a totalizer from each of the selected groups, and means for actuating each of the selected totalizers.

13. In a machine of the class described, the combination of groups of totalizers, a control record, feeding means therefor, record controlled means for automatically selecting any two or more of the groups, record controlled means for automatically selecting a totalizer from each of the selected groups, and automatic means for actuating the selected totalizers.

14. In a machine of the class described, the combination of groups of totalizers, feeding means for a control record, record controlled means for selecting any two or more of the groups, record controlled means for selecting a totalizer from each of the selected groups, and record controlled means for actuating each of the selected totalizers.

15. In a machine of the class described, the combination of groups of totalizers, means for feeding a control record, means for selecting any two or more of the groups, means controlled by the record for selecting a totalizer from each of the selected groups, and differential means for actuating the selected totalizers.

16. In a machine of the class described, the combination of groups of totalizers, means for feeding a control record, means for selecting any two or more of the groups, means for selecting a totalizer from each of the selected groups, and record controlled differential means for actuating the selected totalizers.

17. In a machine of the class described, the combination of groups of totalizers, means for feeding a control record, means for selecting two or more of the groups, differential means for selecting a totalizer from each of the selected groups, and means for actuating the selected totalizers.

18. In a machine of the kind described, the combination of groups of totalizers, means for feeding a control record, means for selecting any two or more of the groups, differential means for selecting a totalizer from each of the selected groups, and means for actuating the selected totalizers.

19. In a machine of the class described, the combination of a plurality of shafts arranged in two series of a plurality each, a series of totalizers on each of the shafts, each comprising a plurality of denominational elements mounted in axial alignment the same denominational elements of all of the totalizers being grouped together, a set of actuators common to the elements of all of the totalizers and located between the two series of totalizer shafts, means for selecting the totalizers to be actuated, means for moving the totalizers and the actuators relative to each other, means for operating the actuators to actuate the totalizers selected, and means for engaging and disengaging the totalizers and actuators.

20. In a machine of the class described, the combination of a main operating mechanism, a plurality of totalizers each comprising a plurality of denominational elements mounted in axial alignment, similar denominational elements of all of the totalizers being grouped together, the totalizers being arranged in a plurality of groups, the corresponding totalizers of the respective groups being arranged in like position, a set of actuators common to the elements of all of the totalizers, record controlled means for selecting the group or groups containing totalizers to be operated by the actuators, record controlled differential means for adjusting the selected groups of totalizers as a whole with respect to the actuators so as to select the totalizer or totalizers to be operated, means for engaging the selected totalizers and actuators, record controlled means for determining the extent of movement of the actuators so as to control the amount entered on the selected totalizers, and means for disengaging the totalizers from the actuators.

21. In a machine of the class described, the combination of a plurality of totalizers arranged in a plurality of groups, the groups being divided into identical sets arranged in parallel relation to each other, actuating devices for the totalizers arranged between the parallel sets, means for selecting the totalizers for operation, means for moving the two parallel sets of totalizers toward the actuators to bring the same into engaging position therewith, and means for operating the actuators.

22. In a machine of the class described, the combination of a plurality of groups of totalizers, each totalizer comprising a plurality of denominational elements mounted in axial alignment, the same denominational elements of all of the totalizers being grouped together, the totalizers being arranged in a plurality of groups, and the groups being divided into two identical sets arranged in parallel relation to each other; a set of actuators common to the elements of all of the totalizers arranged between the parallel sets, means for selecting totalizers for actuation, means for producing a relative movement between the totalizers and the actuators to bring them into co-operative relation with each other, and means for operating the actuators.

23. In a machine of the class described, the combination of a plurality of groups of totalizers each totalizer comprising a plurality of denominational elements mounted in axial alignment, the same denominational elements of all of the totalizers being grouped together, the totalizers being arranged in a plurality of groups, and the groups being divided into two identical sets arranged in parallel relation to each other; a set of actuators common to the elements of all of the totalizers and adapted to be reciprocated between the respective sets and having engaging surfaces upon both edges, means for selecting totalizers from either or both of the sets of totalizers, means for engaging the selected totalizers with the actuators, and means for operating the actuators.

24. In a machine of the class described, the combination of a plurality of groups of totalizers each totalizer comprising a plurality of denominational elements mounted in axial alinement, the same denominational elements of all of the totalizers being grouped together, the totalizers being arranged in a plurality of groups, and the groups being divided into two identical sets arranged in parallel relation each to the other; a set of actuators common to the elements of all of the totalizers and adapted to be reciprocated between the respective sets so as to actuate the totalizers of either or both sets, means for selecting totalizers from either or both sets, means for shifting the selected groups of the respective sets of totalizers laterally with respect to the actuators to properly position the selected totalizers, means for engaging the selected totalizers with the actuators, and means for operating the actuators.

25. In a machine of the class described, the combination of a plurality of groups of totalizers each totalizer comprising a plurality of denominational elements mounted in axial alignment, the similar denominational elements of all of the totalizers being grouped together, the totalizers being arranged in a plurality of groups, and the groups being divided into two identical sets arranged in parallel relation each to the other; a set of actuators common to the elements of all of the totalizers and adapted to be reciprocated between the respective sets so as to actuate the totalizers of either or both sets, means for selecting totalizers from either or both sets, means for differentially shifting the selected groups of totalizers of the respective sets laterally with respect to the actuators to position the selected totalizers with respect to the actuators, the selected groups of one set being shifted in one direction and those of the other set in the opposite direction, means for engaging the selected totalizers with the actuators, means for differentially operating the actuators to enter predetermined amounts upon the selected actuators, and means for disengaging the totalizers and actuators.

26. In a machine of the class described, the combination of an upper group and a lower group of totalizers, actuators therefor arranged to move in a horizontal plane between the two groups of totalizers, means for selecting the totalizers for operation, means for moving the totalizers into engagement one with the upper side of the actuators and the other with the lower side thereof, and means for operating the actuators.

27. In a machine of the class described, the combination of two totalizer supports; a plurality of totalizers carried by each support, each totalizer comprising a set of denominational elements all positioned by denominations on the supports; a single set of actuators for all of said totalizers arranged between the two groups of totalizers and at right angles thereto; a differential mechanism for positioning the totalizers carried by each support, so as to select and position the totalizer to be operated; a shaft carrying the positioning devices; means for oscillating the shaft so as to move one support in one direction and the other in the other direction, and means for operating the actuators.

28. In a machine of the class described, the combination of two shafts, a plurality of totalizers mounted upon each of the two shafts, each totalizer comprising a set of denominational elements, all positioned by denominations on the shafts; a single set of actuators for all of said totalizers arranged between the two groups of totalizers, and at right angles thereto; a differential means for positioning the shaft so as to select the totalizer to be operated by the actuators; a shaft carrying the positioning devices; means for oscillating the shaft and to thereby shift one totalizer shaft in one direction and the other in the other direction; and means for differentially operating the actuators to add the desired data upon the totalizers.

29. In a machine of the class described, the combination of four supports arranged in pairs and in parallel relation to each other; a group of totalizers on each support, each totalizer comprising a set of denominational elements all positioned by denominations on the supports; a single set of actuators for all of the totalizers arranged between the pairs of totalizers and their respective supports, means for selecting the totalizers, means for moving the totalizers to engage the actuators, and means for operating the actuators.

30. In a machine of the class described, the combination of a set of parallel shafts all arranged in the same plane; another set of parallel shafts all arranged in a second plane which plane is parallel to the plane of the first set; totalizers on each of the several shafts, each totalizer comprising a set of denominational elements all positioned by denominations on the shafts; a single set of actuators for all of said totalizers arranged between the planes of the respective groups of shafts and at right angles thereto; means for selecting the group or groups of totalizers desired; means for differentially adjusting the selected shaft or shafts and the totalizers thereon to position the desired totalizer or totalizers for actuation; means for engaging the selected totalizer or totalizers with the actuators; and means for shifting the actuators differentially to enter thereon the desired data.

31. In a machine of the class described, the combination of parallel sets of parallel shafts; totalizers carried by each of the several shafts, each totalizer comprising a set of denominational elements positioned by denominations, actuators for the totalizers arranged between the parallel groups; means for selecting the shaft or shafts carrying the totalizers desired; means for differentially adjusting the selected shafts to position the desired totalizers with respect to the actuators; and means for shifting the actuators differentially to enter thereon the desired data.

32. In a machine of the class described, the combination of parallel sets of parallel groups of totalizers; actuators therefor positioned between the parallel sets of totalizers and at right angles thereto; differentials, one for each of the groups of totalizers, arranged each in line with its group for selecting a totalizer in its group for operation, means for engaging the selected totalizers with the actuators; and differential means for moving the actuators as the data to be entered on the totalizers may require.

33. In a machine of the class described, the combination of parallel groups of parallel shafts; totalizers on each shaft, each totalizer comprising a set of denominational elements all positioned by denominations on the shafts; actuators arranged between the parallel groups of shafts; a differential setting device for each shaft, the setting devices being arranged at one end of the machine in alignment with their respective shafts; means for operating the setting devices once for each cycle of operation of the machine; a differential operating device for moving each of the actuators, each operating device being in alignment with its actuator at one side of the machine; all so combined that the movements of the totalizers and their actuators are at approximately right angles to each other.

34. In a machine of the class described, the combination of parallel groups of parallel shafts; totalizers on each shaft, each totalizer comprising a set of denominational elements all positioned by denominations on the shafts; a single set of actuators for all of the totalizers; means for selecting the totalizer or totalizers for operation; means for moving one group of shafts in one direction and the other group in the opposite direction, means to engage the selected totalizers with the actuators; means for differentially reciprocating the actuators to enter the desired amounts upon the totalizers; locking devices for the totalizers; and means extending between the groups of shafts for operating the locking devices as the totalizers are engaged and disengaged from the actuators.

35. In a machine of the class described, the combination of an accounting element, an oscillatory driving member having a variable extent of movement, contacts mounted on said members, fixed contacts cooperating therewith, an actuator therefor having an invariable extent of movement, a latch for securing the two members together, electromagnetic means for releasing the latch at any desired point and thereby stopping the variable member, whereby the same may be set differentially and circuits for the electromagnets controlled by the contacts.

36. In a machine of the class described, the combination of groups of totalizers, a control record having control points, an analyzer for making electrical contacts as required by the control points of the record, electromagnetic means controlled by the analyzer for selecting any totalizer in any group, and means for actuating the selected totalizer.

37. In a machine of the class described, the combination of groups of totalizers, a control record having totalizer group positions equal in number to the groups of totalizers, an analyzer for interpreting the record, means controlled by the analyzer for selecting any group of totalizers and for selecting any totalizer from the selected group, and means for actuating the totalizer.

38. In a machine of the class described, the combination of groups of totalizers, a control record having control points, an analyzer for making electrical contacts as required by the control points of the record, electro-magnetic means controlled by the analyzer for selecting any totalizer in any group, and means controlled by the record for actuating the selected totalizer.

39. In a machine of the class described, the combination of groups of totalizers, a control record having denominational columns equal in number to the denominations of the totalizers with which the machine is provided and with digit determining perforations in the several columns, and also having totalizer group control columns equal in number to the groups of totalizers with which the machine is provided, and having perforations in the columns which control groups from which totalizers are to be selected; an analyzer for interpreting the record; means controlled by the analyzer for selecting the group or groups from which the totalizer or totalizers are to be selected; means controlled by the analyzer for selecting the desired totalizers from the selected groups; and means controlled by the analyzer for entering upon the denominational elements of the totalizer or totalizers amounts determined by the perforations in the denominational columns of the control record.

40. In a machine of the class described, the combination of groups of totalizers; a control record having on one side denominational columnar positions equal to the number of denominational elements of the totalizers with which the machine is provided, the columns being provided with digit determining perforations, and the record having on the other side controlling columnar positions equal in number to the groups of totalizers with which the machine is provided for determining the group or groups to be selected, the columns which control groups from which totalizers are to be selected being provided with perforations, the record being also provided with an additional column of control perforations; an analyzer for interpreting the record; means controlled by the analyzer for selecting the desired totalizers from the selected groups; means controlled by the analyzer for entering upon the denominational elements of the totalizers amounts determined by the perforations in the denominational positions of the control record; and means actuated by the analyzer coacting with the special control column for controlling the starting of the machine.

41. In a machine of the class described, the combination of groups of totalizers; a control record having on one side a plurality of denominational columnar positions with digit determining perforations in the columns, and having on the other side a plurality of group controlling columnar positions for determining the group or groups to be selected separated from the denominational columnar positions by a space sufficient for two additional columnar positions, the sheet being provided with totalizer selecting perforations in the positions which control the groups from which the totalizers are to be selected, and also provided with perforations in one of the intermediate columnar positions; an analyzer for interpreting the record; means controlled by the analyzer for selecting the desired totalizer from the selected group or groups; means controlled by the analyzer for entering upon the selected totalizers the amounts determined by the perforations in the denominational positions of the control record, and means controlled by the analyzer in connection with the special control column for preventing the starting of the machine when the record is not in proper position.

42. In a machine of the class described, the combination of a plurality of groups of totalizers, each group comprising a series of denominational elements arranged by denominations upon a common shaft, actuators common to all of the totalizers of the respective groups, a perforated control record, means for feeding the record, an analyzer to interpret the record, means controlled by the analyzer and control record for positioning the totalizer or totalizers with respect to the actuators thereby selecting the totalizer or totalizers to be operated, and means controlled by the analyzer and control record for operating the actuators.

43. In a machine of the class described, the combination of a plurality of totalizers, each group comprising a series of denominational elements arranged by denominations upon a common support, actuators therefor, a record having both totalizer selecting and amount determining perforations therein, feeding means for the record, means controlled by the record for selecting the totalizers as required by the perforations in the record, and means also controlled by the record for operating the actuators as required by the amount perforations in the record.

44. In a machine of the class described, the combination of a plurality of totalizers arranged in a plurality of groups, the corresponding totalizers of the respective groups being similarly arranged, a control record having amount determining control perforations and totalizer group selecting positions with control perforations in those positions which control groups from which totalizers are to be selected, an analyzer for interpreting the record, means for feeding the record relative to the analyzer, means controlled by the analyzer for selecting any one or more of the groups in accordance with the group positions which have perforations therein, means controlled by the analyzer for selecting the desired totalizer from each of the selected groups as required by the perforations in the respective group controlling positions, actuators for the selected totalizers, and means controlled by the analyzer for operating the actuators as required by the amount perforations of the record.

45. In a machine of the class described, the combination of an accounting element, a movable control member having a variable extent of movement, a driver therefor having an invariable extent of movement, means for securing the two members together, a perforated control record, means for feeding the record, and means controlled by the perforated record for releasing the securing means at any point as required by the perforations, and thereby stop the member having the variable movement.

46. In a machine of the class described, the combination of a plurality of groups of totalizers, each totalizer comprising a series of denominational elements arranged by denominations upon a common shaft, actuators for the totalizers, a record having both totalizer selecting and amount determining perforations therein, means for feeding the record, an analyzer for interpreting the record, means controlled by the analyzer and record for positioning the totalizer or totalizers with respect to the actuators thereby selecting the totalizer or totalizers for operation, and means controlled by the analyzer and record for operating the totalizers.

47. In a machine of the class described, the combination of a plurality of totalizers arranged in a plurality of groups, the corresponding totalizers of the respective groups being arranged by denominations upon a common shaft, a control record having amount determining control perforations and totalizer group selecting positions with control perforations in those group positions which control groups from which totalizers are to be selected, means for feeding the record, an electric analyzer for interpreting the record, a member having a variable extent of movement for actuating each totalizer shaft, a driver for each member having an invariable extent of movement, locking means for securing the member and driver of each set together, electro-magnetic means for releasing the locking means, an actuator for each denomination of the totalizers, a member having a variable extent of movement for operating each actuator, a driver for each member having an invariable extent of movement, locking means for securing the member and driver of each set together, electro-magnetic means for releasing the locking mechanism, means controlled by the analyzer and record for energizing both sets of electro-magnetic devices, as required by the perforations of the control record.

48. In a machine of the class described, the combination of groups of registers arranged in a definite order, record controlled means for selecting the groups one by one and the registers from the groups, and means for entering data upon the selected registers in the order of their selection.

49. In a machine of the class described, the combination of a plurality of totalizers arranged by groups in a definite order, means for selecting the groups one at a time, means for selecting the totalizers of any group one by one, and means for entering data upon the totalizers as selected.

50. In a machine of the class described, the combination of a plurality of totalizers arranged by groups, means for selecting the groups in a definite order one at a time, means for selecting the totalizers of any group in definite order one by one, and means for entering data upon the totalizers in the order selected.

51. In a machine of the class described, the combination of a plurality of registers arranged by groups, means for selecting the groups one at a time in a predetermined order, means for selecting the registers of any group one by one, and means for entering data upon the registers in the order selected.

52. In a machine of the class described, the combination of a plurality of totalizers arranged by groups, means for selecting the groups one at a time in a predetermined order, means for selecting the totalizers of any group one by one in a predetermined order, and means for entering data upon the totalizers in the order selected.

53. In a machine of the class described, the combination of a plurality of registers arranged by groups, means for automatically selecting the groups one at a time in a predetermined order, means for automatically selecting the registers of the selected groups one by one in a predetermined order, and means for entering data upon the registers in the order selected.

54. In a machine of the class described, the combination of a plurality of totalizers arranged by groups, means for automatically selecting the groups one at a time in a predetermined order, means for automatically selecting the totalizers of the selected groups one by one in a predetermined order, and means for automatically accumulating data upon the totalizers in the order selected.

55. In a machine of the class described, the combination of a plurality of totalizers arranged by groups, record controlled means for selecting the groups one at a time, means for selecting the totalizers one by one in a predetermined order, and means for actuating the totalizers in the order selected.

56. In a machine of the class described, the combination of a plurality of groups of totalizers, record controlled means for selecting the groups one at a time, record controlled means for selecting the totalizers of any group one by one, and means for actuating the totalizers.

57. In a machine of the class described, the combination of a plurality of groups of totalizers, record controlled means for selecting the groups in a predetermined order, record controlled means for selecting the totalizers of any group one by one in a predetermined order, and means for actuating the totalizers in the order selected.

58. In a machine of the class described, the combination of a plurality of groups of totalizers, record controlled means for selecting the groups one at a time in a predetermined order, record controlled means for selecting the totalizers of the groups one by one in a predetermined order, and record controlled means for actuating the totalizers.

59. In a machine of the class described, the combination of a plurality of registers arranged by groups, record controlled means for selecting the groups one by one, record controlled means for selecting the registers of any group one by one, actuators for the registers, and record controlled means for controlling the movement of the actuators.

60. In a machine of the class described, the combination of a plurality of totalizers arranged by groups, means for selecting the groups one at a time in a definite order, means for selecting the totalizers of any group one by one in a definite order, actuators for the denominational elements of the totalizers, and record controlled means for determining the movement of the actuators.

61. In a machine of the class described, the combination of a plurality of totalizers arranged in a definite order, record controlled means for selecting the totalizers one after the other in regular sequence, and record controlled means for actuating the totalizers in the order selected.

62. In a machine of the class described, the combination of a plurality of groups of totalizers, record controlled automatic means for selecting the groups one by one, record controlled automatic means for selecting the totalizers of any group one by one, and automatic means for operating the actuators.

63. In a machine of the class described, the combination of a plurality of totalizers arranged in order, a record controlled means for selecting therefrom groups of totalizers one at a time, record controlled means for selecting totalizers from the groups one by one, and record controlled means for actuating the totalizers in the order selected.

64. In a machine of the class described, the combination of a plurality of totalizers, a control record, means controlled by the record for selecting groups of totalizers, means controlled by the record for selecting totalizers one by one from the groups, and means for actuating the totalizers.

65. In a machine of the class described, the combination of a plurality of registers arranged by groups in a predetermined order, a control record, means actuated by the control record for selecting the groups one by one, means controlled by the record for selecting the totalizers of the groups one by one, and means controlled by the record for actuating the totalizers in the order selected.

66. In a machine of the class described, the combination of a plurality of totalizers arranged by groups, a control record, means controlled by the record for selecting the groups one at a time in a predetermined order, means for selecting the totalizers within a group one by one in a predetermined order, and means controlled by the record for actuating the totalizers in the order given.

67. In a machine of the class described, the combination of a plurality of totalizers arranged by groups, a control record, an analyzer for interpreting the record, means controlled by the analyzer for selecting the groups one at a time, means controlled by the analyzer for selecting the totalizers of any group one by one, and means controlled by the analyzer for actuating the totalizers.

68. In a machine of the class described, the combination of a plurality of registers, a record having amount determining control points, group determining control points and register selecting control points, means controlled by the group control points for selecting groups of registers, means controlled by the totalizer selecting control points for selecting registers from the groups, and means controlled by the amount control points for operating the registers.

69. In a machine of the class described, the combination of a plurality of totalizers arranged by groups, a control record having amount control perforations, group control perforations and totalizer control perforations, means controlled by the group control perforations for selecting the groups of totalizers one by one, means controlled by the totalizer selecting perforations for selecting the totalizers of the groups one by one, means controlled by the amount perforations for operating the totalizers in the order selected.

70. In a machine of the class described, the combination of a plurality of groups of totalizers; a control record having columnar control perforations for actuating the elements of the totalizers, a perforated column of group selecting perforations, and a perforated column of totalizer selecting perforations; means controlled by the group selecting column for selecting the groups of totalizers in a predetermined order; means controlled by the totalizer selecting column for selecting the totalizers in a predetermined order, and means controlled by the perforations in the amount columns for operating the totalizers as they are selected.

71. In a machine of the class described, the combination of a plurality of groups of totalizers; a control record having formed therein amount determining perforations, group determining perforations, and totalizer selecting perforations; an analyzer for interpreting the record; means controlled by the analyzer for selecting the groups of totalizers one by one, means controlled by the analyzer for selecting the totalizers of the groups one by one, and means controlled by the analyzer for entering upon the selected totalizers the amounts indicated by the amount perforations of the record.

72. In a machine of the class described, the combination of a group of registers arranged in line upon a support, means for selecting the registers one by one in any predetermined order, and means for accumulating data upon the registers as they are selected.

73. In a machine of the class described, the combination of a plurality of totalizers arranged upon a common shaft, means for selecting the totalizers one by one in any definite order, and means for accumulating data upon the totalizers as they are selected.

74. In a machine of the class described, the combination of a plurality of totalizers arranged by denominations upon a common shaft, means for selecting the totalizers one by one in any definite order, a set of actuators common to all of the totalizers for accumulating data upon the totalizers one by one as they are selected.

75. In a machine of the class described, the combination of a plurality of registers arranged upon a common support, means for accumulating data thereon, and means for moving the support with the registers and the accumulating means relative to each other by definite steps to select the registers one by one in any definite order for operation by the accumulating means.

76. In a machine of the class described, the combination of a plurality of totalizers arranged upon a common shaft, actuators common to the totalizers for accumulating data thereon, and means for moving the group of totalizers and the actuators with respect to each other by steps to select the totalizers one by one in any definite order, and means for operating the actuators.

77. In a machine of the class described, the combination of a plurality of totalizers arranged upon a common support, actuators common to all of the totalizers for accumulating data thereon, and a differential mechanism for moving the group of totalizers with respect to the actuators by any predetermined steps to select the totalizers one by one in a predetermined order according to said steps, and means for operating the actuators.

78. In a machine of the class described, the combination of a plurality of totalizers arranged upon a shaft, actuators common to all the totalizers, a record controlled differential mechanism for moving the totalizers with respect to the actuators in a definite order to select the totalizers one by one in predetermined order, and record controlled means for operating the actuators.

79. In a machine of the class described, the combination of a plurality of totalizers arranged by denominations upon a shaft, actuators common to all the totalizers, a control record, means controlled by the record for engaging the totalizers with the actuators in definite order, and means controlled by the record for operating the actuators.

80. In a machine of the class described, the combination of a plurality of totalizers arranged upon a shaft, actuators common to the totalizers, a differential mechanism for presenting the totalizers one by one to the actuators, a control record, an electro-magnetic means controlled by the record for determining the order in which the totalizers shall be presented to the actuators, and means for operating the actuators.

81. In a machine of the class described, the combination of a plurality of registers arranged upon a common shaft, actuators common to the registers, a differential mechanism for presenting the registers one by one to the actuators, a driver for the differential, means for latching the differential and the driver together, a control record, means controlled by the record for releasing the latch at predetermined points, thereby determining the order in which the registers are presented to the actuators, and means for operating the actuators.

82. In a machine of the class described, the combination of a plurality of registers arranged upon a common shaft, actuating means common to the registers, a differential mechanism for presenting the registers one by one to the actuating means, a control record having perforations which control the order of the selection of the registers, means controlled by the record for controlling the differential mechanism, and means controlled by the record for operating the actuating means.

83. In a machine of the class described, the combination of a plurality of registers arranged upon a support, actuating means common to all of the registers, a differential mechanism for presenting the registers one by one to the actuating means, a control record having register selecting perforations and amount determining perforations, an analyzer for interpreting the record, means controlled by the analyzer for controlling the differential so that the registers are presented to the actuating means in the order required by the record, and means controlled by the analyzer for operating the actuating means.

84. In a machine of the class described, the combination of a plurality of totalizers arranged upon a common support, actuating means common to the totalizers, a differential mechanism for presenting the totalizers one by one to the actuating means, a control record having both totalizer selecting perforations and amount determining perforations, an analyzer for interpreting the record, electro-magnetic means controlled by the analyzer for positioning the differential mechanism so that the totalizers are presented to the actuating means in the order required by the perforations of the record, and electro-magnetic means controlled by the analyzer for operating the actuating means as required by the amount perforations of the record.

85. In a machine of the class described, the combination of a plurality of totalizers arranged upon a support, actuators common to all of the totalizers, a differential mechanism for presenting the totalizers one by one to the actuators, a driver for the differential, a latch connecting the driver and the differential, an electro-magnet for releasing the latch, a record having totalizer selecting perforations and amount determining perforations therein, an analyzer for interpreting the record, a circuit controlled by the analyzer for energizing the electro-magnet as required by the perforations of the record, and electro-magnetic means also controlled by the analyzer for operating the actuators as required by the amount perforations.

86. In a machine of the class described, the combination of a plurality of totalizers arranged upon a shaft, actuators common to all of the totalizers, a differential mechanism, driving means therefor, a latch for securing the differential and driving means together, means for operating the driving mechanism, an electro-magnet for releasing the latch, a record having totalizer selecting perforations and amount determining perforations therein, a circuit controlling means operating in conjunction with the record for energizing the electro-magnet as required by the totalizer selecting perforations therein, means for operating the actuators, and electro-magnetic means controlled by the amount determining perforations of the record for controlling the operation of the actuators.

87. In a machine of the class described, the combination of a plurality of groups of accounting devices, actuating means common to all of the accounting devices, record controlled means for selecting the groups of accounting devices one by one, and record controlled means for selecting the totalizers of the selected group one by one in definite order.

88. In a machine of the class described, the combination of a plurality of groups of accounting devices, actuating means common to all of the accounting devices, a control record having both group determining perforations and individual accounting devices determining perforations, means controlled by the record for selecting the groups of accounting devices one by one as required by the group perforations of the record, and means controlled by the record for selecting the individual accounting devices as determined by the perforations, and means for operating the actuating means.

89. In a machine of the class described, the combination of a plurality of shafts, a plurality of totalizers upon each shaft, actuators common to all the totalizers, differential mechanisms one for each shaft for engaging the totalizers one by one with the actuators, a control record, means controlled by the record for determining the differential mechanism to be controlled, means also controlled by the record for positioning the differential mechanism so as to select the totalizers one by one in predetermined order, and means for operating the actuators.

90. In a machine of the class described, the combination of a plurality of totalizers arranged by groups upon a plurality of supports, actuators common to all the totalizers, differential mechanisms one for each group of totalizers, a control record having group determining and totalizer selecting perforations therein, means controlled by the record for selecting the differentials in the order required by the group determining perforations, means controlled by the record for positioning the differential of the selected groups so as to select the totalizers as required by the totalizer selecting perforations.

91. In a machine of the class described, the combination of a plurality of shafts, a plurality of totalizers arranged by denominations upon each shaft, a single set of actuators for the totalizers, differential means for positioning the totalizers of the respective groups one at a time with respect to the actuators, a perforated record having group selecting perforations, totalizer selecting perforations, and amount determining perforations therein, electrical means controlled by the group perforations for selecting the groups one by one, electrical means controlled by the totalizer selecting perforations for selecting the totalizers of the selected groups one by one, means for engaging the selected totalizers with the actuators, and means for operating the actuators.

92. In a machine of the class described, the combination of a plurality of groups of registers, actuators therefor, a group selector, a register selector for each group, means for controlling the group selector, means for controlling the register selector, and means for operating the actuators.

93. In a machine of the class described, the combination of a plurality of groups of registers, actuators therefor, a group selector, a register selector for each group, automatic means for controlling the group selector, automatic means for controlling the register selectors, and means for operating the actuators.

94. In a machine of the class described, the combination of two or more groups of accumulating devices, actuating means therefor, a group selector, an accumulator selector for each group, record controlled means for controlling the group selector, record controlled means for controlling the accumulator selectors, and means for operating the actuating means.

95. In a machine of the class described, the combination of two or more groups of totalizers, means for actuating the same, a group selector, a totalizer selector for each group, a control record having group determining perforations and totalizer selecting perforations, means controlled by the group perforations for controlling the operation of the group selector means, means controlled by the totalizer selecting perforations for controlling the operation of the totalizer selectors, and means for operating the actuating means.

96. In a machine of the class described, the combination of groups of totalizers, actuators therefor, a group selector, a totalizer selector for each group, a record having group controlling perforations, totalizer selector perforations and amount determining perforations, an analyzer for interpreting the record, means controlled by the analyzer for controlling the operation of the group selector, means controlled by the analyzer for controlling the totalizer selectors, and means controlled by the analyzer for controlling the operation of the totalizer actuators.

97. In a machine of the class described, the combination of groups of registers, means for actuating the same, a register selector for each group, an electro-magnet for controlling the position of the selector, means for supplying current to the electro-magnet, a group selector for controlling the connections of the electro-magnets with the current supply and thereby controlling the selection of the groups of registers, record controlled means for controlling the group selector, record controlled means for controlling the register selectors, and means for operating the register actuators.

98. In a machine of the class described, the combination of groups of registers, actuating means therefor, a register selector for each group, an electro-magnet for controlling the register selectors, a current supply for the electro-magnets, a group selector controlling the circuits of the electro-magnets and thereby controlling the magnet which shall be energized, a record having group controlling perforations and totalizer selecting perforations, circuit controlling devices coacting with the perforated record for controlling the operation of the group selector, circuit controlling devices for controlling the operation of the electro-magnets of the register selectors, and means for controlling the register actuators.

99. In a machine of the class described, the combination of a plurality of groups of totalizers, actuators therefor, a totalizer selector for each group, a controlling electro-magnet for each totalizer selector, circuits for the magnets arranged in parallel across the source, a group selector for controlling the negative sides of the magnet circuits, an electro-magnet for controlling the group selector, a circuit for this magnet, a perforated record having group controlling perforations and totalizer selecting perforations therein, an electrical analyzer having contacts which cooperate with the group controlling perforations to govern the group controlling magnet so as to cause the group selector to select the group required by the perforations, other electrical contacts coacting with the totalizer selecting perforations for controlling the totalizer selector magnets and thereby controlling the selection of the totalizers as required by the perforations.

100. In a machine of the class described, the combination of a plurality of groups of totalizers, totalizers of each group being arranged by denominations upon a single shaft, a set of actuators equal in number to the denominations of the totalizers, means for automatically adjusting the shafts one at a time with respect to the actuators to select the totalizers one by one, and means for recording the data of the totalizers as they are cleared.

101. In a machine of the class described, the combination of a plurality of registers arranged upon a common support, actuators therefor for restoring them to zero, automatically controlled means for engaging the registers one by one with the actuators, and means for simultaneously producing both a printed and perforated record of the registers as they are returned to zero.

102. In a machine of the class described, the combination of a plurality of totalizers arranged by denominations upon a single shaft, a set of actuators equal in number to the denominations of the totalizers, means for engaging the actuators and totalizers one by one, electro-magnetic means for stopping the various actuators when the denominational elements with which they are engaged reach zero, and means controlled by the actuators for recording the data upon the totalizers as they are restored to zero.

103. In a machine of the class described, the combination of a plurality of registers having entries therein, means for restoring the registers to zero one by one, means for recording the amounts on the registers, and means for recording the numbers of the registers by perforations as they are cleared.

104. In a machine of the class described, the combination of a plurality of totalizers arranged in order, means for selecting the totalizers one by one to be cleared, means for restoring the selected totalizers to zero, punching mechanism controlled by the restoring means for producing in a record sheet perforations corresponding to the data on the totalizers, and punching mechanism for producing in the record perforations corresponding to the order of the totalizers.

105. In a machine of the class described, the combination of a plurality of totalizers arranged in order, means for selecting the totalizers one by one to be cleared, means for restoring the selected totalizers to zero, punching mechanism controlled by the restoring means for producing in a record perforations corresponding to the data on the totalizers, a printing mechanism also controlled by the restoring means for printing on the record the data contained on the totalizers, punching mechanism for producing in the record perforations corresponding to the order of the totalizers, and printing means for producing on the record in printed form the order of the totalizers.

106. In a machine of the class described, the combination of a plurality of totalizers arranged in order, means for selecting the totalizers one by one to be cleared, means for restoring the selected totalizers to zero, punching mechanism and printing mechanism both controlled by the restoring means for producing records corresponding to the amounts upon the totalizers, the two records being juxtaposed with relation to each other so that the printed record is the interpretation of the perforated record, and punching and printing mechanism for recording the number of each totalizer as it is cleared, the two records being juxtaposed with respect to each other so that the latter is the interpretation of the former.

107. In a machine of the class described, the combination of a plurality of registers arranged in order, means for selecting the registers one by one to be cleared, means for restoring the selected registers to zero, means controlled by the registers for stopping the restoring means when the registers reach zero, means controlled by the restoring means for producing a perforated record of the data on the registers, and means for producing a perforated record of the number of each register in its order as it is cleared.

108. In a machine of the class described, the combination of a plurality of totalizers arranged in order, means for selecting the totalizers one by one to be cleared, actuators equal in number to the denominations of the totalizers for restoring the selected totalizers to zero, punches controlled by each actuator for recording data corresponding to the particular denomination of the totalizer which it actuates, and punches for recording the number of each totalizer as it is cleared.

109. In a machine of the class described, the combination of groups of totalizers arranged ten to the group, means for selecting the groups one by one, means for selecting the totalizers one by one from the selected groups, means for restoring the selected totalizers to zero, means for recording on a record the data of each totalizer, means for recording the groups on the record, and means for recording on the record the individual totalizers as they are cleared.

110. In a machine of the class described, the combination of a plurality of groups of totalizers arranged ten to the group, means for selecting the groups, means for selecting the totalizers one by one from the selected groups, means for restoring the selected totalizers to zero, means for recording the data of each totalizer, means for recording the groups, and means for recording the individual totalizers.

111. In a machine of the class described, the combination of a plurality of groups of totalizers, means for selecting the groups one by one, means for selecting the totalizers from the groups one by one, actuators equal in number to the denominations of the totalizers, means controlled by the group selecting means for operating the selected totalizers one by one, means controlled by the actuators for recording the data on the totalizers as they are cleared, means for recording the group to which the totalizer being cleared belongs, and means for recording the numbers of the individual totalizers as they are cleared.

112. In a machine of the class described, the combination of a plurality of groups of totalizers arranged ten to the group, each group of ten totalizers being arranged in line upon a shaft, a tens selector for selecting the groups of totalizers, a units selector for selecting the totalizers one by one from the selected groups, actuators equal in number to the denominations of the totalizers for restoring the same to zero, means for engaging the totalizers with the actuators, means controlled by each actuator for recording the data of the denomination which it controls, means for recording the group to which the totalizers being cleared belong, and means for recording the numbers of the individual totalizers.

113. In a machine of the class described, the combination of a plurality of groups of totalizers, an electrical selecting mechanism for selecting the groups one by one, an electrical selecting mechanism for selecting the totalizers one by one from the selected groups, actuators equal in number to the denominations of the totalizers, means for engaging the selected totalizers one by one with the actuators, means controlled by the denominational elements of the totalizers for stopping the actuators when the totalizers reach zero, and means for recording the data and the numbers of the totalizers.

114. In a machine of the class described, the combination of a plurality of groups of totalizers arranged ten to the group, the totalizers of each group being arranged in line by denominations upon a single shaft, actuators equal in number to the denominations of the totalizers, an electrical selector for selecting the group or groups of totalizers, an electrical selector for selecting the individual totalizers one by one from the selected groups, means for engaging the totalizers one by one with the actuators, electro-magnetic means controlled by the totalizers for stopping the actuators when the several denominational elements reach zero, record producing devices controlled by the several actuators for producing a record of the data of each denominational element, record producing devices for recording the groups, and record producing devices for recording the number of the totalizers one by one as they are cleared.

115. In a machine of the class described, the combination of a plurality of groups of totalizers, the totalizers of each group being arranged by denominations upon a single shaft with spaces between the denominations, a single set of actuators equal in number to denominations in the totalizers, a record, means controlled by the record for selecting one or more groups, means controlled by the record for selecting a totalizer from each of the selected groups by positioning the shafts of the selected groups in such a manner with respect to the actuators that the latter will engage the elements of the selected totalizers, means controlled by the record for so positioning all other groups with respect to the actuators that the latter shall occupy the blank spaces between the denominations of the totalizers, and means for operating the actuators.

116. In a machine of the class described, the combination of a plurality of groups of totalizers, the totalizers of each group being arranged by denominations upon a single shaft with blank or home positions between the denominations, actuators therefore equal in number to the denominations in the totalizers, record controlled means for selecting a totalizer from each of one or more groups, record controlled means for engaging the selected totalizers with the actuators, record controlled means for placing all groups from which totalizers have not been selected in the blank or home position, and means for operating the actuators.

117. In a machine of the class described, the combination of a plurality of groups of totalizers, the totalizers of each group being arranged by denominations upon a single shaft, with spaces between the denominations, the shafts being arranged in two sets in planes parallel to each other, a single set of actuators therefor equal in number to the denominations in the totalizers, record controlled means for determining the positions of the groups with respect to the actuators, thereby determining which, if any, totalizers are to be selected, means for positioning all groups from which no totalizers have been selected so that all totalizers of these groups shall occupy the home or blank positions, and record controlled means for operating the actuators so as to enter upon the selected totalizers pre-determined data.

118. In a machine of the class described, the combination of a plurality of registers, a control record having data control points and classification control points, means controlled by the record for selecting registers as determined by the classification control points and entering therein the data represented by the data control points, and means controlled by the registers for making a perforated record of the data which they contain.

119. In a machine of the class described, the combination of a plurality of registers, a control record having data control perforations and classification control perforations therein, means controlled by the record for selecting one or more registers as determined by the classification perforations and entering therein the data represented by the data control perforations, means for clearing the totalizers one by one in predetermined order, and means for making a perforated record of the data of each register as cleared and for simultaneously making a perforated record of the number of the register.

120. In a machine of the class described, the combination of a plurality of registers, a control record having data control perforations and classification control perforations therein, means controlled by the record for selecting one or more registers as determined by the classification perforations and entering therein the data represented by the data control perforations, means for clearing all the registers in a predetermined order, and means actuated by the registers as they are cleared for producing a perforated record of the data on the register and its number.

121. In a machine of the class described, the combination of a plurality of registers arranged by groups, a control record having data control perforations and classification control perforations arranged in positions equal to the number of groups in which the registers are divided, means controlled by the record for selecting registers one from each of one or more groups as determined by the perforations in the group position and means for entering in the registers the data represented by the data control perforations, means for clearing the registers one by one in a predetermined order and for producing a record of the data thereof as they are cleared, and means for simultaneously recording the group from which the registers are taken and the number of each register in the group to which it belongs.

122. In a machine of the class described, the combination of a plurality of registers, a control record having data perforations and classification perforations therein, means controlled by the record for selecting registers as determined by the classification perforations and entering therein data represented by the data perforations, and means controlled by the registers for simultaneously recording on a sheet both by perforations and printed characters the amount on each register, and means for recording on a sheet both by perforations and printed characters its number as it is cleared.

123. In a machine of the class described, the combination of a plurality of registers, a control record having data perforations and classification perforations, means controlled by the record for selecting registers as determined by the classification perforations and entering therein data represented by the data perforations, means for selecting the registers one by one in definite order, means for restoring the selected registers to zero in the order of their selection, means controlled by the restoring means for recording the data on the totalizers, and means controlled by the selecting means for recording the number of each totalizer as it is cleared.

124. In a machine of the class described, the combination of a plurality of totalizers, a control record having data control perforations and classification control perforations therein, means controlled by the record for selecting totalizers as determined by the classification perforations and entering therein data as determined by the data control perforations, means for selecting the totalizers one by one to be cleared, means for restoring the selected totalizers to zero, punching mechanism controlled by the restoring means for producing a record sheet having perforations corresponding to the data on the totalizers, and punching means for producing in the record sheet perforations corresponding to the order of the totalizers as they are cleared.

125. In a machine of the class described, the combination of a plurality of totalizers, a control record having data control perforations and classification control perforations, means controlled by the record for selecting totalizers as determined by the classification perforations and entering therein data represented by the data perforations, means for selecting the totalizers one by one to be cleared, means for restoring the selected totalizers to zero, punching mechanism controlled by the restoring means for producing a record having perforations corresponding to the data on the totalizers, a printing mechanism also controlled by the restoring means for printing on the record the data contained on the totalizers, punching mechanism for producing in the record perforations corresponding to the order of the totalizers and printing means for producing on the record in printed form the numbers of the totalizers.

126. In a machine of the class described, the combination of a plurality of totalizers, a control record having data control perforations and classification control perforations therein, means controlled by the record for selecting registers as determined by the classification perforations and entering therein data represented by the data perforations, means for selecting the totalizers one by one to be cleared, actuators equal in number to the denominations in the totalizers for restoring the selected totalizers to zero, punches controlled by each actuator for recording data corresponding to the particular denomination of the totalizer which it actuates, and punches for recording the number of each totalizer as it is cleared.

127. In a machine of the class described, the combination of a plurality of groups of totalizers, a control record having therein data control perforations and classification control perforations arranged by positions, means controlled by the record for selecting totalizers as determined by the classification perforations and entering therein data represented by the data perforations, means for selecting the totalizers group by group, means for selecting the totalizers one by one from the selected groups, means for restoring the selected totalizers to zero in the order of their selection, means for recording the data of each totalizer as it is cleared, means for recording the groups, and means for recording the numbers of the individual totalizers.

128. In a machine of the class described, the combination of a plurality of groups of totalizers arranged ten to the group, a control record having therein data control perforations and classification control perforations arranged by groups, means controlled by the perforations for selecting the totalizers as determined by the classification perforations and entering therein data represented by the data perforations, means for selecting the groups one at a time, means for selecting the totalizers one by one from the selected groups, means for restoring the selected totalizers to zero, means for recording on a sheet the data of each totalizer, means for recording on the sheet the order of the groups, and means for recording on the sheet the order of the individual totalizers as they are selected.

129. In a machine of the class described, the combination of a plurality of totalizers arranged by groups, a control record having therein data control perforations and classification perforations, means controlled by the record for selecting totalizers as determined by the classification perforations and entering therein data as represented by the data perforations, means for selecting the groups of totalizers one by one, means for selecting the totalizers from the groups one by one, actuators equal in number to the denominations of the totalizers, means controlled by the actuators for recording on a record sheet the data taken from the totalizers, means for recording the group to which the totalizer being cleared belongs, and means for recording on the sheet the particular totalizers as they are cleared.

130. In a machine of the class described, the combination of a plurality of registers, means common to all of the registers for operating the same, record controlled means for simultaneously selecting the registers to be actuated when the machine is used to compile data, automatic means for selecting the registers one by one in a definite order when the machine is being cleared, recording mechanism controlled by the registers for recording the data on the registers as they are cleared, and means for operating either the record controlled means, or the recording devices, depending upon whether the machine is being used to compile data or to record the data of the registers.

131. In a machine of the class described, the combination of a plurality of totalizers, actuators therefor common to all of the totalizers, record controlled means for simultaneously selecting the totalizers to be actuated when the machine is used to compile data; recording means controlled by the totalizer when the machine is used to record data; a manual control shaft, and means governed by the shaft for engaging the record controlled means and for disengaging the recording devices when the machine is used to compile data, and for disengaging the record controlled means and engaging the recording devices when the machine is used to record data.

132. In a machine of the class described, the combination of a plurality of totalizers, actuators therefor common to all of the totalizers, a perforated control record, means for supporting and feeding the record, means controlled by the record for selecting the totalizers to be actuated when the machine is used to record data, a record sheet, perforating means controlled by the totalizers when the machine is used to record data to perforate the record sheet to indicate the totalizers cleared, and manual means for engaging the record controlled means and for disengaging the recording devices when the machine is used to compile data, and for disengaging the record controlled means and engaging the recording devices when the machine is used to record data.

133. In a machine of the class described, the combination of a plurality of groups of totalizers, actuators therefor common to all of the totalizers, a perforated control record for use when the machine is employed to compile data, an analyzer for interpreting the record, means controlled by the record and analyzer for selecting a totalizer from each of one or more groups, a second record, perforating means therefor controlled by the totalizers when the machine is used to record data, and means for connecting the analyzer and record controlled means and for disconnecting the perforating means, when the machine is used to compile data, and for disconnecting the analyzer and record controlling devices, and connecting the perforating means when the machine is used to record data.

134. In a machine of the class described, the combination of a plurality of totalizers, record controlled means for simultaneously selecting totalizers and entering data thereon, means for automatically returning the totalizers to zero one by one, means for automatically making a perforated record of the data on the totalizers one by one as they are cleared, a common driving means, and means for connecting with the driving means either the record controlled means or the recording devices, depending upon whether the machine is being used to compile data or to record the data of the totalizers.

135. In a machine of the class described, the combination of a plurality of groups of totalizers, record controlled means for selecting a totalizer from each of one or more groups, record controlled means for entering data upon the selected totalizers, means for automatically selecting the totalizers one by one to restore them to zero, means for automatically making both a perforated and printed record of the totalizers as they are cleared, and means for driving either the data entering mechanism or the recording devices, depending upon whether the machine is being used to compile data or to record the data which is upon the totalizers.

136. In an auditing and recording machine the combination of a plurality of totalizers arranged by groups, actuators therefor to be used either when entering data or clearing the totalizers, group controlling mechanism for selecting totalizer groups either when compiling data or when the totalizers are being cleared, record controlled means for operating both the group controlling mechanism and the actuators when the machine is used to compile data, automatic means for operating both the group selecting means and the actuators when the machine is being cleared, and means for driving either the record controlled mechanism or the automatic mechanism, depending upon whether the machine is used to compile data or to record the data which is upon the totalizers.

137. In an auditing and recording machine, the combination of a plurality of groups of totalizers, record controlled means for selecting the groups and the totalizers from the groups, and means for actuating the selected totalizers, to enter thereon the amounts indicated by the record; automatic means for selecting the groups of totalizers and the totalizers from the groups, means for restoring them to zero, means for recording the data and means for driving either the auditing mechanism or the recording mechanism, depending upon whether the machine is being used to compile or to record data.

138. In an auditing and recording machine, the combination of a plurality of totalizers arranged by groups, actuators common to all the totalizers for turning them in one direction for the entry of data thereon or for turning them in the opposite direction for restoring them to zero, record controlled means for selecting the totalizers for the entry of data by the actuators, automatic means for selecting the totalizers one by one to be cleared by the actuators, a driving mechanism, and a manual adjusting device for so timing the movements that the actuators will engage the totalizers to enter data when the machine is record controlled, and to engage the totalizers to clear the same when the automatic means is in operation.

139. In a machine of the class described, the combination of a plurality of totalizers, a set of actuators common to the totalizers, means for operating the actuators to either enter data upon the totalizers or to clear the same, record controlled means for simultaneously selecting one or more totalizers for the entry of data thereon by the actuators, automatic means for selecting the totalizers one by one in definite sequence to be cleared by the actuators, means controlled by the totalizers as they are restored to zero for recording the data thereon, means for driving the machine, and manual means for so timing the operation of the parts that the actuators shall operate the totalizers to enter data when the machine is used to compile data and to clear the totalizers when the machine is used to record the data on the totalizers.

140. In a machine of the class described, the combination of a plurality of accumulating elements, actuating means common thereto for turning the accumulating elements in either direction, zero stops one for each accumulating element, electro-magnetic means for controlling the actuating means, and means common to all the zero stops for controlling the electro-magnetic device.

141. In a machine of the class described, the combination of groups of totalizers, actuators one for each denomination of all the totalizers of all the groups, zero stops one for each denomination of each group, electro-magnetic means for controlling the actuators of the several denominations and means whereby any zero stop of any group of the same denomination may control the electro-magnetic device for the actuator of that denomination.

142. In a machine of the class described, the combination of groups of totalizers, actuators one for each denomination of all the totalizers of all the groups, zero stops one for each denomination of each group, a differential mechanism for controlling each actuator, an electro-magnetic device for positioning the differential, and switches whereby any zero stop of any group of the same denomination may control the electro-magnetic device for the actuator for that denomination.

143. In a machine of the class described, the combination of groups of totalizers, actuators one for each denomination of all the totalizers of all the groups, zero stops one for each denomination of each group, a movable member adapted to be shifted by any zero stop of any group of the same denomination, and means whereby the movable element controls the actuator for that denomination.

144. In a machine of the class described, the combination of groups of totalizers, actuators one for each denomination of all the totalizers of all the groups, zero stops one for each denomination of each group, a movable element common to all the zero stops for any denomination for moving the zero stops for that denomination into and out of operative position with respect to the totalizers and a movable element likewise common to all of the zero stops of any denomination for controlling the actuator for that denomination.

145. In a machine of the class described, the combination of groups of totalizers, actuators one for each denomination of all the totalizers of all the groups, a differentially movable element for each actuator, a stop for each differential for positioning the same, and means whereby any zero stop of any group of the same denomination may control the stop for the differential.

146. In a machine of the class described, the combination of groups of totalizers, actuators one for each denomination of all the totalizers of all the groups, an electro-magnetic device for controlling the position of each actuator, a switch for each electro-magnetic device, zero stops one for each denomination of each group, and means whereby any zero stop of any group of the same denomination may operate the movable element, thereby closing the switch which controls the electro-magnetic device for that denomination.

147. In a machine of the class described, the combination of groups of totalizers, actuators one for each denomination of all the totalizers of all the groups, zero stops one for each denomination of each group, a slide for engaging all of the zero stops for any denomination for moving them into and out of operative relation with respect to the totalizers, means operating in timed relation with other parts of the machine for operating the slide, and means whereby any zero stop of any group of the same denomination may control the actuator for that denomination.

148. In a machine of the class described, the combination of groups of totalizers arranged in two sets, the sets being arranged in planes horizontal to each other, actuators one for each denomination of all the totalizers of all the groups, arranged to move between the sets of totalizers, zero stops one for each denomination of each group, a movable element arranged to move between the sets of totalizers for moving all of the zero stops into and out of operative position, and means whereby any zero stop of any group of the same denomination may control the actuator for that denomination.

149. An actuator for operating registers comprising a frame made of two similar sheets of uniform width spaced apart, a plurality of main rack sections rigidly secured between the frame plates, supplemental rack sections one for each main section pivotally mounted in the frame plates for movement to and from the end of its coacting main rack, the supplemental racks for use with the main racks on either side of the frame being pivoted near the other side thereof.

150. An actuator for operating registers comprising a frame made of two similar sheets of uniform width from end to end, a plurality of main rack sections rigidly secured between the edges of sheets on each side thereof, supplemental rack sections pivoted in the frame plates and projecting one adjacent each main rack sections on both sides of the rack structure, means for effecting relative movement of the supplemental rack sections with respect to the main rack sections, and an additional rack by means of which the structure may be adjusted.

151. In a machine of the class described, the combination of an accounting element, a driver having an invariable extent of movement, a differential member for adjusting said accounting element and having a variable extent of movement, a latch for securing the driver and the member together, a bank of electrical contacts, a movable contact mounted on the differential cooperating with the bank of contacts, and means for unlatching the driver and the differential at different points so as to position the movable contact differentially with respect to the fixed contacts of the contact bank.

152. In a machine of the class described, the combination of an accounting element, a driver having an invariable extent of movement, a differential for adjusting said accounting element and having a variable extent of movement, a latch for securing the driver and the differential together, an electrical contact bank having a fixed contact extending throughout the length thereof and a plurality of separated contacts, the structure being arranged concentric with the axis of the driver, a movable contact secured to the differential and having two leaves, one adapted to engage the long contact and the other the individual contacts, and means for unlatching the driver and the differential at varying positions, thereby connecting any one of the desired separated contacts with the long contact.

153. In a machine of the class described, the combination of an accounting element, a driver having an invariable extent of movement, a differential for adjusting said accounting element and having a variable extent of movement, a latch for securing the driver and the differential together, a double contact bank comprising an arcuate member arranged concentric with the axis of the driver, with separate contacts arranged on both sides thereof, two contact members mounted upon the differential, one to engage with the contacts on one side and the other on the other side of the contact bank, and means for unlatching the differential from the driver at varying positions, thereby positioning the movable contacts with respect to the fixed contacts of the bank.

154. In a machine of the class described, the combination of an accounting element, a driver having an invariable extent of movement, a differential for adjusting said accounting element and having a variable extent of movement, a latch for securing the driver and the differential together, a double contact bank comprising a central supporting plate, a long contact upon each side of the supporting plate, a plurality of separated contacts adapted to be connected one by one to the long contact, two contacts mounted upon the differential, each having two leaves, one to continuously engage the long contact, the other to intermittently engage the separator contacts, and means for unlatching the driver and the differential so as to variously position the movable contacts with respect to the contacts of the contact bank.

155. In a machine of the class described, the combination of an accounting element, a driver having an invariable extent of movement, a differential for adjusting said accounting element and having a variable extent of movement, a latch for securing the driver and the differential together, a rack carried by the differential having a definite number of teeth, a contact bank arranged concentric to the axis of the driver, having a long contact extending substantially the length of the bank and a plurality of separate contacts equal in number to the teeth of the rack, a contact mounted upon the differential and having two blades, one adapted to continuously contact with the long contact of the bank and the other adapted to contact with any one of the separate contacts, depending upon the position assumed of the differential, and means for unlatching the driver and the differential so that the differential may stop at the point desired and the contact selected which corresponds to the position assumed by the differential.

156. In a machine of the class described, the combination of an accounting element, a driver having an invariable extent of movement, a differential for adjusting said accounting element and having a variable extent of movement, an electrical contact bank, a contact fixed to the differential so as to assume the position taken by the differential and arranged to move over the contact bank, as determined by the position assumed by the differential.

157. In a machine of the class described, the combination of an accounting element, a driver having an invariable extent of movement, a differential actuated by the driver for adjusting said accounting element and having a variable extent of movement, a contact secured to the differential and movable therewith, a contact bank having a plurality of seperate contacts any one of which may be engaged by the movable contact, and means disassociating the driver and the differential so as to position the movable contact with respect to any one of the separate contacts of the bank.

158. In a machine of the class described, the combination of an accounting element, a driver having an invariable extent of movement, a differential for adjusting said accounting element and which may assume any one of a definite number of fixed positions, a latch for securing the driver and the differential together, a contact bank having a long contact and a plurality of separate contacts, all insulated from each other and arranged in co-operative relation with the differential, a contact carried by the differential and having two leaves, one arranged to continuously engage the long contact of the bank, and the other to contact with any one of the separated contacts, as may be determined by the position assumed by the differential, and means for unlatching the driver and the differential at any desired position.

159. In a machine of the class described, the combination of an accounting element, a driver having an invariable extent of movement, and a differential for adjusting said accounting element and having a variable extent of movement, a latch for securing the driver and the differential together, a contact bank, a contact adapted to move over the bank, a support for the contact, a beam and link connection between the support and the differential, a beam actuator working in conjunction with the beam for positioning the contact support as determined by the position of the differential, and means for unlatching the driver and the differential.

160. In a machine of the class described, the combination of an accounting element, a driver having an invariable extent of movement, a driven member for adjusting said accounting element and having a variable extent of movement, means for latching the two members together, a contact bank having a plurality of separated contacts, a contact mounted on the movable element so as to move over separated contacts, a second contact bank having separated contacts, a contact to move over the separated contacts of the second bank, a support for the last mentioned contact, a beam and link connection between the support and the differential, a beam actuator co-operating with the beam to position the second contact, as determined by the differential, and means for unlocking the driver and the differentially movable element.

161. In an auditing machine, the combination of a plurality of registers, a record control sheet, means governed by the control sheet for actuating the registers, electro-magnetic means for controlling the operation of the machine, a circuit for supplying current to the electro-magnetic devices, a generator for supplying current to the circuit, a motor for driving the generator, a switch in the motor circuit, an electro-magnet in the distribution circuit for controlling the switch in the motor circuit, a normally closed switch in series with the magnet for controlling the motor circuit, means actuated by the machine when uncontrolled by the control sheet for opening the last mentioned switch, thereby de-energizing the magnet which controls the motor circuit, thereby stopping the motor and the generator which supplies current to the system.

162. In an auditing machine, the combination of a plurality of registers, a control sheet having analyzing and control perforations, a contact making device operating in conjunction with the control perforations, an electric motor for operating the machine, a motor control switch, a normally locked switch actuating means, a manipulative device for effecting the closing of the magnet circuit, an electro-magnet for controlling the manipulative device, a circuit for the electro-magnetic devices in series with the detector contacts, means for supplying current to these devices, the detector contact being adapted to maintain the circuit broken except when the record is in proper position and permitting the energization of the magnets when the contacts register with the control perforations of the control sheet.

163. In an auditing machine, the combination of a plurality of registers, a control sheet having amount perforations therein, and control perforations therein for positioning the sheet, detector contacts working in conjunction with these perforations so as to make circuit through the perforations when the sheet is properly placed, electro-magnetic devices in series with the detector contacts for controlling the starting of the machine, a manipulative device for effecting the starting of the mechanism, a latch controlled by the electro-magnetic device for controlling the manipulative device so that the manipulative device cannot be operated until the electro-magnetic device is operated.

164. In a machine of the class described, the combination of two or more groups of totalizers, totalizer selecting means for each group, electro-magnetic means connected in multiple circuits for controlling the selecting means, and record controlled means for controlling the energization of the circuits and thereby determining the selection of the totalizers.

165. In a machine of the class described, the combination of two or more groups of totalizers, totalizer selecting means for each group, electro-magnetic means connected in multiple circuits for controlling the selecting means, a control record having control positions equal in number to the groups of totalizers, and an analyzer for each group of totalizers for interpreting the record.

166. In a machine of the class described, the combination of a group of totalizers, a differential mechanism for effecting selection of totalizers from the group, electro-magnetic means for controlling the position of the differential, a circuit for the electro-magnetic means, an analyzer adapted to make circuits as determined by a control record, a contact bank having two sets of contacts each set having a line contact in the circuit and a plurality of analyzer contacts arranged in cooperative relation to the line contacts, electrical connections between the analyzer and the analyzer contacts, two movable contacts one for each set of the bank contacts adapted to electrically connect the analyzer with the line contacts, and means for moving the movable contacts in unison with the differential mechanism, whereby the magnet of the electro-magnetic means is energized when the movable contacts complete a circuit which has been selected by the analyzer.

167. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, analyzer contacts for each totalizer group adapted to make circuits as determined by a control record, a contact bank having two sets of contacts, each set having a line contact for connecting it in circuit and a plurality of selector contacts arranged in cooperative relation to the line contacts, electrical connections between the analyzer contacts and the selector contacts, two movable contacts one for each set of bank contacts adapted to electrically connect the analyzer contacts with the line contacts, and means for moving the movable contacts in unison with the differential mechanism with which they are respectively associated, whereby the magnets of the respective electro-magnetic means are energized when the movable contacts of the respective banks complete circuits which have been selected by the analyzers.

168. In a machine of the class described, the combination of a group of totalizers, a differential mechanism for effecting selection of totalizers from the group, electro-magnetic means for controlling the position of the differential, a circuit for the electro-magnet means, a perforated control record, analyzer contacts adapted to make circuits as determined by the control record, a contact bank having two sets of contacts each set having a line contact and a plurality of selector contacts arranged in cooperative relation to the line contacts, electrical connections between the analyzer contacts and the selector contacts, two movable contacts one for each set of the bank contacts adapted to electrically connect the selector contacts with the line contacts, and means for moving the movable contacts in unison with the differential mechanism, whereby the magnet of the electro-magnetic means is energized when the movable contacts complete a circuit which has been selected by the analyzer contacts.

169. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, analyzer contacts for each totalizer group adapted to make circuits as determined by a control record, contact banks one for each totalizer group each bank having two sets of contacts each set having a line contact for connecting it in circuit and a plurality of selector contacts arranged in cooperative relation to the line contacts, electrical connections between the analyzer contacts and the selector contacts, two movable contacts one for each set of the bank contacts of the respective differentials adapted to electrically connect the selector contacts with the line contacts, means for moving the movable contacts in unison with the differential mechanism with which they are respectively associated, whereby the magnets of the respective electro-magnetic means are energized when the movable contacts of the respective banks complete circuits which have been selected by the analyzer contacts.

170. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, a perforated control record having control perforations arranged in columns equal in number to the groups of totalizers, analyzer contacts for each totalizer group adapted to make circuits as determined by the control record, contact banks one for each totalizer group each bank having two sets of contacts each set having a line contact for connecting it in circuit and a plurality of selector contacts arranged in cooperative relation to the line contacts, electrical connections between the analyzer contacts and the selector contacts, two movable contacts one for each set of the bank contacts of the respective differentials adapted to electrically connect the selector contacts with the line contacts, and means for moving the movable contacts in unison with the differential mechanism with which they are respectively associated, whereby the magnets of the respective electro-magnetic means are energized when the movable contacts of the respective banks complete circuits which have been selected by the analyzer contacts.

171. In a machine of the class described, the combination of two or more groups of totalizers, selecting means associated with each group for effecting the selection of totalizers from the groups, electro-magnetic means for controlling the position of each selecting means, a circuit for each electro-magnetic means, an analyzer common to the groups of totalizers adapted to make circuits as determined by a control record, contact banks one for each selecting means, electrical connections arranged in parallel between the analyzer and the contacts of the several banks, so that one analyzer may control the selecting means of any of the totalizer groups, and means for determining which differential shall be in circuit.

172. In a machine of the class described, the combination of two or more groups of totalizers, differential mechanisms one for each totalizer group for effecting selection of totalizers from the groups, electro-magnetic means for each differential for controlling the position thereof, a circuit for each electro-magnetic means, an analyzer common to the several groups of totalizers adapted to make circuits as determined by a control record, contact banks one for each totalizer group, electrical connections arranged in parallel between the analyzer and the contacts of all the contact banks, so that one analyzer may control the differentials of any of the totalizer groups, and means for determining which differential shall be in circuit.

173. In a machine of the class described, the combination of two or more groups of totalizers, differential mechanisms one for each totalizer group for effecting selection of totalizers from the groups, electro-magnetic means one for each differential for controlling the position thereof, a circuit for each electro-magnetic means, an analyzer common to the several groups of totalizers adapted to make circuits as determined by a control record, contact banks one for each totalizer group each bank having two sets of contacts each set having a line contact for connecting it in circuit and a plurality of selector contacts arranged in cooperative relation to the line contact, electrical connections arranged in parallel between the analyzer and the selector contacts of all the contact banks, so that one analyzer may control the differentials of any of the totalizer groups, means for determining which differential shall be in circuit, and means for determining the position of the last mentioned means.

174. In a machine of the class described, the combination of two or more groups of totalizers, differential mechanisms one for each totalizer group for effecting selection of totalizers from the groups, electro-magnetic means one for each differential for controlling the position thereof, a circuit for each electro-magnetic means, an analyzer common to the several groups of totalizers adapted to make circuits as determined by a control record, contact banks one for each totalizer group each bank having two sets of contacts each set having a line contact for connecting it in circuit and a plurality of selector contacts arranged in cooperating relation to the line contacts, electrical connections arranged in multiple between the analyzer and the selector contacts of all the contact banks, so that one analyzer may control the differentials of any of the totalizer groups, means for determining which differential shall be in circuit, and record controlled means for determining the position of the last mentioned means.

175. In a machine of the class described, the combination of two or more groups of totalizers, differential mechanisms one for each totalizer group for effecting selection of totalizers from the groups, electro-magnetic means one for each differential for controlling the position thereof, a circuit for each electro-magnetic means, an analyzer common to the several groups of totalizers adapted to make circuits as determined by a control record, contact banks one for each totalizer group each bank having two sets of contacts each set having a line contact for connecting it in circuit and a plurality of selector contacts arranged in cooperative relation to the line contacts, electrical connections arranged in parallel between the analyzer and the selector contacts of all the contact banks, so that one analyzer may control the differentials of any of the totalizer groups, means for determining which differential shall be in circuit, and a record controlled differential mechanism for positioning the last mentioned means.

176. In a machine of the class described, the combination of two or more groups of totalizers, differential mechanisms one for each totalizer group for effecting selection of totalizers from the groups, electro-magnetic means one for each differential for controlling the position thereof, a circuit for each electro-magnetic means, an analyzer common to the several groups of totalizers adapted to make circuits as determined by a control record, contact banks one for each totalizer group each bank having two sets of contacts each set having a line contact for connecting it in circuit and a plurality of selector contacts arranged in cooperative relation to the line contacts, electrical connections arranged in parallel between the analyzer and the selector contacts of all the contact banks, so that one analyzer may control the differentials of any of the totalizer groups, means for determining which differential shall be in circuit, a differential mechanism for positioning the last mentioned means, a record having thereon perforations for determining the position of the differential mechanism, and an analyzer for interpreting the record and coacting therewith to control the differential mechanism.

177. In a machine of the class described, the combination of two or more groups of totalizers, totalizer selecting means, electro-magnetic means arranged in multiple for controlling the selecting means, and a mechanical switch for selecting the circuits and thereby determining the selection of the totalizers.

178. In a machine of the class described, the combination of two or more groups of totalizers, totalizer selecting means common to the groups, electro-magnetic means arranged in multiple for controlling the selecting means, and a mechanical switch for selecting the circuits and thereby determining the selection of the totalizers.

179. In a machine of the class described, the combination of two or more groups of totalizers, totalizer selecting means, electro-magnetic means arranged in multiple for controlling the selecting means, and a mechanical switch for selecting the circuits one by one in a definite order and thereby determining the selection of the totalizers.

180. In a machine of the class described, the combination of a group of totalizers, a selecting means, electro-magnetic means for controlling the position of the selecting means, a circuit for the electro-magnetic means, a mechanical totalizer selecting switch provided with a plurality of contacts, a contact bank having two sets of contacts each set having a line contact connected in the circuit and a plurality of selector contacts arranged in cooperative relation to the line contacts, electrical connections between the mechanical switch and the selector contacts, two movable contacts one for each set of bank contacts adapted to electrically connect the mechanical switch with the line contacts, and means for moving the movable contacts in unison with the selecting means, whereby the electro-magnetic means is energized when the movable contacts complete a circuit which has been closed by the mechanical switch.

181. In a machine of the class described, the combination of a group of totalizers, a differential mechanism for effecting selection of totalizers from the group, electro-magnetic means for controlling the position of the differential, a circuit for the electro-magnetic means, a mechanical switch provided with a plurality of contacts, a contact bank having two sets of contacts each set having a line contact connected in the circuit and a plurality of selector contacts arranged in cooperative relation to the line contacts, electrical connections between the mechanical switch and the selector contacts, two movable contacts one for each set of bank contacts adapted to electrically connect the mechanical switch with the line contacts, means for moving the movable contacts in unison with the differential mechanism, whereby the magnet of the electro-magnetic means is energized when the movable contacts complete a circuit which has been closed by the mechanical switch.

182. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, a mechanical switch common to the groups of totalizers provided with a plurality of contacts, contact banks one for each totalizer group each bank having two sets of contacts each set having a line contact for connecting it in circuit and a plurality of selector contacts arranged in cooperative relation to the line contacts, electrical connections between the mechanical switch and the selector contacts of all the contact banks so that one mechanical switch may control the differentials of any of the totalizer groups, and means for determining which group shall be under control.

183. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, a mechanical switch common to the groups of totalizers provided with a plurality of contacts, contact banks one for each totalizer group each bank having two sets of contacts each set having a line contact for connecting it in circuit and a plurality of selector contacts arranged in cooperative relation to the line contacts, electrical connections between the mechanical switch and the selector contacts of all the contact banks so that one mechanical switch may control the differentials of any of the totalizer groups, and a mechanical switch for connecting the circuits of the electro-magnetic means one at a time with a source of current supply.

184. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, a mechanical switch common to the groups of totalizers provided with a plurality of contacts, contact banks one for each totalizer group each bank having two sets of contacts each set having a line contact for connecting it in circuit and a plurality of selector contacts arranged in cooperative relation to the line contacts, electrical connections between the mechanical switch and the selector contacts of all the contact banks so that one mechanical switch may control the differentials of any of the totalizer groups, a mechanical switch for connecting the circuits of the electro-magnetic means one at a time with the source of current supply, and means for driving the mechanical switches in timed relation with respect to each other so that after the totalizers of one group are cleared those of another group are brought under control to be cleared.

185. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, a mechanical switch common to the groups of totalizers provided with a plurality of contacts, contact banks one for each totalizer group each bank having two sets of contacts each set having a line contact for connecting it in circuit and a plurality of selector contacts arranged in cooperative relation to the line contacts, electrical connections between the mechanical switch and the selector contacts of all the contact banks so that one mechanical switch may control the differentials of any of the totalizer groups, and two mechanical switches operating in unison for connecting the circuits of the electro-magnetic means one at a time with a source of current supply, one of the switches being arranged to control connection with the positive side of the source and the other with the negative side.

186. In a machine of the class described, the combination of two or more groups of totalizers, a differential mechanism for each totalizer group for effecting the selection of totalizers from the groups, electro-magnetic means one for each differential mechanism for controlling the position thereof, a circuit for each electro-magnetic means, a mechanical switch common to the groups of totalizers provided with a plurality of contacts, contact banks one for each totalizer group each bank having two sets of contacts each set having a line contact for connecting it in circuit and a plurality of selector contacts arranged in cooperative relation to the line contacts, electrical connections between the mechanical switch and the selector contacts of all the contact banks so that one mechanical switch may control the differentials of any of the totalizer groups, two mechanical switches operating in unison for connecting the circuits of the electro-magnetic means one at a time with a source of current supply, one of the switches being arranged to control connection with the positive side of the source and the other with the negative side, and means for driving all of the mechanical switches in timed relation with respect to each other so that after the totalizers of one group are cleared those of another are brought under control to be cleared.

187. In a machine of the class described, the combination of mechanism for auditing detail records, mechanism for auditing summary records, and means controlled by the respective records themselves for determining whether the machine shall function to audit the detail record or the summary record.

188. In a machine of the class described, the combination of mechanism for auditing detail records in which the data is promiscuously arranged, mechanism for auditing summary records in which the data is arranged in definite order, and means controlled by the respective records themselves for determining whether the machine shall function to audit the detail record or the summary record.

189. In a machine for auditing either detail or summary records, the combination of a plurality of totalizers, detail record controlled means for selecting totalizers as required by the detail record, summary record controlled means for selecting totalizers in a given sequence, and means for actuating the totalizers.

190. In a machine for auditing either detail or summary records, the combination of a plurality of totalizers, detail record controlled means for selecting totalizers as required by the detail record, summary record controlled means for selecting totalizers in a given sequence, and means controlled by the respective records themselves for determining whether the machine shall function to audit the detail record or the summary record.

191. In a machine for auditing either detail or summary records, the combination of a plurality of totalizers, a detail record, means controlled by the detail record for selecting totalizers as required by the record, a summary record, means controlled by the summary record for selecting the totalizers in a given sequence, and means for actuating the totalizers.

192. In a machine for auditing either detail or summary records, the combination of groups of totalizers, a group selector, detail record controlled means for selecting totalizers and for rendering the group selector inactive, summary record controlled means for controlling the group selector and for selecting the totalizers from the groups, and means for actuating the totalizers.

193. In a machine for auditing either detail or summary records, the combination of groups of totalizers, a group selector, means for automatically selecting the totalizers and for controlling the group selector so that it shall be inactive during the analysis of detail records, means for controlling the action of the group selector during the analysis of summary records so that it shall select the groups of totalizers one by one, means for selecting the totalizers from the selected groups, and means for actuating the totalizers.

194. In a machine for auditing either detail or summary records, the combination of groups of totalizers, a group selector, means for automatically selecting totalizers and for controlling the group selector so that it shall be inactive during the analysis of detail records, record controlled means for controlling the action of the group selector during the analysis of summary records so that it shall select the groups of totalizers as required by the record, means for selecting the totalizers from the selected groups, and means for actuating the totalizers.

195. In a machine for auditing either detail or summary records, the combination of groups of totalizers, a group selector, means for automatically selecting the totalizers and for controlling the group selector so that it shall be inactive during the analysis of detail records, record controlled means for controlling the action of the group selector during analysis of summary records so that it shall select the groups of totalizers one by one, record controlled means for selecting totalizers from the selected groups, and means for actuating the totalizers.

196. In a machine for auditing either detail or summary records, the combination of groups of totalizers, a group selector, record controlled means for automatically selecting the totalizers and for controlling the group selector so that it shall be inactive during the analysis of detail records, record controlled means for controlling the action of the group selector during analysis of summary records so that it shall select the groups of totalizers one by one, record controlled means for selecting totalizers from the selected groups, and means for actuating the totalizers.

197. In a machine for auditing either detail or summary records, the combination of two or more groups of totalizers, means for segregating the groups when the machine is auditing detail records, means for selecting totalizers from the segregated groups, a second means for segregating the groups when the machine is auditing summary records, electro-magnetic means for cooperating in the selection of totalizers from the selected groups when analyzing either record, means controlled by the second segregating means for determining the group selected by the segregating means, a switch for connecting the electro-magnetic means in circuit when the machine is auditing detail records, totalizer selecting means common to the groups when the machine is arranged to analyze summary records, a second switch for connecting the totalizer selecting means in circuit with all of the group selectors when the machine is arranged to analyze summary records, means controlled by the second segregating means for operating the switches so that the first switch shall connect the electro-magnetic means in circuit when the machine is auditing detail records and disconnect it when auditing summary records, and to actuate the second switch to connect the totalizer selecting means in circuit with the several group selectors when the machine is used to analyze summary records and disconnect them when arranged to analyze detail records.

198. In a machine for auditing either detail or summary records, the combination of groups of totalizers, means for segregating the groups when the machine is auditing detail records, a second means for segregating the groups when the machine is auditing summary records, electro-magnetic means for controlling the selection of totalizers from the selected groups when analyzing either record, means controlled by the second segregating means for determining the group selected, a switch, and means controlled by the second segregating means for actuating the switch to connect the electro-magnetic means in circuit when the machine is auditing detail records and for breaking this connection when the machine is auditing summary records.

199. In a machine for auditing either detail or summary records, the combination of groups of totalizers, means for segregating the groups when the machine is auditing detail records, a second means for segregating the groups when the machine is auditing summary records, electro-magnetic means for controlling the selection of totalizers from the selected groups when analyzing either record, electro-magnetic means controlled by the second segregating means for determining the group selected, a switch, and means controlled by the second segregating means for actuating the switch to connect the electro-magnetic means in circuit when the machine is auditing detail records and for breaking this connection when the machine is auditing summary records.

200. In a machine for auditing either detail or summary records, the combination of groups of totalizers, means for segregating the groups when the machine is auditing detail records, a second means for segregating the groups when the machine is auditing summary records, electro-magnetic means for controlling the selection of totalizers from the selected groups when analyzing either record, record controlled means for controlling the second segregating means and thereby determining the group selected, a switch, and means controlled by the second segregating means for actuating the switch to connect the electro-magnetic means in circuit when the machine is auditing detail records and for breaking this connection when the machine is auditing summary records.

201. In a machine for auditing either detail or summary records, the combination of groups of totalizers, means for segregating the groups when the machine is auditing detail records, a second means for segregating the groups when the machine is auditing summary records, electro-magnetic means for controlling the selection of totalizers from the selected groups when analyzing either record, record controlled electro-magnetic means for controlling the second segregating means and thereby determining the group selected, a switch, and means for actuating the switch to connect the electro-magnetic means in multiple when the machine is auditing detail records and for breaking this connection when the machine is auditing summary records.

202. In a machine for auditing either detail or summary records, the combination of groups of totalizers, means for segregating the groups when the machine is auditing detail records, a second means for segregating the groups when the machine is auditing summary records, electro-magnetic means for controlling the selection of totalizers from the selected groups when analyzing either record, an electro-magnetic record controlled differential for controlling the second segregating means and thereby determining the group selected, a switch, and means controlled by the second segregating means for actuating the switch to connect the electro-magnetic means in circuit when the machine is auditing detail records and for breaking this connection when the machine is auditing summary records.

203. In a machine for auditing either detail or summary records, the combination of groups of totalizers, means for segregating the groups when the machine is auditing detail records, a mechanical selector for segregating the groups when the machine is auditing summary records, electro-magnetic means for controlling the selection of totalizers from the selected groups when analyzing either record, means for controlling the position of the mechanical selector and thereby determining the group selected, a switch, and means controlled by the mechanical selector for actuating the switch to connect the electro-magnetic means in circuit when the machine is auditing detail records and for breaking this connection when the machine is auditing summary records.

204. In a machine for auditing either detail or summary records, the combination of groups of totalizers, means for segregating the groups when the machine is auditing detail records, a mechanical selector for segregating the groups when the machine is auditing summary records, electro-magnetic means for controlling the selection of totalizers from the selected groups when analyzing either record, a differential for controlling the position of the mechanical selector and thereby determining the group selected, a switch, and means controlled by the mechanical selector for actuating the switch to connect the electro-magnetic means in multiple when the machine is auditing detail records and for breaking this connection when the machine is auditing summary records.

205. In a machine for auditing either detail or summary records, the combination of groups of totalizers, means for segregating the groups when the machine is auditing detail records, a mechanical selector for segregating the groups when the machine is auditing summary records, electro-magnetic means for controlling the selection of totalizers from the selected groups when analyzing either record, a record controlled differential for controlling the position of the mechanical selector and thereby determining the group selected, a switch, and means controlled by the mechanical selector for actuating the switch to connect the electro-magnetic means in multiple when the machine is auditing detail records and for breaking this connection when the machine is auditing summary records.

206. In a machine for auditing either detail or summary records, the combination of groups of totalizers, means for segregating the groups when the machine is auditing detail records, a mechanical selector for segregating the groups when the machine is auditing summary records, electro-magnetic means for controlling the selection of totalizers from the selected groups when analyzing either record, an electro-magnetic record controlled differential for controlling the position of the mechanical selector and thereby determining the group selected, a switch, and means controlled by the mechanical selector for actuating the switch to connect the electro-magnetic means in multiple when the machine is auditing detail records and for breaking this connection when the machine is auditing summary records.

207. In a machine of the class described, the combination of record controlled analyzing contacts, a contact bank, the bank comprising two separate sets of contacts, two movable contacts one for each set adapted to connect the contacts of the respective sets one by one in circuit, conductors connecting the analyzing contacts with the bank contacts, and means for actuating the movable contacts.

208. In a machine of the class described, the combination of record controlled analyzing contacts, a contact bank, the bank comprising two separate sets of contacts, two movable contacts one for each set adapted to connect the contacts of the respective sets one by one in circuit, conductors connecting the analyzing contacts with the bank contacts, means for actuating the movable contacts, and electro-magnetic means in circuit with the analyzer for stopping the contact actuating means.

209. In a machine of the class described, the combination of analyzing contacts, a contact bank, the bank comprising two separate sets of contacts, two movable contacts one for each set adapted to connect the contacts of the respective banks one by one in circuit, conductors connecting the analyzing contacts with the bank contacts, and means for actuating the movable contacts.

210. In a machine of the class described, the combination of a plurality of record controlled analyzing contacts, a contact bank, the bank comprising two separate sets of contacts, an extra contact for each set with which any of its set may be electrically connected, two movable contacts one for each set adapted to connect the contacts of the respective sets one by one with the extra contact of that set, conductors connecting the analyzing contacts with the bank contacts, and means for actuating the movable contacts.

211. In a machine of the class described, the combination of a plurality of analyzing contacts, a contact bank, the bank comprising two separate sets of contacts, an extra contact for each set with which any of its set may be electrically connected, two movable contacts one for each set adapted to connect the contacts of the respective sets one by one with the extra contact of that set, conductors connecting the analyzing contacts with the bank contacts, means for actuating the movable contacts, and electro-magnetic means in circuit with the analyzer for stopping the contact actuating means.

212. In a machine of the class described, the combination of a contact plate, analyzing contacts adapted to cooperate with the contact plate, a bank of contacts, the bank comprising two separate sets of contacts, an extra contact for each set with which any of its set may be electrically connected, two movable contacts one for each set adapted to connect the contacts of the sets one by one with the extra contact of that set, conductors for connecting the contact plate and analyzing contacts with the bank contacts, and means for actuating the movable contacts.

213. In a machine of the class described, the combination of a contact plate, analyzing contacts adapted to cooperate with the contact plate, a control record to control the contacts, a bank of contacts, the bank comprising two separate sets of contacts, an extra contact for each set with which any of its companion set may be electrically connected, two movable contacts one for each set adapted to connect the contacts of the sets one by one with the extra contact of that set, conductors for connecting the contact plate and analyzing contacts with the bank contacts, and means for actuating the movable contacts.

214. In a machine of the class described, the combination of a contact plate, four analyzing contacts adapted to cooperate with the contact plate, a bank of contacts, the bank comprising two separate sets of ten contacts each, an extra contact for each set with which any of its companion set may be electrically connected, two movable contacts one for each set adapted to connect the ten contacts of the sets one by one with the extra contact of that set, conductors leading one from each of the four analyzing contacts to four of the contacts of the sets, and another conductor leading from the contact plate to four other contacts of the sets.

215. In a machine of the class described, the combination of a contact plate, four analyzing contacts adapted to cooperate with the contact plate, a bank of contacts, the bank comprising two sets of ten separate contacts, two movable contacts one for each set adapted to connect the ten contacts of the sets one by one in circuit, conductors leading one from each of the four analyzing contacts to four of the contacts of the bank, another conductor leading from the contact plate to four other contacts of the bank, and a control record having perforations through which any one or any two analyzing contacts may pass to make contact with the contact plate.

216. In a machine of the class described, the combination of a contact plate, four analyzing contacts adapted to cooperate with the contact plate, a bank of contacts, the bank comprising two sets of ten separate contacts each, an extra contact for each with which any of its companion set may be electrically connected, conductors leading one from each of the four analyzing contacts to four of the contacts of the bank, another conductor leading from the contact plate to four other contacts of the bank, two movable contacts one for each set adapted to connect the ten contacts of the sets one by one with the extra contacts of the respective sets, and means for actuating the movable contacts with relation to the contacts of the sets once for each cycle of the machine so as to complete the circuit through whatever analyzing contacts may have engaged the plate contact during that cycle.

217. In a machine of the class described, the combination of a contact plate, four analyzing contacts adapted to cooperate with the contact plate, a bank of contacts, the bank comprising two sets of ten contacts each, an extra contact with which any of its companion set may be electrically connected, conductors leading one from each of the four analyzing contacts to four of the contacts of the bank, another conductor leading from the contact plate to four other contacts of the bank, two movable contacts one for each set adapted to connect the ten contacts of the sets one by one with the extra contact of that set, means for actuating the movable contacts with relation to the contacts of the sets one for each cycle of the machine so as to complete the circuit through whatever analyzing contacts may have engaged the plate contact during that cycle, and electro-magnetic means in circuit with the movable contacts for stopping the actuating means when the movable contacts shall have reached bank contacts through which a circuit is completed.

218. In a machine of the class described, the combination of mechanism for auditing detail records, mechanism for auditing summary records, recording mechanism, means for articulating the three mechanisms, means controlled by the respective records themselves for determining whether the auditing machine shall function to audit the detail or the summary records.

219. In a machine of the class described, the combination of mechanism for auditing detail records, mechanism for auditing summary records, recording mechanism, means for articulating the three mechanisms, means controlled by the respective records themselves for determining whether the auditing machine shall function to audit the detail or the summary records, and a shaft for operating the articulating means.

220. In a machine of the class described, the combination of accounting elements, a record control sheet, means controlled by said sheet for adjusting said accounting elements, an electric motor for driving said adjusting means, a motor control switch, manipulative means for effecting the closing of the switch, a lock for normally holding the manipulative means against movement, and electromagnetic means controlled by the position of the record sheet for rendering said lock ineffective.

221. In a machine of the class described, the combination of accounting elements, a record control sheet, means controlled by said sheet for adjusting said accounting elements, an electric motor for driving said adjusting means, a motor control switch, manipulative means for effecting the closing of the switch, a lock for normally holding the manipulative means against movement, an electro-magnet for disengaging the locking means, means controlled by the record sheet for controlling the electro-magnet, and a source of current for energizing the magnet.

222. In a machine of the class described, the combination of accounting elements, a record control sheet, means controlled by said sheet for adjusting said accounting elements, an electric motor for driving said adjusting means, a motor control switch, a normally locked switch actuating means, manipulative means for controlling the switch actuating means, means for locking the manipulative means, electro-magnetic means controlled by the position of the record sheet for releasing the locking means, and means for energizing the electro-magnet.

223. In a machine of the class described, the combination of accounting elements, a record control sheet, means controlled by said sheet for adjusting said accounting elements, an electric motor for driving said adjusting means, a motor control switch, a normally locked switch actuating means, manipulative means for controlling the switch actuating means, means for locking the manipulative means, an electro-magnet controlled by the record sheet for releasing the locking means, means for energizing the electro-magnet, and means actuated by the motor for restoring the motor control switch to normal position thereby stopping the motor.

224. In a machine of the class described, the combination of accounting elements, a record control sheet, means controlled by said sheet for adjusting said accounting elements, an electric motor for driving said adjusting means, a motor control switch, a normally locked switch actuating means, a latch for controlling the switch actuating means, an electro-magnet controlled by the record sheet for controlling the latch, a source of current for energizing the magnet, a switch in the magnet circuit, and manipulative means for closing the last mentioned switch.

225. In a machine of the class described, the combination of accounting elements, a record control sheet, means controlled by said sheet for adjusting said accounting elements, an electric motor for driving said adjusting means, a motor control switch, a normally locked switch actuating means, a latch for controlling the switch actuating means, an electro-magnet controlled by the record sheet for controlling the latch, a source of current for energizing the magnet, a switch in the magnet circuit, manipulative means for closing the last mentioned switch, means controlled by the position of the record sheet for breaking the circuit of the magnet, and means operated by the motor for restoring the motor control switch to its normal position.

226. In a machine of the class described, the combination of accounting elements, a record control sheet, means controlled by said sheet for adjusting said accounting elements, an electric motor for driving said adjusting means, a motor control switch, a normally locked switch actuating means, manipulative means and a latch operating in conjunction for controlling the switch actuating means, an electro-magnet controlled by the record sheet for controlling the manipulative means, and a second electro-magnet for controlling the latch and circuits for the respective magnets.

227. In a machine of the class described, the combination of accounting elements, a record control sheet, means controlled by said sheet for adjusting said accounting elements, an electric motor for driving said adjusting means, a motor control switch, a normally locked switch actuating means, manipulative means and a latch operating in conjunction for controlling the switch actuating means, an electro-magnet controlled by the record sheet for controlling the manipulative means, and a second electro-magnet for controlling the latch, circuits for the respective magnets, and circuit controlling devices common to the circuits of the magnets.

228. In a machine of the class described, the combination of accounting elements, means adapted to be controlled by a record sheet for adjusting said accounting elements, an electric motor for driving said adjusting means, a motor control switch, a normally locked switch actuating means, a latch for controlling the switch actuating means, an electro-magnet for controlling the latch, manipulative means for starting the machine, a circuit for the electro-magnet, a switch in the circuit controlled by the record sheet, and means operated by the manipulative means when it is operated to start the machine to close the circuit through the electro-magnet.

229. In a machine of the class described, the combination of accounting elements, a record control sheet, means controlled by said sheet for adjusting said accounting elements, an electric motor for driving said adjusting means, a motor control switch, a normally locked switch actuating means, a latch controlled switch actuating means, manipulative means working in conjunction with the latch for controlling the switch actuating means, a second latch for normally holding the manipulative means against movement, an electro-magnet for actuating the first mentioned latch, another electro-magnet for operating the second latch, circuits controlled by the record sheet for the respective magnets, and a switch in the circuit of the first mentioned magnet actuated by the manipulative means so that the magnet is energized as the manipulative means is operated.

230. In a machine of the class described, the combination of accounting elements, means adapted to be controlled by a record sheet for adjusting said accounting elements, an electric motor for driving said adjusting means, a main switch, an actuator therefor, a latch for controlling the actuator, an electro-magnet for actuating the latch, a circuit for the magnet, a plurality of switches in series in the circuit and controlled by the record sheet so that all must be closed before the magnet will be energized, the opening of any of which will open the circuit for the magnet.

231. In a machine of the class described, the combination of accounting elements, mechanism for operating in conjunction with a record sheet for adjusting said accounting elements, means for supporting the sheet in operative position, an electric motor for driving said mechanism, a motor control switch, a normally locked switch actuating means, an electro-magnet for controlling the switch actuating means, a circuit for the magnet, a switch in this circuit, an electro-magnet for operating the last mentioned switch, contacts normally separated by the record sheet, a second circuit in parallel to the first mentioned circuit through the last mentioned magnet, and contacts whereby if no sheet is present between the contacts or if the sheet should be ruptured, the contacts will close the circuit through the last mentioned magnet, which in turn will break the circuit through the first mentioned magnet and stop the machine if it is in operation or prevent the starting of the motor if the sheet is not in place.

232. In a machine of the class described, the combination of accounting elements, a record control sheet, means controlled by said sheet for adjusting said accounting elements, a distribution circuit, a generator for supplying current thereto, a motor for the generator, a switch in the motor circuit, an electro-magnetic switch in the distribution circuit for holding closed the switch in the motor circuit, and circuit controlling means in series with the electro-magnetic switch and governed by the record control sheet, whereby the switch is held closed as long as current passes through the magnet but is opened as soon as the controlling means are opened.

233. In a machine of the class described, the combination of accounting elements, a record control sheet, means controlled by said sheet for adjusting said accounting elements, a distribution circuit, a generator for supplying current thereto, a motor for the generator, a switch in the motor circuit, a motor in the distribution circuit for operating the switch, a manual switch and automatic circuit controllng devices both arranged in series with the magnet and governed by the record control sheet so that the current is maintained through the magnet whereby the switches are closed but is interrupted as soon as they are broken.

234. In a machine of the class described, the combination of accounting elements, a record control sheet, means controlled by said sheet for adjusting said accounting elements, a distribution circuit, a generator for supplying current thereto, a motor for the generator, a switch in the motor circuit, a magnet for holding the switch closed while the current passes therethrough, a switch in series with the magnet, electro-magnetic means controlled by the record sheet for controlling the last mentioned switch arranged in an independent circuit, contacts in series with the last mentioned magnet adapted to be separated by the record sheet under normal working conditions but arranged to come together under abnormal conditions whereby the second magnet is operated under abnormal conditions and the switch in the circuit with the first magnet opened thus stopping the main motor.

235. In a machine of the class described, the combination of accounting elements, mechanism operating in conjunction with a record sheet for adjusting said accounting elements, contacts between which the sheet normally moves but which are adapted to come together in absence of the sheet, a motor, a distributing system, a generator for supplying current for the motor, a switch in the motor circuit, a magnet for operating the switch in the distribution circuit, a normally closed switch controlling the last mentioned circuit, a magnet for operating this switch arranged in an independent circuit and in series with the detecting contacts, whereby upon the rupture of the sheet or its absence or displacement the detecting contacts cause the second magnet to be energized, the circuit of the first magnet to be opened, and the motor circuit broken, thereby stopping the machine.

236. In a machine of the class described, the combination of accounting elements, mechanism operating in conjunction with a record control sheet for adjusting the accounting elements, an electric motor for operating said mechanism, a switch in the motor circuit, electro-magnetic means governed by the record sheet controlling the switch, a circuit for supplying current to the electro-magnetic means, a generator for supplying current to this circuit, a motor for driving the generator, means operated by the current supplied by the generator for controlling the current supplied to the motor, means actuated by the machine for interrupting the last mentioned circuit whereby the generator is de-energized and the circuit for the main operating motor is interrupted.

237. In a machine of the class described, the combination of an accounting element, a driver having an invariable extent of movement, a differential adapted to be adjusted under control of said accounting element, an electrical contact bank, a contact fixed to the differential so as to assume the position taken by the differential and arranged to move over the contact bank, as determined by the position assumed by the differential.

238. In a machine of the class described, the combination of an accounting element, a driver having an invariable extent of movement, a differential actuated by the driver and controlled by said accounting element, an electrical contact secured to the differential and movable therewith, a contact bank having a plurality of separate contacts any one of which may be engaged by the movable contacts and means disassociating the driver and the differential so as to position the movable contact with respect to any one of the separate contacts of the bank.

239. In a machine of the class described, the combination of means for feeding a control record in a given direction, groups of totalizers, and totalizer selecting devices one for each group, arranged transversely of the path of movement of the record.

240. In a machine of the class described, the combination of means for feeding a control record in a given direction, groups of totalizers, totalizer selecting devices one for each group of totalizers for selecting the totalizers from the groups, and means for moving the selecting devices toward and from the path of movement of the record.

241. In a machine of the class described, the combination of means for feeding a control record in a given direction, groups of totalizers, a differential for each group to select the totalizers from the groups, and selecting devices one for each group arranged transversely of the path of movement of the record for controlling the differentials.

242. In a machine of the class described, the combination of means for feeding a control record in a given direction, groups of totalizers, a differential for each group to select the totalizers from the groups, selecting devices one for each group of totalizers arranged transversely of the path of movement of the record for controlling the differentials, and means for moving the selecting devices toward and from the record.

243. In a machine of the class described, the combination of means for feeding a control record in a given direction, groups of totalizers, differentials one for each group for selecting the totalizers from the groups, electro-magnetic means for controlling the differentials, and selecting devices one for each group arranged transversely of the path of movement of the record for controlling the electro-magnetic means.

244. In a machine of the class described, the combination of means for feeding a control record in a given direction, groups of totalizers, differentials one for each group for selecting the totalizers from the groups, an electro-magnet for controlling each differential, and selecting devices one for each magnet arranged transversely of the path of movement of the record for controlling the electro-magnets.

245. In a machine of the class described, the combination of means for feeding a control record in a given direction, groups of totalizers, selecting devices one for each group of totalizers arranged across the path of movement of the record for selecting the totalizers from the groups, totalizer actuating means common to all the totalizers of the groups, and amount determining devices arranged across the path of movement of the record for controlling the actuating means.

246. In a machine of the class described, the combination of means for feeding a record in a given direction, groups of totalizers, actuators common to all the totalizers of all the groups, totalizer selecting devices one for each group of totalizers arranged across the path of movement of the record for selecting the totalizers of the groups, amount determining devices arranged across the path of movement of the record for controlling the actuators, and means for raising and lowering the selecting devices and the amount determining devices toward and from the record.

247. In a machine of the class described, the combination of means for feeding a control record in a given direction, groups of totalizers, selecting devices one for each group arranged across the path of movement of the record for selecting the totalizers from the groups, totalizer actuating means common to all the totalizers of the groups, differentials for controlling said actuating means, and amount determining devices arranged across the path of movement of the record for controlling the differentials.

248. In a machine of the class described, the combination of means for feeding a control record in a given direction, groups of totalizers, selecting devices one for each group of totalizers arranged across the path of movement of the record for selecting the totalizers from the groups, totalizer actuating means common to all the totalizers of the groups, differentials for controlling said actuating means, electro-magnetic means controlling said differentials, and amount determining devices arranged transversely of the path of movement of the record for controlling the electro-magnetic means.

In testimony whereof I affix my signature.

MAXIMILIAN M. GOLDBERG.